United States Patent
Oshima et al.

(10) Patent No.: US 11,983,019 B2
(45) Date of Patent: May 14, 2024

(54) UNMANNED AERIAL VEHICLE AND DELIVERY SYSTEM

(71) Applicant: Panasonic Intellectual Property Corporation of America, Torrance, CA (US)

(72) Inventors: Mitsuaki Oshima, Kyoto (JP); Takuya Takahama, Osaka (JP); Fumio Muramatsu, Kyoto (JP); Nobuaki Hayashi, Osaka (JP); Hideki Aoyama, Osaka (JP); Gaku Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 627 days.

(21) Appl. No.: 17/266,511

(22) PCT Filed: Aug. 9, 2019

(86) PCT No.: PCT/JP2019/031653
§ 371 (c)(1),
(2) Date: Feb. 5, 2021

(87) PCT Pub. No.: WO2020/032262
PCT Pub. Date: Feb. 13, 2020

(65) Prior Publication Data
US 2021/0300557 A1    Sep. 30, 2021

Related U.S. Application Data

(60) Provisional application No. 62/877,026, filed on Jul. 22, 2019, provisional application No. 62/785,882, (Continued)

(30) Foreign Application Priority Data

Aug. 31, 2018  (JP) .................................. 2018-162251
Feb. 5, 2019   (JP) .................................. 2019-018419

(51) Int. Cl.
*G05D 1/00*   (2006.01)
*B64D 31/00*  (2006.01)
(Continued)

(52) U.S. Cl.
CPC .............. *G05D 1/101* (2013.01); *B64D 31/00* (2013.01); *B64U 10/13* (2023.01); *B64U 30/20* (2023.01);
(Continued)

(58) Field of Classification Search
CPC ............ B64U 2101/60; B64U 2101/64; B64U 2101/67; B64U 10/60
See application file for complete search history.

(56) References Cited

U.S. PATENT DOCUMENTS 9,205,922 B1 * 12/2015 Bouwer ............... G05D 1/0858
9,650,136 B1 *  5/2017 Haskin ................... B64U 10/13
9,753,461 B1 *  9/2017 Johnson ................ B64D 47/08

FOREIGN PATENT DOCUMENTS

JP   2018-012477 A       1/2018
KR   20180038595 A  *   4/2018

OTHER PUBLICATIONS

International Search Report (ISR) (including English Language Translation), dated Oct. 29, 2019 by the Japan Patent Office (JPO), in International Application No. PCT/JP2019/031653.

* cited by examiner

*Primary Examiner* — Nicholas McFall
*Assistant Examiner* — Eric Acosta
(74) *Attorney, Agent, or Firm* — Greenblum & Bernstein, P.L.C.

(57) ABSTRACT

An unmanned aerial vehicle that delivers a package includes a plurality of rotary wings, a plurality of first motors, a main body, a connector, a movable block, and a processor. When
(Continued)

the connector is connected to a rail, the processor sets a rotation rate of the plurality of first motors to a rotation rate that is lower than a minimum rotation rate necessary for floating and higher than a minimum rotation rate necessary for propulsion along the rail. Furthermore, the processor causes the movable block to increase the angle formed by the normal direction of an imaginary plane containing the plurality of rotary wings relative to a support direction of the connector.

15 Claims, 89 Drawing Sheets

Related U.S. Application Data filed on Dec. 28, 2018, provisional application No. 62/716,595, filed on Aug. 9, 2018.

(51) Int. Cl.
*B64U 10/13* (2023.01)
*B64U 30/20* (2023.01)
*B64U 101/60* (2023.01)
*B64U 101/64* (2023.01)
*B64U 101/67* (2023.01)

(52) U.S. Cl.
CPC ...... *B64U 2101/60* (2023.01); *B64U 2101/64* (2023.01); *B64U 2101/67* (2023.01)

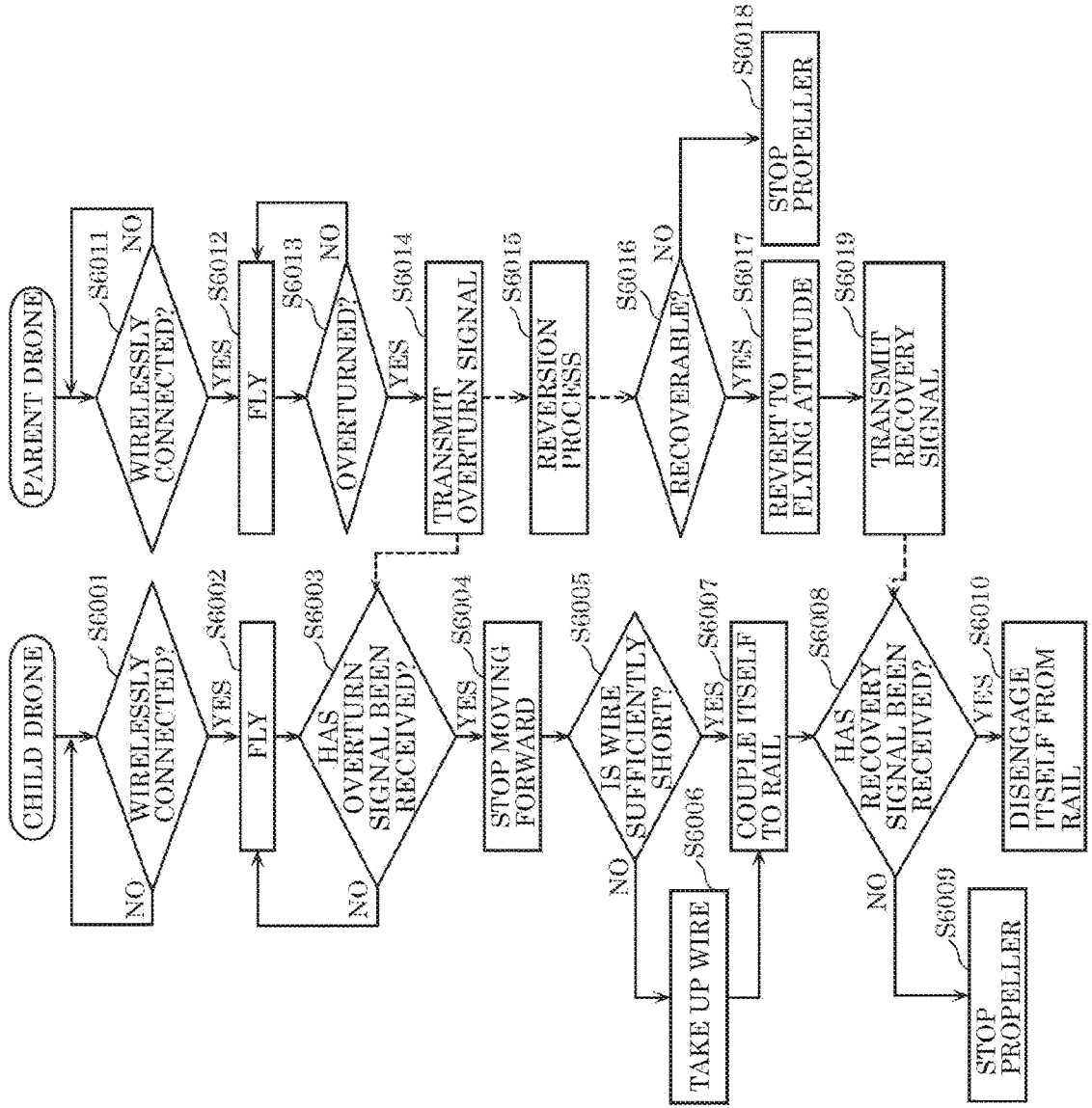

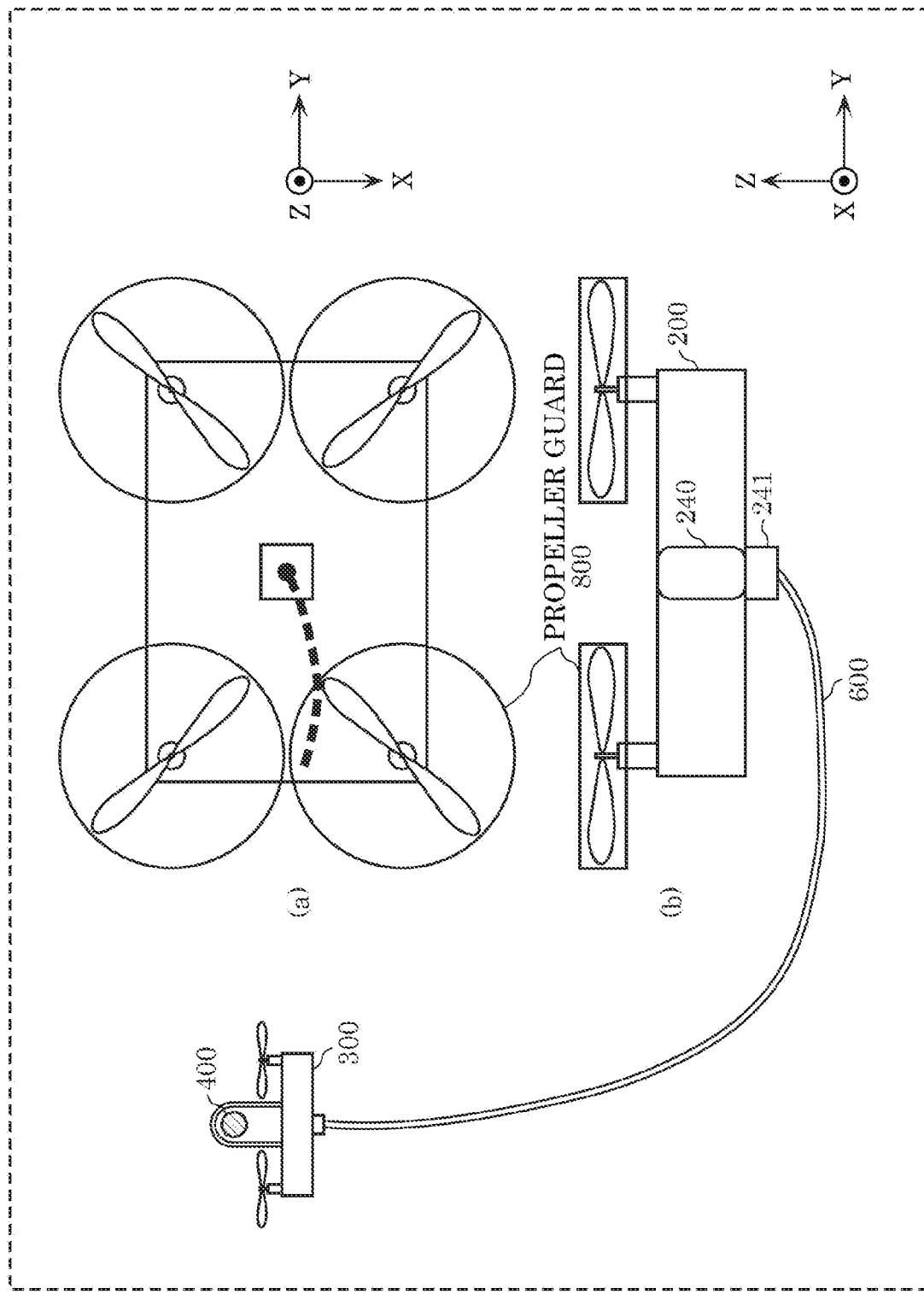

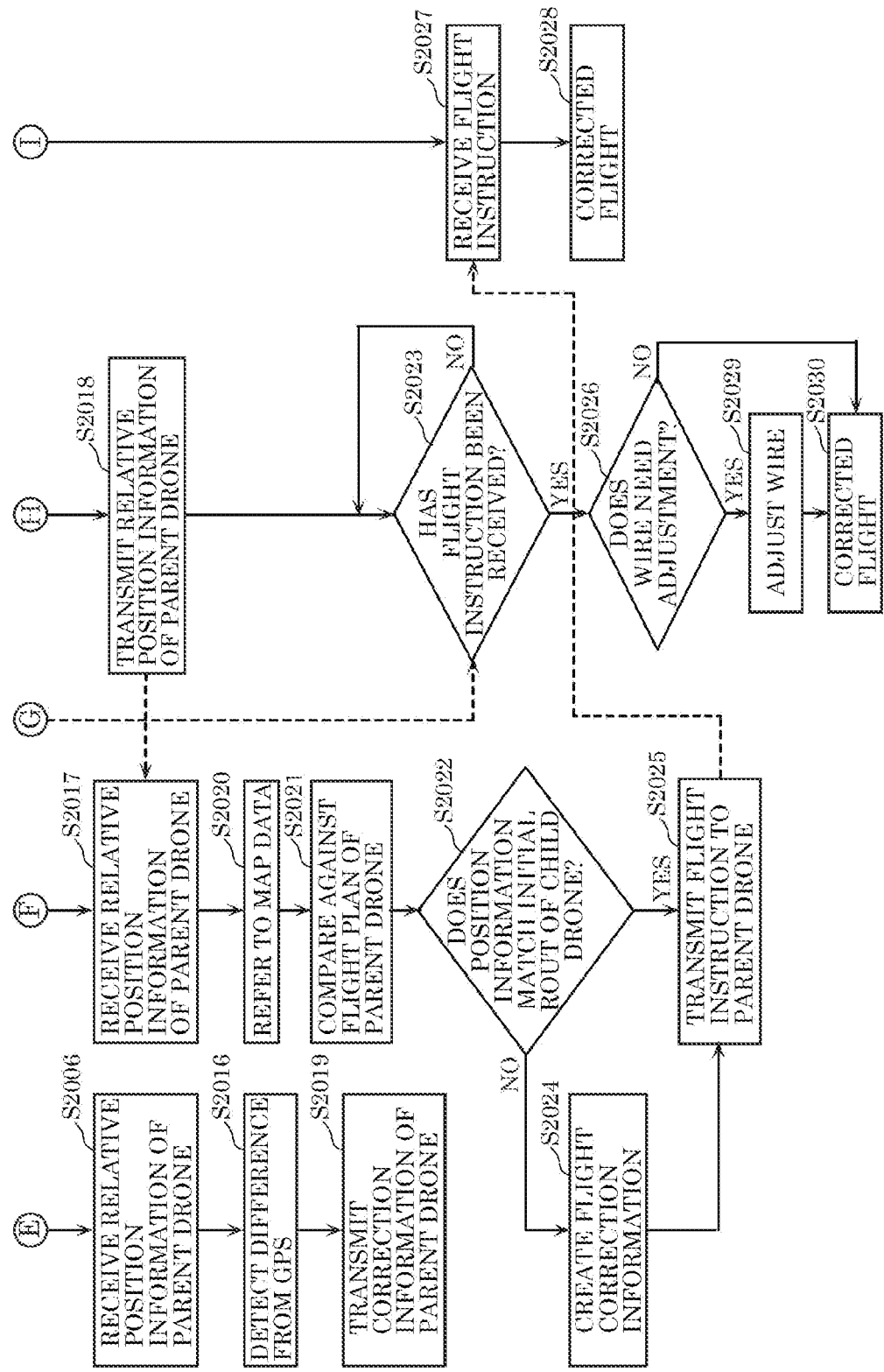

ARM IS ANCHORED TO RAIL

CHILD DRONE MAIN BODY DESCENDS

RETRACTED STATE

EXTENDED STATE

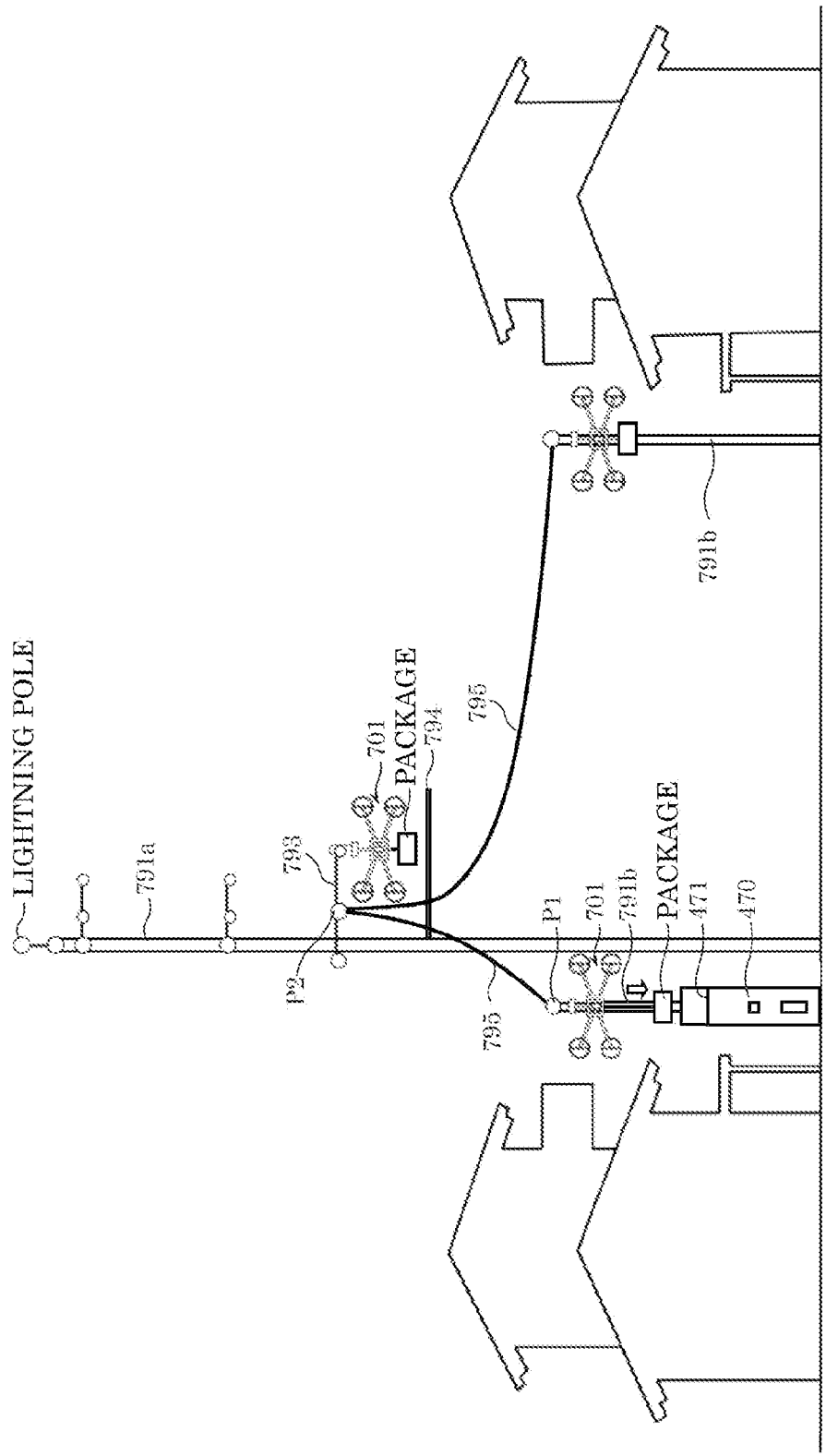

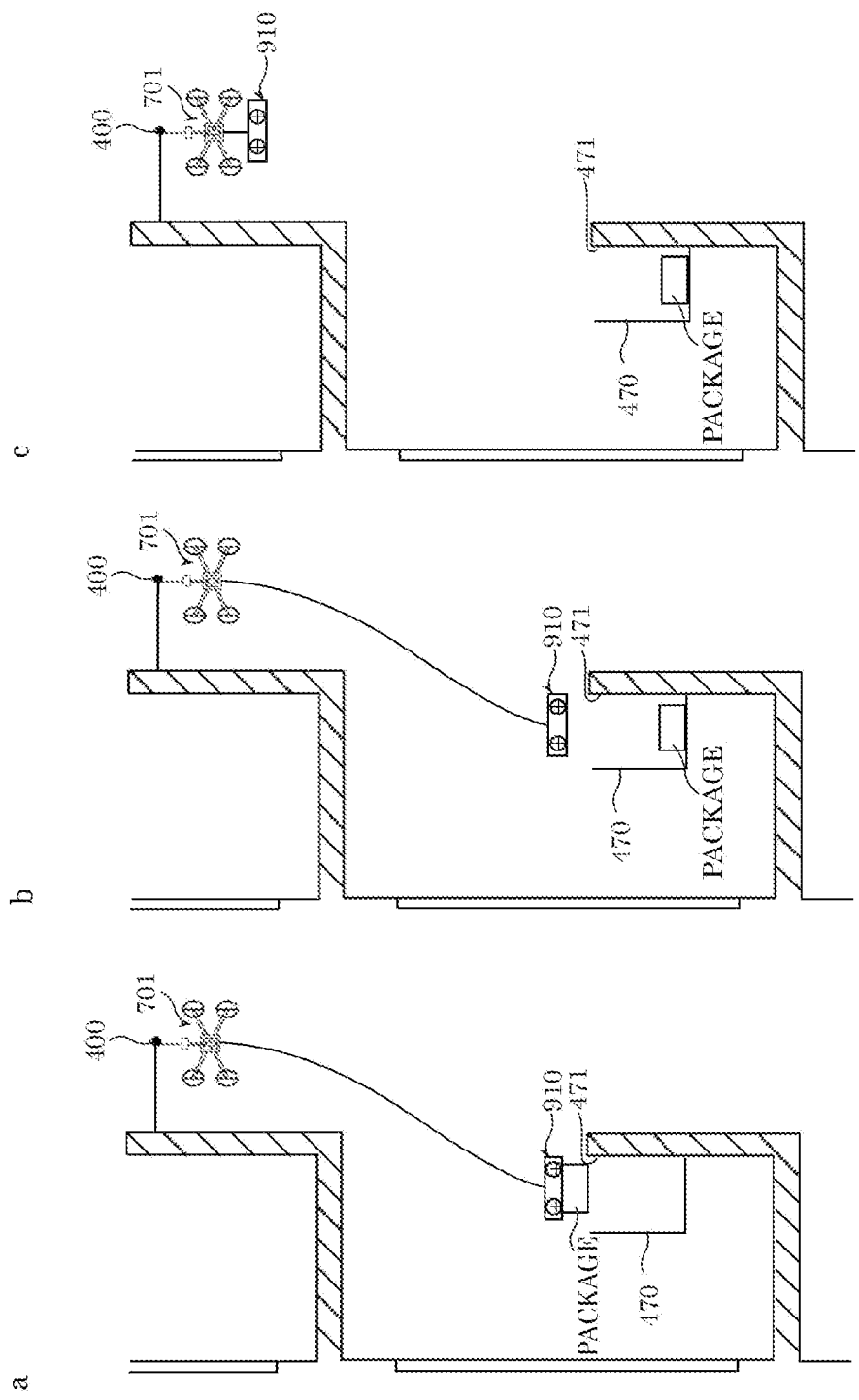

UNMANNED AERIAL VEHICLE AND DELIVERY SYSTEM

TECHNICAL FIELD

The present disclosure relates to an unmanned aerial vehicle and so on.

BACKGROUND ART

There is proposed a control method for providing improved safety while flying a drone, or an unmanned aerial vehicle (see, for example, Patent Literature 1).

Patent Literature 1 discloses a technique for detecting any anomaly in a flying drone with the use of various means and for retrieving the drone identified to be flying anomalously with the use of retrieving means provided on power lines, utility poles, or the like.

CITATION LIST

Patent Literature

PTL 1: Japanese Unexamined Patent Application Publication No. 2018-12477

SUMMARY OF THE INVENTION

Technical Problem

The unmanned aerial vehicle disclosed in Patent Literature 1 above can be improved upon.

Accordingly, the present disclosure provides an unmanned aerial vehicle improved upon the existing technique.

Solution to Problem

An unmanned aerial vehicle according to one aspect of the present disclosure is an unmanned aerial vehicle that delivers a package, and the unmanned aerial vehicle includes: a plurality of rotary wings; a plurality of first motors that rotate the plurality of rotary wings, respectively; a main body that supports the plurality of first motors; a connector that is to be connected to a rail, with the main body hanging from the connector, the rail being provided at a position spaced apart from a ground surface; a movable block that sets an inclination of an imaginary plane containing the plurality of rotary wings relative to a support direction in which the connector is supported on the rail; and a control circuit that controls the plurality of first motors and the movable block, wherein the connector includes: a first end connected to the main body; and a second end to be slidably connected to the rail, the support direction extends from the first end toward the second end of the connector, and when the second end of the connector is connected to the rail, the control circuit: (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends; and (ii) causes the movable block to increase an angle formed by a normal direction of the imaginary plane relative to the support direction of the connector.

It is to be noted that general or specific embodiments of the above may be implemented in the form of a system, a method, an integrated circuit, a computer program, or a computer readable recording medium, such as a CD-ROM, or may be implemented in the form of any desired combination of a system, a method, an integrated circuit, a computer program, and a recording medium.

Advantageous Effect of Invention

With the unmanned aerial vehicle and so on according to the present disclosure, further improvement can be achieved.

BRIEF DESCRIPTION OF DRAWINGS

FIG. 6 is a flowchart illustrating a second example of fall prevention control in the flying system according to Embodiment 1.

FIG. 8 schematically illustrates an appearance of a parent drone coupled to a child drone via a wire according to Embodiment 1.

FIG. 25B is another flowchart illustrating the control concerning how the position information of the parent drone is acquired according to Embodiment 1.

FIG. 63 is a schematic diagram illustrating an example of how a drone of the delivery system stores a package into a delivery box via a lead-in support pillar and a lead-in wire according to Embodiment 7.

FIG. 84 is a schematic diagram illustrating an example of how a drone delivers a package to an apartment building with the use of a thruster device of the delivery system according to Embodiment 9.

DESCRIPTION OF EXEMPLARY EMBODIMENTS

Figure 1:
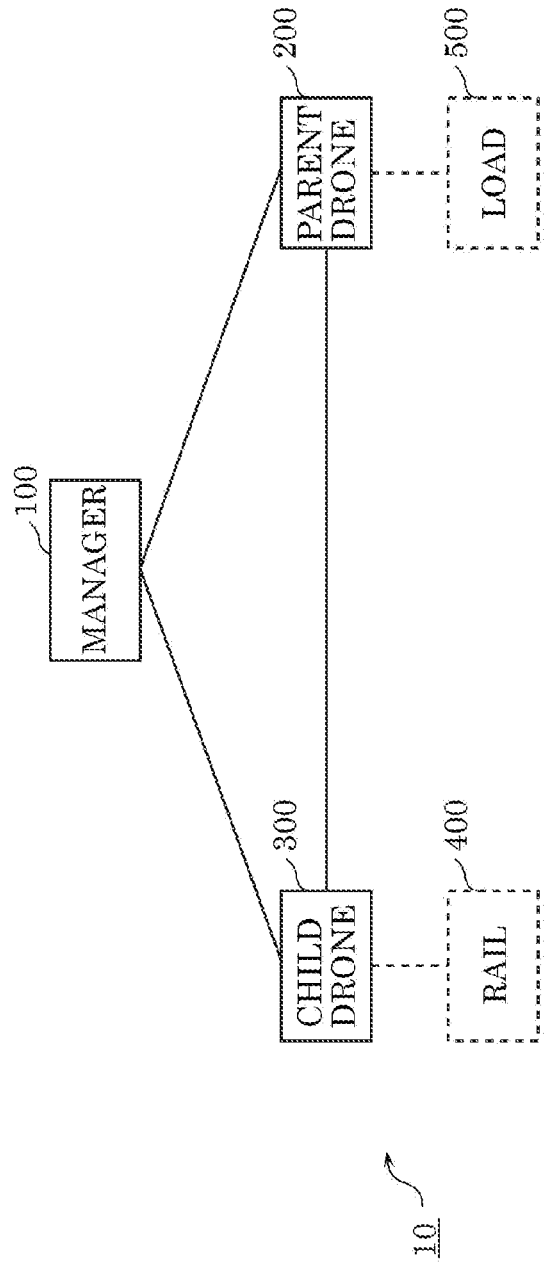
FIG. 1 is a schematic diagram illustrating a flying system according to Embodiment 1.

A control method of controlling an unmanned aerial vehicle according to one aspect of the present disclosure is a control method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The control method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

This method can reduce the possibility that the second unmanned aerial vehicle crashes into the ground, and a further improvement can be achieved as a result.

In the above (B), an operation of the first unmanned aerial vehicle may be changed from the forward movement to hovering.

This configuration allows the first unmanned aerial vehicle to remain in a predetermined position when an anomaly has occurred in the second unmanned aerial vehicle.

In the above (A), the first unmanned aerial vehicle may monitor the tension in the coupling line. In the above (B), the first unmanned aerial vehicle may detect an anomaly in flying of the second unmanned aerial vehicle based on a change in the tension.

This configuration allows the first unmanned aerial vehicle to detect an anomaly immediately when an anomaly has occurred in flying of the second unmanned aerial vehicle.

In the above (B), the first unmanned aerial vehicle may determine that an anomaly has occurred in flying of the second unmanned aerial vehicle when the tension has reached or exceeded a predetermined value.

This configuration allows the first unmanned aerial vehicle to quantitatively determine the presence of an anomaly when an anomaly has occurred in flying of the second unmanned aerial vehicle. The first unmanned aerial vehicle can detect an anomaly immediately when an anomaly has occurred in flying of the second unmanned aerial vehicle.

In the above (B), the second unmanned aerial vehicle may be caused to output an anomaly signal when an anomaly has occurred in flying of the second unmanned aerial vehicle, and the first unmanned aerial vehicle may determine that an anomaly has occurred in flying of the second unmanned aerial vehicle in response to receiving the anomaly signal.

This configuration allows the first unmanned aerial vehicle to detect an anomaly electrically when an anomaly has occurred in flying of the second unmanned aerial vehicle. The first unmanned aerial vehicle can receive the signal through wireless communication or wired communication. The first unmanned aerial vehicle can detect an anomaly immediately when an anomaly has occurred in flying of the second unmanned aerial vehicle.

The coupling line may include a communication cable, and the anomaly signal may be transmitted from the second unmanned aerial vehicle to the first unmanned aerial vehicle via the communication cable.

This configuration allows the first unmanned aerial vehicle to detect an anomaly immediately regardless of the radio signal reception status when an anomaly has occurred in flying of the second unmanned aerial vehicle.

The first unmanned aerial vehicle may include a camera. In the above (B), the first unmanned aerial vehicle may determine that an anomaly has occurred in the second unmanned aerial vehicle based on a video from the camera.

This configuration allows the first unmanned aerial vehicle to detect an anomaly while being aware of the specific situation through the video when an anomaly has occurred in flying of the second unmanned aerial vehicle even if no noticeable change occurs in the tension in the coupling line.

In the above (B), the length of the coupling line may be reduced when an anomaly has occurred in the second unmanned aerial vehicle.

This configuration makes it possible to reduce the size of the area in which the second unmanned aerial vehicle falls or the area in which the second unmanned aerial vehicle flies anomalously when an anomaly has occurred in the second unmanned aerial vehicle.

In the above (B), the length of the extended coupling line may be reduced by causing the first unmanned aerial vehicle to take up a portion of the coupling line.

This configuration makes it possible to reduce the length of the coupling line efficiently when an anomaly has occurred in the second unmanned aerial vehicle.

The system may further include a first rail fixed at a position spaced apart from the ground surface. In the above (A), the first unmanned aerial vehicle may be caused to move forward at a position where the first unmanned aerial vehicle is closer to the first rail than the second unmanned aerial vehicle is.

This configuration makes it possible to limit the flying route of the first unmanned aerial vehicle, and the first unmanned aerial vehicle can fly with higher spatial accuracy.

In the above (A), the first unmanned aerial vehicle may be caused to move forward at a position lower than the first rail.

This configuration allows the first unmanned aerial vehicle to fly stably.

In the above (A), the first unmanned aerial vehicle may be caused to move forward along the first rail with the first unmanned aerial vehicle being movably coupled to the first rail.

This configuration allows the first unmanned aerial vehicle to fly stably along the first rail.

In the above (B), the first unmanned aerial vehicle may be coupled to the first rail when an anomaly has occurred in flying of the second unmanned aerial vehicle.

This configuration allows the first unmanned aerial vehicle to fly stably even when an anomaly has occurred in the second unmanned aerial vehicle. In addition, the above configuration can keep the second unmanned aerial vehicle coupled to the first unmanned aerial vehicle via the coupling line from crashing into the ground.

The first unmanned aerial vehicle may include an arm that can be opened and closed. In the above (A), the first unmanned aerial vehicle may be caused to move forward with the arm open. In the above (B), the first unmanned aerial vehicle may be coupled to the first rail by closing the arm so as to enclose the first rail.

This configuration makes it possible to keep the first unmanned aerial vehicle from making contact with the rail while the first unmanned aerial vehicle is flying in the case of (A). In the case of (B), the above configuration allows the first unmanned aerial vehicle to fly stably even when an anomaly has occurred in the second unmanned aerial vehicle.

The arm may include a first arm and a second arm. When the arm is open, the distance between one end of the first arm and one end of the second arm is greater than the width of the first rail. When the arm is closed, the distance between the one end of the first arm and the one end of the second arm is smaller than the width of the first rail.

This configuration allows the first unmanned aerial vehicle to become disengaged from the rail while the arm is open and can keep the first unmanned aerial vehicle from becoming disengaged from the rail while the arm is closed.

The first unmanned aerial vehicle may be smaller than the second unmanned aerial vehicle.

This configuration can keep the first unmanned aerial vehicle from interfering with the flying second unmanned aerial vehicle, and the noise and so on can be reduced.

One end of the coupling line may be coupled to a lower surface of the first unmanned aerial vehicle while the first unmanned aerial vehicle is in a flying state.

This configuration can keep the coupling line coupling the first unmanned aerial vehicle and the second unmanned aerial vehicle from interfering with the flying first unmanned aerial vehicle.

The second unmanned aerial vehicle may include a ring that encloses the main body of the second unmanned aerial vehicle and that is rotatable relative to the main body. An outer peripheral surface of the ring may extend along a lower surface, a first side surface, an upper surface, and a second side surface of the main body of the second unmanned aerial vehicle while the second unmanned aerial vehicle is in a flying state. The other end of the coupling line may be coupled to the outer peripheral surface of the ring of the second unmanned aerial vehicle while the second unmanned aerial vehicle is in a flying state.

This configuration allows the second unmanned aerial vehicle to hang from the first unmanned aerial vehicle without flipping its body upside down even when the second unmanned aerial vehicle has fallen while flying.

The system may include a management server. The first rail may include a first recording surface on which first identification information for identifying the first rail is recorded. The first unmanned aerial vehicle may include at least one reading sensor for reading the first identification information from the first recording surface. In the above (A), the first unmanned aerial vehicle may cause the at least one reading sensor to read the first identification information continuously or intermittently. The first unmanned aerial vehicle may be caused to identify its own position based on the first identification information. The first unmanned aerial vehicle may be caused to wirelessly transmit first position information indicating the position of the first unmanned aerial vehicle to the management server continuously or intermittently.

This configuration allows the first unmanned aerial vehicle to identify its own position and in turn to fly with higher spatial accuracy.

In the above (A), the first unmanned aerial vehicle may be caused to wirelessly transmit second position information indicating the relative positions of the first unmanned aerial vehicle and the second unmanned aerial vehicle to the management server continuously or intermittently. The management server may be caused to identify the position of the second unmanned aerial vehicle based on the first position information and the second position information.

This configuration allows the management server to grasp the position of the second unmanned aerial vehicle. The second unmanned aerial vehicle can in turn fly with higher spatial accuracy.

Prior to the above (A), the first unmanned aerial vehicle may be caused to download, from the management server, route information indicating a plurality of rails disposed along a planned flying route of the first unmanned aerial vehicle and the second unmanned aerial vehicle. In the above (A), the first unmanned aerial vehicle may be caused to compare the first identification information against the rail information so as to identify the position of the first unmanned aerial vehicle.

This configuration allows the first unmanned aerial vehicle to acquire the rail information and to identify its own position based on the acquired rail information. Thus, the first unmanned aerial vehicle can fly with higher spatial accuracy.

The rail information may include identification information of each of the plurality of rails and coordinate information indicating the geographical coordinates of each of the plurality of rails.

This configuration allows the first unmanned aerial vehicle to identify each rail and to acquire the coordinate information indicating the position of each rail. Thus, the first unmanned aerial vehicle can fly with higher spatial accuracy.

The at least one reading sensor may be at least one optical sensor.

This configuration allows the first unmanned aerial vehicle to grasp the position of the rail, and thus the first unmanned aerial vehicle can fly with higher spatial accuracy.

The recording surface may be disposed on the outer peripheral surface of the first rail. The at least one optical sensor may include a plurality of optical sensors. In the above (A), the plurality of optical sensors may scan the recording surface in mutually different directions.

This configuration allows the first unmanned aerial vehicle to read the identification information and so on of the rail from different directions with the use of the plurality of sensors and thus to read the identification information of the rail reliably.

The first recording surface may have further recorded thereon altitude information indicating the altitude of the first rail.

This configuration allows the first unmanned aerial vehicle to acquire the altitude information of each rail, and thus the first unmanned aerial vehicle can fly with higher spatial accuracy.

The control method may further include (C) changing the flying course of the second unmanned aerial vehicle when a following aerial vehicle that flies behind the second unmanned aerial vehicle passes the second unmanned aerial vehicle.

This configuration allows the unmanned aerial vehicle flying behind the second unmanned aerial vehicle to pass the second unmanned aerial vehicle without colliding with the second unmanned aerial vehicle by causing the second unmanned aerial vehicle to change its flying course.

In the above (C), the flying course of the second unmanned aerial vehicle may be changed to a direction away from the first unmanned aerial vehicle.

This configuration can keep the second unmanned aerial vehicle from colliding with the first unmanned aerial vehicle when the second unmanned aerial vehicle is passed by the following aerial vehicle.

In the above (C), the second unmanned aerial vehicle may be returned to its original flying course after the following aerial vehicle has passed the second unmanned aerial vehicle.

This configuration allows the second unmanned aerial vehicle to return to its original flying course after having been passed by the following aerial vehicle and thus to continue flying along the flying course held before the second unmanned aerial vehicle has been passed by the following aerial vehicle.

In the above (C), the length of the coupling line extending from the first unmanned aerial vehicle to the second unmanned aerial vehicle may be increased before the following aerial vehicle passes the second unmanned aerial vehicle.

This configuration allows the second unmanned aerial vehicle to change its own flying course smoothly when the second unmanned aerial vehicle is to be passed by the following aerial vehicle.

The system may further include a third unmanned aerial vehicle that shares the first rail with the first unmanned aerial vehicle and a fourth unmanned aerial vehicle that is coupled to the third unmanned aerial vehicle via a coupling line. The control method may further include (D) changing the flying course of the first unmanned aerial vehicle when the third unmanned aerial vehicle flying behind the first unmanned aerial vehicle passes the first unmanned aerial vehicle.

With this configuration, as the first unmanned aerial vehicle is caused to change its flying course, the third unmanned aerial vehicle and the fourth unmanned aerial vehicle coupled to the third unmanned aerial vehicle via the coupling line can pass the first unmanned aerial vehicle without colliding with the first unmanned aerial vehicle.

In the above (D), the flying course of the first unmanned aerial vehicle may be changed to a direction away from the first rail.

This configuration allows the third unmanned aerial vehicle and the fourth unmanned aerial vehicle coupled to the third unmanned aerial vehicle via the coupling line to pass the first aerial vehicle without changing the courses of the third unmanned aerial vehicle and the fourth unmanned aerial vehicle.

The system may further include a second rail that is fixed at a position spaced apart from the ground surface and that extends parallel to the first rail. In the above (D), the flying course of the first unmanned aerial vehicle may be changed to a direction approaching the second rail.

With this configuration, as the first unmanned aerial vehicle is caused to change its flying course so as to approach the second rail, the third unmanned aerial vehicle and the fourth unmanned aerial vehicle coupled to the third unmanned aerial vehicle via the coupling line can pass the first unmanned aerial vehicle without colliding with the first unmanned aerial vehicle.

In the above (A), the first unmanned aerial vehicle may be caused to move forward along the first rail with the first unmanned aerial vehicle being movably coupled to the first rail. In the above (D), the first unmanned aerial vehicle may be caused to disengage itself from the first rail and to couple itself to the second rail before the third unmanned aerial vehicle passes the first unmanned aerial vehicle, and the first unmanned aerial vehicle may be caused to disengage itself from the second rail and to couple itself to the first rail after the third unmanned aerial vehicle has passed the first unmanned aerial vehicle.

This configuration allows the third unmanned aerial vehicle and the fourth unmanned aerial vehicle coupled to the third unmanned aerial vehicle via the coupling line to pass the first unmanned aerial vehicle without colliding with the first unmanned aerial vehicle.

When viewed in a direction perpendicular to the ground surface, the distance between the first rail and the second rail may be greater than the width of the first unmanned aerial vehicle.

This configuration allows the first unmanned aerial vehicle to move within a space between the first rail and the second rail without making contact with the rails. The above configuration can also reduce the possibility that the first unmanned aerial vehicle collides with another unmanned aerial vehicle behind the first unmanned aerial vehicle when the first unmanned aerial vehicle is passed by the other unmanned aerial vehicle from behind.

The first rail and the second rail may be disposed at the same height from the ground surface.

This configuration allows a plurality of parent-child drones to fly at the same altitude when any passing occurs.

The system may further include a third unmanned aerial vehicle that is coupled to the second unmanned aerial vehicle via a coupling line and that shares the first rail with the first unmanned aerial vehicle, a fourth unmanned aerial vehicle that shares the first rail with the first unmanned aerial vehicle and the third unmanned aerial vehicle, and a fifth unmanned aerial vehicle that is coupled to the fourth unmanned aerial vehicle via a coupling line. In the above (A), the first unmanned aerial vehicle and the third unmanned aerial vehicle may each be caused to move forward along the first rail with the first unmanned aerial vehicle and the third unmanned aerial vehicle being movably coupled to the first rail. In the control method, furthermore, (E) in a case where the first unmanned aerial vehicle and the third unmanned aerial vehicle are flying behind the fourth unmanned aerial vehicle and where the second unmanned aerial vehicle is flying behind the fifth unmanned aerial vehicle, when the second unmanned aerial vehicle is to pass the fifth unmanned aerial vehicle, the first unmanned aerial vehicle may be disengaged from the first rail, the first unmanned aerial vehicle may be moved to the front of the fourth unmanned aerial vehicle, the first unmanned aerial vehicle may be recoupled to the first rail, the second unmanned aerial vehicle may be moved to the front of the fifth unmanned aerial vehicle after the first unmanned aerial vehicle has been recoupled to the first rail, the third unmanned aerial vehicle may be disengaged from the first rail after the first unmanned aerial vehicle has been recoupled to the first rail, the third unmanned aerial vehicle may be moved to the front of the fourth unmanned aerial vehicle, and the third unmanned aerial vehicle may be recoupled to the first rail.

This configuration allows the second unmanned aerial vehicle to pass the fifth unmanned aerial vehicle without the coupling lines being tangled up.

The system may further include a second rail that is fixed at a position spaced apart from the ground surface and that is disposed adjacent to the first rail with a space provided therebetween. In the control method, furthermore, (M the first unmanned aerial vehicle may be moved from the vicinity of the first rail to the vicinity of the second rail when the first unmanned aerial vehicle is moving forward along the first rail and the second rail is located in the direction in which the first unmanned aerial vehicle moves forward.

This configuration allows the second unmanned aerial vehicle to pass the first unmanned aerial vehicle without colliding with the first unmanned aerial vehicle.

In the above (F), the altitude of the first unmanned aerial vehicle may be temporarily raised when the first unmanned aerial vehicle is to become disengaged from the first rail.

This configuration allows the first unmanned aerial vehicle to become disengaged from the first rail smoothly.

In the above (F), the altitude of the first unmanned aerial vehicle may be raised higher than the height of the first rail and the height of the second rail.

This configuration allows the first unmanned aerial vehicle to change its position without colliding with the rails.

In the control method, furthermore, (G) the first unmanned aerial vehicle may be stopped from flying while the second unmanned aerial vehicle is flying, the second unmanned aerial vehicle may be caused to take up the coupling line, and the first unmanned aerial vehicle may be anchored to the second unmanned aerial vehicle.

This configuration allows the second unmanned aerial vehicle to anchor the first unmanned aerial vehicle at a predetermined position between the second unmanned aerial vehicle and the first unmanned aerial vehicle.

In the above (G), the second unmanned aerial vehicle may be housed inside the first unmanned aerial vehicle.

This configuration allows the first unmanned aerial vehicle and the second unmanned aerial vehicle to fly while being united to each other in a location where no rail is present.

The second unmanned aerial vehicle may include a housing opening for housing a package, and the housing opening may be located in a panel regarded as a side panel when the second unmanned aerial vehicle is flying.

This configuration allows the second unmanned aerial vehicle to house a package through the housing opening and to deliver the package.

The control method of controlling an unmanned aerial vehicle may be executed by a computer.

Thus, the control method of controlling an unmanned aerial vehicle described above can be executed by a computer.

Moreover, a system may include an unmanned aerial vehicle and another unmanned aerial vehicle coupled to the unmanned aerial vehicle via a coupling line, and the unmanned aerial vehicle may include a first controller. The first controller may cause the unmanned aerial vehicle to move forward or to stop moving forward when an anomaly has occurred in the other unmanned aerial vehicle.

This configuration allows the first unmanned aerial vehicle to be caused to move forward or to stop moving forward by the first controller. Therefore, the first unmanned aerial vehicle can be operated remotely, for example.

Moreover, a system may include a first unmanned aerial vehicle and a second unmanned aerial vehicle coupled to the first unmanned aerial vehicle via a coupling line. The first unmanned aerial vehicle may include a first controller, and the second unmanned aerial vehicle may include a second controller. The first controller may cause the first unmanned aerial vehicle to move forward or to stop moving forward when an anomaly has occurred in flying of the second unmanned aerial vehicle.

This configuration allows the first unmanned aerial vehicle and the second unmanned aerial vehicle to be caused to move forward or to stop moving forward by the first controller and the second controller, respectively. Therefore, the first unmanned aerial vehicle and the second unmanned aerial vehicle can be operated remotely, for example.

An unmanned aerial vehicle is an unmanned aerial vehicle that delivers a package, and the unmanned aerial vehicle includes a plurality of rotary wings, a plurality of first motors that respectively rotate the plurality of rotary wings, a main body that supports the plurality of first motors, a connector that is to be connected to a rail provided at a position spaced apart from a ground surface with the main body hanging from the connector, a movable block that sets an inclination of an imaginary plane containing the plurality of rotary wings relative to a support direction in which the connector is supported on the rail, and a control circuit that controls the plurality of first motors and the movable block. The connector includes a first end connected to the main body and a second end to be slidably connected to the rail. The support direction extends from the first end toward the second end of the connector. When the second end of the connector is connected to the rail, the control circuit (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends and (ii) causes the movable block to increase an angle formed by a normal direction of the imaginary plane relative to the support direction of the connector.

According to this configuration, the unmanned aerial vehicle can move along the rail with the connector of the unmanned aerial vehicle being connected to the rail. In the case of (i), the control circuit controls the rotation rate of the plurality of first motors to the rotation rate that is lower than the minimum rotation rate necessary for causing the unmanned aerial vehicle to float and that is higher than the minimum rotation rate necessary for propelling the unmanned aerial vehicle. Therefore, the unmanned aerial vehicle can move along the rail at an appropriate speed. In the case of (ii), the control circuit controls the actuator so as to change the inclination of the imaginary plane containing the plurality of rotary wings relative to the support direction of the connector. Therefore, the speed of the unmanned aerial vehicle can be regulated.

A delivery system may include an unmanned aerial vehicle, a plurality of support pillars, and the rail stretched between two adjacent support pillars of the plurality of support pillars.

The movable block may be disposed between the main body and the connector.

This configuration allows the movable block to change the angle of the connector relative to the main body with ease.

For example, in a case where the connector is disposed at or around the center of gravity of the main body, the movable block is also disposed at or around the center of gravity of the main body. This configuration makes it possible to balance the center of gravity of the unmanned aerial vehicle.

The unmanned aerial vehicle may further include a pair of wings.

According to this configuration, for example, the unmanned aerial vehicle can be rotated in the horizontal direction if the pair of wings are yaw wings, or the unmanned aerial vehicle can be rotated in the vertical direction if the pair of wings are pitch wings. As a result, the traveling direction of the unmanned aerial vehicle can be steered freely, and thus the unmanned aerial vehicle can be moved stably.

After the movable block has increased the angle, the control circuit may disengage the connector from the rail when a propulsion speed of the unmanned aerial vehicle exceeds a predetermined value.

This configuration can keep the connector from making contact with the rail, and thus the safety of the unmanned aerial vehicle can be increased.

When the connector is being disengaged from the rail, the control circuit may cause the movable block to reduce the angle and control the rotation rate of the plurality of first motors to a rotation rate higher than the minimum rotation rate necessary for causing the unmanned aerial vehicle to float.

According to this configuration, when the connector is disengaged from the rail, the unmanned aerial vehicle can float to a predetermined height from the ground surface by reducing the angle. This can keep the unmanned aerial vehicle from making contact with an object, and thus the safety of the unmanned aerial vehicle can be increased.

In the above (ii), the control circuit may control the rotation rate of the plurality of first motors so as to increase the angle to greater than 15 degrees.

This configuration makes it possible to appropriately set the speed of the unmanned aerial vehicle.

In the above (ii), the control circuit may control the rotation rate of the plurality of first motors so as to increase the angle to greater than 45 degrees.

In the above (ii), the control circuit may control the rotation rate of the plurality of first motors so as to increase the angle to greater than 65 degrees.

In the above (ii), the control circuit may control the rotation rate of the plurality of first motors so as to increase the angle to greater than 80 degrees.

The connector may include a support portion swingably connected to the main body and a first arm connected to one end of the support portion.

This configuration allows the first arm to swing along with a swinging movement of the support portion. Therefore, the first arm can connect itself to the rail more easily.

The first arm may be a hanger for hanging the unmanned aerial vehicle from the rail.

According to this configuration, the first arm can be hung on the rail when the unmanned aerial vehicle has stopped. Therefore, the unmanned aerial vehicle can place a package at a receiver with the unmanned aerial vehicle hanging from the rail.

The connector may further include a wheel that is connected to the first arm and that allows the connector to rotatably make contact with the rail.

According to this configuration, when the unmanned aerial vehicle becomes connected to the rail, the unmanned aerial vehicle can move along the rail with the wheel making contact with the rail. The wheel starts rotating upon friction with the rail. Therefore, the unmanned aerial vehicle can travel on the rail solely with the propelling force acting in the traveling direction produced by the rotation of the rotary wings. This configuration renders it unnecessary for the unmanned aerial vehicle to use the rotary force of the rotary wings as a lifting force for lifting up the unmanned aerial vehicle. As a result, the energy used by the unmanned aerial vehicle can be reduced.

The connector may further include a second arm connected to the one end of the support portion.

According to this configuration, not only the first arm but also the second arm can be connected to the rail. Therefore, the possibility that the unmanned aerial vehicle falls off from the rail can be reduced, and the safety in the system that includes the unmanned aerial vehicle can be further increased.

The first arm may be a first hanger for hanging the unmanned aerial vehicle from the rail. The second arm may be a second hanger for hanging the unmanned aerial vehicle from the rail. The connector may further include a first actuator that sets an angle of the first arm relative to the support portion and a second actuator that sets an angle of the second arm relative to the support portion.

This configuration makes it possible to hang the unmanned aerial vehicle from the rail reliably. Therefore, the possibility that the unmanned aerial vehicle falls off from the rail can be reduced, and the safety in the system that includes the unmanned aerial vehicle can be further increased.

The connector may further include a base disposed between the support portion and the first and second arms and a third actuator that sets an angle of the base relative to the support portion.

According to this configuration, the height of the first arm relative to the main body or the height of the second arm relative to the main body can be changed only by changing the angle of the base. Therefore, the heights of the first arm and the second arm can be changed without tilting the main body, and thus the stability of the unmanned aerial vehicle can be maintained.

The first arm may include a first hook that extends from a first connected end connected to the first actuator to a first open end. The second arm may include a second hook that extends from a second connected end connected to the second actuator to a second open end. The first hook may include a first bent portion that is bent in a first direction and located between the first connected end and the first open end. The second hook may include a second bent portion that is bent in a second direction opposite the first direction and located between the second connected end and the second open end.

According to this configuration, the horizontal attitude of the main body can be maintained when the first hook is hung on the rail, and the horizontal attitude of the main body can be maintained also when the second hook is hung on the rail. Therefore, the first hook and the second hook can maintain an appropriate attitude of the unmanned aerial vehicle.

The first hook and the second hook make it easier to hook the unmanned aerial vehicle from the rail.

When the unmanned aerial vehicle is slidably hung from a first rail via the first hook, the control circuit may hook the second hook onto a second rail that extends along and adjacent to the first rail by controlling the second actuator and may disengage the first hook from the first rail by controlling the first actuator.

According to this configuration, for example, if the first hook is disengaged from the first rail after the second hook has become connected to the second rail while the first hook of the unmanned aerial vehicle is connected to the first rail, the unmanned aerial vehicle can switch the connection from the first rail to the second rail serving as another rail and then move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

The delivery system may include an unmanned aerial vehicle, a plurality of support pillars, and the first rail and the second rail that are stretched between two adjacent support pillars of the plurality of support pillars.

When the unmanned aerial vehicle is slidably hung from the first rail via the first hook and the second hook, the control circuit may disengage the second hook from the first rail and hook the second hook onto the second rail that extends along and adjacent to the first rail by controlling the second actuator and may disengage the first hook from the first rail and hook the first hook onto the second rail by controlling the first actuator.

According to this configuration, for example, if the first hook is disengaged from the first rail and connected to the second rail after the second hook has been disengaged from the first rail and has become connected to the second rail when the first hook and the second hook of the unmanned aerial vehicle are connected to the first rail, the unmanned aerial vehicle can switch the connection from the first rail to the second rail serving as another rail and then move along the second rail. Therefore, the unmanned aerial vehicle can reliably switch from one rail to another rail at the branching point of these rails. Thus, the possibility that the unmanned aerial vehicle falls off can be reduced, and the safety in the system that includes the unmanned aerial vehicle can be further increased.

When the second hook is to be hooked onto the second rail, the control circuit may tilt the main body or the support portion in the second direction so as to position the second connected end higher than the first connected end. When the first hook is to be disengaged from the first rail, the control circuit may tilt the main body or the support portion in the first direction so as to position the first connected end higher than the second connected end.

According to this configuration, by tilting the main body or the support portion, the first hook and the second hook can be hooked onto the rail with ease, or the first hook and the second hook can be disengaged from the rail with ease.

The unmanned aerial vehicle may further include a hanging wire connected to the main body and provided to hang the package and a lift motor that is capable of taking up the hanging wire. The control circuit may position the unmanned aerial vehicle vertically above a storage device for storing the package with the connector being connected to the rail. In addition, the control circuit may let out the hanging wire by actuating the lift motor, lower the package from the main body, and store the package into the storage device.

According to this configuration, upon the unmanned aerial vehicle arriving at the destination point, the control circuit controls the lift motor so as to let out the hanging wire. Thus, the unmanned aerial vehicle can lower the package and store the package into the storage device. Therefore, the unmanned aerial vehicle can deliver the package to the receiver.

While the control circuit lets out the hanging wire, the control circuit may adjust at least one of the position and the orientation of the main body in accordance with the position of the package relative to the storage device.

According to this configuration, even if the position of the unmanned aerial vehicle fails to match the position directly above the storage device, the control circuit can position the main body relative to the storage device by adjusting at least one of the position and the orientation of the main body. Therefore, the unmanned aerial vehicle can reliably lower the package and store the package into the storage device, which in turn makes it possible to deliver the package reliably to the receiver.

In particular, even if the unmanned aerial vehicle moves from the position directly above the storage device due to the wind or the like, the unmanned aerial vehicle can position the main body relative to the storage device.

When the position of the package is moved from the position vertically above the storage device in a third direction, the control circuit may move the unmanned aerial vehicle in a fourth direction opposite the third direction along the direction in which the rail extends.

According to this configuration, even if the position of the package has changed (moved) in the third direction via the hanging wire due to the wind or the like, the control circuit can change the position of the unmanned aerial vehicle in the fourth direction opposite the third direction. Therefore, the unmanned aerial vehicle can reliably lower the package and store the package into the storage device, which in turn makes it possible to deliver the package more reliably to the receiver.

When the position of the package has moved in the fifth direction from the position vertically above the storage device, the control circuit may cause the unmanned aerial vehicle to swing about the rail and may move the center of gravity of the unmanned aerial vehicle in a sixth direction opposite the fifth direction.

According to this configuration, even if the position of the package has changed in the fifth direction via the hanging wire due to the wind or the like, the control circuit can change the position of the package in the sixth direction opposite the fifth direction by moving the center of gravity of the unmanned aerial vehicle. Therefore, the unmanned aerial vehicle can reliably lower the package and store the package into the storage device, which in turn makes it possible to deliver the package more reliably to the receiver.

The unmanned aerial vehicle may further include a thruster device removably attached to the package. The thruster device may include a plurality of propellers, a plurality of second motors that respectively rotate the plurality of propellers, and a support member that supports the plurality of second motors.

According to this configuration, even if the position of the unmanned aerial vehicle fails to match the position directly above the storage device, the thruster device can guide the package to the storage device. Therefore, the unmanned aerial vehicle can reliably lower the package and store the package into the storage device, which in turn makes it possible to deliver the package more reliably to the receiver. Even in a case where the opening of the storage device is small and it is hard to insert the package into the storage device, the unmanned aerial vehicle can reliably insert the package into the storage device. Thus, the unmanned aerial vehicle does not require a large space for landing.

In particular, with this unmanned aerial vehicle, even in a case where the unmanned aerial vehicle moves from the position directly above the storage device due to the wind or the like, the thruster device can store the package into the storage device.

The plurality of propellers include a first propeller disposed on a first side portion of the support member and a second propeller disposed on a second side portion of the support member, and the second side portion may be different from the first side portion.

According to this configuration, the position and the orientation of the thruster device relative to the storage device can be adjusted. Therefore, with this unmanned aerial vehicle, the thruster device can more reliably store the package into the storage device.

The control circuit may cause the thruster device to actuate at least one of the plurality of second motors in at least a portion of a period in which the hanging wire is let out.

According to this configuration, when a package is lowered from the unmanned aerial vehicle, the position and the orientation of the thruster device relative to the storage device can be adjusted. Therefore, with this unmanned aerial vehicle, the package can be stored smoothly into the storage device.

In the delivery system, each of the plurality of support pillars may be a utility pole.

According to this configuration, existing utility poles can be used as the support pillars, and no new support pillar needs to be installed in order to stretch the rail. Therefore, this system can prevent a surge in the cost of installation.

The delivery system may further include a lead-in support pillar disposed within a predetermined site and a lead-in wire stretched to the rail. The height from the ground surface to a first connection point at which the lead-in wire and the lead-in support pillar are connected to each other may be lower than the height from the ground surface to a second connection point at which the lead-in wire and the rail are connected to each other.

According to this configuration, the rail is disposed at a position higher than the first connection point, and thus the unmanned aerial vehicle can move along a high position. Since the unmanned aerial vehicle travels along a position where the unmanned aerial vehicle is less likely to be recognized by people, the privacy of the user at the receiver and the privacy of people in the facilities, such as homes, that are located so as to face the rail can be protected.

The utility pole may support a power transmission line, and the rail may be provided at a position lower than the power transmission line and higher than the leading end of the lead-in support pillar.

According to this configuration, since the rail is disposed under the power transmission line, the rail can be disposed at a position where the unmanned aerial vehicle will not make contact with the power transmission line, and the unmanned aerial vehicle can travel along the rail. Therefore, the safety of the unmanned aerial vehicle delivering packages can be ensured.

The plurality of support pillars may each be a streetlight.

According to this configuration, existing streetlights can be used as the support pillars, and no new support pillar needs to be installed in order to stretch the rail. Therefore, this system can prevent a surge in the cost of installation.

The delivery system may further include a protective net stretched along a position vertically below an approaching region of the first rail and the second rail. The approaching region may be a region where the distance between the first rail and the second rail is smaller than or equal to the width of the unmanned aerial vehicle.

According to this configuration, since the distance between the first rail and the second rail is smaller than the width (the size) of the main body, the unmanned aerial vehicle can make a switch from the first rail to the second rail with ease and then move along the second rail.

As the protective net is provided along a position vertically below the approaching region of the first rail and the second rail, even if the unmanned aerial vehicle becomes disengaged from the first rail and the second rail, the possibility that the unmanned aerial vehicle falls to the ground can be reduced. Therefore, the safety in the system that includes the unmanned aerial vehicle can be further increased.

The height of at least a portion of the second rail may be higher than the height of the adjacent first rail.

According to this configuration, when two unmanned aerial vehicles are traveling along the first rail in opposite directions, one of the two unmanned aerial vehicles can take refuge in the second rail. In other words, the second rail can be used as a refuge track. This can keep the unmanned aerial vehicles from colliding with each other or suppress the congestion of the unmanned aerial vehicles.

It is to be noted that general or specific embodiments of the above may be implemented in the form of a system, a method, an integrated circuit, a computer program, or a computer readable recording medium, such as a CD-ROM, or through any desired combination of a system, a method, an integrated circuit, a computer program, and a recording medium.

Hereinafter, some embodiments will be described in concrete terms with reference to the drawings.

It is to be noted that the embodiments described below merely illustrate general or specific examples. The numerical values, the shapes, the materials, the constituent elements, the arrangement positions and the connection modes of the constituent elements, the steps, the orders of the steps, and so on illustrated in the following embodiments are examples and are not intended to limit the present invention. Among the constituent elements described in the following embodiments, any constituent element that is not described in the independent claims is to be construed as an optional constituent element.

Embodiment 1

FIG. 1 is a schematic diagram illustrating flying system 10 according to Embodiment 1. With reference to FIG. 1, flying system 10 according to the present embodiment will be described. Flying system 10 according to the present embodiment includes manager 100, parent drone 200, and child drone 300. Manager 100 manages position information of rail 400, information indicating flying conditions of the drones, and so on. Parent drone 200 is an unmanned aerial vehicle. Child drone 300 is also an unmanned aerial vehicle and is smaller than parent drone 200. Manager 100 may be implemented by a server or a cloud server. Child drone 300 may be coupled to rail 400. Parent drone 200 may store load 500. Parent drone 200 and child drone 300 are each wirelessly connected to manager 100. Parent drone 200 and child drone 300 are coupled to each other via a coupling line, such as wire 600, for example.

Child drone 300 and parent drone 200 fly while being coupled to each other via the coupling line. When parent drone 200 and child drone 300 fly while being coupled to each other via the coupling line, this state is referred to below as a parent-child coupled flight. When an anomaly occurs in flying of parent drone 200, child drone 300 stops moving forward. Child drone 300 or parent drone 200 may include a controller. When an anomaly occurs in flying of parent drone 200, the controller stops child drone 300 from moving forward.

Figure 2:
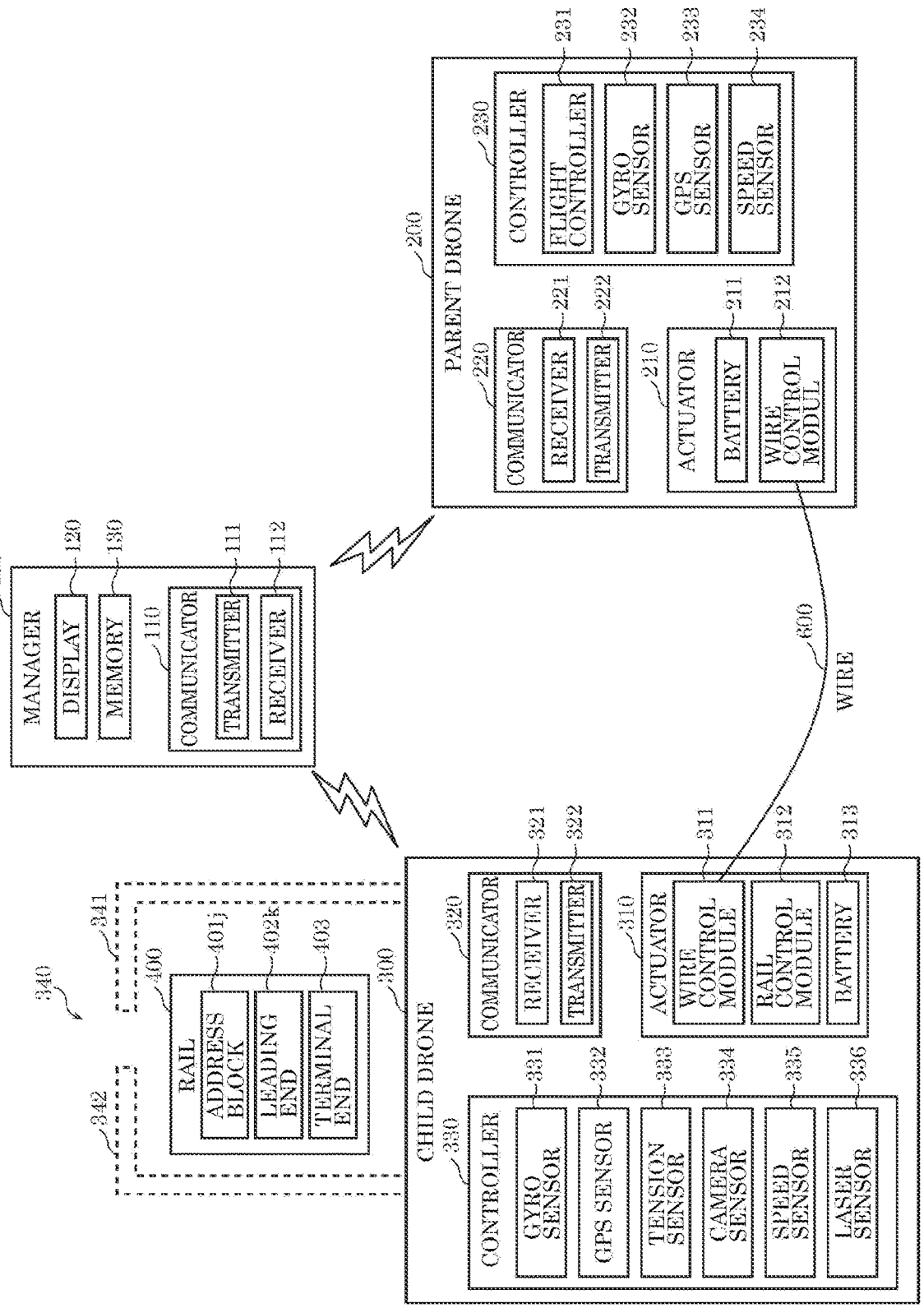
FIG. 2 is a block diagram illustrating a configuration of the flying system according to Embodiment 1.

FIG. 2 is a block diagram illustrating a configuration of flying system 10 according to Embodiment 1. Manager 100 includes communicator 110, display 120, and memory 130. Communicator 110 includes transmitter 111 and receiver 112. Communicator 110 communicates with parent drone 200 and child drone 300. Memory 130 is a recording medium for storing (recording) information such as identification information of rail 400.

Parent drone 200 includes controller 230, actuator 210, and communicator 220. Communicator 220 includes receiver 221 and transmitter 222. Actuator 210 includes battery 211 and wire control module 212. Controller 230 includes flight controller 231, gyro sensor 232, global positioning system (GPS) sensor 233, and speed sensor 234.

Communicator 220 communicates with manager 100 through receiver 221 and transmitter 222. Battery 211 is a battery for actuating parent drone 200. Battery 211 is implemented by, for example but not limited to, a lithium battery. Wire control module 212 controls wire 600 that couples parent drone 200 and child drone 300. Wire control module 212 may be an example of a lift motor. Flight controller 231 detects the inclination, the angle, and so on of the flying aerial vehicle and performs various arithmetic operations based on the detected pieces of information. Then, flight controller 231 provides the aerial vehicle with an instruction concerning the attitude and so on to be held during a flight. Gyro sensor 232 detects the angular speed and the acceleration of the flying aerial vehicle. GPS sensor 233 detects, for example but not limited to, geographical spatial information, such as latitude and longitude information. Speed sensor 234 detects the speed of parent drone 200.

Child drone 300 includes communicator 320, actuator 310, controller 330, and arm 340. Communicator 320 includes receiver 321 and transmitter 322. Actuator 310 includes wire control module 311, rail control module 312, and battery 313. Controller 330 includes gyro sensor 331, GPS sensor 332, tension sensor 333, camera sensor 334, speed sensor 335, and laser sensor 336. In this example, controller 330 may further include a flight controller. Arm 340 includes first arm 341 and second arm 342.

Communicator 320 communicates with manager 100 through receiver 321 and transmitter 322. Battery 313 is a battery for actuating child drone 300. Battery 313 is implemented by, for example but not limited to, a lithium battery. Wire control module 311 controls wire 600 that connects parent drone 200 and child drone 300. Rail control module 312 is a module that controls child drone 300 when child drone 300 couples itself to rail 400. Gyro sensor 331 detects the angular speed and the acceleration of the flying aerial vehicle. GPS sensor 332 detects, for example but not limited to, geographical spatial information, such as latitude and longitude information. Speed sensor 335 detects the speed of child drone 300. Tension sensor 333 detects the tension in wire 600 that couples wire control module 311 of child drone 300 to wire control module 212 of parent drone 200. Camera sensor 334 is a sensor that detects an anomaly in flying of parent drone 200 based on an image captured by a camera. Laser sensor 336 is a sensor that detects the position of an object and detects, for example but not limited to, the presence of an anomaly in flying of parent drone 200. Arm 340 couples itself to rail 400 by actuating first arm 341 and second arm 342.

Parent drone 200 and child drone 300 are coupled to each other by wire 600 via wire control module 212 of parent drone 200 and wire control module 311 of child drone 300.

Rail 400 includes address block 401j, leading end 402k, and terminal end 403. Address block 401j stores, for example but not limited to, the identification information of rail 400. Leading end 402k is a point where rail 400 begins, and terminal end 403 is a point where rail 400 ends. Rail 400 is formed of metal or resin. Data such as the identification information or the position information of rail 400 can be written on a surface of rail 400. In this example, the data such as the identification information or the position information of rail 400 is stored in rail 400 in the form of address block 401*j*.

Figure 3:
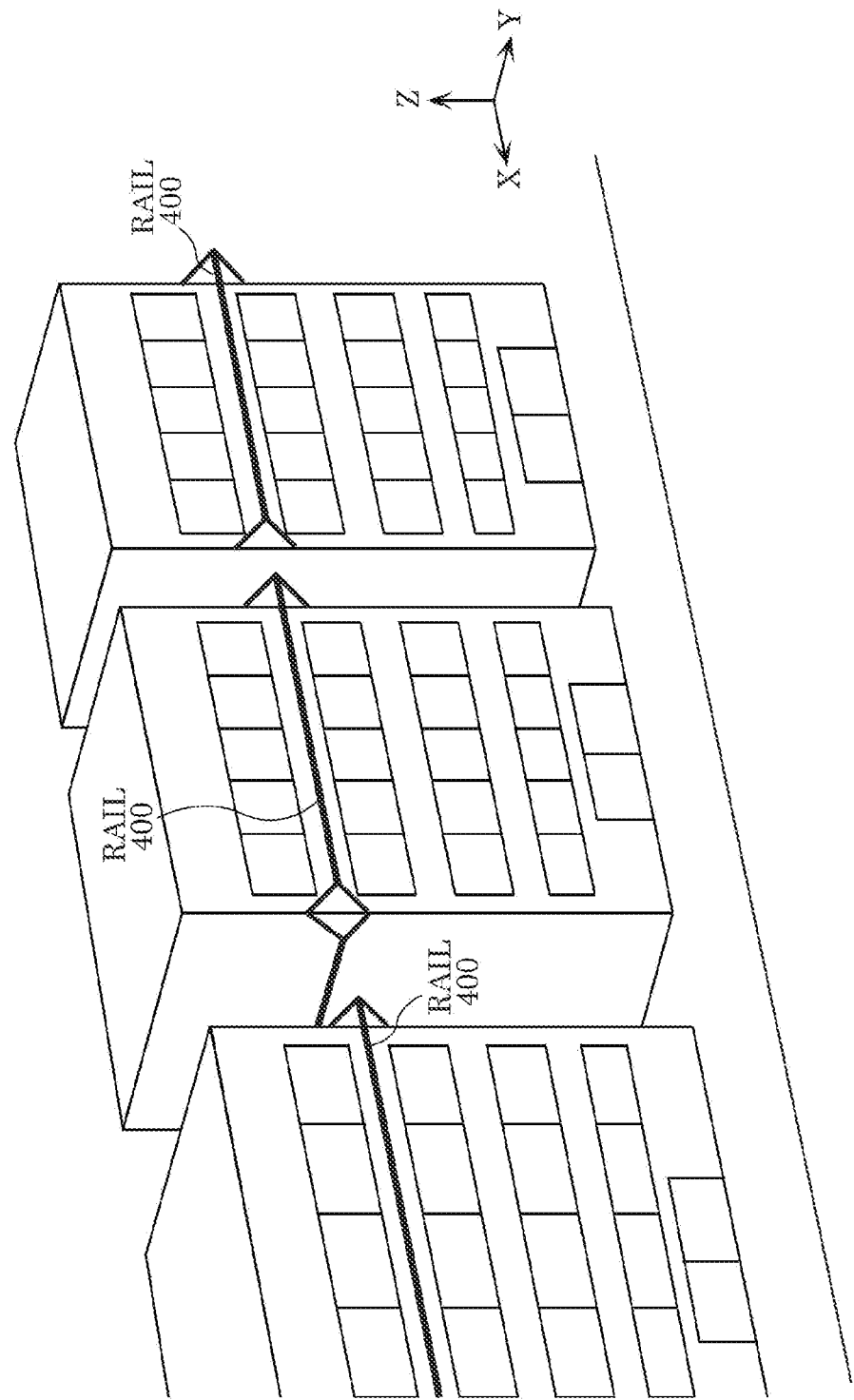
FIG. 3 illustrates rails installed on buildings within a flying area according to Embodiment 1.

FIG. 3 illustrates rail 400 installed on building 700 within a flying area according to Embodiment 1. Three coordinate axes are defined in FIG. 3, and the X-axis direction coincides with the direction in which the drones travel. The forward moving direction of the drones coincides with the positive direction along the X-axis, and the backward moving direction of the drones coincides with the negative direction along the X-axis. The Y-axis direction is a direction perpendicular to the X-axis direction and the vertical direction. The direction away from building 700 or rail 400 coincides with the positive direction along the Y-axis, and the direction approaching building 700 or rail 400 coincides with the negative direction along the Y-axis. The Z-axis direction is the vertical direction. The vertically upward direction coincides with the positive direction along the Z-axis, and the vertically downward direction coincides with the negative direction along the Z-axis. Rails 400 extend in the horizontal direction on side walls of buildings 700. Each rail 400 is fixed and installed at a position spaced apart from the ground surface. In FIG. 3, rail 400 is installed on the upper half of building 700. Alternatively, rail 400 may be installed on the lower half of building 700. For example, in flying system 10 according to the present embodiment, child drone 300 flies closer to rail 400 than parent drone 200 does. Child drone 300 flies along a position lower than where rail 400 is installed. This configuration allows child drone 300 to couple itself to rail 400 with ease via arm 340 provided in an upper portion of child drone 300. Child drone 300 flies along installed rail 400. Alternatively, child drone 300 couples arm 340 provided in child drone 300 to rail 400 and thus flies while being prevented from falling. Child drone 300 can be movably coupled to rail 400 via arm 340 provided in child drone 300. Child drone 300 may fly while being coupled to rail 400.

Figure 4:
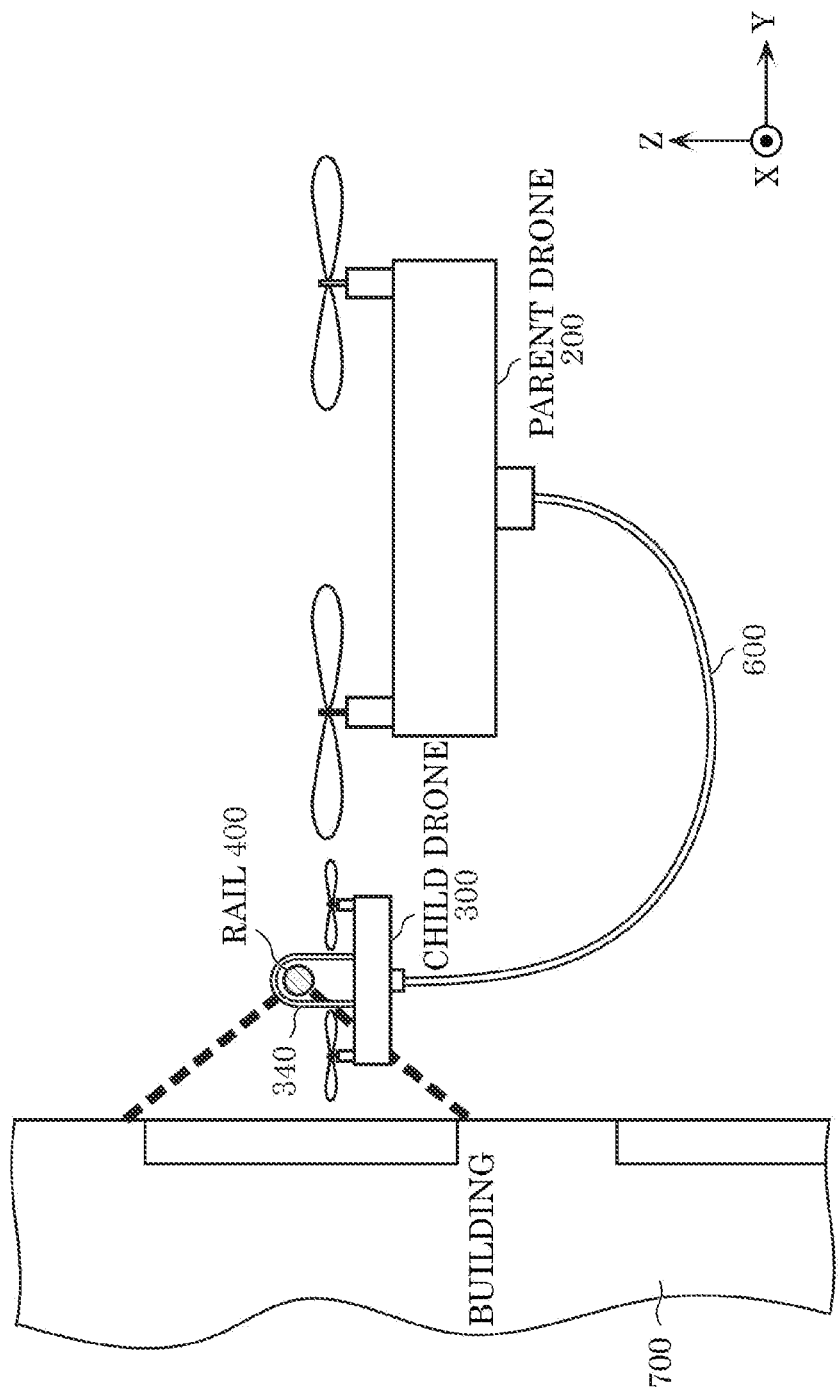
FIG. 4 illustrates a state in which a child drone is coupled to a rail installed on a building and a parent drone is coupled to the child drone via a wire according to Embodiment 1.

FIG. 4 illustrates a state in which child drone 300 is coupled to rail 400 installed on building 700 and parent drone 200 is coupled to child drone 300 via wire 600 according to Embodiment 1. In FIG. 4, child drone 300 is coupled to rail 400 installed on building 700. Child drone 300 is coupled to parent drone 200 via wire 600. In order to reduce the wear of rail 400, child drone 300 flies with arm 340 of child drone 300 making no contact with rail 400. Parent drone 200 can fly freely within a range that wire 600 can reach from the point where parent drone 200 is coupled to child drone 300 via wire 600. Meanwhile, child drone 300 flies linearly along rail 400 installed on building 700. Since child drone 300 is coupled to rail 400 via arm 340, there is little possibility that child drone 300 or parent drone 200 falls even if an anomaly occurs in flying of child drone 300 or parent drone 200.

Figure 5:
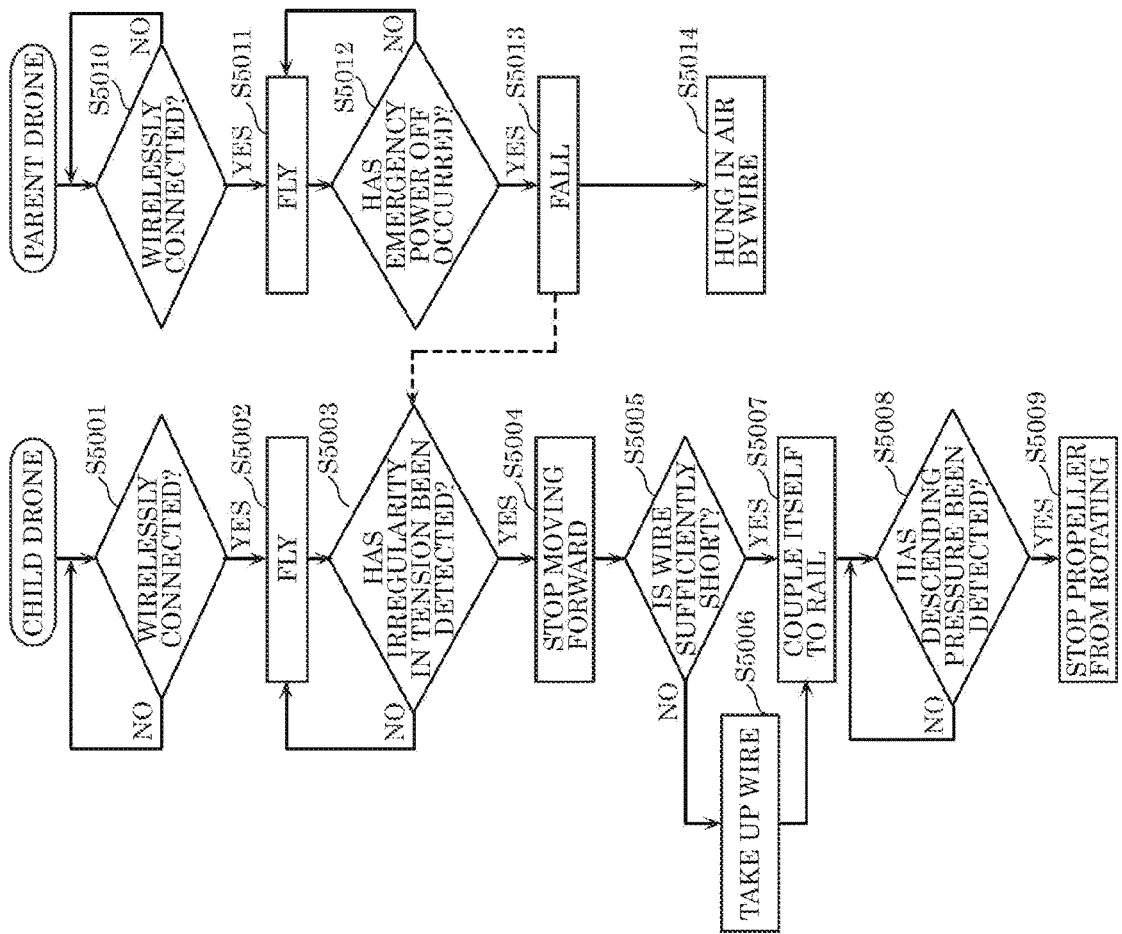
FIG. 5 is a flowchart illustrating a first example of fall prevention control in the flying system according to Embodiment 1.

FIG. 5 is a flowchart illustrating a first example of fall prevention control in flying system 10 according to Embodiment 1. Child drone 300 determines whether child drone 300 is wirelessly connected to parent drone 200 (S5001). If child drone 300 is wirelessly connected to parent drone 200 (YES in S5001), child drone 300 starts flying (S5002). If child drone 300 is not wirelessly connected to parent drone 200 (NO in S5001), the flow returns to step S5001. Next, child drone 300 determines, via tension sensor 333, whether there is any irregularity in the tension of wire 600 (S5003). If child drone 300 has detected an irregularity in the tension of wire 600 (YES in S5003), child drone 300 stops moving forward (S5004). Next, child drone 300 determines whether the length of wire 600 connecting child drone 300 and parent drone 200 is less than or equal to a predetermined length (S5005). If the length of wire 600 is less than or equal to the predetermined length (YES in S5005), child drone 300 couples itself to rail 400 (S5007). If the length of wire 600 is neither less than nor equal to the predetermined length (NO in S5005), child drone 300 takes up wire 600 with wire control module 311 (S5006). Thereafter, child drone 300 couples itself to rail 400 (S5007). Next, child drone 300 determines whether child drone 300 has detected a descending pressure (S5008). For example, in a case where controller 230 includes a pressure sensor, child drone 300 determines whether the descending pressure detected by that pressure sensor is higher than or equal to a threshold. If child drone 300 has detected the descending pressure (YES in S5008), child drone 300 stops its propellers from rotating (S5009).

Parent drone 200 determines whether parent drone 200 is wirelessly connected to child drone 300 (S5010). If parent drone 200 is wirelessly connected to child drone 300 (YES in S5010), parent drone 200 starts flying (S5011). Next, it is determined whether an emergency power off has occurred in parent drone 200 (S5012). If an emergency power off has occurred in parent drone 200 (YES in S5012), parent drone 200 falls (S5013). In this case, child drone 300 detects an irregularity in the tension in step S5003. Next, parent drone 200 that has fallen becomes hung in the air by wire 600 coupling child drone 300 and parent drone 200 (S5014).

Through the series of operations described above, when an emergency power off has occurred in flying parent drone 200, child drone 300 can determine that parent drone 200 has fallen based on a change in the tension of wire 600 connecting parent drone 200 and child drone 300. Child drone 300 may determine that an anomaly has occurred in flying of parent drone 200 when the tension of wire 600 has reached or exceeded a predetermined threshold. When parent drone 200 has fallen, child drone 300, via wire control module 311, takes up wire 600 connecting child drone 300 and parent drone 200 to reduce the length of wire 600. Then, child drone 300 couples itself to rail 400. This operation can reduce the distance between child drone 300 and parent drone 200, and thus child drone 300 and parent drone 200 can be kept from falling to the ground. Lastly, child drone 300 stops its propellers from rotating and stops flying.

FIG. 6 is a flowchart illustrating a second example of fall prevention control in flying system 10 according to Embodiment 1. Child drone 300 determines whether child drone 300 is wirelessly connected to parent drone 200 (S6001). If child drone 300 is wirelessly connected to parent drone 200 (YES in S6001), child drone 300 starts flying (S6002). If child drone 300 is not wirelessly connected to parent drone 200 (NO in S6001), the flow returns to step S6001. Next, child drone 300 determines whether child drone 300 has received an overturn signal from parent drone 200 (S6003). If child drone 300 has received an overturn signal from parent drone 200 (YES in S6003), child drone 300 stops moving forward (S6004). Next, child drone 300 determines whether the length of wire 600 coupling parent drone 200 and child drone 300 is less than or equal to a predetermined length (S6005). If wire 600 is sufficiently short (YES in S6005), child drone 300 couples itself to rail 400 (S6007). If wire 600 is not sufficiently short, child drone 300, via wire control module 311, takes up wire 600 connecting child drone 300 and parent drone 200. Thereafter, child drone 300 couples itself to rail 400 (S6007). Next, child drone 300 determines whether child drone 300 has received a recovery signal from parent drone 200 (S6008). If child drone 300 has received a recovery signal from parent drone 200 (YES in S6008), child drone 300 disengages itself from rail 400 (S6010). If child drone 300 does not receive any recovery signal from parent drone 200 (NO in S6008), child drone 300 stops its propellers (S6009).

Parent drone 200 determines whether parent drone 200 is wirelessly connected to child drone 300 (S6011). If parent drone 200 is wirelessly connected to child drone 300 (YES in S6011), parent drone 200 starts flying (S6012). If parent drone 200 is not wirelessly connected to child drone 300 (NO in S6011), the flow returns to step S6011. Next, parent drone 200 determines whether parent drone 200 itself has overturned (S6013). In this example, that parent drone 200 has overturned means that the body of parent drone 200 is inverted and turned almost upside down while flying. If parent drone 200 has overturned (YES in S6013), parent drone 200 transmits an overturn signal to child drone 300 (S6014). Thereafter, parent drone 200 performs a reversion process (S6015). In this example, a reversion process is a process of gathering information for recovering from the overturned attitude. Then, parent drone 200 determines whether parent drone 200 itself is capable of recovery (S6016). In this example, that parent drone 200 recovers means that parent drone 200 brings its overturned attitude back to the attitude held in a normal flying condition. If parent drone 200 is capable of recovery (YES in S6016), parent drone 200 reverts to its flying attitude (S6017). If parent drone 200 is not capable of recovery (NO in S6016), parent drone 200 stops its propellers (S6018). After parent drone 200 has reverted to its flying attitude in step S6017, parent drone 200 transmits a recovery signal to child drone 300 (S6019).

The above operations allow child drone 300 to detect an overturn of parent drone 200 based on an electric signal transmitted from parent drone 200. If child drone 300 has detected an overturn of parent drone 200, child drone 300, via wire control module 311, takes up wire 600 coupling parent drone 200 and child drone 300. This operation can reduce the length of wire 600 present between parent drone 200 and child drone 300. Thereafter, child drone 300 couples itself to rail 400, and this can keep parent drone 200 and child drone 300 from falling to the ground. If parent drone 200 has reverted to its flying attitude, child drone 300 disengages itself from rail 400 in response to receiving a recovery signal transmitted from parent drone 200. This configuration allows parent drone 200 and child drone 300 to fly again with a high degree of freedom. If child drone 300 fails to receive a recovery signal transmitted from parent drone 200, parent drone 200 and child drone 300 each stop its propellers, and child drone 300 remains coupled to rail 400. Therefore, parent drone 200 and child drone 300 can be kept from falling to the ground and can stop operating safely.

Figure 7A:
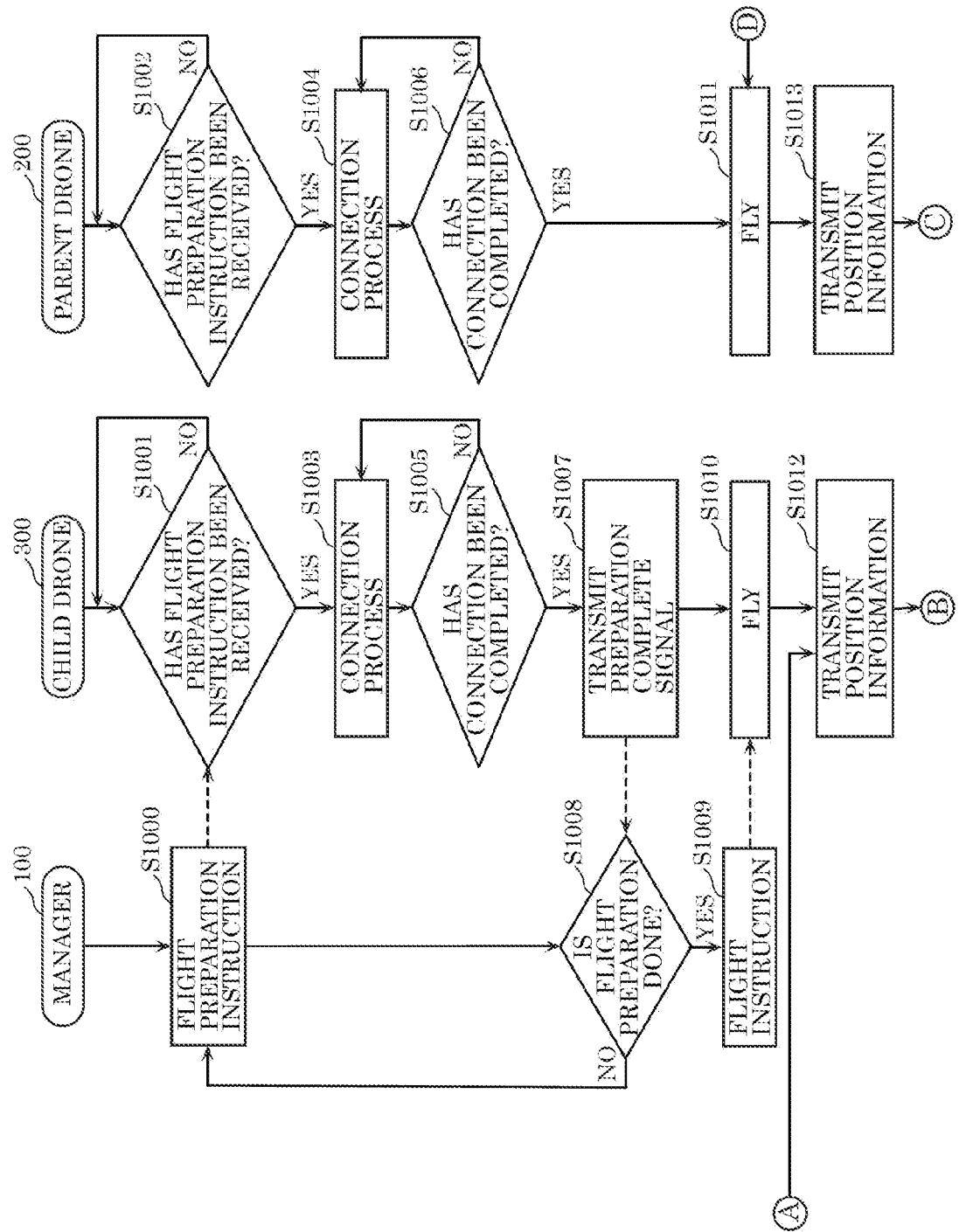
FIG. 7A is a flowchart illustrating a third example of fall prevention control in the flying system according to Embodiment 1.
Figure 7B:
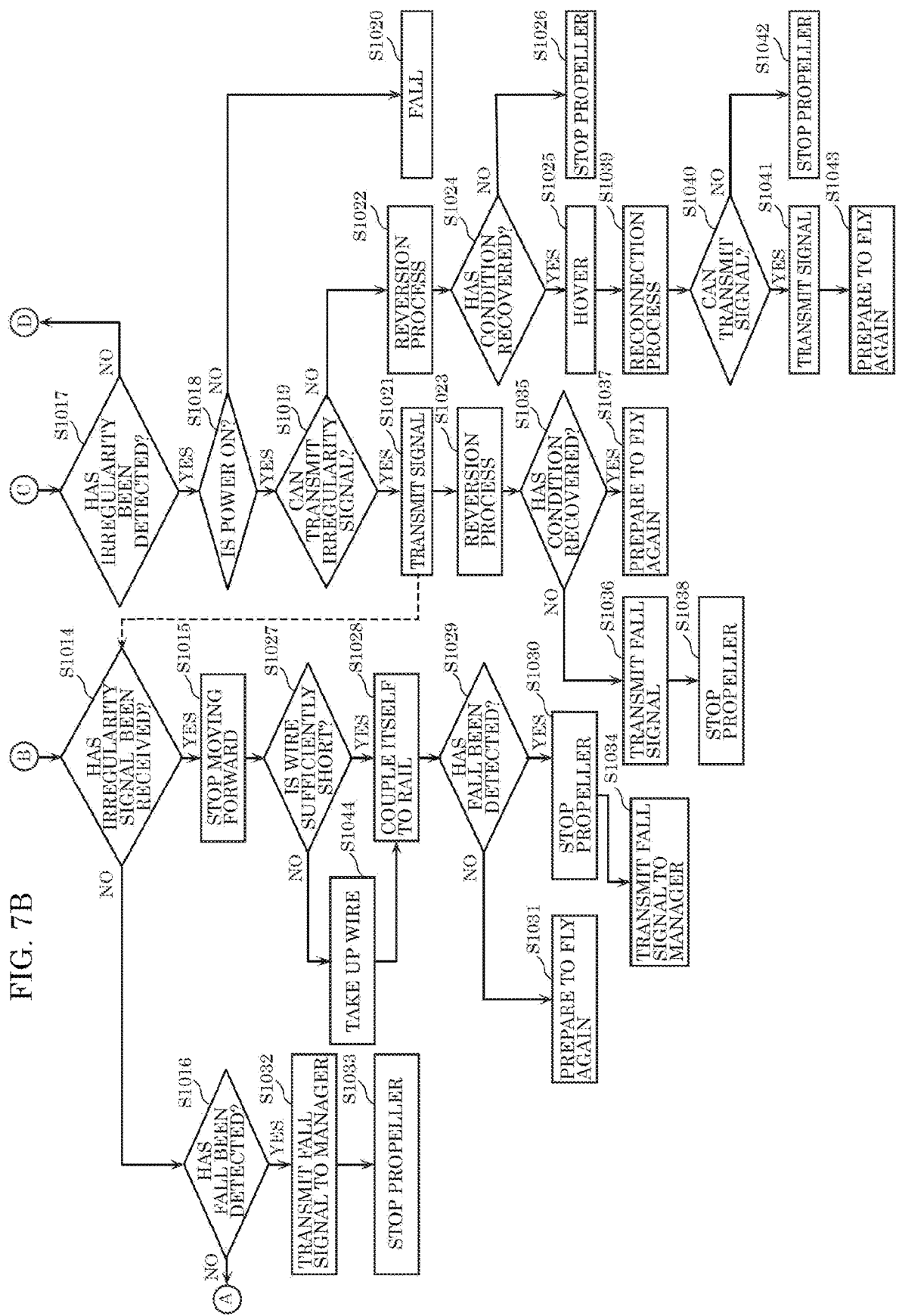
FIG. 7B is another flowchart illustrating the third example of the fall prevention control in the flying system according to Embodiment 1.

FIGS. 7A and 7B are flowcharts illustrating a third example of fall prevention control in flying system 10 according to Embodiment 1.

First, manager 100, which operates the drones, wirelessly transmits a flight preparation instruction to each of parent drone 200 and child drone 300 (S1000). Child drone 300 receives the flight preparation instruction (S1001). Parent drone 200 also receives the flight preparation instruction (S1002). Next, child drone 300 tries to connect to parent drone 200 wirelessly or via a cable (S1003). Parent drone 200 also tries to connect to child drone 300 wirelessly or via a cable (S1004). Child drone 300 determines whether child drone 300 has connected to parent drone 200 (S1005). Parent drone 200 determines whether parent drone 200 has connected to child drone 300 (S1006). If child drone 300 determines that child drone 300 has connected to parent drone 200 (YES in S1005), child drone 300 transmits a preparation complete signal to manager 100 (S1007). In response to receiving the preparation complete signal from child drone 300, manager 100 determines whether child drone 300 is prepared to fly (S1008). If manager 100 determines that child drone 300 is prepared to fly (YES in S1008), manager 100 issues a flight instruction to child drone 300 (S1009). Upon receiving the flight instruction from manager 100, child drone 300 starts flying (S1010). If manager 100 determines that child drone 300 is not prepared to fly (NO in S1008), manager 100 wirelessly transmits a flight preparation instruction to each of parent drone 200 and child drone 300 (the flow returns to step S1000). If child drone 300 determines that child drone 300 has not connected to parent drone 200 (NO in S1005), child drone 300 tries to connect to parent drone 200 wirelessly or via a cable (the flow returns to step S1003). Next, if parent drone 200 determines that parent drone 200 has connected to child drone 300 (YES in S1006), parent drone 200 starts flying (S1011). If parent drone 200 determines that parent drone 200 has not connected to child drone 300 (NO in S1006), parent drone 200 tries to connect to child drone 300 wirelessly or via a cable (the flow returns to step S1004).

While child drone 300 is flying, child drone 300 intermittently transmits, to manager 100, its own position information acquired through the global navigation satellite system (GNSS) (S1012). Parent drone 200 also intermittently transmits, to manager 100, its own position information acquired through the GNSS (S1013).

As illustrated in FIG. 7B, if an irregularity occurs to parent drone 200 while parent drone 200 is flying, that is, if a certain situation arises that keeps parent drone 200 from further flying stably (YES in S1017), parent drone 200 first determines whether its own power is on (S1018). If the power is off (NO in S1018), the propellers of parent drone 200 are forced to stop, and parent drone 200 falls downward by its own weight (S1020).

Specifically, the above situation occurs conceivably, for example but not limited to, when battery 211 of parent drone 200 is depleted or when the power supply system of parent drone 200 is damaged instantaneously upon parent drone 200 colliding with an object.

If parent drone 200 can keep its power on (YES in S1018), parent drone 200 then determines whether parent drone 200 is still electrically connected to child drone 300 and whether parent drone 200 can transmit, to child drone 300, a signal that informs child drone 300 of an irregularity (S1019).

If parent drone 200 cannot transmit a signal that informs child drone 300 of an irregularity (NO in S1019), parent drone 200 performs a process of reverting to the flying status on its own (S1022).

Some specific examples of the case where parent drone 200 cannot transmit a signal include a case where communicator 220 of parent drone 200 has been damaged upon parent drone 200 colliding with an object and a case where the wireless connection has been lost due to radio wave interference or the like.

The reversion process in this example refers to a process in which flight controller 231 of parent drone 200 measures and analyzes the flight condition and the position information via sensors provided in parent drone 200 and tries to bring parent drone 200 back into a stable flying condition. This reversion process may be performed autonomously by parent drone 200 itself or may be performed remotely by manager 100.

It is determined whether the flying condition of parent drone 200 has recovered through the reversion process (S1024). If the flying condition has recovered (YES in S1024), parent drone 200 temporarily hovers (S1025) and tries to electrically reconnect to child drone 300 (S1039). If the flying condition fails to recover even after a predefined time has passed (NO in S1024), parent drone 200 automatically stops its propellers and falls toward the ground (S1026). In this case, it is also conceivable that the manager remotely transmits a signal that causes an emergency stop of the propellers and makes parent drone 200 fall.

After parent drone 200 has tried to reconnect to child drone 300 (S1039), parent drone 200 determines whether an electrical connection has been established to allow parent drone 200 to transmit a signal (S1040). If parent drone 200 can transmit a signal (YES in S1040), parent drone 200 transmits a signal to child drone 300 concerning the flying condition of parent drone 200 (S1041) and prepares again for a flight that is based on an initial flight plan (S1043). If parent drone 200 is still unable to transmit a signal even after a predefined time has passed, parent drone 200 automatically stops its propellers, or manager 100 manually stops the propellers of parent drone 200. Then, parent drone 200 falls (S1042).

If parent drone 200 can transmit an irregularity signal from the beginning (YES in S1019), parent drone 200 transmits an irregularity signal to child drone 300 (S1021) and performs the reversion process (S1023). Parent drone 200 determines whether its flying condition has recovered as a result of the reversion process (S1035). If the flying condition has recovered, parent drone 200 prepares to fly again (S1037). If the flying condition fails to recover, parent drone 200 transmits, to child drone 300, a signal informing child drone 300 that parent drone 200 is to fall (S1036). Then, parent drone 200 falls upon stopping its propellers manually or automatically (S1038). Child drone 300 constantly monitors whether child drone 300 receives an irregularity signal from parent drone 200 (S1014). If child drone 300 has received an irregularity signal (YES in S1014), child drone 300 stops moving forward against the flight plan (S1015) and starts preparing for a fall of parent drone 200.

First, child drone 300 measures the length of wire 600 coupling child drone 300 and parent drone 200 and, in consideration of the current speed or the current position information of parent drone 200, determines whether wire 600 is sufficiently short so that parent drone 200 does not crash into the ground (S1027). If child drone 300 determines that wire 600 is not sufficiently short, child drone 300 takes up wire 600 by a necessary amount (S1044) and tries to couple itself to rail 400 near child drone 300 (S1028). In this example, that child drone 300 couples itself to rail 400 means that child drone 300 couples arm 340 physically to rail 400 via rail control module 312.

Thereafter, child drone 300 determines whether child drone 300 has received a fall signal from parent drone 200 or whether wire control module 311 has detected a fall of parent drone 200 (S1029). If child drone 300 has detected a fall of parent drone 200 (YES in S1029), child drone 300 stops its propellers (S1030) and transmits, to manager 100, a signal informing manager 100 that child drone 300 has also fallen (S1034). When child drone 300 falls in this situation, the altitude of child drone 300 is lowered to a certain extent due to the loss of the lifting power provided by the propellers, but child drone 300 does not crash into the ground since child drone 300 is coupled to rail 400. This also applies similarly to the case where parent drone 200 falls, and parent drone 200 does not crash into the ground.

If no fall is detected even after a predefined time has passed (NO in S1029), it is determined that parent drone 200 has successfully reverted to its flying condition, and child drone 300 prepares to fly again (S1031).

Even if no irregularity signal is received from parent drone 200 (NO in S1014), if child drone 300 has detected a fall of parent drone 200 (YES in S1016), child drone 300 transmits, to manager 100, a signal informing manager 100 that child drone 300 is to fall and then stops its propellers (S1033).

FIG. 8 schematically illustrates an appearance of parent drone 200 coupled to child drone 300 via wire 600 according to Embodiment 1. Illustrated in (a) in FIG. 8 is a top view of parent drone 200. Parent drone 200 includes four propellers provided on an upper surface. The four propellers are each provided with propeller guard 800. Each propeller guard 800 has a ring shape and encircles the corresponding propeller. The presence of propeller guards 800 can help prevent wire 600 or the like from being caught by the propellers while parent drone 200 is flying. Wire 600 that couples parent drone 200 and child drone 300 is coupled to a lower surface of parent drone 200. Wire 600 is attached to wire connector 241 provided on rotary ring 240. Rotary ring 240 surrounds the fuselage of parent drone 200 and is rotatably attached to parent drone 200. As rotary ring 240 is rotated, wire connector 241 can be positioned on the upper surface of parent drone 200 or positioned on the lower surface of parent drone 200. Therefore, with respect to parent drone 200, wire 600 can extend from the upper surface of parent drone 200 or can hang down from the lower surface of parent drone 200. As illustrated in (b) in FIG. 8, parent drone 200 is coupled to child drone 300 via wire 600 that is coupled to wire connector 241.

Figure 9:
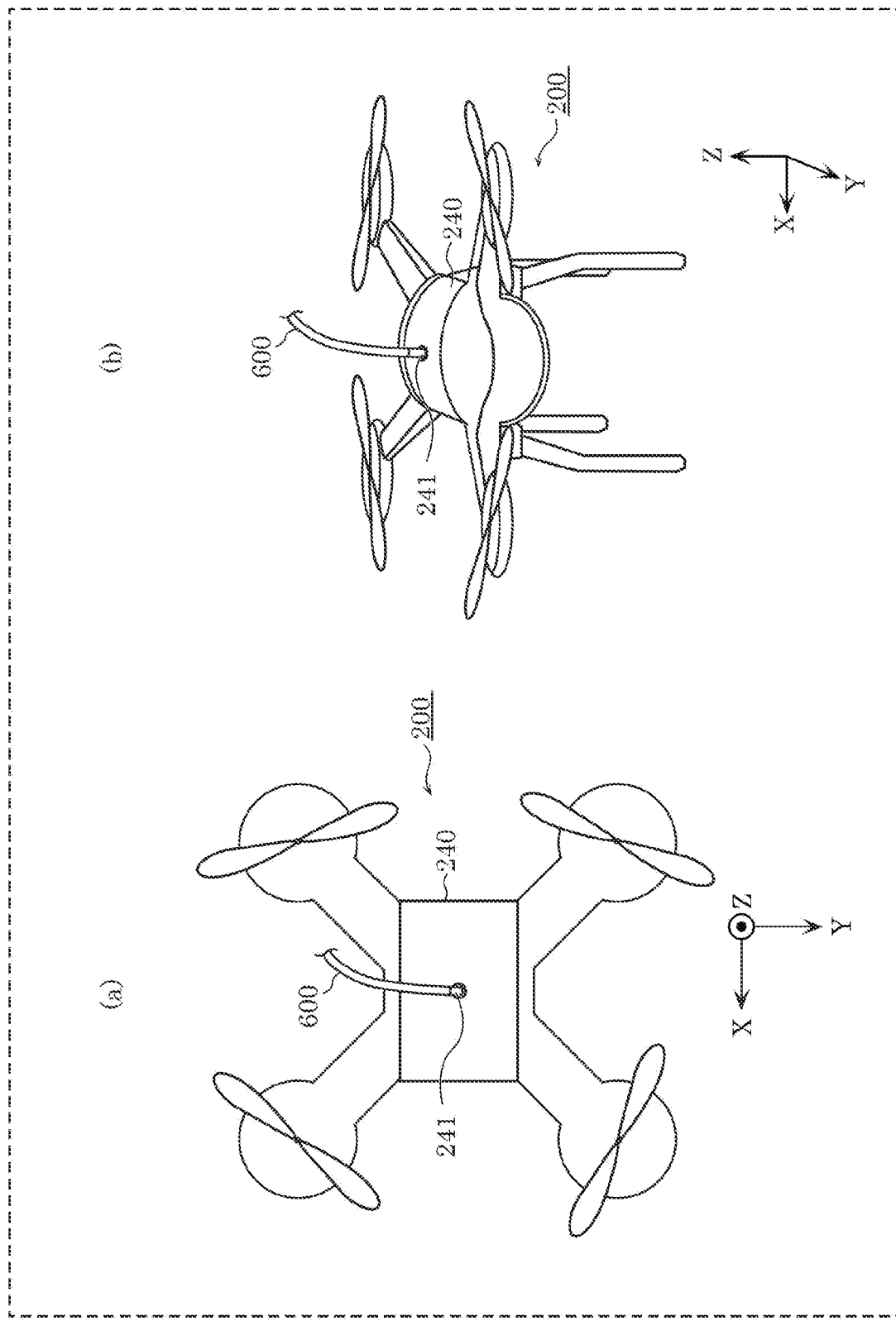
FIG. 9 illustrates a top view and a side view of a parent drone that includes a rotary ring to which a wire is to be connected.

FIG. 9 illustrates a top view and a side view of parent drone 200 that includes rotary ring 240 to which wire 600 is to be coupled. Illustrated in (a) in FIG. 9 is a top view of parent drone 200. Parent drone 200 includes four propellers provided on its upper surface. The number of the propellers provided in parent drone 200 is not limited to four, and it suffices that a plurality of propellers be provided in parent drone 200. Parent drone 200 includes rotary ring 240. Rotary ring 240 surrounds the fuselage of parent drone 200 and is rotatably attached to parent drone 200. Wire 600 is coupled to rotary ring 240 via wire connector 241. In (a) in FIG. 9, rotary ring 240 is installed such that wire connector 241 where rotary ring 240 is connected to wire 600 is located on the upper surface of parent drone 200. Illustrated in (b) in FIG. 9 is a side view of parent drone 200. Parent drone 200 is shaped such that the lower surface of its fuselage bulges in the vertical direction. The fuselage of parent drone 200 may have a cylinder-like shape. Parent drone 200 may include one or more legs that help parent drone 200 stand on the ground. The propellers installed in parent drone 200 may be arranged radially about the center of parent drone 200. In (b) in FIG. 9, wire 600 coupled to parent drone 200 is located on the upper surface of parent drone 200 via wire connector 241 in rotary ring 240. In this manner, wire 600 may extend from the upper surface of parent drone 200.

Figure 10:
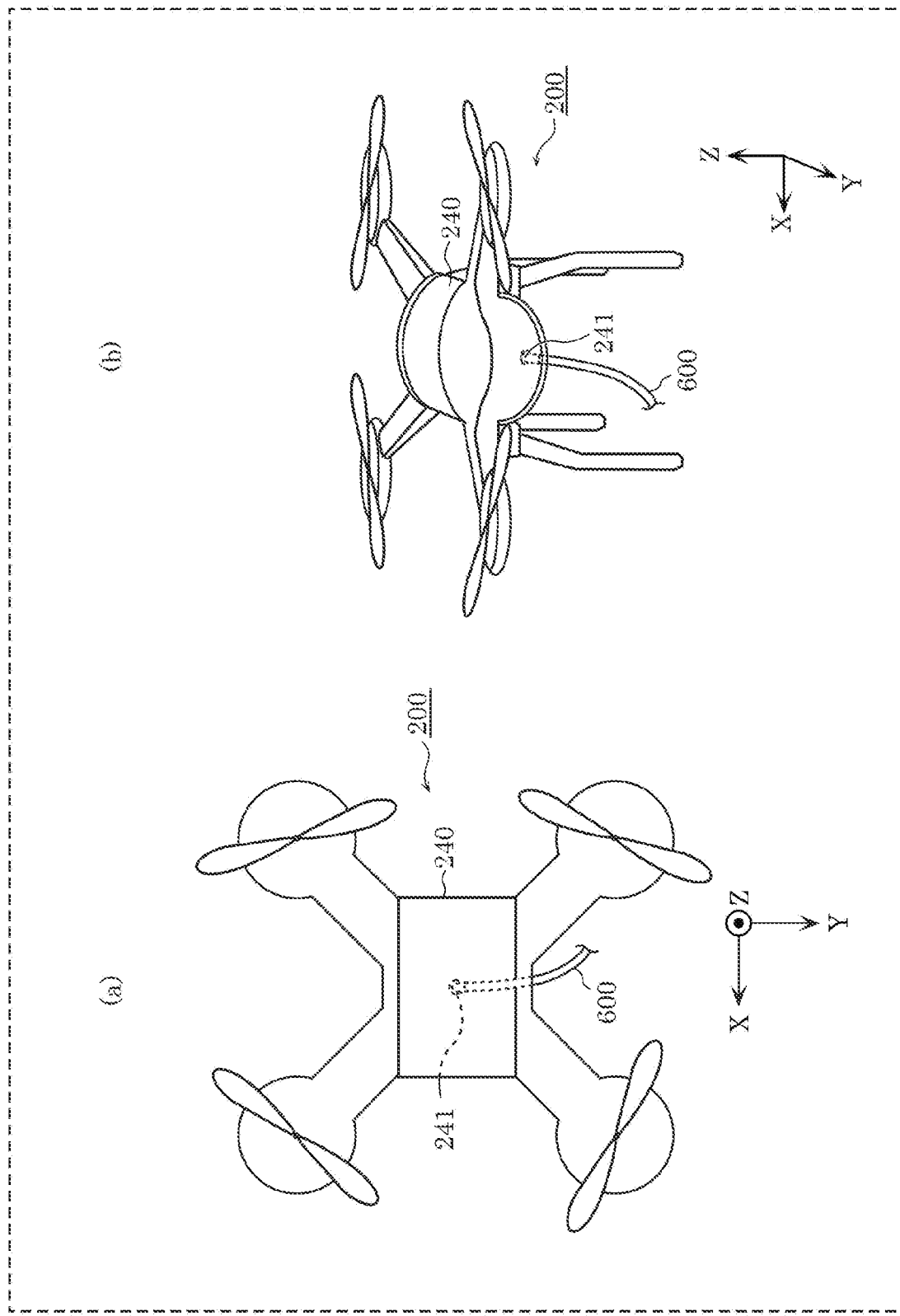
FIG. 10 illustrates a top view and a side view of a parent drone that includes a rotary ring to which a wire is to be connected, and a wire connector is located on a lower surface of the parent drone.

FIG. 10 illustrates a top view and a side view of parent drone 200 that includes rotary ring 240 to which wire 600 it to be coupled, and wire connector 241 is located on the lower surface of parent drone 200. Illustrated in (a) in FIG. 10 is a top view of parent drone 200. Parent drone 200 includes four propellers provided on its upper surface. The number of the propellers provided in parent drone 200 is not limited to four, and it suffices that a plurality of propellers be provided in parent drone 200. Parent drone 200 includes rotary ring 240. Rotary ring 240 surrounds the fuselage of parent drone 200 and is rotatably attached to parent drone 200. Wire 600 is coupled to rotary ring 240 via wire connector 241. In (a) in FIG. 10, rotary ring 240 is installed such that wire connector 241 where rotary ring 240 is connected to wire 600 is located on the lower surface of parent drone 200. Illustrated in (b) in FIG. 10 is a side view of parent drone 200. Wire 600 is attached to rotary ring 240. In (b) in FIG. 10, wire connector 241 provided in rotary ring 240 that is rotatably attached to parent drone 200 is located on the lower surface of parent drone 200. In this manner, wire 600 may hang down from the lower surface of parent drone 200.

Figure 11:
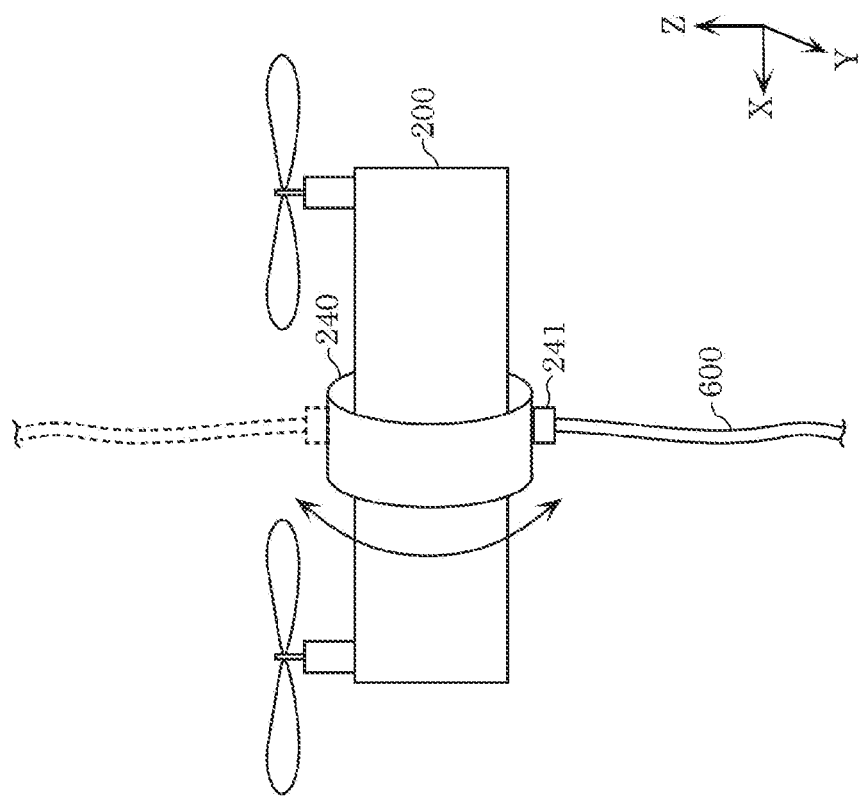
FIG. 11 illustrates a movement of a rotary ring connected to a wire.

FIG. 11 illustrates a movement of rotary ring 240 coupled to wire 600. The coordinate axes defined in FIG. 11 are the X-axis extending in the right and left direction, the Y-axis extending in the depthwise direction, and the Z-axis extending in the up and down direction. Rotary ring 240 is attached to parent drone 200. Rotary ring 240 is attached so as to surround the fuselage of parent drone 200. Rotary ring 240 rotates about an axis extending in the X-axis direction. Rotary ring 240 has a ring-like shape. Rotary ring 240 is made of metal, resin, or the like. Wire connector 241 is disposed in a portion of rotary ring 240. Wire connector 241 may be a cylindrical projection formed on rotary ring 240. Wire 600 is attached to wire connector 241. Rotary ring 240 rotates in accordance with the tension in wire 600. Therefore, parent drone 200 can maintain its attitude to a certain extent regardless of the tension in wire 600.

Figure 12:
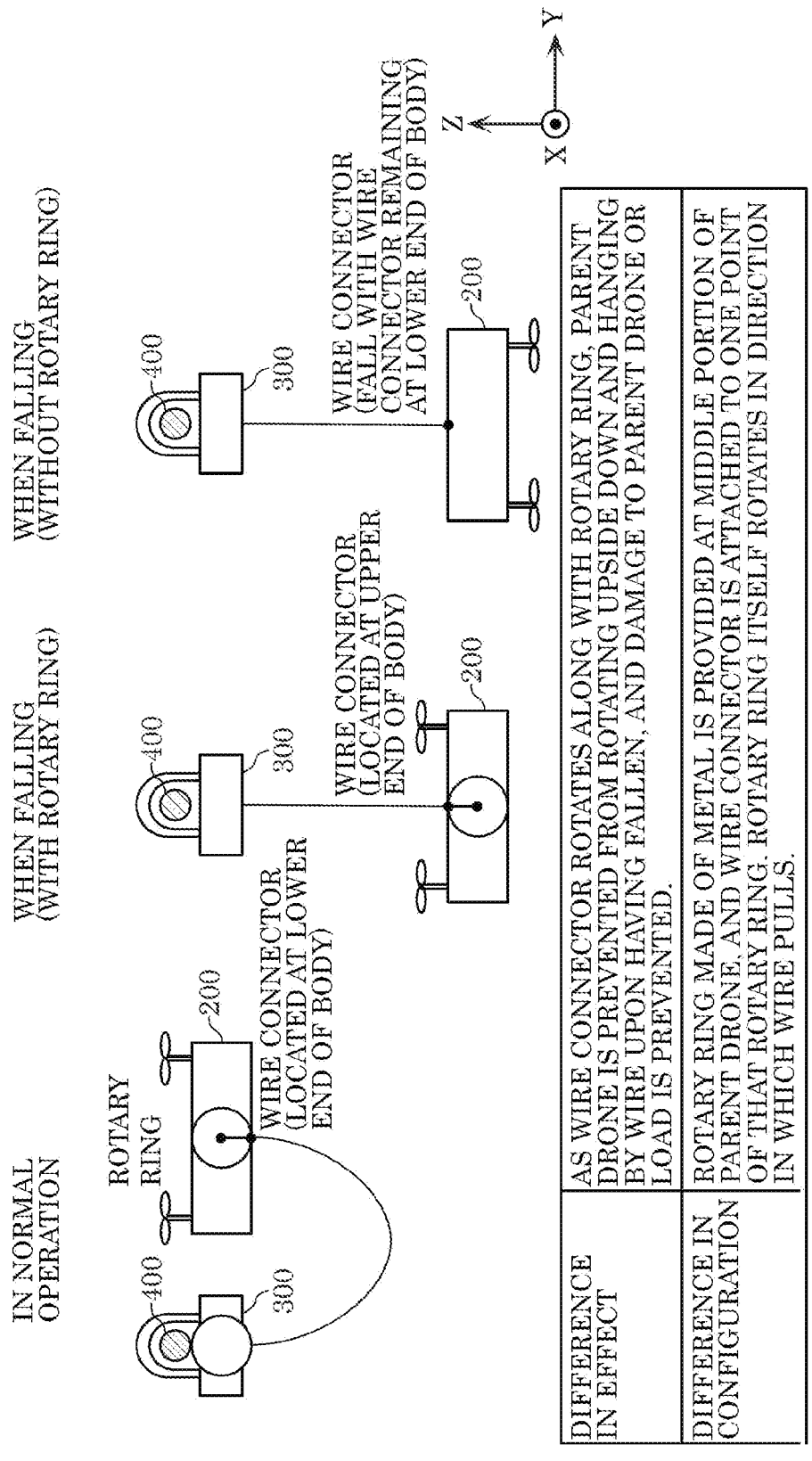
FIG. 12 is a schematic diagram for describing a role that a rotary ring plays when a parent drone falls according to Embodiment 1.

FIG. 12 is a schematic diagram for describing a role that rotary ring 240 plays when parent drone 200 falls according to Embodiment 1. In a normal operation, wire connector 241 provided in rotary ring 240 is located at a lower end of the body of parent drone 200. In a normal operation, parent drone 200 is coupled to child drone 300 by wire 600 via wire connector 241 located at the lower end of the body of parent drone 200. Rotary ring 240 is mounted on and around a middle portion of the body of the parent drone. Wire connector 241 is provided in rotary ring 240. Therefore, rotary ring 240 rotates in a direction in which wire 600 pulls rotary ring 240.

When the parent drone falls, rotary ring 240 provided with the wire connector and installed on parent drone 200 rotates a half circle, and parent drone 200 hangs down from a lower portion of child drone 300. Rotary ring 240 rotates, and this reduces the possibility that parent drone 200 gets tangled in wire 600. This configuration can keep the body of the parent drone from rotating upside down when the parent drone falls and can thus prevent damage to the body of parent drone 200 and to load 500 loaded in parent drone 200.

If rotary ring 240 is not provided in parent drone 200, parent drone 200, upon having fallen, ends up hanging down from child drone 300 upside down with the lower end of parent drone 200 where wire connector 241 is located facing upward.

Figure 13:
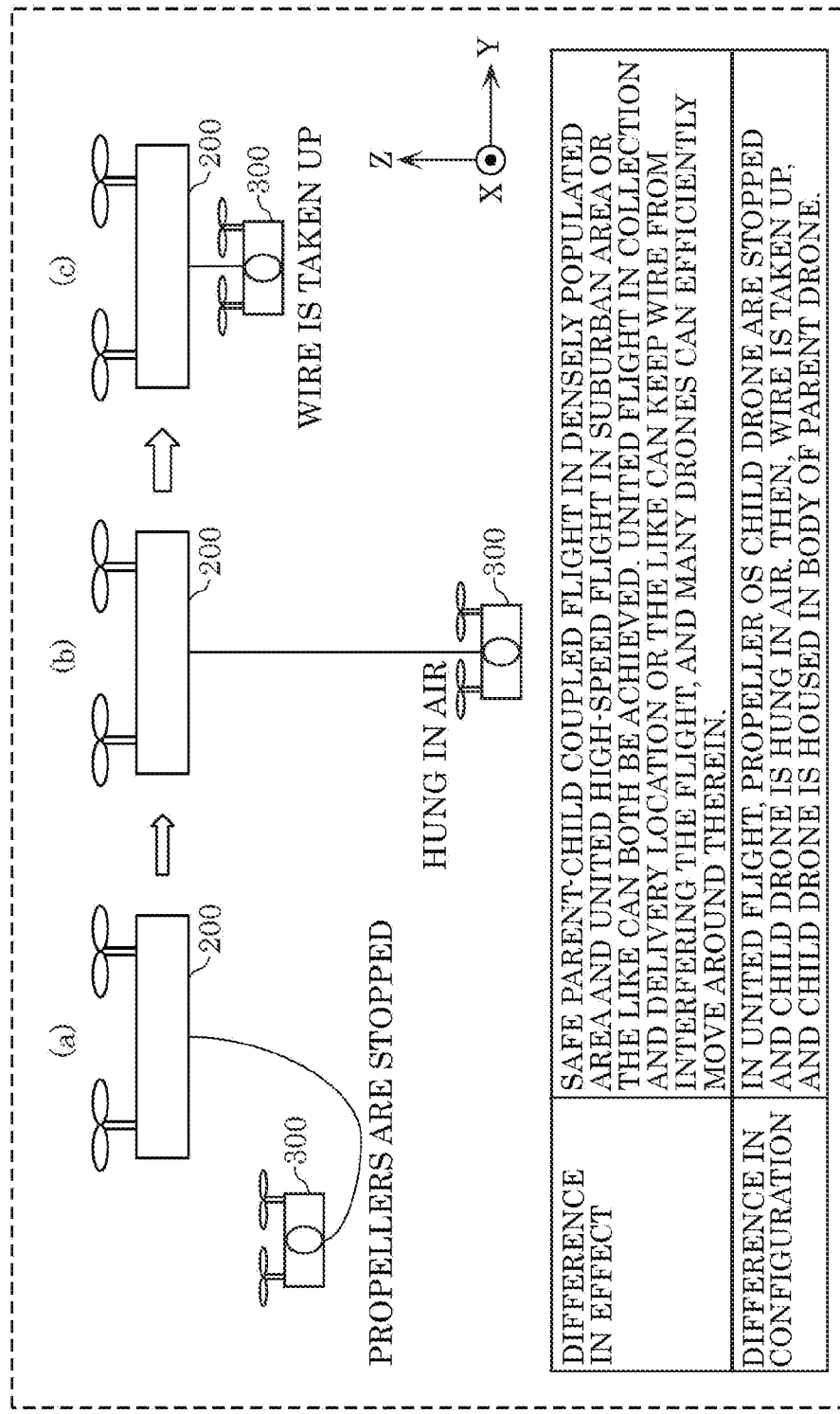
FIG. 13 schematically illustrates procedures that a parent drone performs to retrieve a child drone according to Embodiment 1.

FIG. 13 schematically illustrates procedures performed when parent drone 200 retrieves child drone 300 according to Embodiment 1. Child drone 300 may include a rotary ring to which the wire is to be coupled. In (a) in FIG. 13, the propellers of child drone 300 stop for some reason. Then, as illustrated in (b) in FIG. 13, child drone 300 is hung in the air while hanging down from parent drone 200. Thereafter, as illustrated in (c) in FIG. 13, parent drone 200, via wire control module 212 of actuator 210, takes up wire 600 connecting parent drone 200 and child drone 300. With this operation, child drone 300 is retrieved by parent drone 200. In this state, parent drone 200 and child drone 300 are regarded as being united. Child drone 300 may be housed inside parent drone 200. Uniting parent drone 200 and child drone 300 enables a high-speed flight in a location, such as a suburban area, where no rail 400 is installed. In a location such as a collection and delivery location for loads to be transported by parent drone 200 as well, if parent drone 200 and child drone 300 fly while being united, wire 600 does not interfere with other parent drones 200 and child drones 300, and this allows many drones to efficiently move around in the collection and delivery location.

Figure 14:
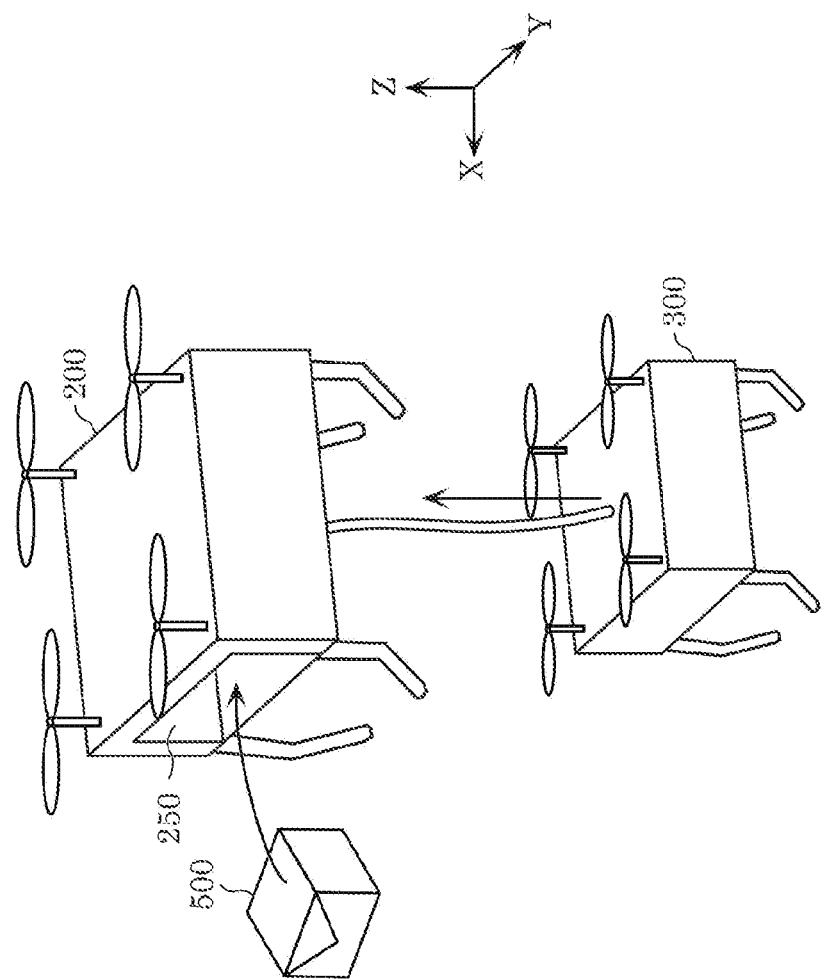
FIG. 14 illustrates how a load is loaded into a parent drone from its side.

FIG. 14 illustrates how load 500 is loaded into parent drone 200 from the side. Opening 250 is provided in a side of parent drone 200 so that load 500 can be loaded into a hollow space in the fuselage of parent drone 200. The shape of opening 250 may be rectangular or circular, for example. Load 500 may be loaded not into the hollow space in the fuselage of parent drone 200 but into a box-like container attached to a lower portion of the fuselage of parent drone 200. Parent drone 200 can house child drone 300 in a lower portion of parent drone 200. While the propellers of child drone 300 are stopped, wire control module 212 of parent drone 200 may take up wire 600 coupling parent drone 200 and child drone 300. Thus, parent drone 200 can house child drone 300 in a lower portion of parent drone 200.

When parent drone 200 and child drone 300 fly together, with child drone 300 housed inside parent drone 200, at a higher speed than they do when they perform a parent-child coupled flight, this mode of fight is referred to as a united high-speed flight. A united high-speed flight refers not only to a flight in which parent drone 200 and child drone 300 fly with child drone 300 housed in parent drone 200 but also to a flight in which parent drone 200 and child drone 300 can fly together with the coupling line that couples parent drone 200 and child drone 300 shortened.

Figure 15:
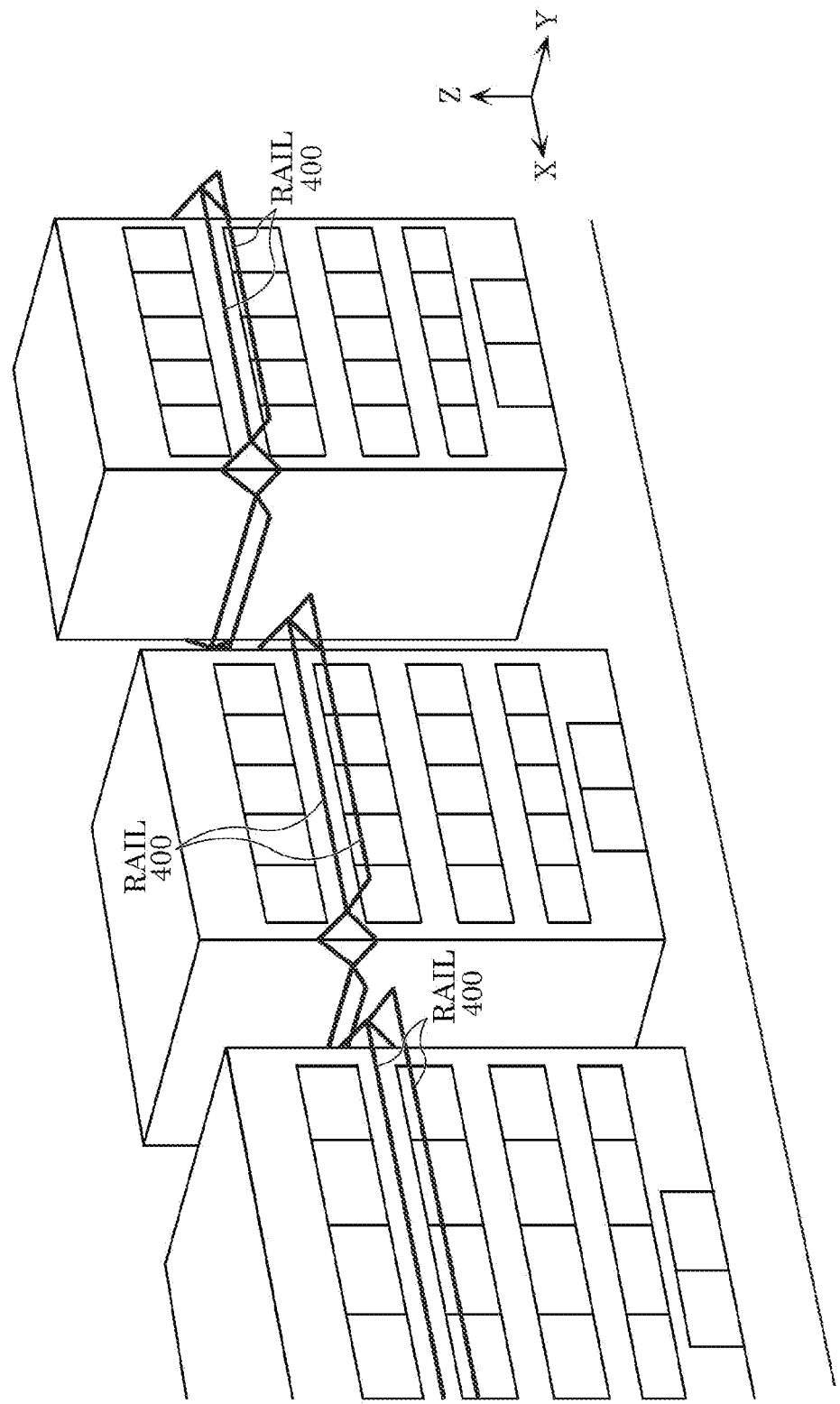
FIG. 15 illustrates two rails installed on each building within a flying area according to Embodiment 1.

FIG. 15 illustrates two rails 400 installed on each building 700 within a flying area according to Embodiment 1. As in the example illustrated in FIG. 3, rails 400 are installed on side walls of the buildings so as to extend in the horizontal direction. In this example, the number of installed rails 400 is two. Two rails 400 may be arrayed side by side along a horizontal plane or may be disposed at different heights in the up and down direction. A flying body composed of parent drone 200 and child drone 300 coupled to each other is referred to as parent-child drone 30. When two or more parent-child drones 30 are flying along rails 400, the presence of the two rails allows one parent-child drone 30 to pass another parent-child drone 30.

Figure 16:
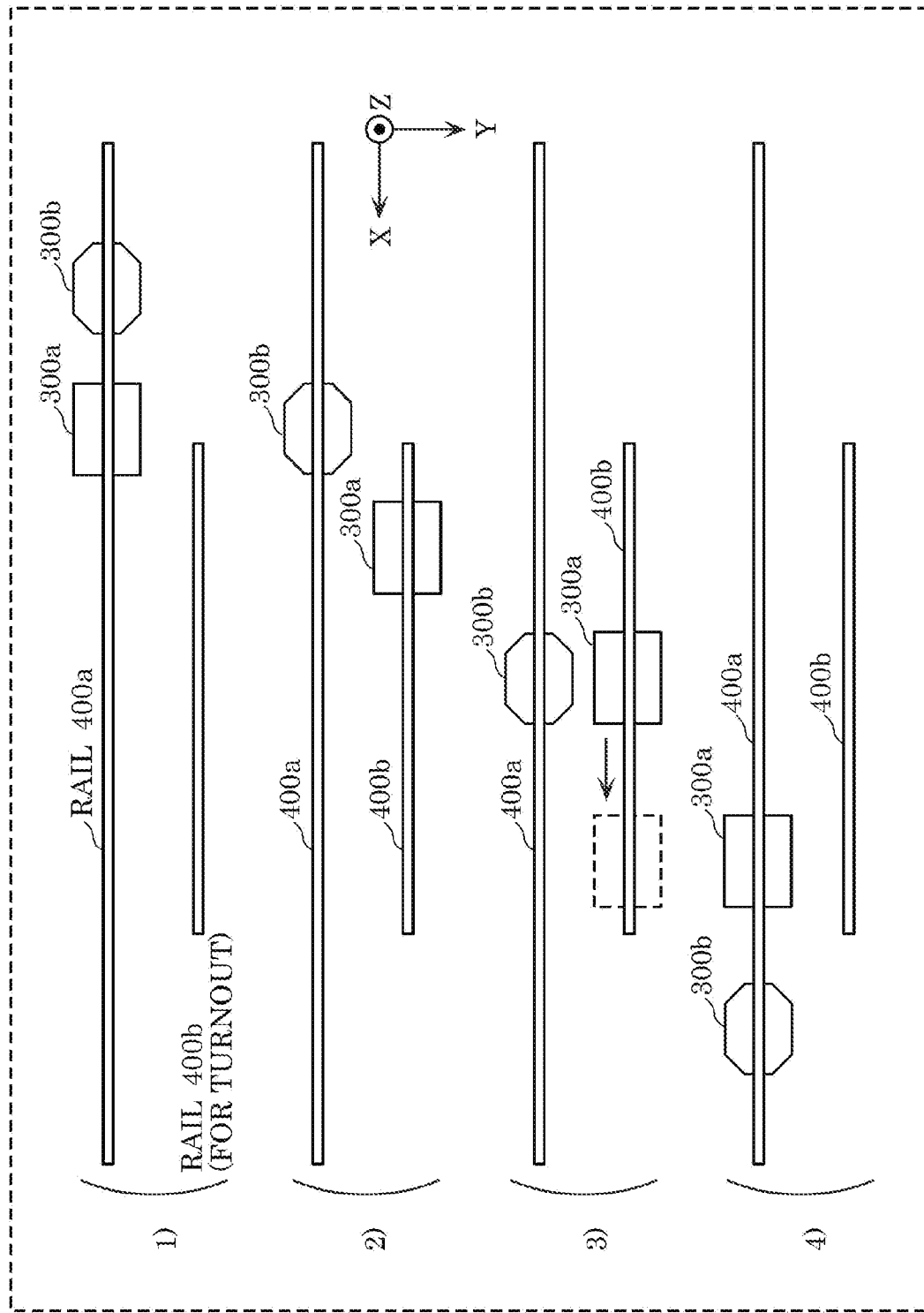
FIG. 16 illustrates how one of the two child drones passes the other one of the two child drones in two-lane type rails according to Embodiment 1.

With reference to FIG. 16, how two drones can pass each other by utilizing two rails 400 will be described. FIG. 16 illustrates how one of two child drones 300 passes the other one of two child drones 300 via two-lane type rails 400 according to Embodiment 1. Rails 400a and 400b illustrated in FIG. 16 correspond to two rails 400 illustrated in FIG. 15. For example, rail 400a is closer to a side wall of a building than rail 400b is. Child drones 300a and 300b illustrated in FIG. 16 each have a function and a configuration similar to those of child drone 300. In 1) of FIG. 16, child drone 300a and child drone 300b are coupled to rail 400. Child drone 300a is ahead of child drone 300b.

When child drone 300b is to pass child drone 300a, the following procedures are performed. As illustrated in 2) in FIG. 16, first, child drone 300a to be passed by temporarily moves over to rail 400b for the turnout. At this point, parent drone 200a (not illustrated) coupled to child drone 300a via wire 600 may be moved in a direction away from child drone 300a. Next, as illustrated in 3) in FIG. 16, child drone 300b remaining on rail 400a moves along rail 400a. As illustrated in 4) in FIG. 16, after child drone 300b has moved sufficiently along rail 400a, child drone 300a returns to rail 400a from rail 400b. At this point, the length of wire 600 coupling child drone 300 and parent drone 200a to be passed by may be increased. Through the operation described above, child drone 300b finishes passing child drone 300a. Thereafter, parent drone 200a (not illustrated) coupled to child drone 300a via wire 600 may be returned to its original flight course.

Figure 17:
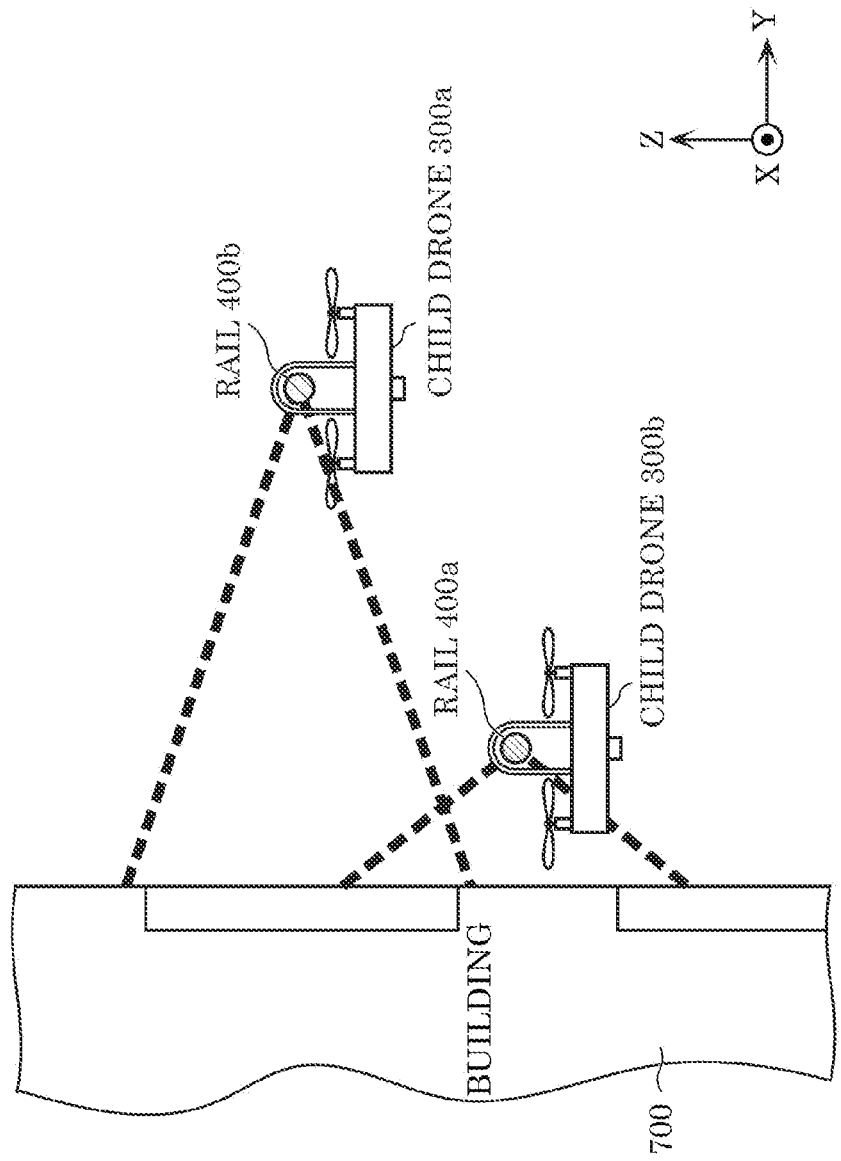
FIG. 17 illustrates an arrangement example of two-lane type rails according to Embodiment 1.

FIG. 17 illustrates an arrangement example of two-lane type rails 400 according to Embodiment 1. In this example, the distance between two rails 400a and 400b may be greater than the width of child drone 300. In FIG. 17, rail 400a at a lower level is disposed close to the building, and rail 400b at a higher level is disposed farther from the building than rail 400a is. Child drone 300b is coupled to rail 400a, and child drone 300a is coupled to rail 400b.

When a plurality of rails are to be used to allow a plurality of drones flying along the rails to pass each other, rail 400a and rail 400b may be disposed at different heights in the vertical direction, as illustrated in FIG. 17. In a case where rail 400a and rail 400b are disposed at different heights in the vertical direction in the aforementioned manner, the possibility that parent drone 200a (not illustrated) coupled to child drone 300a collides with parent drone 200b (not illustrated) coupled to child drone 300b can be reduced.

Figure 18:
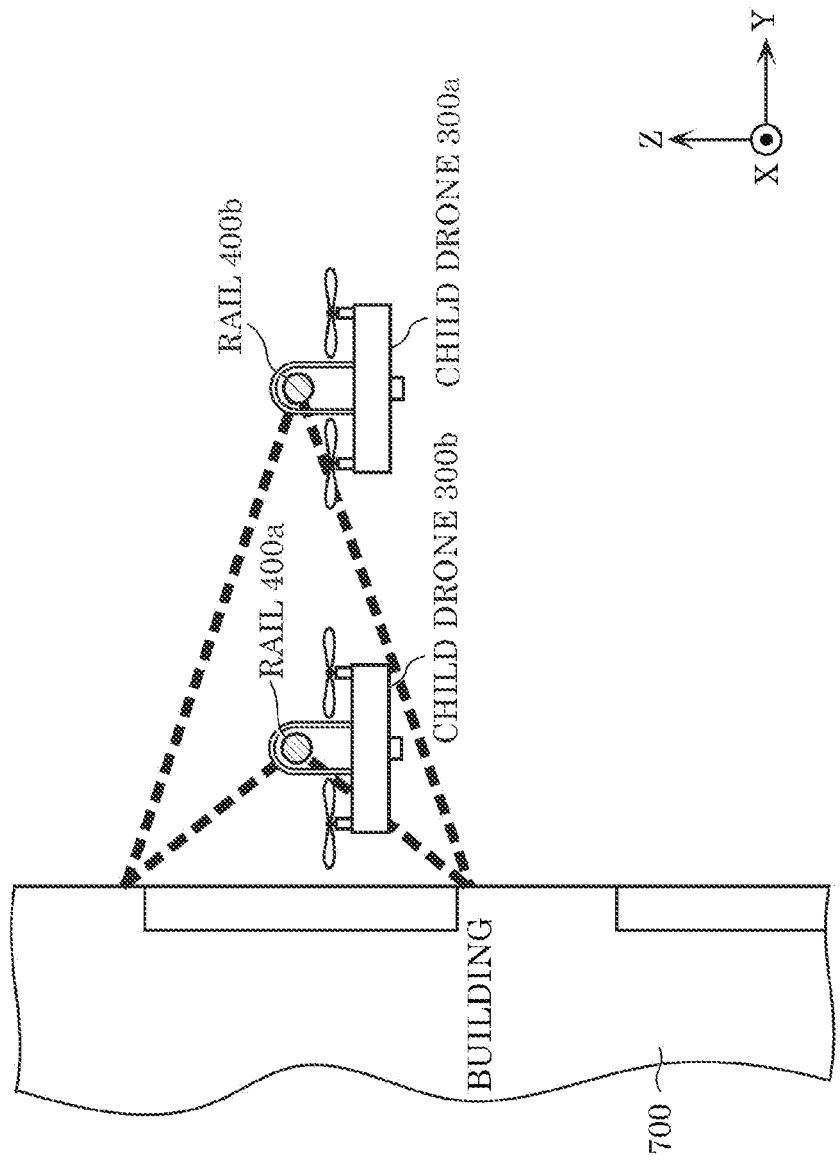
FIG. 18 illustrates another arrangement example of two-lane type rails according to Embodiment 1.

FIG. 18 illustrates another arrangement example of two-lane type rails 400 according to Embodiment 1. In FIG. 18, rail 400a is disposed close to the building, and rail 400b is disposed farther from the building than rail 400a is. Rail 400a and rail 400b are disposed level with each other along a horizontal plane and at the same height in the vertical direction. Child drone 300b is coupled to rail 400a, and child drone 300a is coupled to rail 400b.

When a plurality of rails are to be used to allow a plurality of drones flying along the rails to pass each other, rail 400a and rail 400b may be disposed at the same height in the vertical direction, as illustrated in FIG. 18. In a case where rail 400a and rail 400b are disposed level with each other along a horizontal plane and at the same height in the vertical direction in the aforementioned manner, child drone 300a and child drone 300b can move smoothly between rails 400a and 400b.

Figure 19:
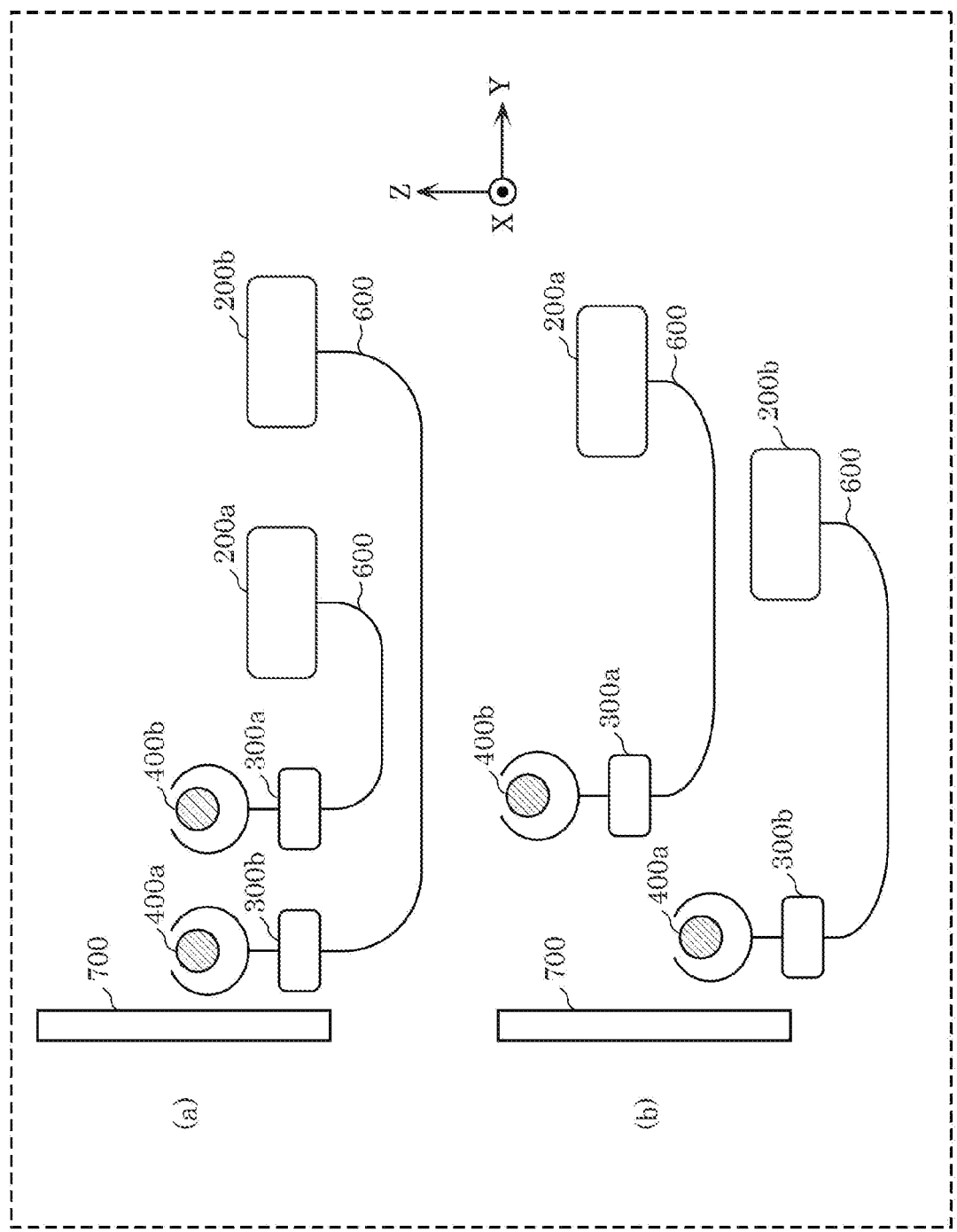
FIG. 19 is a schematic diagram illustrating how parent-child drones can be arranged in a case where two rails are provided.

FIG. 19 is a schematic diagram illustrating how parent-child drones 30 can be arranged in a case where two rails 400 are provided. As illustrated in (a) in FIG. 19, rails 400a and 400b are disposed along a horizontal plane on building 700. In this case, child drone 300b is coupled to rail 400 disposed closer to building 700, and child drone 300a is coupled to rail 400b that is farther from the building. Meanwhile, parent drone 200b is coupled to child drone 300b via wire 600, and parent drone 200a is coupled to child drone 300a via wire 600. This arrangement places child drone 300a and parent drone 200a between child drone 300b and parent drone 200b. Therefore, parent drone 200b coupled, via wire 600, to child drone 300b that is coupled to rail 400a closer to building 700 flies along the outermost location among the drones, that is, flies along a location farthest from the building.

With reference to (b) in FIG. 19, a case where rails 400a and 400b are disposed on building 700 at different heights in the vertical direction will be described. Child drone 300b is coupled to rail 400a disposed closer to building 700. Child drone 300a is coupled to rail 400b located farther from building 700 and disposed at a higher location than rail 400a. Parent drone 200b is coupled to child drone 300b via wire 600. Parent drone 200a is coupled to child drone 300a via wire 600. Child drone 300b and parent drone 200b are located lower than child drone 300a and parent drone 200a. Child drone 300b and parent drone 200b are located closer to building 700 than, respectively, child drone 300a and parent drone 200a are. Therefore, child drone 300a and parent drone 200a fly above and to the right of child drone 300b and parent drone 200b, respectively. The length of wire 600 coupling child drone 300a and parent drone 200a is equal to the length of wire 600 coupling child drone 300b and parent drone 200b. This configuration renders it unnecessary to vary the control of wire 600 between the passing parent-child drone and the parent-child drone to be passed by. The parent-child drones fly at different heights in the up and down direction, and this reduces the possibility of collision to occur when the parent-child drones pass each other.

Figure 20:
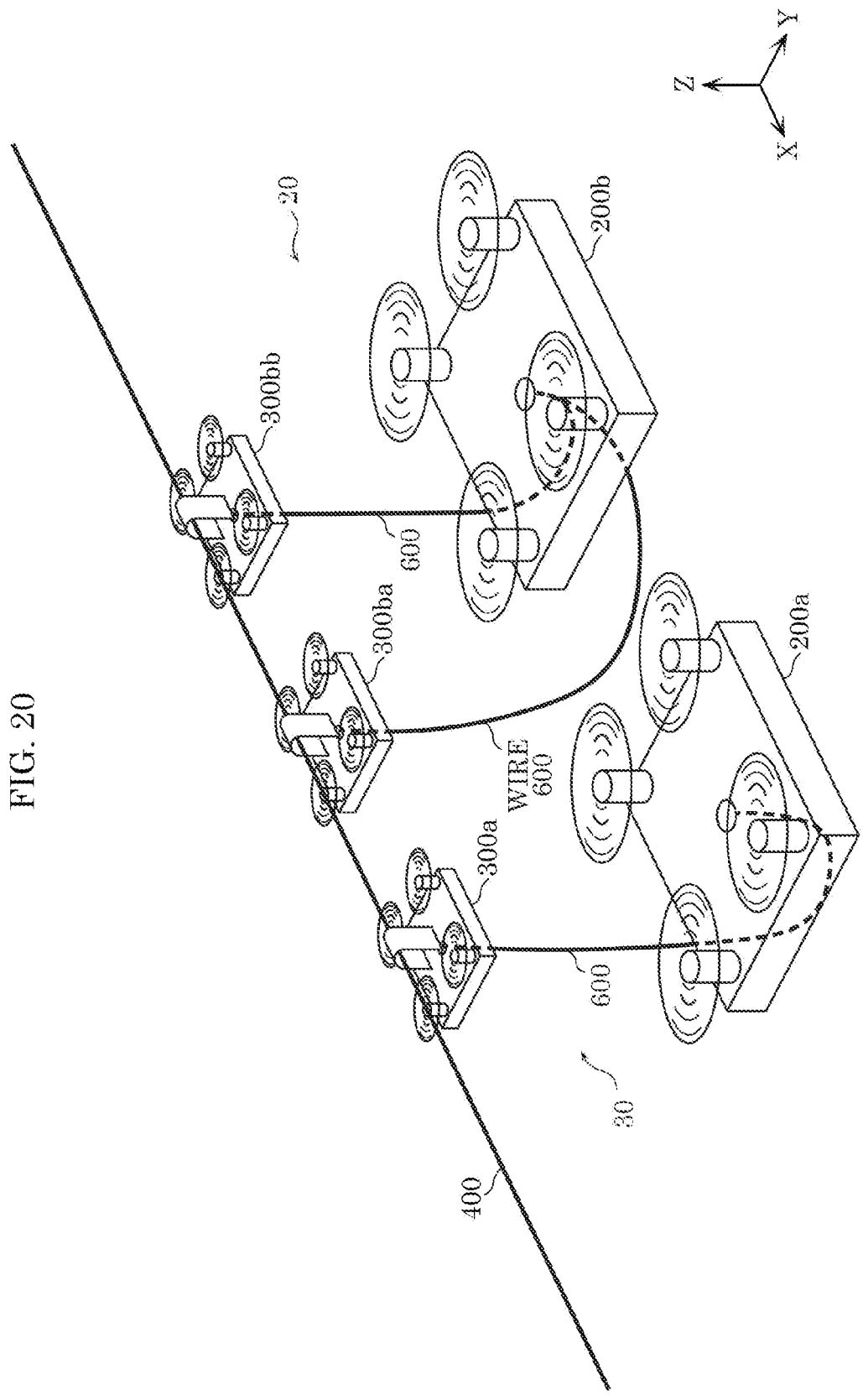
FIG. 20 illustrates two child drones coupled to one parent drone according to Embodiment 1.
Figure 21:
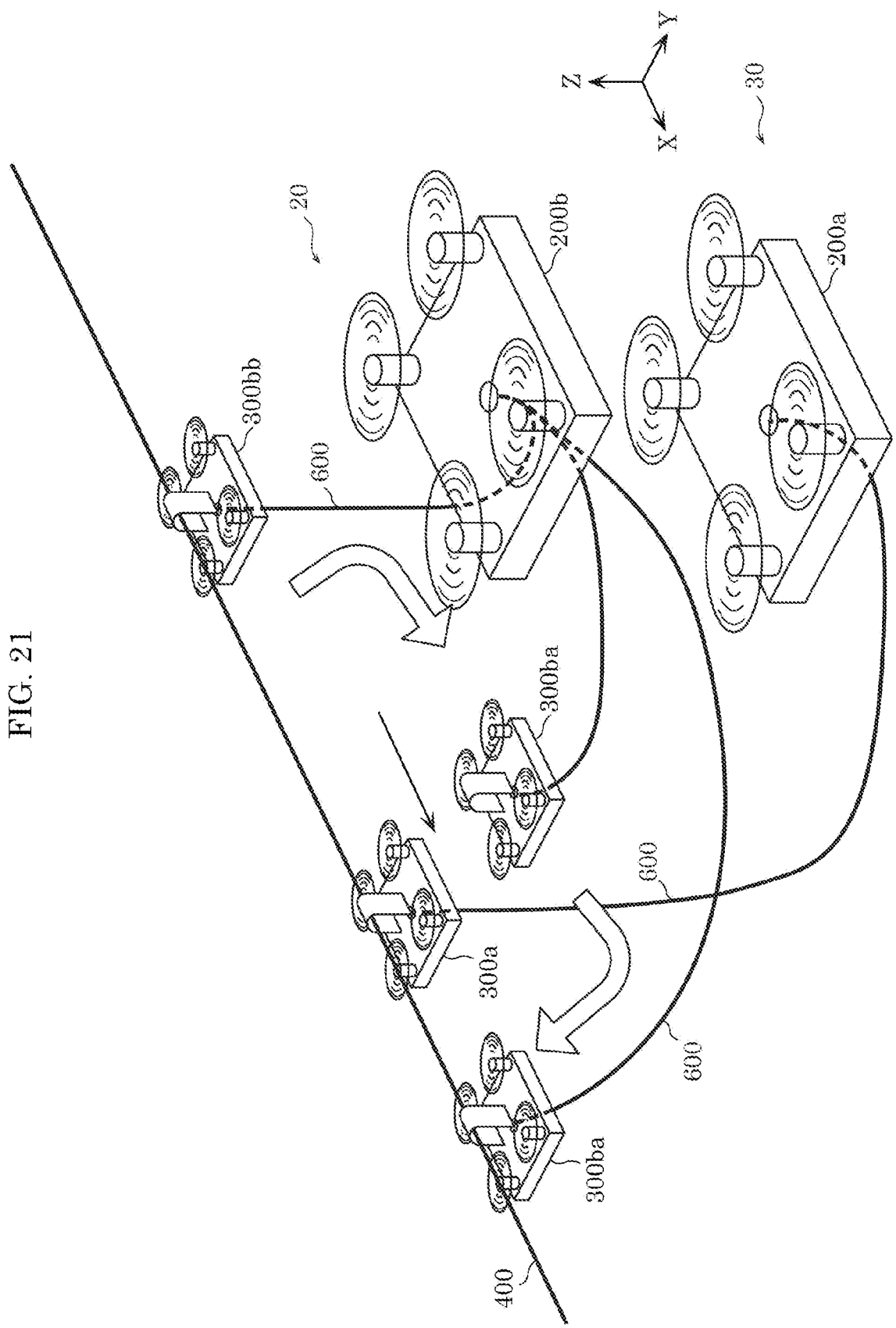
FIG. 21 illustrates how one parent drone coupled to two child drones passes another set of a parent drone and child drones located ahead of the one parent drone according to Embodiment 1.

FIG. 20 illustrates two child drones 300 coupled to one parent drone 200 according to Embodiment 1. FIG. 21 illustrates how one parent drone 200 coupled to two child drones 300 passes other parent drone 200 and child drones 300 located ahead of one parent drone 200 according to Embodiment 1.

As illustrated in FIG. 20, parent drone 200a coupled, via wire 600, to child drone 300a that is coupled to rail 400 is flying, and parent drone 200b coupled, via respective wires 600, to child drone 300ba coupled to rail 400 and child drone 300bb coupled to rail 400 is flying behind parent drone 200a. Procedures to be performed when child drone 300ba, child drone 300bb, and parent drone 200b pass child drone 300a and parent drone 200a flying ahead of child drone 300ba, child drone 300bb, and parent drone 200b will be described.

As illustrated in FIG. 21, parent-child drone 20 includes parent drone 200b and child drones 300ba and 300bb coupled to parent drone 200b. As illustrated in FIG. 21, first, manager 100 changes the flying course of parent drone 200a of parent-child drone 30 flying ahead of parent-child drone 20. Manager 100 may change the direction of parent drone 200a to the direction that moves parent drone 200a away from rail 400. Child drone 300ba of parent-child drone 20 flying behind parent-child drone 30 disengages itself from rail 400, passes child drone 300a flying ahead of child drone 300ba, and couples itself to rail 400 at a position ahead of child drone 300a. Next, as with child drone 300ba, child drone 300bb flying behind parent-child drone 30 also disengages itself from rail 400 and couples itself to rail 400 at a position behind child drone 300ba and ahead of child drone 300a. Therefore, parent drone 200b flies to a position close to child drones 300ba and 300bb and passes parent drone 200a.

As parent drone 200b follows the above procedures to pass parent drone 200a, parent drone 200b can pass parent drone 200a without wire 600 that couples parent drone 200a and child drone 300a tangling with wires 600 that couples parent drone 200b and child drones 300ba and 300bb.

Figure 22:
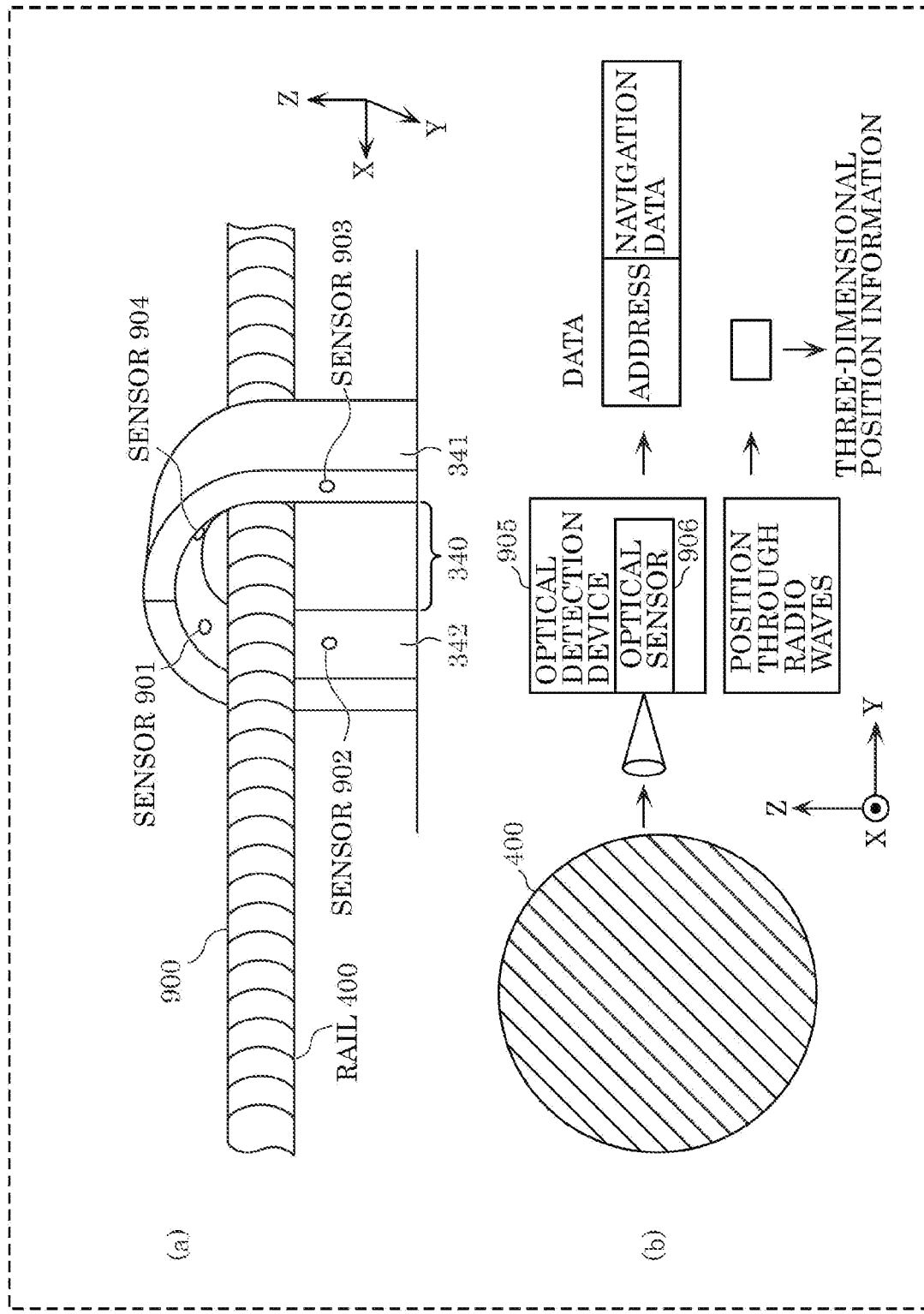
FIG. 22 is a configuration diagram in which address three-dimensional position information and navigation data are written on a surface of a wire that couples a parent drone and a child drone and a sensor reads the address three-dimensional position information and the navigation data according to Embodiment 1.

FIG. 22 is a configuration diagram in which address three-dimensional position information and navigation data are written on the surface of wire 600 that couples parent drone 200 and child drone 300 and a sensor reads the address three-dimensional position information and the navigation data. As illustrated in (a) in FIG. 22, data 900 is recorded on the surface of rail 400. Data 900 includes, for example but not limited to, the identification information and the three-dimensional position information of rail 400 and the navigation data for child drone 300. Data 900 may be recorded in a ring-like manner on the surface of rail 400. In this case, for example, a technique used to write data onto an optical drive, such as a CD-ROM, onto or a recording medium, such as a magnetic disk, may be used.

Sensor 901, sensor 902, sensor 903, and sensor 904 are attached to arm 340 of child drone 300. Sensors 901, 902, 903, and 904 may each be implemented by an optical sensor or the like. In this example, the number of the sensors is not limited to four. Data 900 recorded on rail 400 is read by a plurality of sensors from different angles with respect to rail 400. As data 900 is read by the plurality of sensors 901, 902, 903, and 904, even if there is a defect in a part of data 900 recorded on rail 400, child drone 300 can read out necessary data 900. Moreover, even if any one of the plurality of sensors 901, 902, 903, and 904 is damaged, child drone 300 can still read out data 900 from rail 400.

As illustrated in (b) in FIG. 22, a section of rail 400 shows that data 900 is recorded in the outline of rail 400. Sensors 901, 902, 903, and 904 are each constituted by optical detection device 905. Optical detection device 905 includes optical sensor 906. Optical detection device 905 reads data 900 with optical sensor 906. Data 900 includes, for example but not limited to, the address indicating the position information of rail 400 and the navigation data for child drone 300. The position of parent drone 200 relative to child drone 300 can be obtained through radio waves, and the position information indicating the absolute position of parent drone 200 in the three-dimensional space can be identified by comparing the relative position of parent drone 200 against the address information indicating the absolute position recorded on rail 400. Child drone 300 intermittently transmits, to manager 100, information concerning the position of child drone 300 or the position of parent drone 200 identified based on the data read from rail 400 or based on information on the data read from rail 400.

Figure 23:
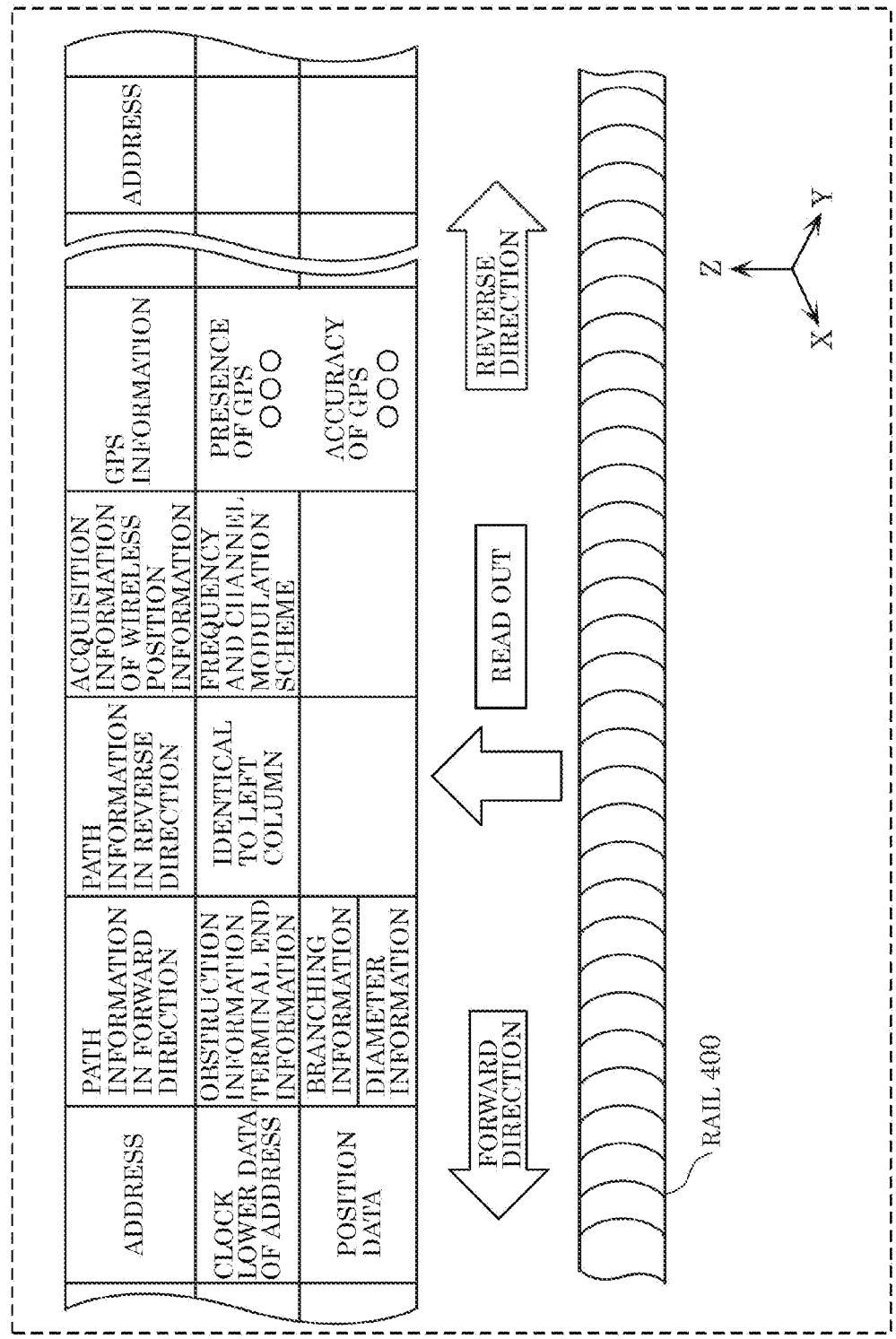
FIG. 23 illustrates the content of data written on a rail according to Embodiment 1.

FIG. 23 illustrates the content of data 900 written on rail 400 according to Embodiment 1. In this example, the forward direction and the reverse direction are defined on rail 400. Data 900 recorded on rail 400 includes, for example but not limited to, the address, the path information in the forward direction, the path information in the reverse direction, the acquisition information of wireless position information, and GPS information. The address includes the clock and the position data. The path information in the forward direction or the path information in the reverse direction includes, for example but not limited to, obstruction information, the terminal end information of rail 400, the branching information of rail 400, and the diameter information of rail 400. The acquisition information of the wireless position information includes the frequency and the channel modulation scheme. The GPS information includes the presence of the GPS and the accuracy of the GPS. In this example, data 900 may also include the geographical coordinate information indicating the location where rail 400 is present or the altitude information indicating the altitude of rail 400.

Figure 24:
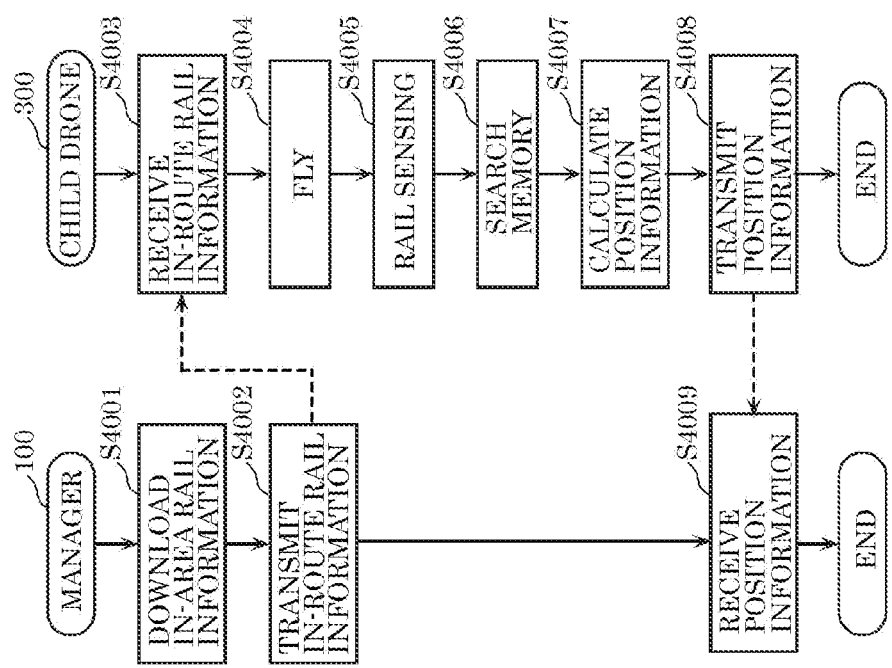
FIG. 24 is a flowchart illustrating control concerning how a child drone acquires rail position information according to Embodiment 1.

FIG. 24 is a flowchart illustrating control concerning how rail position information is acquired by child drone 300 according to Embodiment 1.

First, before child drone 300 starts flying, manager 100 downloads in-area rail information from a database (S4001) and transmits in-route rail information to child drone 300 (84002).

Child drone 300 receives the in-route rail information and stores (records) the in-route rail information into a memory (84003).

In this example, information including numbers, letters, and symbols are converted to a one-dimensional code in accordance with a predefined rule and this converted code is written on the upper surface and the lower surface of rail 400 in the form of stripe-patterned lines. Rail information as used herein is information indicating in which locations in map data a plurality of rails 400 are installed and which position information the code in each point of rail 400 corresponds to.

Two ends of each rail 400 are defined as leading end 402$k$ and terminal end 403 in accordance with a predefined rule. Each code written on rail 400 is set in accordance with a rule that allows information to be obtained based on the difference from an immediately preceding code. Different pieces of information can be acquired when a drone flies from leading end 402$k$ toward terminal end 403 than when the drone flies in the reverse direction.

Child drone 300 starts flying (84004). Then, child drone 300 reads the stripe pattern on rail 400 near child drone 300 with the use of infrared laser sensor 336 (84005). Based on the code that child drone 300 has read out, child drone 300 searches within its memory (84006) and calculates the position information (84007).

Then, child drone 300 transmits the position information to manager 100 (S4008), and manager 100 receives the position information (84009).

A light emitter, such as an LED, may be provided on rail 400, and a signal may be transmitted to child drone 300 or the like through a change in the luminance of the light emitter. In other words, a signal may be transmitted from rail 400 to child drone 300 through visible light communication. A light emitter may be provided so as to penetrate through one rail 400. Such a method makes it possible to reduce any communication error as an emission region is broader. A light emitter may be provided within a predetermined range on rail 400. It is difficult to recognize the rail position at night, and the accuracy of sensing the stripe pattern decreases. However, the visible light communication between rail 400 and child drone 300 makes it possible to recognize the rail position with high accuracy.

In the visible light communication, child drone 300 captures an image showing a change in the luminance of the light emitter provided on rail 400 and acquires a visible light communication image. A CMOS sensor having a plurality of exposure lines may be used as an image sensor. The exposure time of each exposure line of the CMOS sensor is set shorter than a predetermined time, and an image of the light emitter is captured. This makes it possible to capture an image showing a change in the luminance of the light emitter on an exposure line by exposure line basis. In this example, an image showing a change in the luminance corresponding to an exposure line is referred to as an emission line. A visible light communication image includes a plurality of emission lines corresponding to a plurality of exposure lines in each frame, and a signal can be decoded based on the plurality of emission lines of a stripe pattern.

The visible light communication where a CMOS sensor is used includes a first step, a second step, and a third step. In the first step, the exposure time is set shorter than a predetermined time so that an emission line appears in a visible light communication image. In the second step, an image of a light emitter is captured by successively exposing a plurality of exposure lines in accordance with the set exposure time, and a visible light communication image is acquired. In the third step, a signal is decoded based on the emission lines in the visible light communication image. It suffices that the exposure time be set shorter than the exposure time to be held in normal shooting. Setting the exposure time to $1/2000$ seconds or shorter makes it possible to obtain a clear emission line.

Figure 25A:
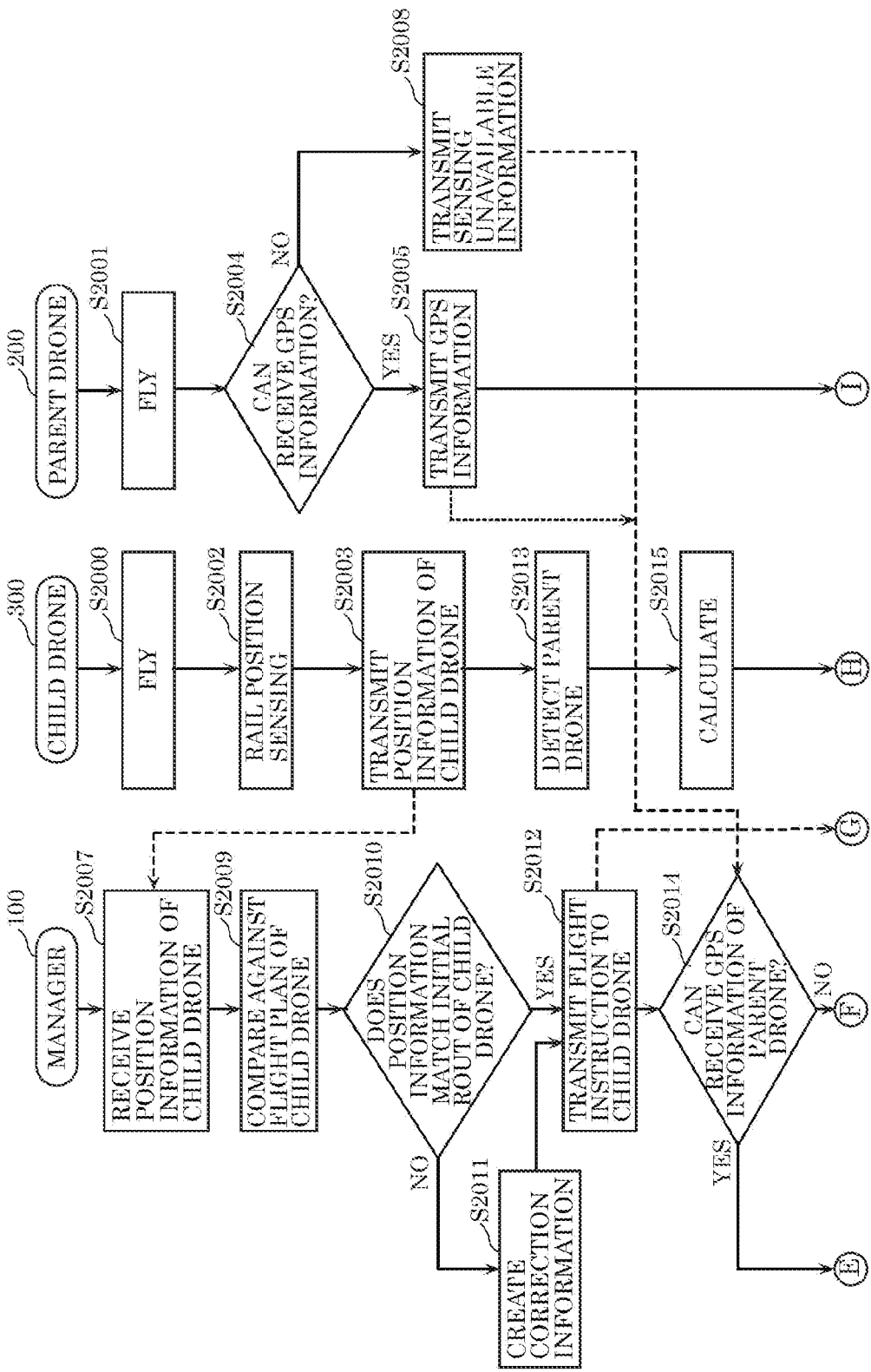
FIG. 25A is a flowchart illustrating control concerning how position information of a parent drone is acquired according to Embodiment 1.

FIGS. 25A and 25B provide a flowchart illustrating the control concerning how the position information of parent drone 200 is acquired according to Embodiment 1.

First, child drone 300 and parent drone 200 start flying in response to instructions from manager 100 (S2001, S2000). Then, child drone 300 reads the address of rail 400 in the vicinity of child drone 300 with the use of laser sensor 336 (S2002) and transmits the position information of child drone 300 calculated from the address of rail 400 to manager 100 (S2003). Manager 100 receives the position information of child drone 300 (S2007) and compares the received position information against the flight plan of child drone 300 created in advance (S2009). Manager 100 determines whether the position information matches the initially planned flying route (S2010). If the current position fails to match the initial flying route (NO in S2010), manager 100 creates correction information for correcting the flying route to the proper route (S2011) and transmits a flight instruction to child drone 300 (S2012).

If the current position matches the initial route (YES in S2010), manager 100 instructs child drone 300 to continue flying without creating the correction information (S2012).

Meanwhile, parent drone 200 determines whether parent drone 200 can receive a GPS signal while flying (S2004). If parent drone 200 can receive a signal and measure its own position information (YES in S2004), parent drone 200 transmits that position information to manager 100 (S2005). If parent drone 200 cannot receive a signal (NO in S2004), parent drone 200 creates information indicating that GPS sensing is unavailable and transmits that information to manager 100 (S2008). Child drone 300 detects the direction, the speed, the distance, and so on of parent drone 200 relative to child drone 300 with the use of tension sensor 333 for wire 600 coupling child drone 300 and parent drone 200 (S2013). Then, child drone 300 calculates the position and the speed information of parent drone 200 relative to child drone 300 based on the detected information (S2015). At this point, it suffices that child drone 300 can calculate the position and the speed information of the parent drone relative to child drone 300 with any type of sensor. Therefore, child drone 300 may measure the relative position and the speed information based on, for example but not limited to, the optical information of the parent drone obtained with the use of camera sensor 334, the strength and direction information of radio waves transmitted from the parent drone and obtained with the use of receiver 321, or an electric signal transmitted via wire 600.

After child drone 300 has calculated the position and the speed information of parent drone 200 relative to child drone 300, as illustrated in FIG. 25B, child drone 300 transmits the calculated position and the speed information to manager 100 (S2018). Manager 100 determines whether manager 100 can receive the GPS information of parent drone 200 (S2014). If manager 100 can receive the GPS information (YES in S2014), manager 100 receives the position and the speed information of parent drone 200 relative to child drone 300 from child drone 300 (S2006). Then, manager 100 calculates the difference between the received information and the position information of the parent drone obtained through the GPS (S2016) and transmits, to parent drone 200, information for correcting the measurement error of the GPS based on the difference (S2019).

If manager 100 cannot receive the GPS information of the parent drone (NO in S2014), manager 100 receives the relative position information of parent drone 200 from child drone 300 (S2017). Then, manager 100 calculates the absolute position information of the parent drone by comparing the received information against the map data (S2020) and compares the absolute position information against the initial flight plan of parent drone 200 (S2021).

Then, manager 100 determines whether the absolute position information matches the initial flight plan (S2022). If there is any error from the initial flight plan (NO in S2022), manager 100 creates information for correcting the flight plan to correct the error and transmits a flight instruction to parent drone 200 (S2025). If the absolute position information matches the initial flight plan (YES in S2022), manager 100 instructs parent drone 200 to continue flying without creating the correction information (S2025).

Parent drone 200 receives the flight instruction (S2027). Then, parent drone 200 corrects the flight plan in accordance with the instruction and continues with the flight (S2028).

Meanwhile, child drone 300 determines whether child drone 300 has received a flight instruction from manager 100 (S2023). If child drone 300 has received a flight instruction, child drone 300 determines whether the length, the direction, and so on of wire 600 for coupling child drone 300 and parent drone 200 need to be adjusted based on the received information (S2026). If the length, the direction, and so on of wire 600 need to be adjusted, child drone 300 adjusts wire 600 (S2029). Then, child drone 300 corrects the flight plan of child drone 300 and continues with the flight (S2030). If no adjustment needs to be made to the length, the direction, and so on of wire 600, child drone 300 makes no adjustment (NO in S2026). Then, child drone 300 corrects the flight plan as necessary and continues with the flight.

Figure 26:
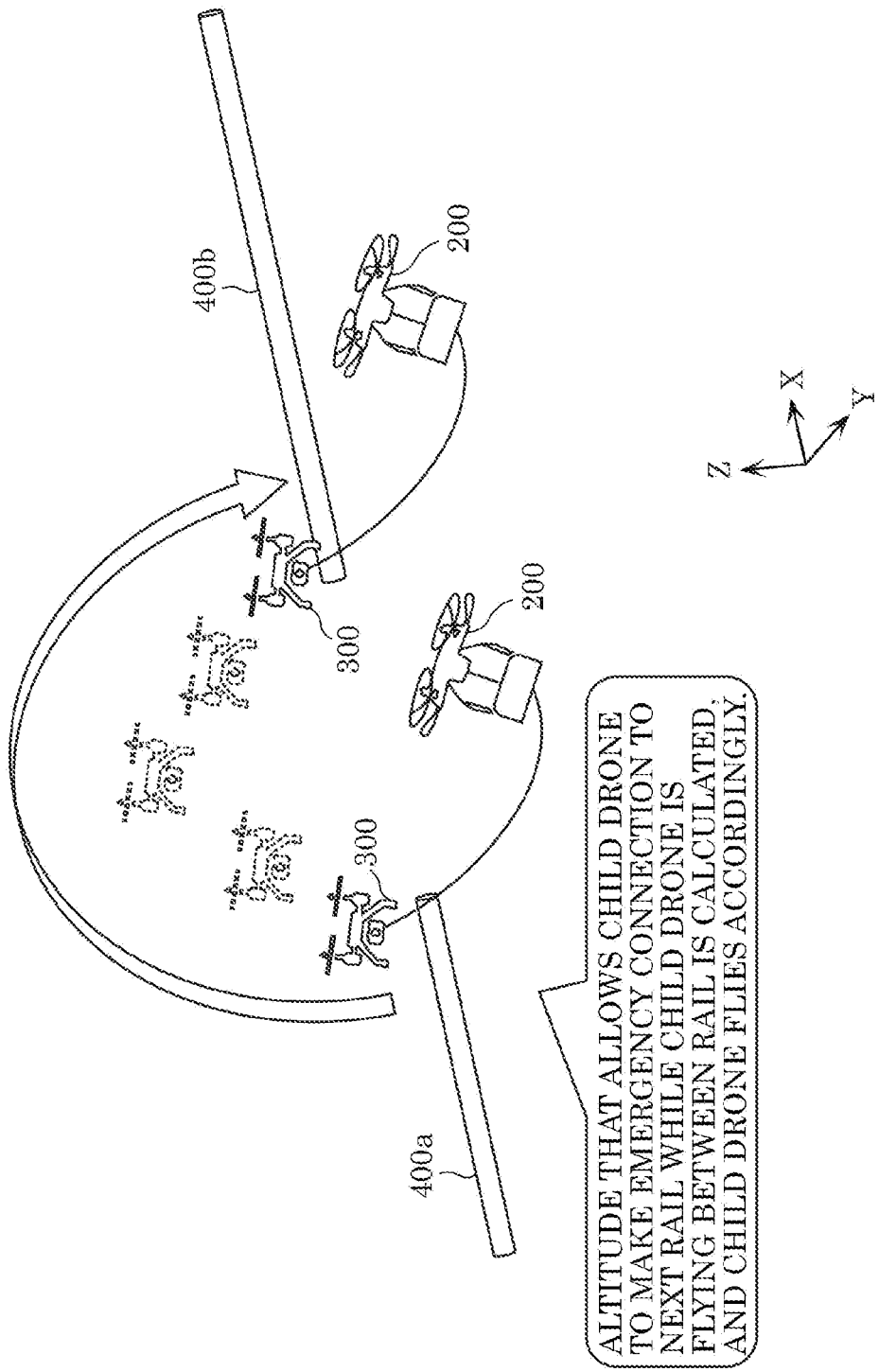
FIG. 26 is a schematic diagram illustrating flight control performed between rails according to Embodiment 1.

FIG. 26 is a schematic diagram illustrating flight control performed between rails according to Embodiment 1. While child drone 300 is flying along rail 400a, child drone 300 may reach the terminal end of rail 400a, and the leading end of rail 400b may be located ahead of the terminal end with a space provided between rail 400a and rail 400b. In that case, child drone 300 moves from the area surrounding rail 400a to the area surrounding rail 400b. At this point, child drone 300 may tentatively raise its altitude while moving from rail 400a to rail 400b. When child drone 300 moves from rail 400a to rail 400b, child drone 300 may fly at an altitude higher than the altitude of rail 400a and rail 400b. With this configuration, as long as child drone 300 is at a sufficiently high altitude while moving from rail 400a to rail 400b, even if an anomaly occurs while child drone 300 is flying, child drone 300 can reach rail 400b by falling from the point where the anomaly has occurred. The altitude and the course that, even if an anomaly occurs in flying child drone 300 while child drone 300 is moving from rail 400a to rail 400b, allow child drone 300 to reach rail 400b by falling from the point where the anomaly has occurred during the flight may be calculated, and child drone 300 may fly in accordance with the calculated altitude and course.

Figure 27:
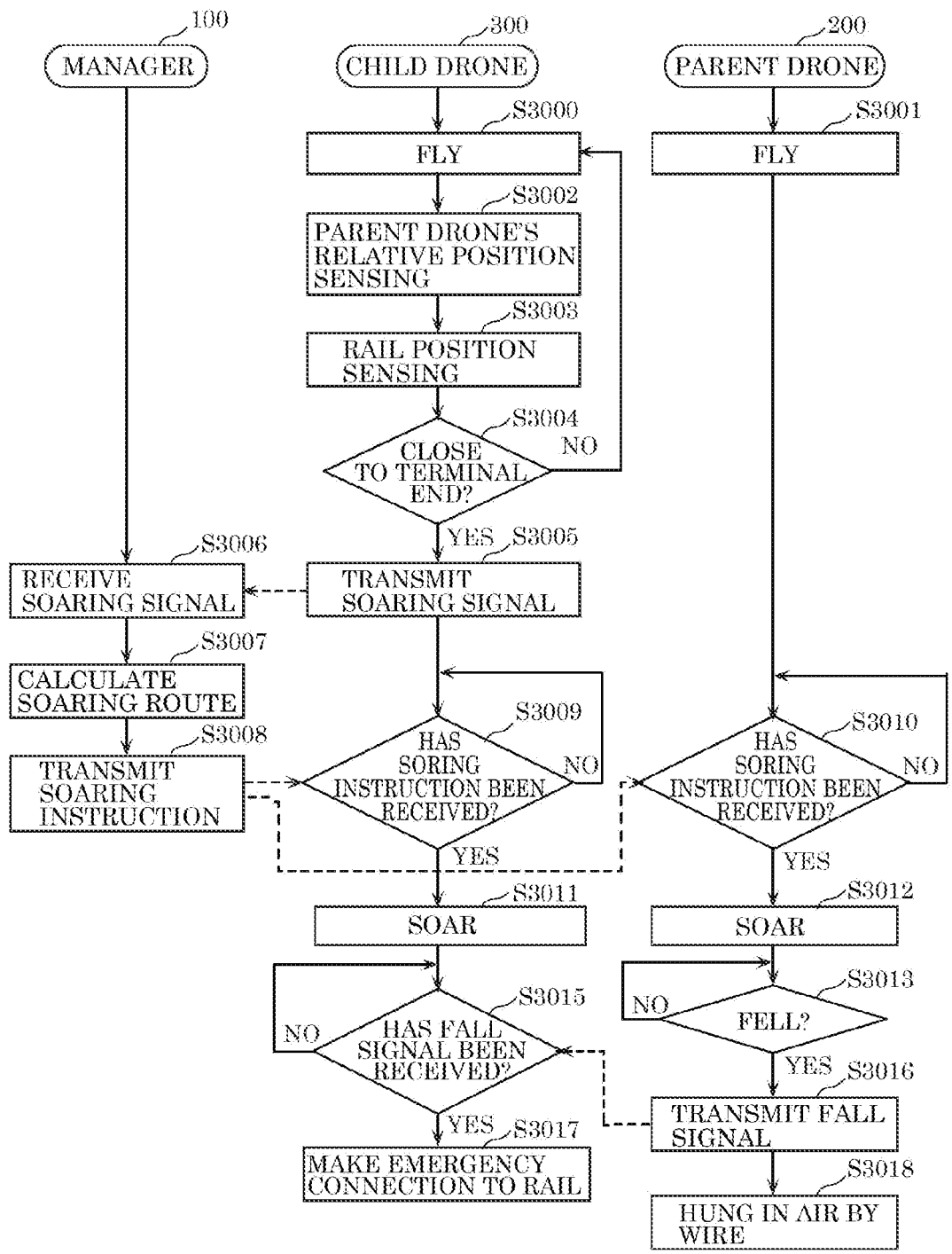
FIG. 27 is a flowchart illustrating flight control performed between rails according to Embodiment 1.

FIG. 27 is a flowchart illustrating the flight control performed between the rails according to Embodiment 1.

Child drone 300 starts flying (S3000). Parent drone 200 also starts flying (S3001). Next, child drone 300 detects the position of parent drone 200 relative to the child drone with the use of a sensor or the like (S3002). Then, child drone 300 detects the position of rail 400 with the use of a sensor or the like (S3003). Thereafter, child drone 300 determines whether child drone 300 is close to the terminal end of rail 400 (S3004). If the position where child drone 300 is located is not close to the terminal end of rail 400 (NO in S3004), child drone 300 continues with the flight (the flow returns to step S3000). If the position where child drone 300 is located is close to the terminal end of rail 400 (YES in S3004), child drone 300 transmits a soaring signal to manager 100

(S3005). Manager 100 receives the soaring signal transmitted from child drone 300 (S3006). Next, manager 100 calculates the flying route of each of child drone 300 and parent drone 200 (S3007). Manager 100 transmits a soaring instruction to each of child drone 300 and parent drone 200 (S3008). Child drone 300 determines whether child drone 300 has received the soaring instruction (S3009). If child drone 300 has failed to receive the soaring instruction (NO in S3009), the flow returns to step S3009. Parent drone 200 determines whether parent drone 200 has received the soaring instruction (S3010). If parent drone 200 has failed to receive the soaring instruction (NO in S3010), the flow returns to step S3010. If child drone 300 has received the soaring instruction (YES in S3009), child drone 300 soars (S3011). If parent drone 200 has received the soaring instruction (YES in S3010), parent drone 200 soars (S3012). Next, parent drone 200 determines whether parent drone 200 has fallen (S3013). If parent drone 200 has not fallen (NO in S3013), parent drone 200 returns to step S3013. If parent drone 200 has fallen (YES in S3013), parent drone 200 transmits a fall signal to child drone 300 (S3016). Thereafter, parent drone 200 becomes hung in the air from child drone 300 via wire 600 (S3018). Child drone 300 determines whether child drone 300 has received the fall signal from parent drone 200 (S3015). If child drone 300 has failed to receive the fall signal from parent drone 200 (NO in S3015), child drone 300 returns to step S3015. If child drone 300 has received the fall signal from parent drone 200 (YES in S3015), child drone 300 makes emergency coupling to rail 400 (S3017).

Child drone 300 may communicate with manager 100 and acquire rail information regarding rails 400 in a planned flying route. Then, child drone 300 may identify the position of child drone 300 by comparing the acquired rail information and the identification information of rails 400 acquired while flying.

Figure 28:
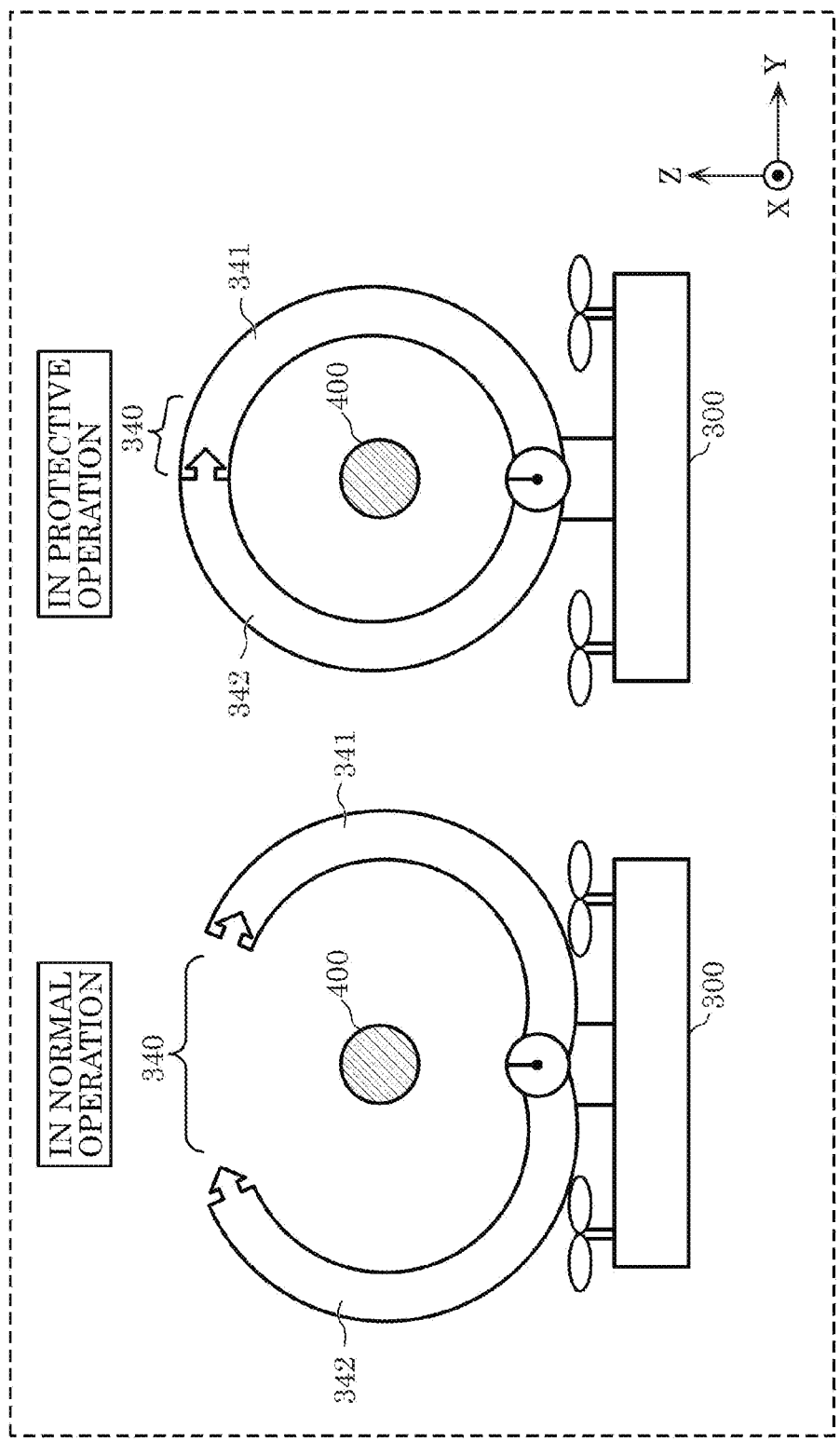
FIG. 28 schematically illustrates an example of opening and closing of an arm provided in a child drone according to Embodiment 1.

FIG. 28 schematically illustrates an example of opening and closing of arm 340 provided in child drone 300 according to Embodiment 1. Child drone 300 includes arm 340 that can be opened and closed. In a normal operation, child drone 300 flies forward along rail 400 with arm 340, which can be opened or closed, kept open. In this case, rail 400 may be located around the center portion of the space enclosed by open arm 340. When an anomaly has occurred in flying of parent drone 200, child drone 300 closes open arm 340 so as to enclose rail 400 with arm 340. At this point, child drone 300 couples itself to rail 400 by closing arm 340. Therefore, even in a case where an anomaly occurs in flying of parent drone 200, child drone 300 coupled to parent drone 200 can avoid entering an anomalous flying state or avoid crashing into the ground by coupling itself to rail 400.

Figure 29:
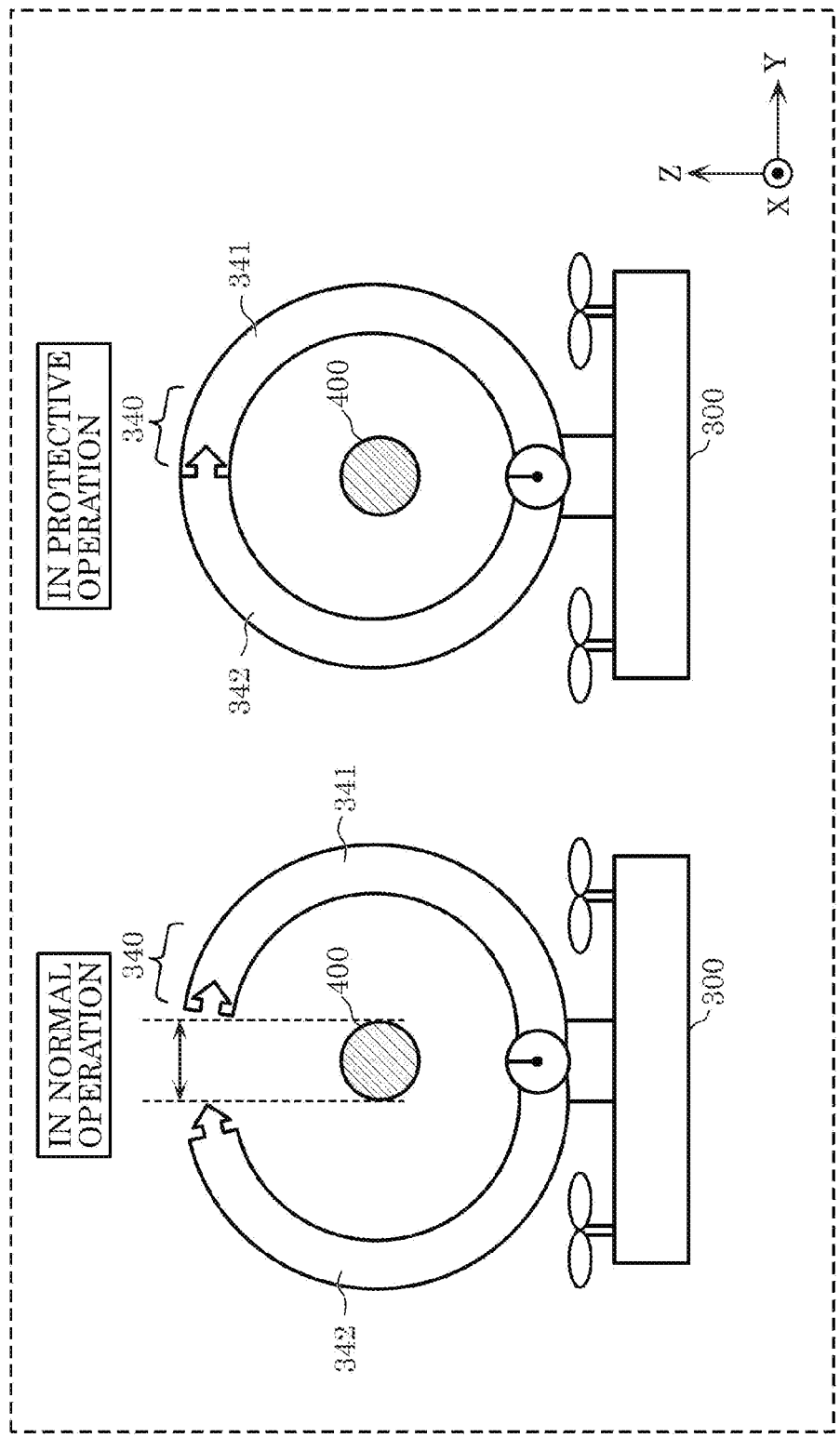
FIG. 29 schematically illustrates another example of opening and closing of an arm provided in a child drone according to Embodiment 1.

FIG. 29 schematically illustrates another example of opening and closing of arm 340 provided in child drone 300 according to Embodiment 1. Arm 340 of the child drone includes first arm 341 and second arm 342. As first arm 341 and second arm 342 become coupled to each other to form a ring, child drone 300 couples itself to rail 400. When arm 340 is open, the distance between the respective ends of first arm 341 and second arm 342 is greater than the diameter of rail 400. This configuration allows child drone 300 to become disengaged from rail 400. When arm 340 is closed, the distance between the respective ends of first arm 341 and second arm 342 is smaller than the diameter of rail 400. This configuration can keep child drone 300 coupled to rail 400 without allowing child drone 300 to become disengaged from rail 400.

Figure 30:
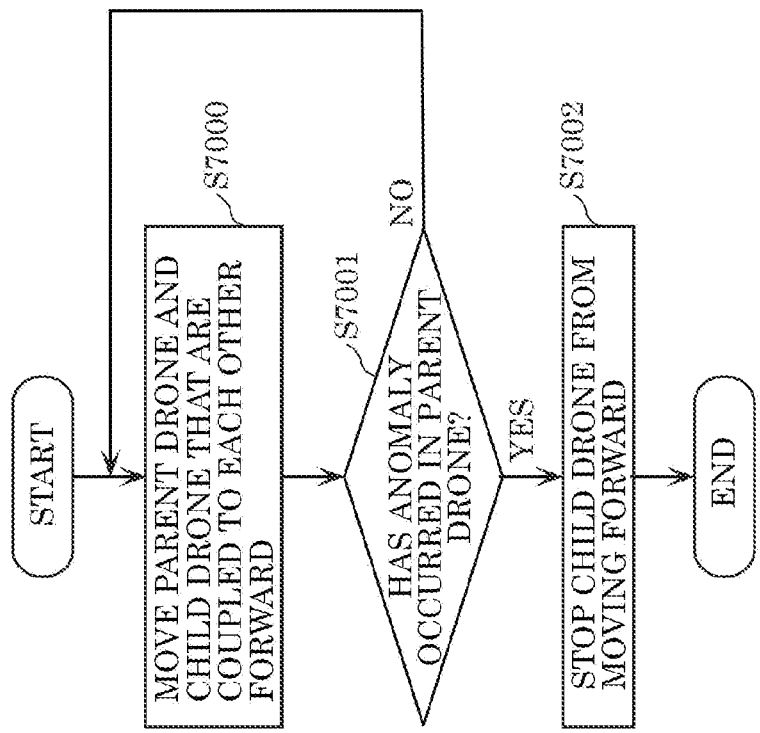
FIG. 30 is a flowchart illustrating a method of controlling an unmanned flying body according to one aspect of the present disclosure.

FIG. 30 is a flowchart illustrating a method of controlling an unmanned flying body according to one aspect of the present disclosure. First, parent drone 200 and child drone 300 that are coupled to each other are moved forward (S7000). Next, it is determined whether an anomaly has occurred in parent drone 200 (S7001). If an anomaly has occurred in the parent drone (YES in S7001), child drone 300 is stopped from moving forward (S7002). If no anomaly is occurring in the parent drone (NO in S7001), parent drone 200 and child drone 300 that are coupled to each other are allowed to move forward (the flow returns to step S7000).

Embodiment 2

In the following, a method of controlling a flying body and basic configurations of the flying body and of flying system 2a according to the present embodiment are identical to the basic configurations described in Embodiment 1 and so on. Therefore, the descriptions of the method of controlling a flying body and the basic configurations of the flying body and of flying system 2a according to the present embodiment will be omitted as appropriate, and mainly the differences from Embodiment 1 will be described.

Figure 31:
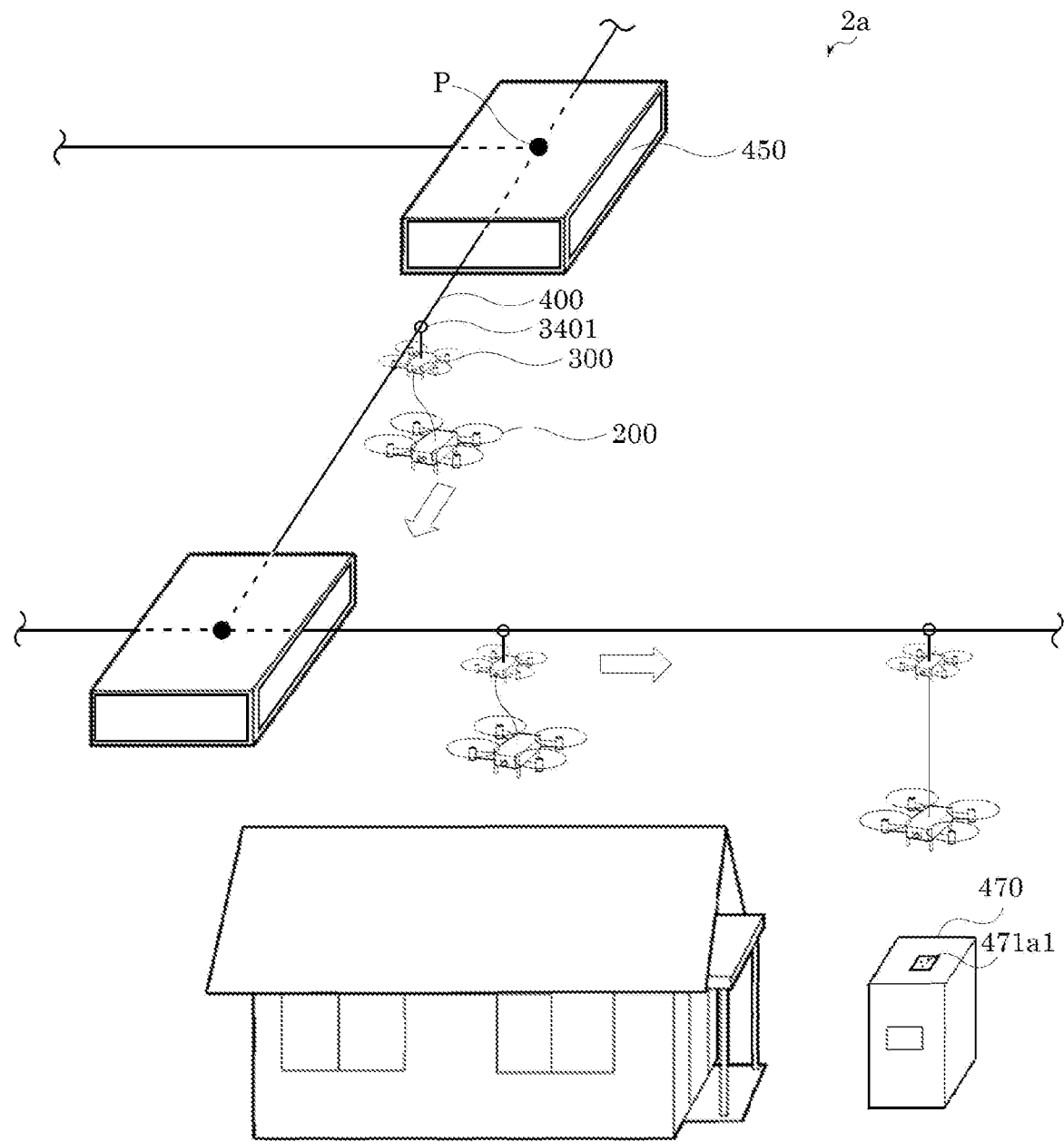
FIG. 31 is a schematic diagram illustrating a flying system according to Embodiment 2.
Figure 32:
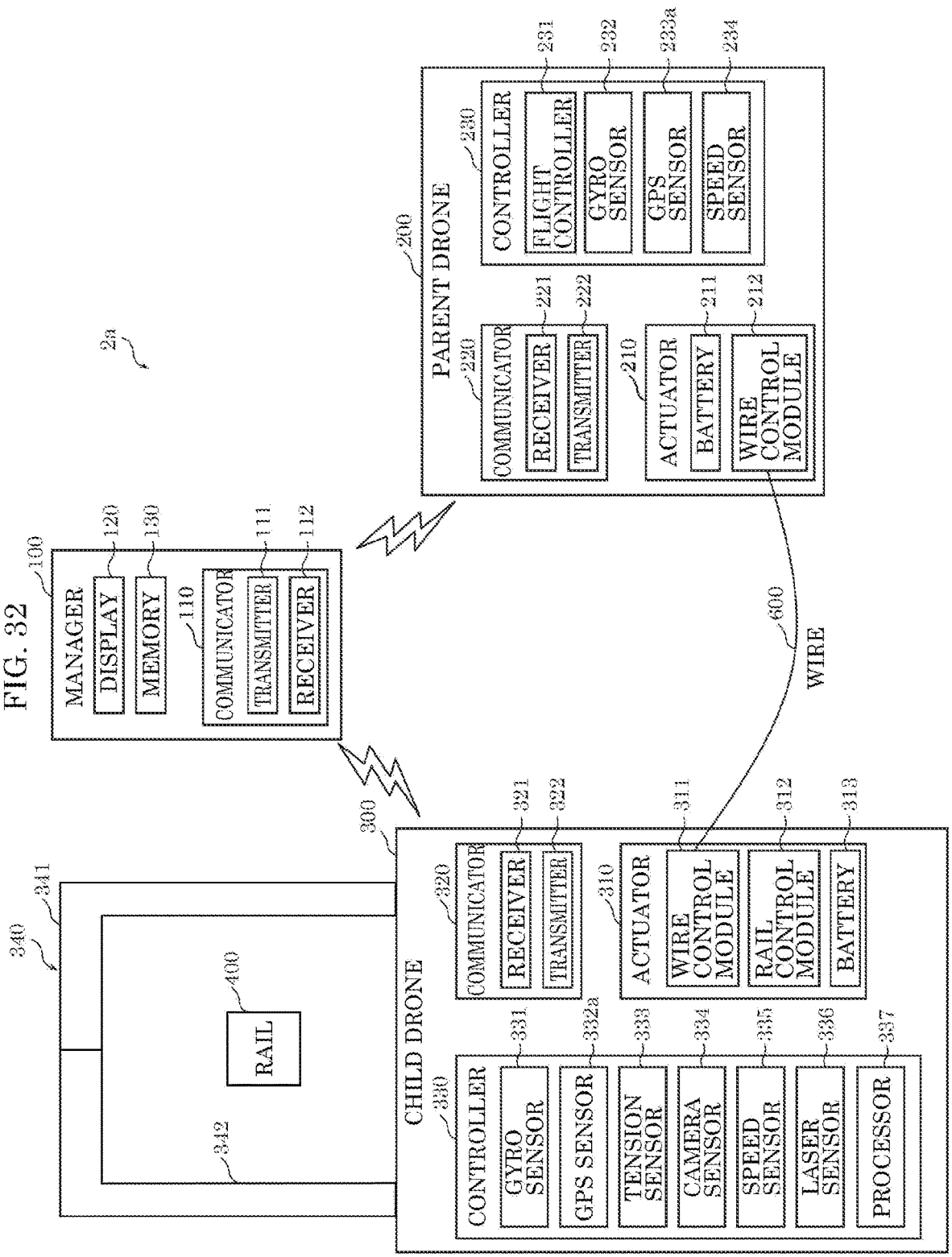
FIG. 32 is a block diagram illustrating a configuration of the flying system according to Embodiment 2.

FIG. 31 is a schematic diagram illustrating flying system 2a according to Embodiment 2. FIG. 32 is a block diagram illustrating a configuration of flying system 2a according to Embodiment 2.

As illustrated in FIGS. 31 and 32, flying system 2a according to the present embodiment is a system that can deliver a load from a sender to a receiver with the use of parent drone 200 and child drone 300. A sender is the one that sends out an item, and a receiver is the one that receives the item. Parent drone 200 and child drone 300 are each an example of a flying body. Parent drone 200 is an example of a second flying body, and child drone 300 is an example of a first flying body. A flying body is, for example, an unmanned aerial vehicle. A load as referred to herein is an example of a package.

Parent drone 200 and child drone 300 do not simply fly in the air but move along rails 400 stretched around above the ground. Parent drone 200 flies along rail 400 so as to follow child drone 300 while parent drone 200 is coupled to child drone 300 via wire 600. A load is loaded in parent drone 200.

Specifically, child drone 300 flies from a sender to a receiver along rail 400 while holding rail 400 with arm 340 having ring 3401. To be more specific, child drone 300 flies from a sender to a receiver with ring 3401 of arm 340 being coupled to rail 400 (hereinafter, this state may be said that arm 340 is coupled to rail 400). In this example, that child drone 300 moves along rail 400 does not necessarily mean that arm 340 of child drone 300 slides directly on rail 400. If arm 340 slides directly on rail 400, arm 340 and rail 400 may be worn. Therefore, child drone 300 may fly with its arm 340 making no contact with rail 400.

When child drone 300 is nearing a receiver, processor 337 of controller 330 of child drone 300 compares a first position indicated in image information captured by camera sensor 334 and a second position indicated in position information acquired from GPS sensor 332a. Camera sensor 334 is an example of an image sensor. If the first position and the second position do not match, processor 337 controls the flying of child drone 300 so as to make the second position match the first position (i.e., processor 337 controls the rotation of the propellers). Specifically, when child drone 300 has neared a space above the receiver, camera sensor 334 captures an image of coded medium 471a1 placed on an upper surface of delivery box 470. Coded medium 471a1 includes the first position indicating the position of delivery box 470. As camera sensor 334 reads coded medium 471a1, processor 337 controls the flying of child drone 300 so as to make the second position match the first position. In this example, coded medium 471a1 is, for example, a two-dimensional barcode but may also be any mark that camera sensor 334 can recognize. GPS sensor 332a is an example of a sensor. Camera sensor 334 may be an example of a sensor. Delivery box 470 is an example of a storage base.

In this manner, child drone 300 arrives at a space above the receiver.

It suffices that at least one of parent drone 200 or child drone 300 include camera sensor 334. In the present embodiment, child drone 300 includes camera sensor 334.

The position of delivery box 470 relative to child drone 300 may be measured with the use of camera sensor 334 instead of GPS sensor 332a. The position of child drone 300 may be measured based on an image of its surroundings acquired by an image sensor.

Upon child drone 300 arriving at a space above the receiver, processor 337 controls actuator 310 so as to hold rail 400 with arm 340. Thus, child drone 300 is anchored to rail 400 at a predetermined position. If an electromagnet is provided in arm 340, for example, arm 340 may be anchored to rail 400 as processor 337 causes actuator 310 to make a current flow in a coil of the electromagnet. Since arm 340 is anchored to rail 400 upon child drone 300 arriving at the space above the receiver in the above manner, any positional shift resulting from an influence of the ground effect can be suppressed. In the present embodiment, the space above the receiver is a space above delivery box 470.

Once child drone 300 arrives at the space above the receiver and is anchored to rail 400, processor 337 transmits a descending instruction to parent drone 200 via communicator 320 so as to make parent drone 200 prepare for a descending movement.

In response to receiving the descending instruction from child drone 300, parent drone 200 descends toward delivery box 470 installed at a destination point. Specifically, controller 230 of parent drone 200 causes actuator 210 to control the rotation of the propellers so as to move parent drone 200 to a point directly under child drone 300. Controller 230 of parent drone 200 determines whether parent drone 200 has moved to a point directly under child drone 300.

If parent drone 200 has moved to a point under child drone 300, controller 230 of parent drone 200 causes actuator 210 to stop the propellers. Controller 230 of parent drone 200 controls wire control module 212 of actuator 210 so as to start letting out wire 600. This operation causes parent drone 200 to descend from child drone 300. In this manner, parent drone 200 enters delivery box 470 through its opening and lands on delivery box 470 serving as the destination point. In this example, the destination point is a point on which parent drone 200 is to land.

Parent drone 200 may include a range finding sensor, an atmospheric pressure sensor, and so on. Then, parent drone 200 can appropriately land on delivery box 470 by inspecting the environment surrounding delivery box 470 with the use of the range finding sensor, the atmospheric pressure sensor, and so on while parent drone 200 is descending.

Rail 400 is stretched at a position that is several meters to several tens of meters above the ground surface, for example. Rail 400 is fixed to support pillars, facilities, and so on installed on the ground. Rail 400 does not need to be stretched around in the entire region above the ground, and it suffices that rail 400 be stretched around at least in the vicinity of a receiver. Rail 400 is stretched along roads, for example.

Rail 400 includes connection point P. Connection point P is where one rail is connected to another rail. Placing structure 450 is disposed directly under connection point P.

Placing structure 450 allows child drone 300 to be placed therein at least between the ground surface directly under connection point P and connection point P. Placing structure 450 may be disposed directly on the ground or may be connected to rail 400. In a case where placing structure 450 is disposed directly on the ground, placing structure 450 may be a placing stage, for example. In a case where placing structure 450 is connected to rail 400, placing structure 450 may be a box-like structure having an opening lying in a plane orthogonal to rail 400. The opening may have a size that allows parent drone 200 and child drone 300 to pass therethrough. Placing structure 450 may be a net-like structure having a cushioning effect, for example.

Delivery box 470 is disposed at a destination point of a receiver. Delivery box 470 may have any configuration. Delivery box 470 according to the present embodiment includes a housing space and an opening that at least allows parent drone 200 to pass therethrough to enter delivery box 470.

In the present embodiment, coded medium 471a1 is provided on delivery box 470 at a position where the child drone can detect coded medium 471 from the above with the camera sensor.

In the present embodiment, delivery box 470 is disposed directly under rail 400. Alternatively, delivery box 470 may be disposed at a position that is spaced apart from a point directly under rail 400. It suffices that delivery box 470 be disposed within a range where parent drone 200 can enter the housing space inside delivery box 470 while child drone 300 is holding rail 400.

[Operation]

Now, a method of controlling a flying body and operations of the flying body and of flying system 2a according to the present embodiment will be described.

Figure 33:
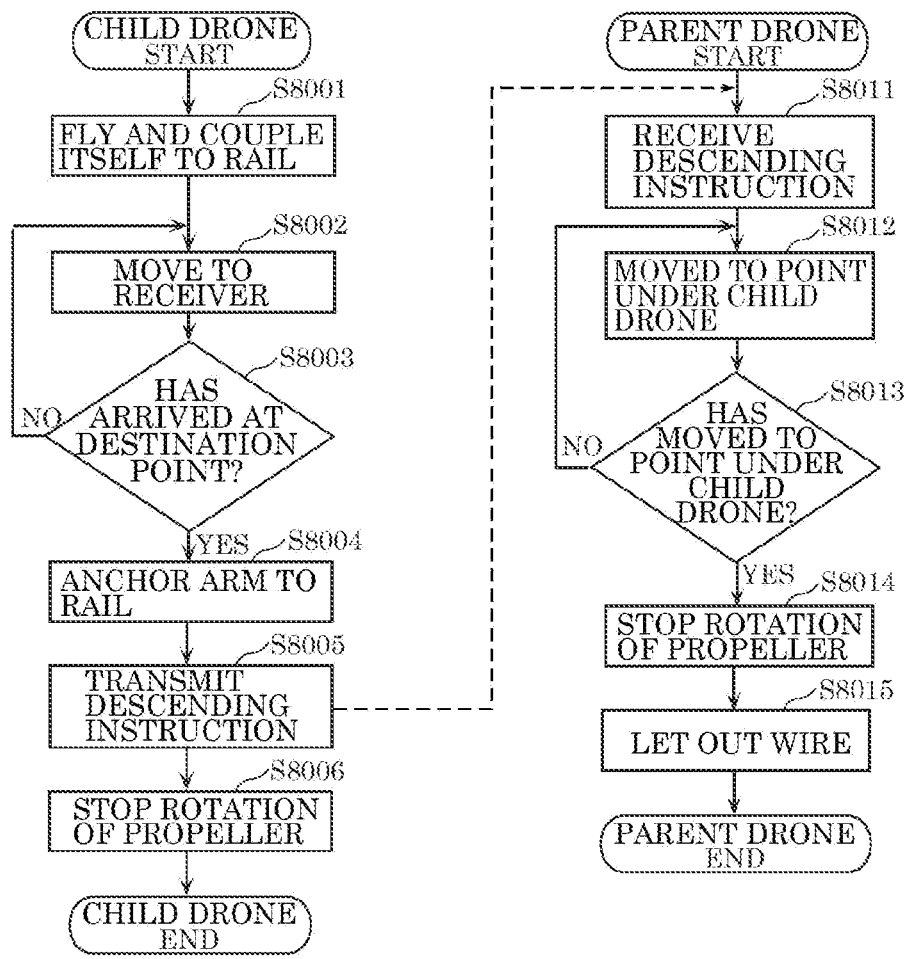
FIG. 33 is a flowchart illustrating an example of how a flying system operates along a route from a sender to a destination point of a receiver according to Embodiment 2.

FIG. 33 is a flowchart illustrating an example of how flying system 2a operates along a route from a sender to a destination point of a receiver according to Embodiment 2.

As illustrated in FIG. 33, first, manager 100 selects a flying route from a sender to a receiver based on map data. Manager 100 transmits the selected flying route to child drone 300. Then, after a load is loaded into parent drone 200 at the sender, child drone 300 starts flying in accordance with the user's operation. For example, child drone 300 detects the position of rail 400 with sensors 901, 902, 903, and 904 illustrated in FIG. 22 and so on. Arm 340 becomes coupled to rail 400 by actuating first arm 341 and second arm 342 so as to hold rail 400 (S8001).

This allows parent drone 200 and child drone 300 to move along rail 400 (S8002).

Parent drone 200 and child drone 300 continually transmit the position information (e.g., the geographical spatial information such as the latitude and longitude information described above) indicating their current positions detected by respective GPS sensors 233a and 332a to manager 100 at a predetermined interval. In this case, manager 100 successively receives the position information of each of parent drone 200 and child drone 300 and can thus immediately acquire the current position of each of parent drone 200 and child drone 300.

Next, processor 337 of child drone 300 determines whether child drone 300 has arrived at a space above the receiver (S8003). Processor 337 compares the current position obtained from GPS sensor 332a and the position of the space above the receiver acquired from the manager and determines whether these two positions match. If the current position matches the destination point, processor 337 determines that child drone 300 has arrived at the space above the receiver and controls actuator 310 so as to hold rail 400 with arm 340. In this manner, child drone 300 becomes anchored to rail 400 (S8004).

Next, processor 337 transmits a descending instruction to parent drone 200 via communicator 320 (S8005). Processor 337 stops the propellers (S8006). This operation causes child drone 300 to be hung in the air by the arm that is coupled to rail 400. In this example, upon arriving at the space above the receiver, child drone 300 may hover with its arm being coupled to rail 400 without holding rail 400 with arm 340.

Next, in response to receiving the descending instruction (S8011), parent drone 200 starts preparing to land in accordance with the descending instruction. Specifically, controller 230 of parent drone 200 causes actuator 210 to control the rotation of the propellers so as to move parent drone 200 to a point directly under child drone 300 (S8012).

Controller 230 of parent drone 200 determines whether parent drone 200 has moved to a point directly under child drone 300 (S8013). For example, controller 230 may make the determination based on whether the position information obtained by GPS sensor 233a of parent drone 200 matches the position information obtained by GPS sensor 332a of child drone 300. Alternatively, child drone 300 may make the determination based on a signal or the like detected by camera sensor 334 or the like.

Next, if parent drone 200 has moved to a point under child drone 300 (YES in S8013), controller 230 of parent drone 200 causes actuator 210 to stop the propellers from rotating (S8014). If parent drone 200 has not moved to a point under child drone 300 (NO in S8013), controller 230 of parent drone 200 returns the process to S8012.

Controller 230 of parent drone 200 controls wire control module 212 of actuator 210 so as to start letting out wire 600 (S8015). This operation causes parent drone 200 to descend from child drone 300. In this manner, parent drone 200 enters delivery box 470 through its opening and lands on delivery box 470 serving as the destination point.

Once parent drone 200 lands on delivery box 470, controller 230 of parent drone 200 controls wire control module 212 so as to stop letting out wire 600. Parent drone 200 unloads the load. Specifically, controller 230 of parent drone 200 controls actuator 210 so as to unload the load from parent drone 200. In this manner, the load is stored into the housing space inside delivery box 470.

Once parent drone 200 unloads the load, parent drone 200 leaves from delivery box 470 through the opening. Specifically, controller 230 of parent drone 200 controls wire control module 212 of actuator 210 so as to start taking up wire 600. Then, upon the length of wire 600 reaching a predetermined length, the propellers of parent drone 200 and child drone 300 start rotating, and this makes parent drone 200 and child drone 300 ready to fly. Processor 337 controls actuator 310 so as to disengage arm 340 of child drone 300 from rail 400. Then, parent drone 200 and child drone 300 return to the sender along the flying route that parent drone 200 and child drone 300 took to reach the receiver from the sender. If there is a next receiver, another load is delivered to the next receiver through the process similar to the process described above.

Advantageous Effects

Now, some advantageous effects of the method of controlling a flying body and the flying system according to the present embodiment will be described.

As described above, the method of controlling a flying body according to the present embodiment is a method of controlling a flying body by controlling a first flying body and a second flying body coupled to the first flying body via a coupling line. The first flying body includes an arm having a ring through which a fixed rail is to pass and a sensor that measures the position of the first flying body. The first flying body measures the position of the first flying body with the use of the sensor and determines whether the position matches a first predetermined position (an example of a receiver). If the position matches the first predetermined position, the first flying body is made to stop flying, the ring is coupled to the rail, and the length of the coupling line is increased. Thus, the second flying body is made to land at a second predetermined position (an example of a destination point).

For example, in an existing method of controlling a flying body, when a flying body lands, due to an influence of the wind called the ground effect, the flying body may erroneously land at a position that is radially about one meter off from the destination point serving as a second predetermined position. When the flying body lands, the flying body may become off balance and crash into the ground, or the flying body may collide with an object and cause an accident. Therefore, needs exist for a method of moving a flying body safely from a sender to a receiver.

According the foregoing method of controlling a flying body, the first flying body moves while being coupled to the rail. Therefore, even if the ground effect occurs, the first flying body can move safely to the first predetermined position along the rail. The second flying body is coupled to the first flying body via the coupling line. This keeps the second flying body from being separated far away from the first flying body. When the first flying body arrives at the receiver, the first flying body is in contact with the rail, and thus the first flying body and the second flying body are less likely to be moved away from the destination point even if the ground effect occurs. This allows the second flying body to deliver a package to the destination point with ease in accordance with an instruction.

Therefore, according to this flying system, the second flying body can deliver a package to a destination point.

The flying system according to the present embodiment is a flying system that delivers a package from a sender to a receiver. The flying system includes a first flying body that moves while being coupled to a rail fixed at a position spaced apart from the ground surface and a second flying body that is coupled to the first flying body via a coupling line. The first flying body includes an arm having a ring through which the fixed rail is to pass, a controller that determines whether the first flying body has arrived at the receiver, and a communicator that transmits, to the second flying body, a delivery instruction for delivering the package to a destination point of the receiver. When the first flying body has arrived at the receiver, the controller transmits the delivery instruction for delivering the package to the destination point of the receiver to the second flying body via the communicator with the ring being coupled to the rail.

In the method of controlling a flying body according to the present embodiment, the second flying body is stopped from flying after the first flying body has been stopped from flying.

This configuration allows the second flying body to move so as to follow the first flying body.

In the method of controlling a flying body according to the present embodiment, the sensor is an image sensor, and the position of the first flying body is measured from an image of the surroundings of the first flying body acquired with the use of the image sensor.

This configuration makes it possible to grasp the position of the first flying body accurately based on the image of the surroundings of the first flying body. Capturing an image of the second predetermined position with the image sensor makes it possible to grasp the second predetermined position accurately.

In the method of controlling a flying body according to the present embodiment, the sensor is a GPS sensor, and the position of the first flying body is measured with the use of the GPS sensor.

This configuration makes it possible to grasp the position of the first flying body accurately.

In the method of controlling a flying body according to the present embodiment, the second predetermined position is a position where a storage base that is to store the second flying body is installed.

This configuration makes it possible to grasp the position of the first flying body accurately.

In the method of controlling a flying body according to the present embodiment, the second flying body stores the package held by the second flying body into the storage base after landing on the storage base.

This configuration allows the second flying body to store the package at the destination point reliably.

The flying system according to the present embodiment further includes one rail fixed at a position spaced apart from the ground surface and another rail different from the one rail. The one rail is connected to the other rail at connection point P.

This configuration makes it possible to produce a plurality of flying routes along which the first flying body and the second flying body fly.

The flying system according to the present embodiment further includes a placing structure disposed at least between the ground surface directly under a connection point connecting one rail and another rail and the connection point, and the first flying body can be placed on the placing structure.

With this configuration, even if the first flying body falls off a rail unexpectedly when the first flying body coupled to one rail is to be coupled to another rail at the connection point, for example, the placing structure can receive the first flying body. This configuration can therefore keep at least the first flying body from being damaged.

In the flying system according to the present embodiment, a coded medium indicating the destination point on which the second flying body is to land is provided at the destination point of the receiver. At least one of the first flying body or the second flying body further includes a camera sensor. The second flying body lands on the destination point based on image information obtained by the camera sensor capturing the medium.

This configuration allows the first flying body and the second flying body that have arrived at the receiver to recognize the location for storing the package with ease based on the image information. This makes it easier for the second flying body to land on the destination point accurately.

The flying system according to the present embodiment further includes a GPS sensor that acquires position information of the first flying body. The controller compares a first position indicated in the image information and a second position indicated by the position information acquired from the GPS sensor. If the first position and the second position do not match, flying of the first flying body is controlled so that the first position and the second position match.

This configuration makes it possible to correct any positional mismatch of the second flying body by reading the image information even if the second flying body is shifted away from a point vertically above the destination point.

This allows the second flying body to land on the destination point more accurately.

The flying system according to the present embodiment further includes an actuator that actuates and controls the arm so as to hold the rail with the arm when the first flying body has arrived at the receiver.

This configuration allows the arm to be anchored to the rail when the first flying body has arrived at the receiver. This in turn can reduce any positional mismatch of the first flying body and the second flying body that could be caused by the ground effect.

Embodiment 3

In the following, a method of controlling a flying body and a basic configuration of the flying body according to the present embodiment are identical to the basic configurations described in Embodiment 1 and so on. Therefore, the descriptions of the method of controlling a flying body and the basic configuration of the flying body according to the present embodiment will be omitted as appropriate. In the present embodiment, no parent drone such as the one described in Embodiment 1 above is present.

Figure 34A:
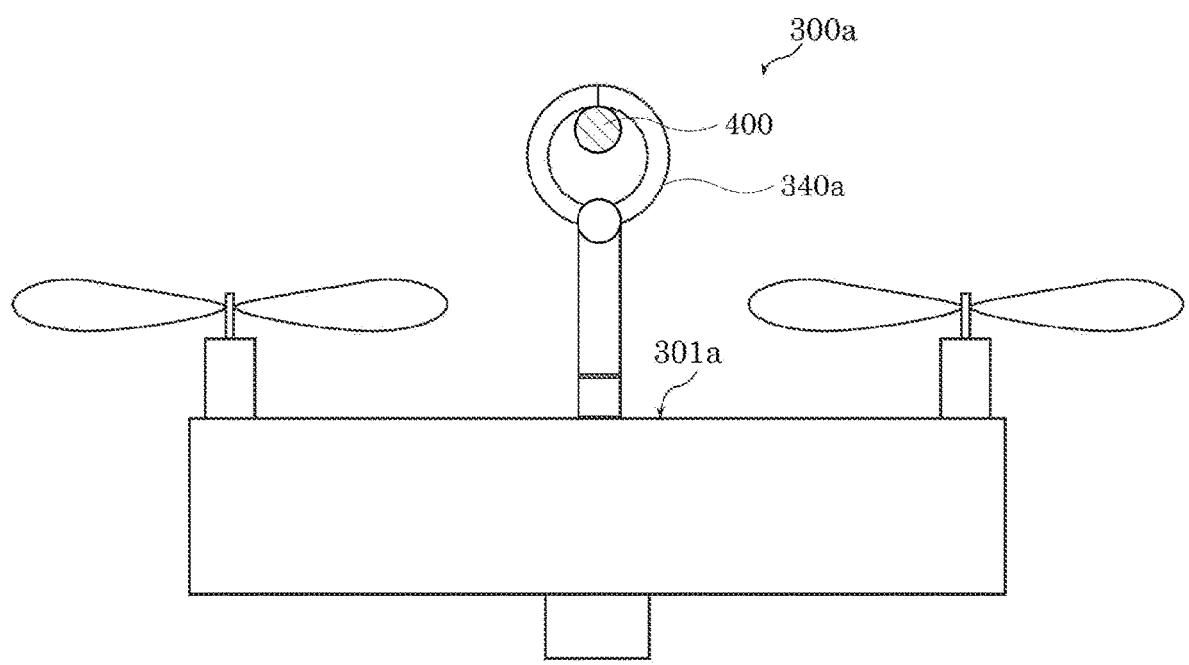
FIG. 34A is a schematic diagram illustrating a state in which an arm of a child drone is anchored to a rail according to Embodiment 3.
Figure 34B:
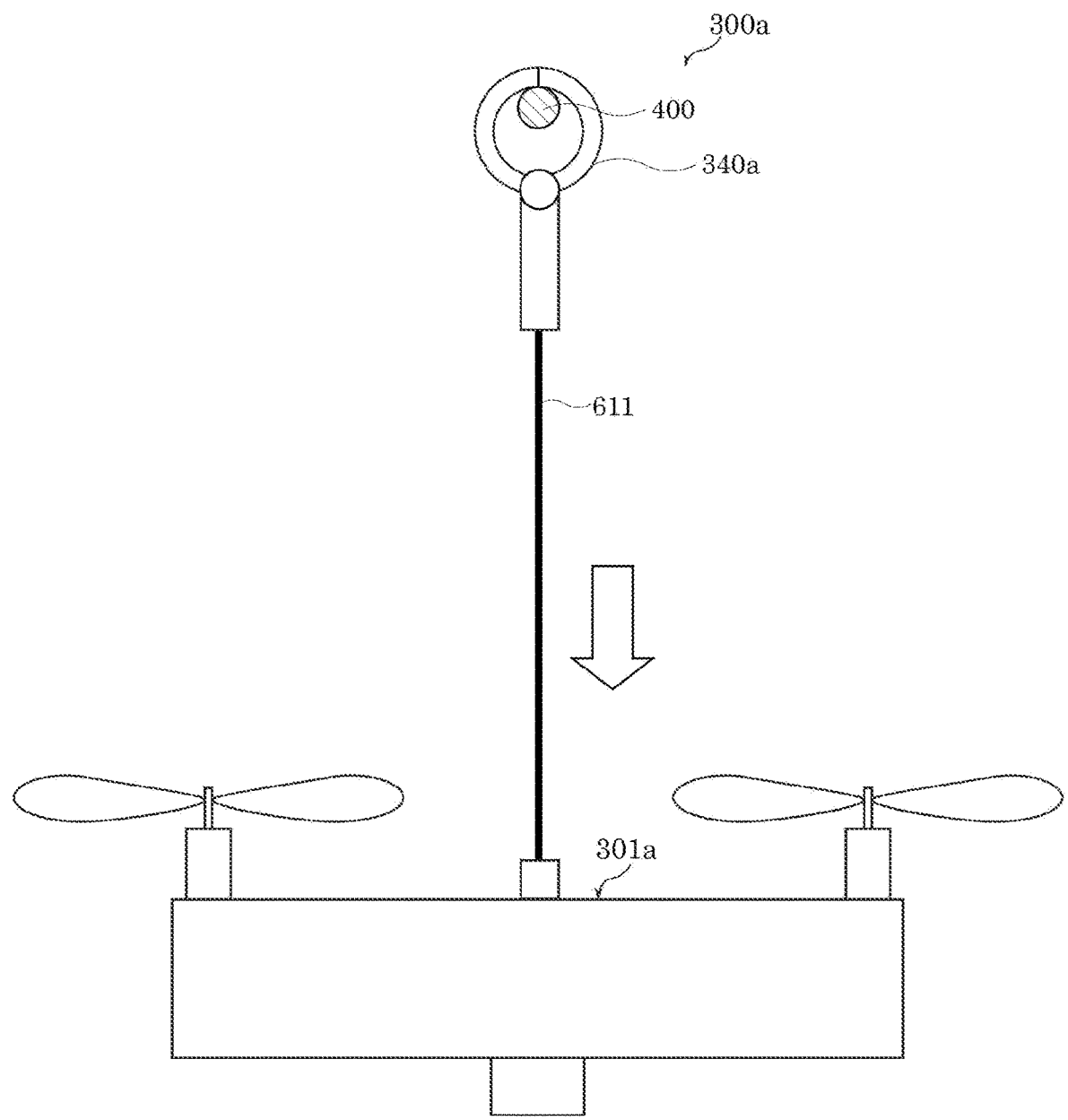
FIG. 34B is a schematic diagram illustrating an example of how a child drone descends while its arm is anchored to a rail according to Embodiment 3.

FIG. 34A is a schematic diagram of child drone 300a according to Embodiment 3. FIG. 34B is a schematic diagram illustrating an example of how child drone 300a descends with its arm 340a being anchored to rail 400 according to Embodiment 3.

As illustrated in FIGS. 34A and 34B, child drone 300a further includes wire 611 that couples arm 340a and child drone main body 301a. Arm 340a is connected to child drone main body 301a via wire 611 and can be moved away from child drone main body 301a.

A wire control module takes up wire 611 or lets out wire 611, for example.

With flying system 2a according to the present embodiment, upon child drone 300a arriving at a receiver, processor 337 controls actuator 310 so as to hold rail 400 with arm 340a and to anchor arm 340a to rail 400. Processor 337 controls the wire control module so as to let out wire 611. In this manner, as illustrated in FIG. 34B, child drone main body 301a descends from rail 400 and lands in a housing space inside a delivery box. This configuration allows child drone 300a to store a load into the delivery box.

Embodiment 4

In the following, a method of controlling a flying body and basic configurations of the flying body and of flying system 2b according to the present embodiment are identical to the basic configurations described in Embodiment 1 and so on. Therefore, the descriptions of the method of controlling the flying body and the basic configurations of the flying body and of flying system 2b according to the present embodiment will be omitted as appropriate, and mainly the differences from Embodiment 1 will be described.

Figure 35:
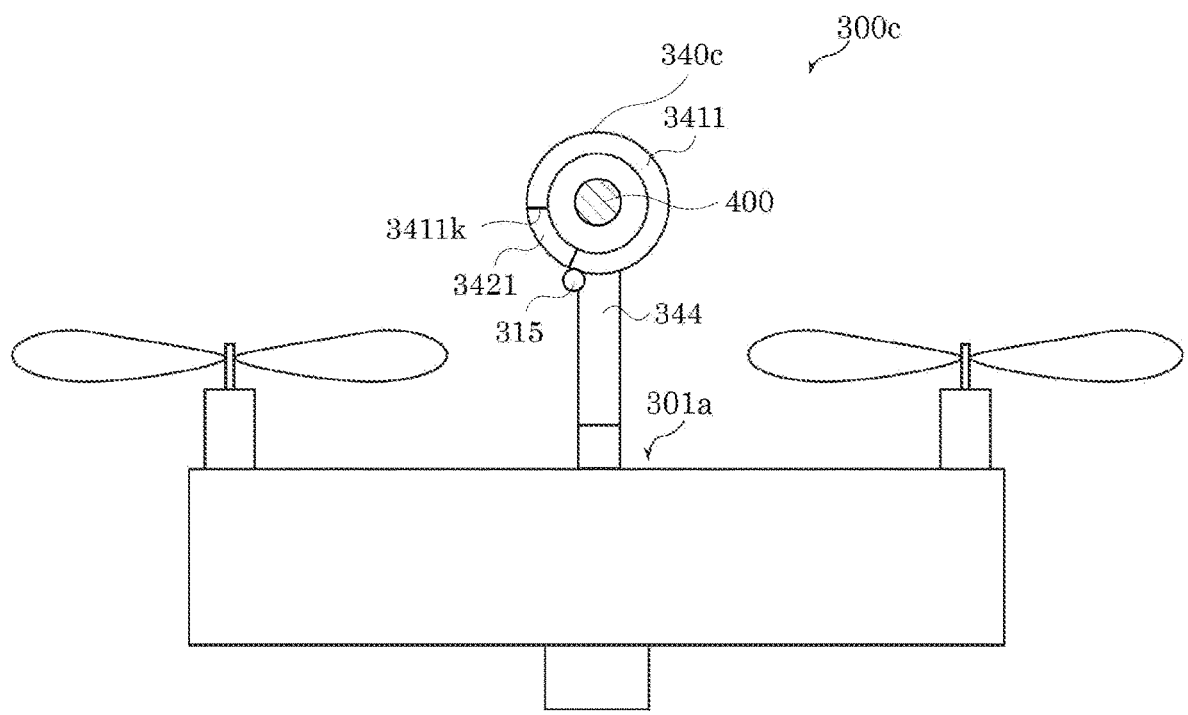
FIG. 35 is a schematic diagram illustrating an example of a child drone of a flying system according to Embodiment 4.
Figure 36:
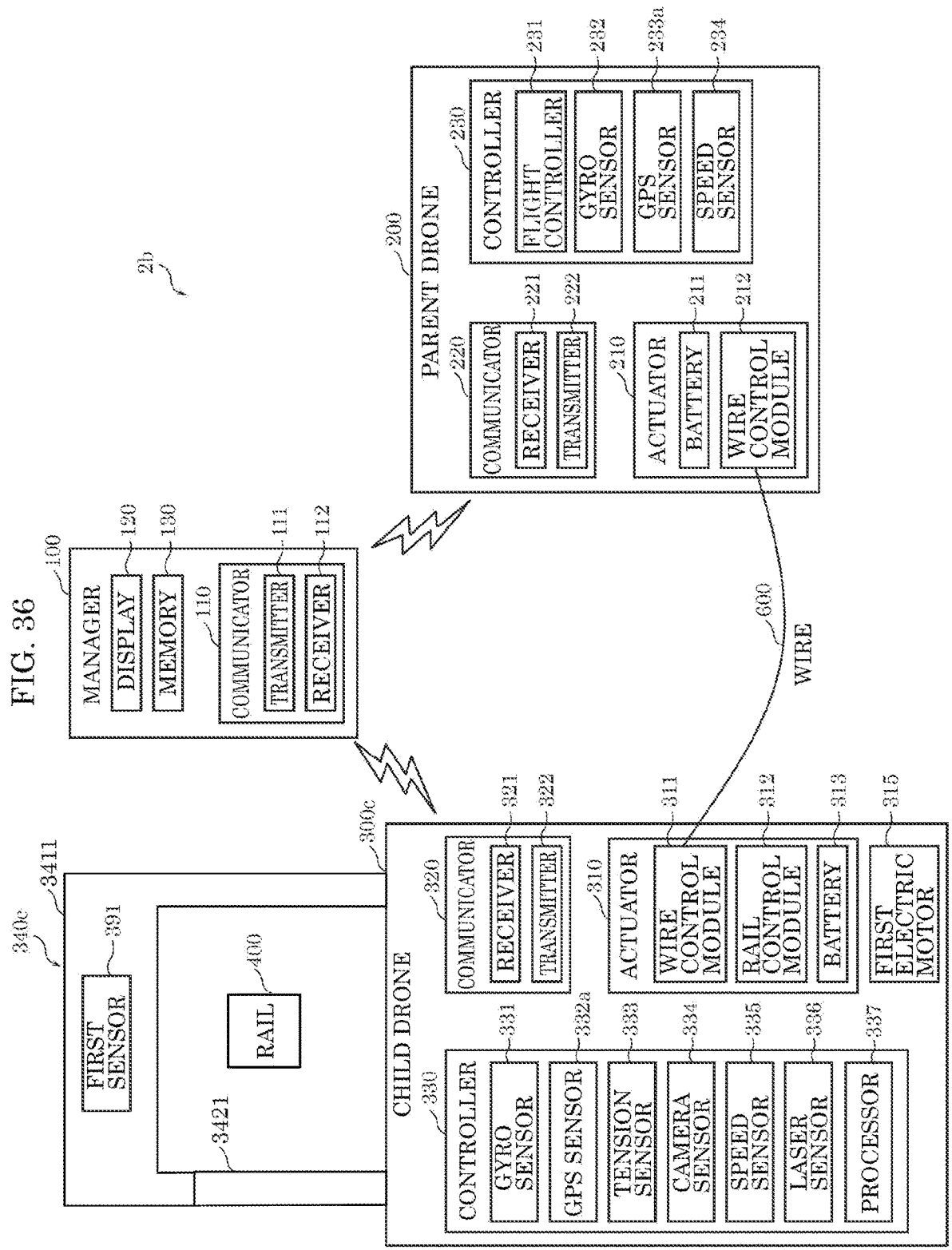
FIG. 36 is a block diagram illustrating a configuration of the flying system according to Embodiment 4.
Figure 37:
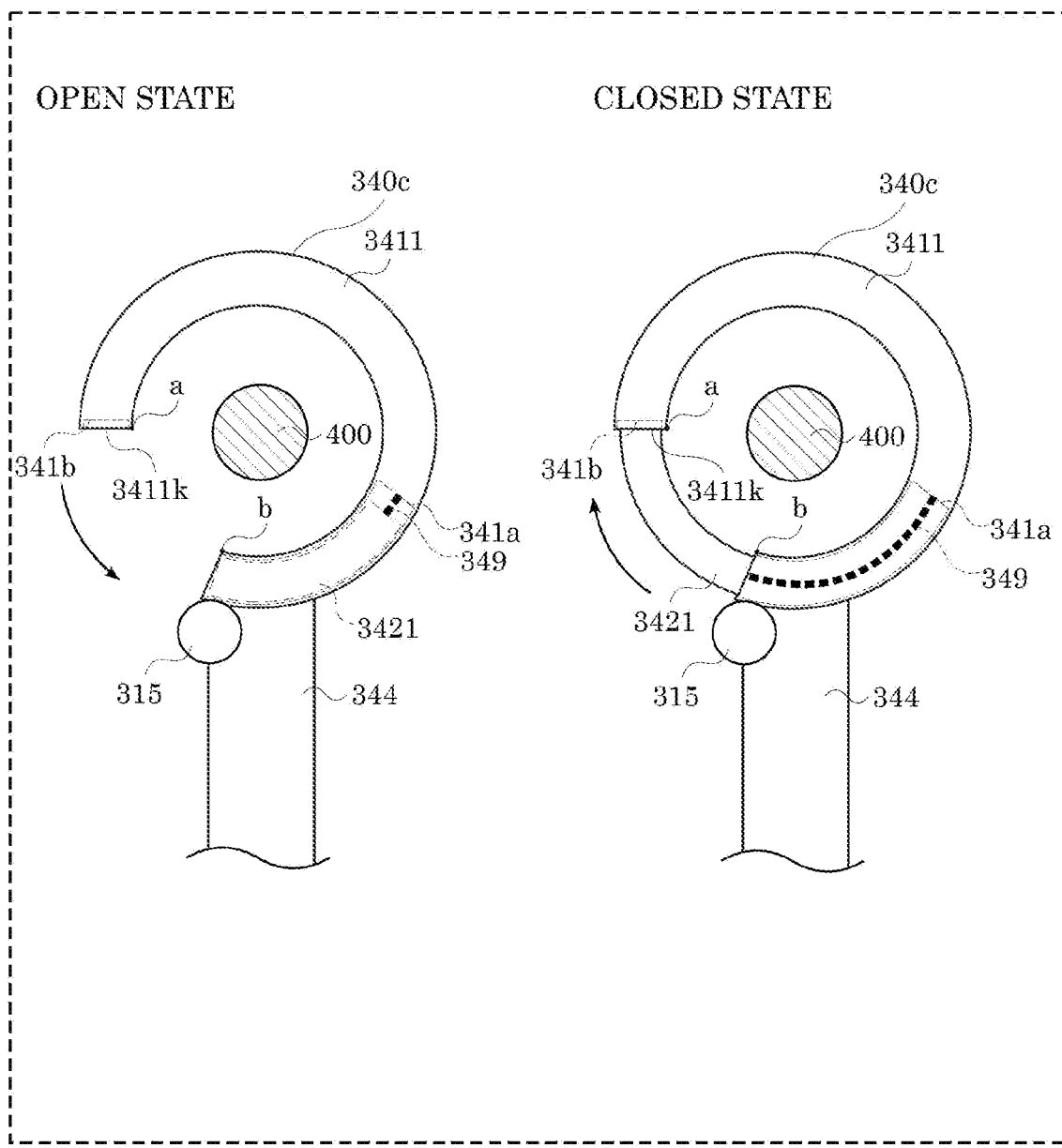
FIG. 37 is a schematic diagram illustrating an example of an arm of a child drone of the flying system according to Embodiment 4.

FIG. 35 is a schematic diagram illustrating an example of child drone 300c of flying system 2b according to Embodiment 4. FIG. 36 is a block diagram illustrating a configuration of flying system 2b according to Embodiment 4. FIG. 37 is a schematic diagram illustrating an example of arm 340c of child drone 300c of flying system 2b according to Embodiment 4. FIG. 37 illustrates a state in which second arm 3421 leaves opening 3411k of first arm 3411 open and a state in which second arm 3421 closes opening 3411k of first arm 3411.

As illustrated in FIGS. 35 to 37, the arm of child drone 300c constituting flying system 2b according to the present embodiment includes, in addition to first arm 3411 and second arm 3421, spring 349, support portion 344 that supports the arm, first electric motor 315, and first sensor 391. First arm 3411 and second arm 3421 constitute an example of a ring.

First arm 3411 and support portion 344 are formed integrally. First arm 3411 has a C-shaped hook-like form where a part of the ring is cut out as viewed in the direction in which child drone 300c travels. The portion cut out from the ring constitutes opening 3411k of first arm 3411 through which rail 400 can enter the space enclosed by arm 340c.

The length of opening 3411k (i.e., the distance from one end a to another end b of first arm 3411 illustrated in FIG. 37) is greater than the diameter of rail 400 so that rail 400 can enter the space enclosed by arm 340c through opening 3411k. The one end of first arm 3411 abuts second arm 3421, and housing 341a that houses second arm 3421 is formed in another end portion of first arm 3411. Housing 341a has a circular arc shape that follows the shape of first arm 3411.

Recess 341b is formed in one end portion of first arm 3411, and one end of second arm 3421 is inserted into recess 341b. With this configuration, when second arm 3421 closes opening 3411k of first arm 3411, even if a force is applied to second arm 3421 by rail 400, the possibility that second arm 3421 is separated from first arm 3411 is reduced since second arm 3421 is fitted in recess 341b.

Second arm 3421 can be slid and housed into housing 341a. Housing 341a may house the whole or apart of second arm 3421. Spring 349 is provided inside housing 341a. Spring 349 applies a biasing force against second arm 3421 so as to cause second arm 3421 to close opening 3411k of first arm 3411. One end of spring 349 is connected to another end of second arm 3421, and another end of spring 349 is connected to an inner bottom of housing 341a. For example, spring 349 is an elastic member, such as a coil spring or rubber.

First arm 3411 and second arm 3421 appear to form a circle when first arm 3411 and second arm 3421 are viewed in the direction in which child drone 300c travels. When arm 340c is positioned upright, opening 3411k of first arm 3411 is located below a horizontal line passing through the center axis of that circle. Therefore, even when opening 3411k of first arm 3411 is open, first arm 3411 functions as a hook, and this reduces the possibility that first arm 3411 coupled to rail 400 becomes disengaged from rail 400.

Second arm 3421 is slid and moved by first electric motor 315 such that second arm 3421 closes or opens opening 3411k of first arm 3411. When second arm 3421 has closed opening 3411k, first arm 3411 and second arm 3421 form a ring. When second arm 3421 opens opening 3411k, arm 340c has a C-like shape (a circular arc shape). Second arm 3421 has a circular arc shape that conforms to the shape of housing 341a.

Support portion 344 is a support pillar that supports first arm 3411 and second arm 3421 on child drone main body 301a. First arm 3411 is connected to one end of support portion 344, and child drone main body 301a is connected to another end of support portion 344. First electric motor 315 is attached to the vicinity of a connection portion where the one end of support portion 344 and first arm 3411 are connected to each other. Support portion 344 is provided so as to erect from the center portion of child drone main body 301a, as child drone main body 301a is viewed from the above.

First electric motor 315 is a motor that is actuated and controlled by processor 337 of controller 330. First electric motor 315 slides and moves second arm 3421 so as to house second arm 3421 into housing 341a. Specifically, a gear or the like provided on a rotary shaft of first electric motor 315 meshes with the teeth formed on an outer peripheral surface of second arm 3421, and this allows second arm 3421 to slide and move. As a matter of course, the actuation force of first electric motor 315 is stronger than the spring force of spring 349.

First electric motor 315 is provided at a position where first electric motor 315 can slide and move second arm 3421, that is, provided at the connection portion where support portion 344 and first arm 3411 are connected to each other. This connection portion lies in the vicinity of opening 3411k of first arm 3411 and on the outer peripheral side of housing 341a.

First sensor 391 measures a first distance between rail 400 and arm 340c. First sensor 391 is disposed on at least an upper portion or a lower portion of the ring of arm 340c. First sensor 391 outputs first distance information indicating the measured first distance to processor 337 of controller 330.

Processor 337 performs control of moving arm 340c upward or downward in accordance with the first distance indicated by the first distance information. Specifically, processor 337 determines whether the first distance is greater than a predetermined value. In a case where first sensor 391 is provided on the upper portion of the ring of arm 340c, processor 337 controls actuator 310 so as to move arm 340c in an upward direction if the first distance is greater than the predetermined value. Meanwhile, processor 337 controls actuator 310 so as to move arm 340c in a downward direction if the first distance is smaller than or equal to the predetermined value. In a case where first sensor 391 is provided on the lower portion of the ring of arm 340c, processor 337 controls actuator 310 so as to move arm 340c in a downward direction if the first distance is greater than the predetermined value. Meanwhile, processor 337 controls actuator 310 so as to move arm 340c in an upward direction if the first distance is smaller than or equal to the predetermined value.

Processor 337 actuates first electric motor 315 so as to slide and move second arm 3421 into housing 341a only when opening 3411k of first arm 3411 is to be opened. When opening 3411k of first arm 3411 is to be closed, processor 337 refrains from actuating first electric motor 315, that is, stops first electric motor 315. In this case, second arm 3421 closes opening 3411k of first arm 3411 by the biasing force of spring 349.

In the present embodiment, spring 349 does not need to be used. Alternatively, opening 3411k of first arm 3411 may be closed or opened by sliding and moving second arm 3421 with first electric motor 315.

When child drone 300c couples arm 340c to rail 400, child drone 300c configured as described above places arm 340c diagonally above rail 400 with opening 3411k of first arm 3411 left open and then couples itself to rail 400.

Alternatively, child drone 300c moves in the horizontal direction with opening 3411k of first arm 3411 left open and then couples itself to rail 400.

The shape of the ring portion of the arm is not limited to the one described above.

Figure 38:
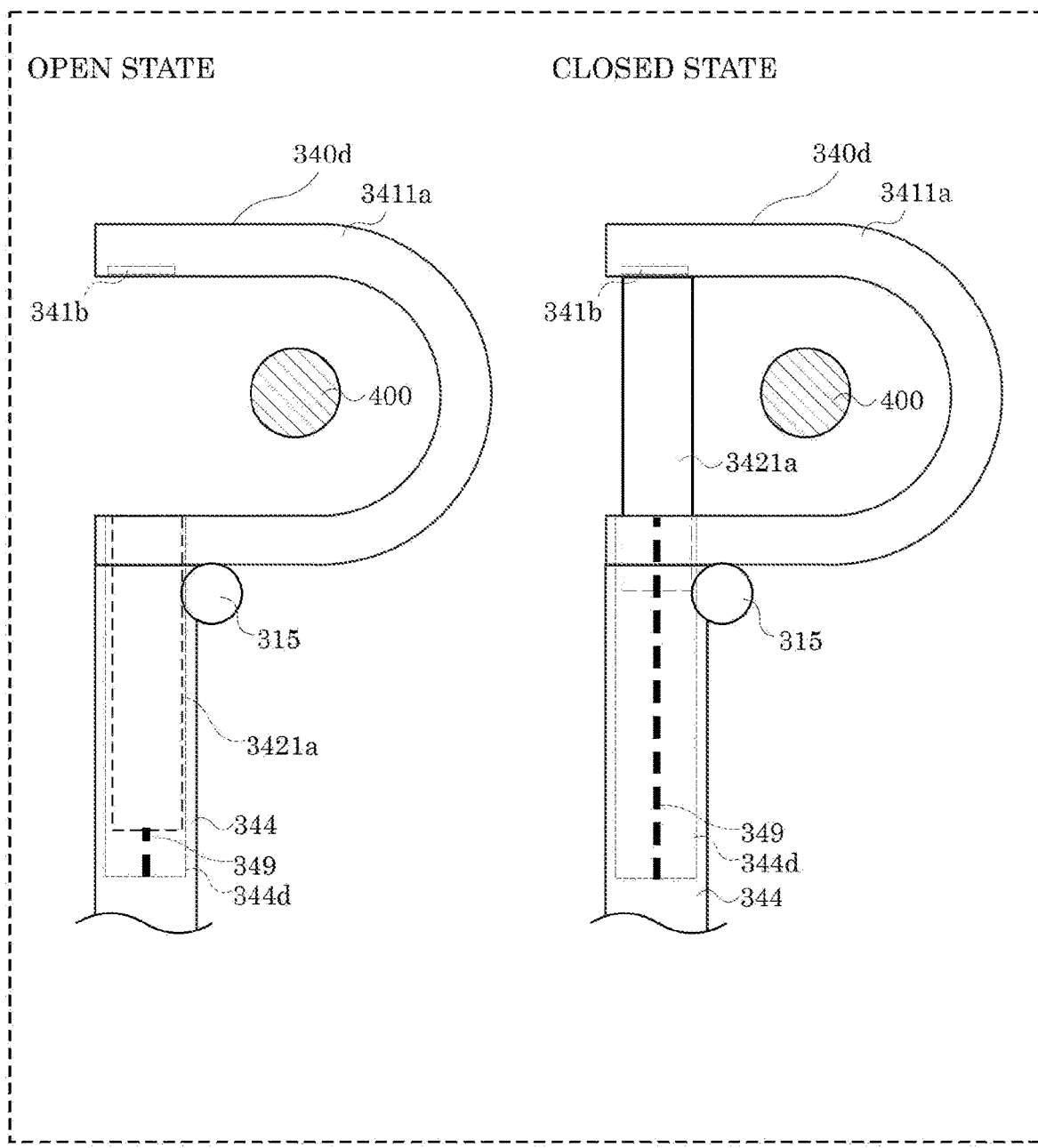
FIG. 38 is a schematic diagram illustrating an example of another arm of a child drone of the flying system according to Embodiment 4.

FIG. 38 is a schematic diagram illustrating an example of another arm 340d of the child drone of the flying system according to Embodiment 4.

As illustrated in FIG. 38, for example, first arm 3411a may have a U-like shape. In this case, opening 3411k of first arm 3411a through which rail 400 can enter the space enclosed by first arm 3411a is formed in a side of first arm 3411a. First arm 3411a has a shape that bulges in the horizontal direction from opening 3411k.

Second arm 3421a is a linear pillar-like member. Second arm 3421a is supported by support portion 344 such that second arm 3421a can be slid and moved by spring 349 in the vertical direction. The biasing force of spring 349 is applied to second arm 3421a in a vertically upward direction.

In FIG. 38, housing 344d that houses second arm 3421a is formed in support portion 344.

In this manner, when the child drone is to couple itself to rail 400, the child drone moves in the horizontal direction with opening 3411k of first arm 3411a left open and then couples itself to rail 400. This configuration reduces the possibility that rail 400 and arm 340d come into contact with each other and allows rail 400 and arm 340d to be coupled to each other with ease.

The function of arm 340d is not limited to the one described above.

Figure 39:
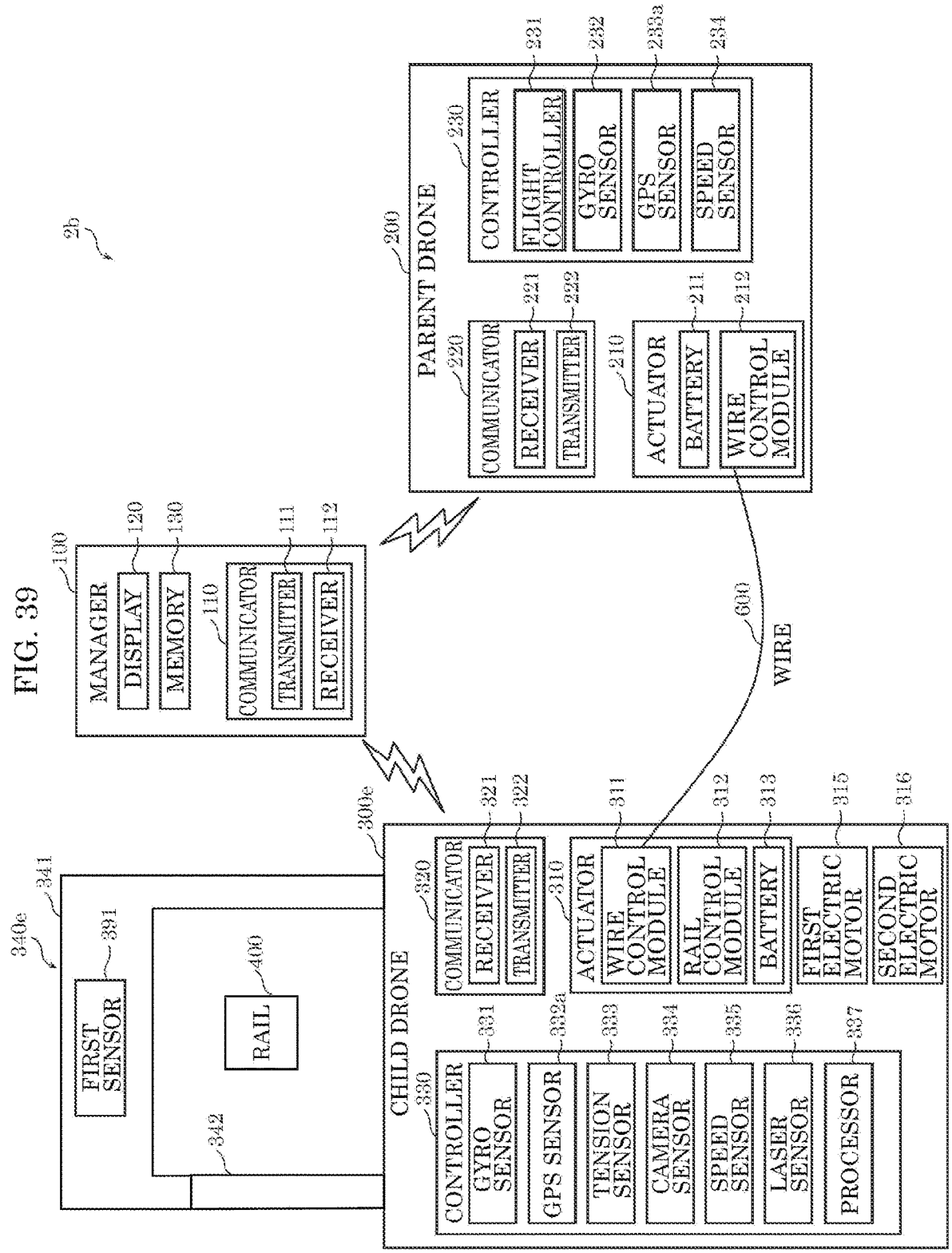
FIG. 39 is a block diagram illustrating another configuration of the flying system according to Embodiment 4.
Figure 40:
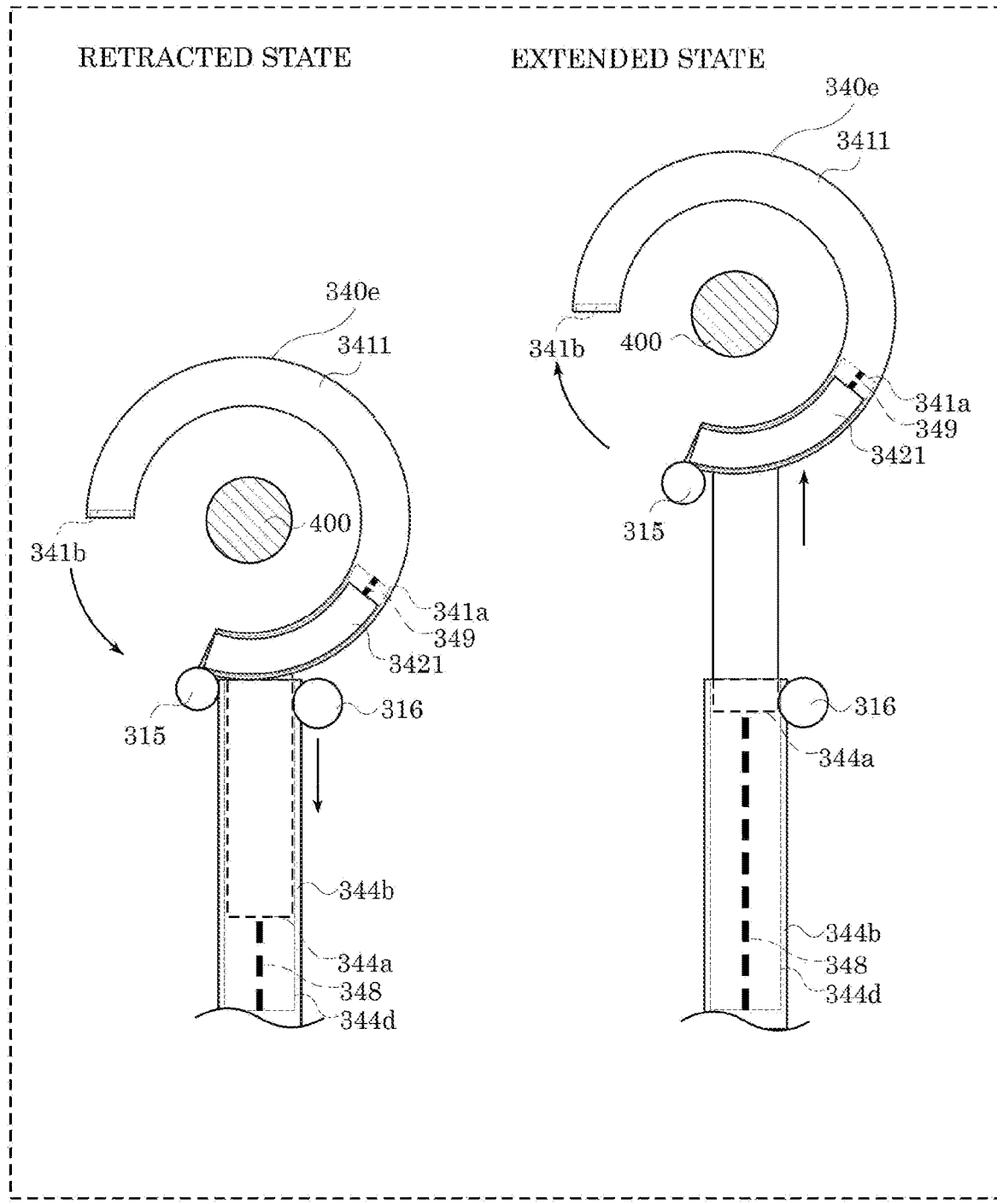
FIG. 40 is a schematic diagram illustrating an example of a state in which yet another arm of a child drone of the flying system is retracted or extended according to Embodiment 4.

FIG. 39 is a block diagram illustrating another configuration of flying system 2b according to Embodiment 4. FIG. 40 is a schematic diagram illustrating a state in which yet another arm 340e of child drone 300e of flying system 2b is retracted or extended according to Embodiment 4.

For example, as illustrated in FIGS. 39 and 40, arm 340e (i.e., first arm 3411 and second arm 3421) may be slid and moved. Specifically, child drone 300e further includes tubular guide portion 344b connected to child drone main body 301a, second electric motor 316, and spring 348. Housing 344d that houses support portion 344a is formed in guide portion 344b.

One end of support portion 344a is connected to first arm 3411, and another end of support portion 344a is connected to spring 348. The end of spring 348 that is opposite to the end connected to support portion 344a is connected to guide portion 344b or child drone main body 301a. Spring 348 applies a biasing force against support portion 344a so as to house support portion 344a into housing 344d in guide portion 344b. In other words, the biasing force of spring 348 acts on support portion 344a in a vertically downward direction.

Second electric motor 316 is a motor that is actuated and controlled by processor 337 of controller 330. Second electric motor 316 slides and moves support portion 344a so as to extend support portion 344a out of guide portion 344b. Specifically, a gear or the like provided on a rotary shaft of second electric motor 316 meshes with the teeth formed on an outer peripheral surface of support portion 344a, and this allows support portion 344a to slide and move in a vertically upward direction.

Second electric motor 316 is provided at a position where second electric motor 316 can slide and move support portion 344a, that is, provided at a leading end of guide portion 344b.

Processor 337 actuates second electric motor 316 only when arm 340e is to be extended from child drone 300e, and slides and moves support portion 344a so as to extend support portion 344a out of guide portion 344b. When arm 340e is to be retracted, processor 337 refrains from actuating second electric motor 316, that is, stops second electric motor 316. At this point, support portion 344a is retracted and housed into guide portion 344b by the biasing force of spring 348.

A plurality of arms may be provided.

Figure 41:
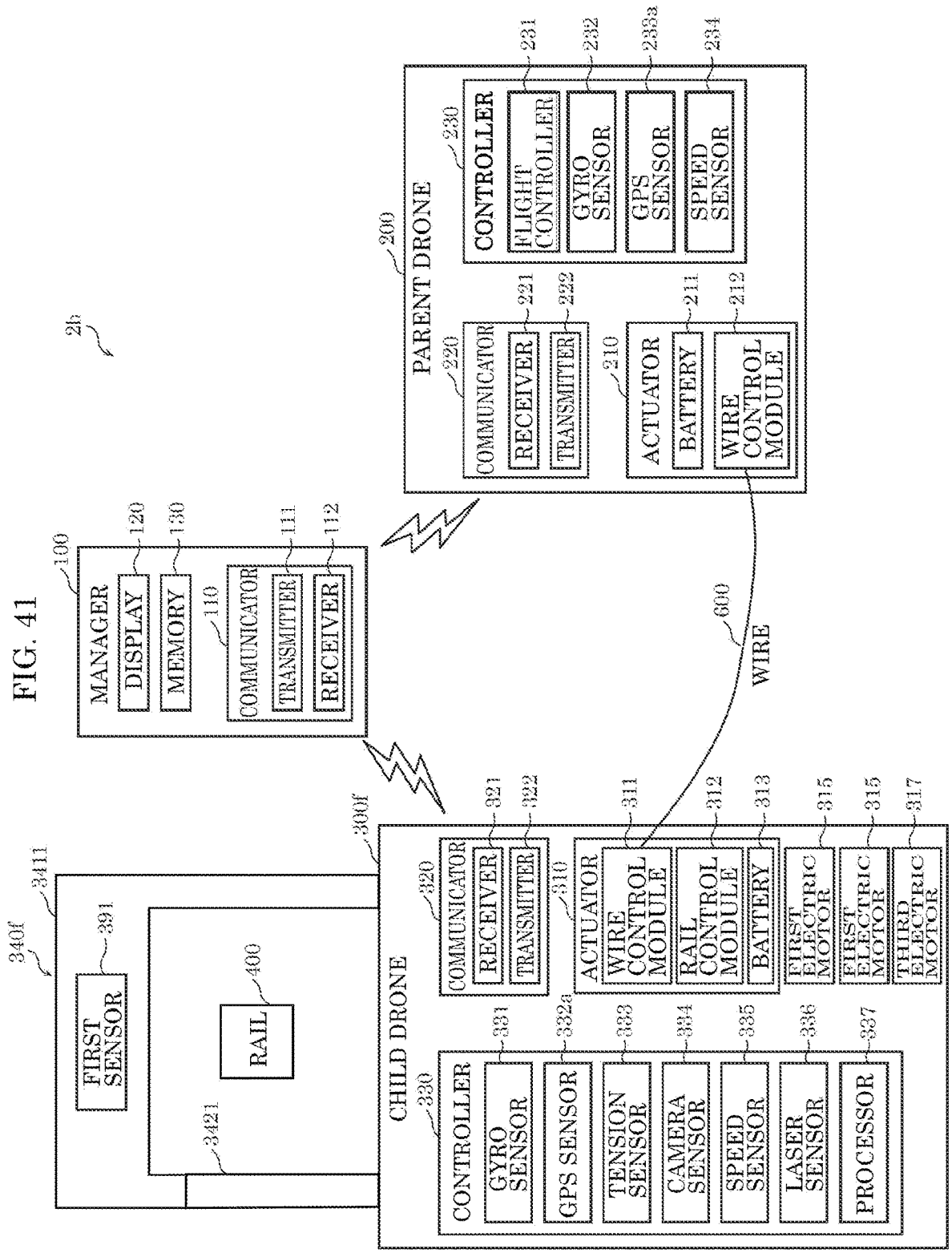
FIG. 41 is a block diagram illustrating yet another configuration of the flying system according to Embodiment 4.
Figure 42:
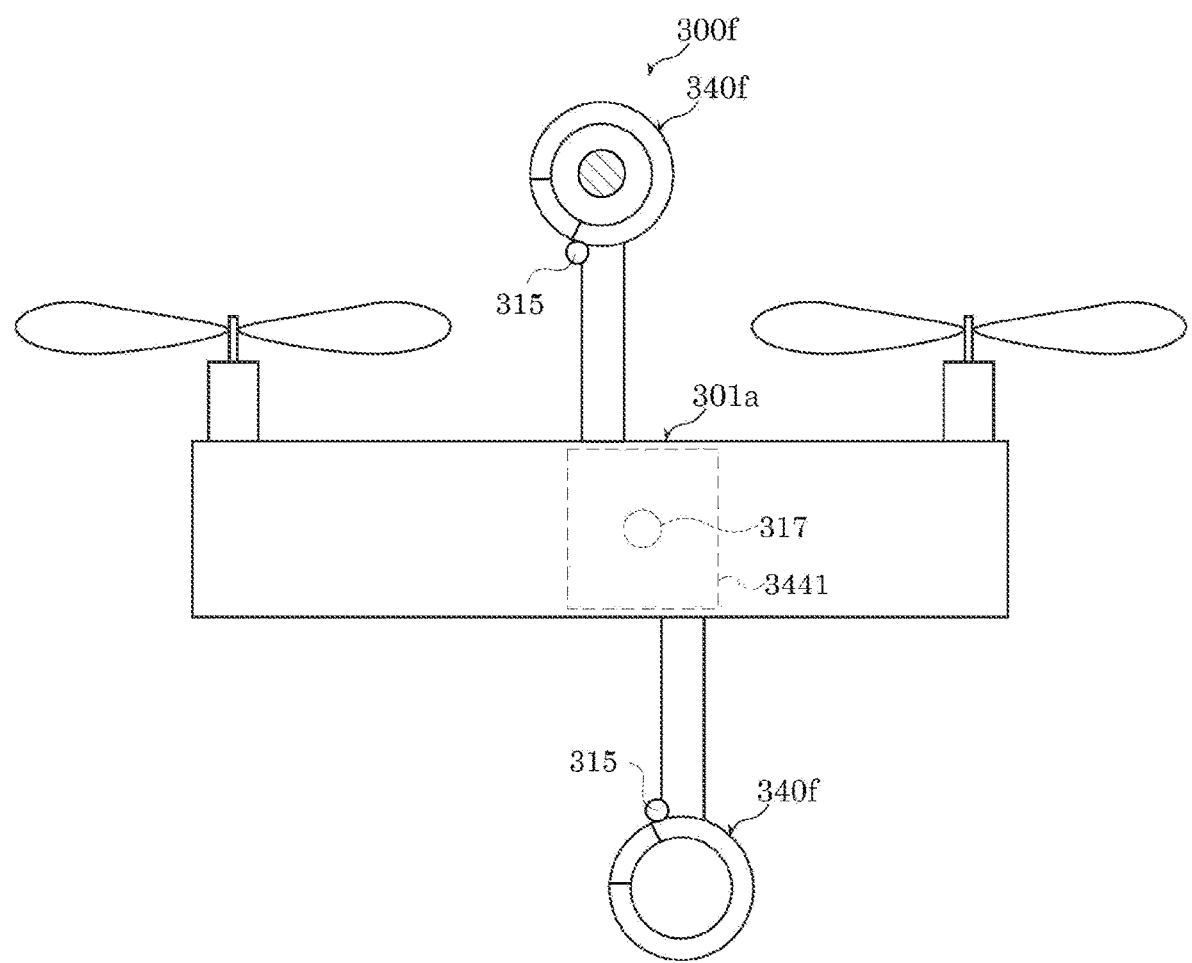
FIG. 42 is a schematic diagram illustrating an example of a child drone of the flying system according to Embodiment 4.
Figure 43A:
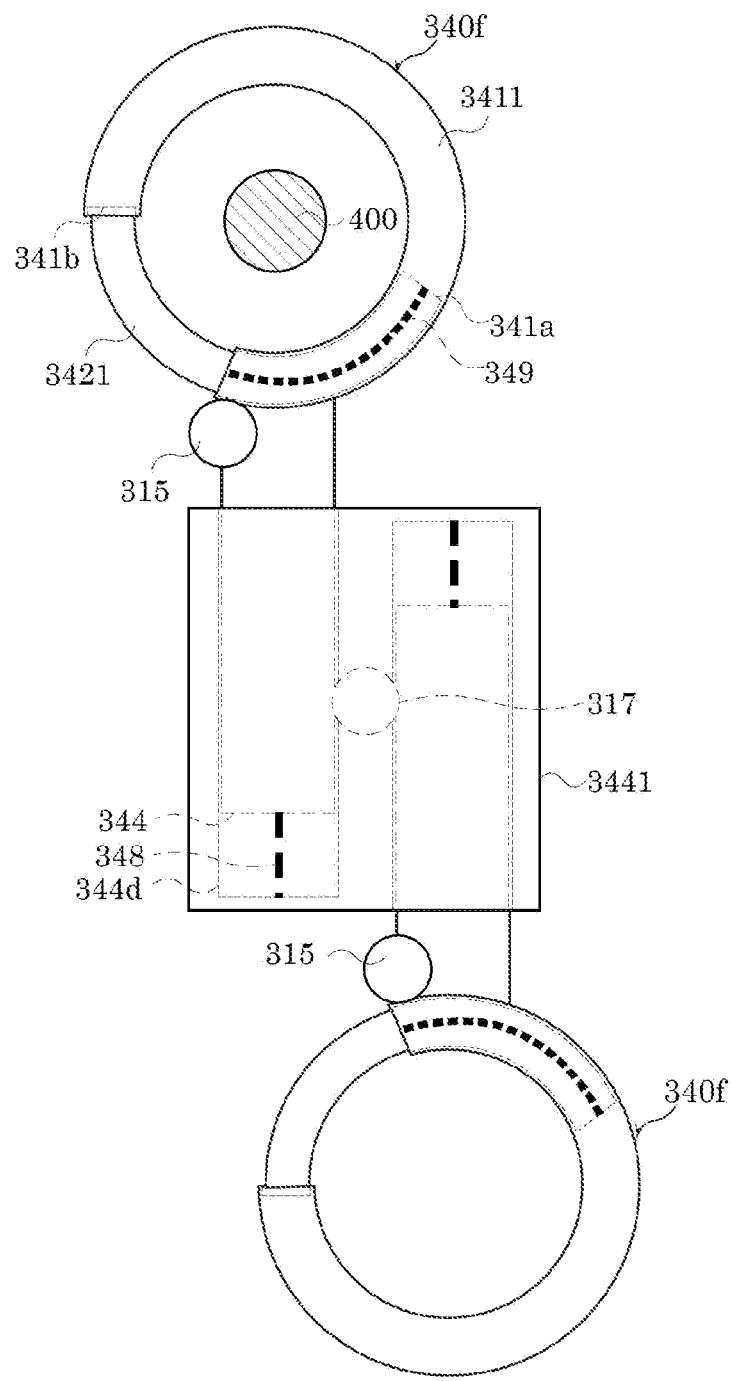
FIG. 43A is a schematic diagram illustrating an example of a state in which an arm of a child drone of the flying system is retracted according to Embodiment 4.
Figure 43B:
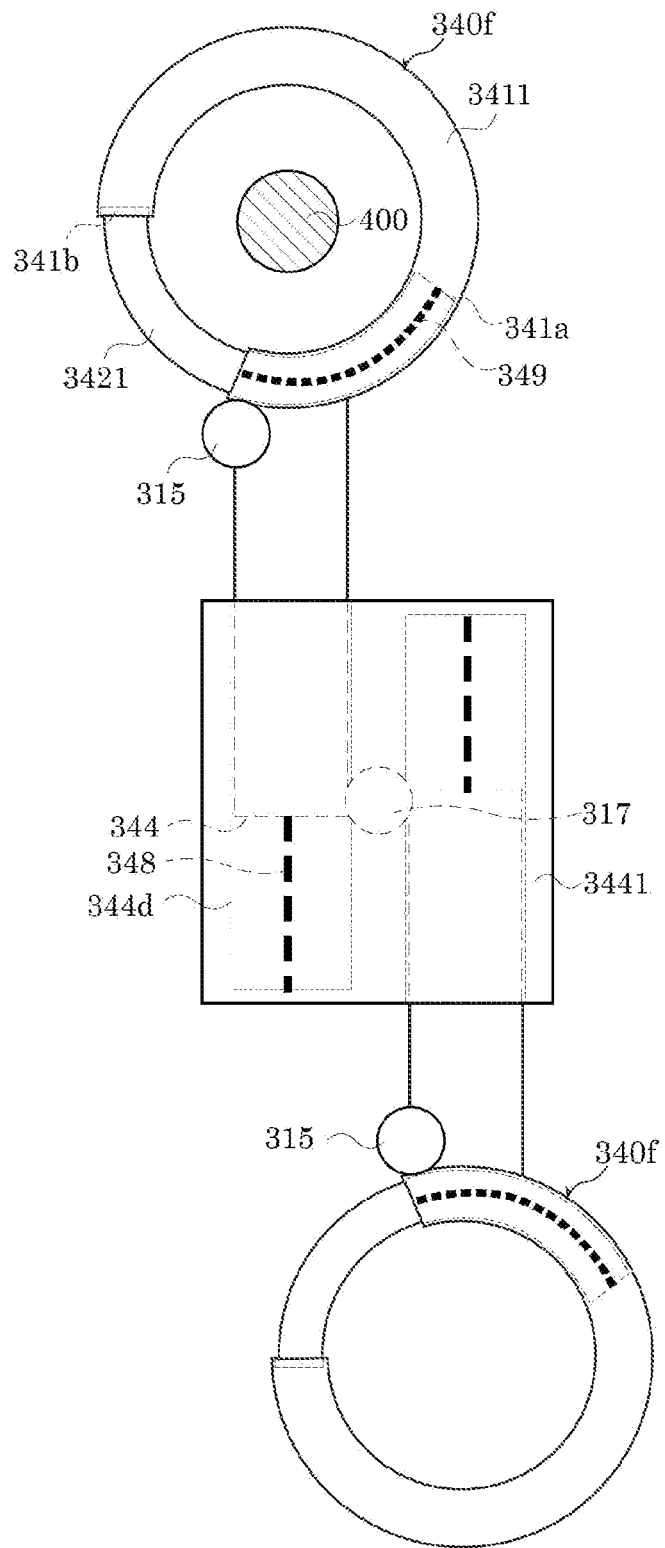
FIG. 43B is a schematic diagram illustrating an example of a state in which an arm of a child drone of the flying system is extended according to Embodiment 4.

FIG. 41 is a block diagram illustrating yet another configuration of flying system 2b according to Embodiment 4. FIG. 42 is a schematic diagram illustrating an example of yet other arm 340f of child drone 300f of flying system 2b according to Embodiment 4. FIG. 43A is a schematic diagram illustrating an example of a state in which arm 340f of child drone 300f of flying system 2b is retracted according to Embodiment 4. FIG. 43B is a schematic diagram illustrating an example of a state in which arm 340f of child drone 300f of flying system 2b is extended according to Embodiment 4.

For example, as illustrated in FIGS. 41, 42, 43A, and 43B, child drone 300f includes arm 340f (may also be referred to below as one arm 3400 that extends in a vertically upward direction from child drone main body 301a, arm 340f (may also be referred to below as other arm 3400 that extends in a vertically downward direction from child drone main body 301a, counterbalance 3441, and first electric motors 315.

One arm 340f and other arm 340f each have a configuration similar to the configuration described above. One arm 340f and other arm 340f are disposed symmetric to each other about child drone main body 301a.

Counterbalance 3441 is a balancer that balances the center of gravity of child drone 300f Counterbalance 3441 is tubular. Housings 344d are formed inside counterbalance 3441. Support portion 344 of one arm 340f and support portion 344 of other arm 340f are inserted into respective housings 344d. Furthermore, third electric motor 317 is housed in counterbalance 3441.

Third electric motor 317 is disposed between support portion 344 of one arm 340f and support portion 344 of other arm 340f. Third electric motor 317 slides and moves support portion 344 of one arm 340f and support portion 344 of other arm 340f so as to extend these support portions 344 from counterbalance 3441. In addition, third electric motor 317 slides and moves support portion 344 of one arm 340f and support portion 344 of other arm 340f so as to retract these support portions 344 into counterbalance 3441. In other words, third electric motor 317 moves one arm 340f and other arm 340f so as not to change the position of the center of gravity of child drone 300f.

Third electric motor 317 is fixed to any one of support portion 344 of one arm 340f, support portion 344 of other arm 340f, or counterbalance 3441.

In the present embodiment, one arm 340f and other arm 340f are provided in a center portion of child drone main body 301a. Alternatively, for example, one arm 340f and other arm 340f may be disposed along the edge of child drone main body 301a. In this case, another counterbalance may be disposed at a position on a diagonal line between one arm 340f and other arm 340f with respect to the center of gravity of child drone 300f so that the counterbalance balances the center of gravity of child drone 300f.

In this example, another counterbalance may be used in place of other arm 340f As such, it is not essential that two arms 340f be provided.

Figure 44:
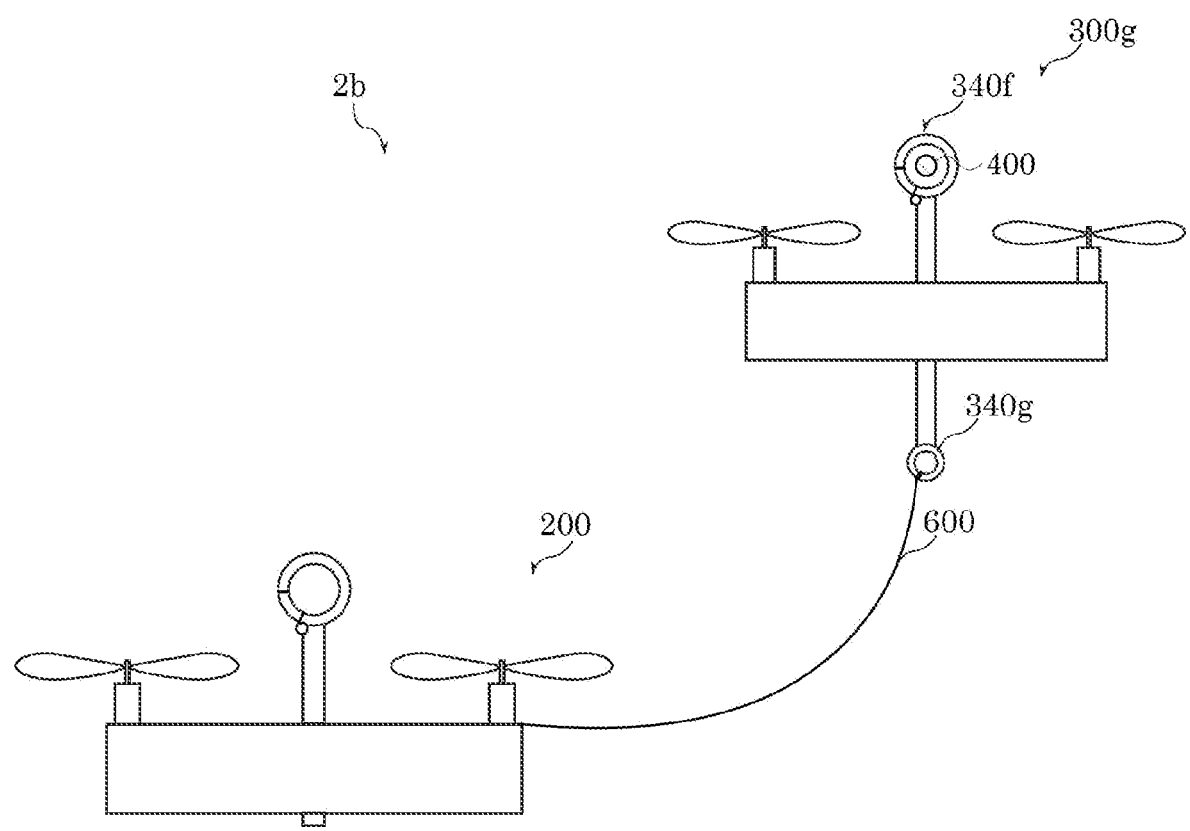
FIG. 44 is a schematic diagram illustrating an example of yet another arm of a child drone of the flying system according to Embodiment 4.

FIG. 44 is a schematic diagram illustrating an example of yet another arm 340g of child drone 300g of flying system 2b according to Embodiment 4.

For example, as illustrated in FIG. 44, an insertion hole is formed at a leading end of a counterbalance, and wire 600 can be tied to the insertion hole. Wire 600 is inserted into the insertion hole and tied thereto. Wire 600 is connected to parent drone 200.

Child drone 300g may include a gimbal in place of the counterbalance.

For example, the gimbal is provided at a portion where child drone main body 301a and arm 340f are connected to each other. In other words, child drone main body 301a is connected to arm 340f via the gimbal. In this case, even if child drone main body 301a tilts while child drone 300g is flying, arm 340f is less likely to tilt relative to the vertical direction. Therefore, child drone 300g can fly stably.

Advantageous Effects

Now, some advantageous effects of the method of controlling a flying body and of the flying body according to the present embodiment will be described.

As described above, the method of controlling a flying body according to the present embodiment is a method of controlling a flying body that is coupled to another flying body via a coupling line. The flying body includes an arm having a ring through which a fixed rail is to pass and a first sensor that measures a first distance between the rail and the ring. The flying body measure the first distance with the use of the first sensor and performs control of moving the arm upward or downward in accordance with the first distance.

This configuration allows the flying body to move appropriately along the rail without the arm making contact with the rail when the flying body moves with its arm being coupled to the rail.

The flying body according to the present embodiment is a flying body that is coupled to another flying body via a coupling line. The flying body includes an arm and a first sensor. The arm includes a ring through which a fixed rail is to pass. The first sensor is provided on an upper portion or a lower portion of the ring and measures a first distance between the rail and the ring.

In the method of controlling a flying body according to the present embodiment, the first sensor is provided on an upper portion of the ring. The arm is moved in an upward direction when the first distance is greater than a predetermined value. Meanwhile, the arm is moved in a downward direction when the first distance is smaller than or equal to the predetermined value.

This configuration makes it possible to secure a certain distance between the ring and the rail so as to keep the ring and the rail from making contact with each other when the upper side or the lower side of the ring of the arm of the flying body has come too close to the rail. Therefore, the possibility that the ring makes contact with the rail while the flying body is flying is reduced.

In the method of controlling a flying body according to the present embodiment, the first sensor is provided on a lower portion of the ring. The arm is moved in a downward direction when the first distance is greater than a predetermined value. Meanwhile, the arm is moved in an upward direction when the first distance is smaller than or equal to the predetermined value.

In the flying body according to the present embodiment, the arm includes a first arm, a second arm, and a first electric motor. The first arm has a substantially circular arc shape and is partially cut out to have an opening. The second arm has a substantially circular arc shape and forms a ring shape together with the first arm. The first electric motor slides and moves the second arm to at least open the opening. The arm becomes coupled to the rail when the rail is allowed to pass through the opening while the opening is open.

This configuration allows the arm to be coupled to the rail with ease by opening the opening of the first arm and allowing the rail to pass through the opening.

In the flying body according to the present embodiment, the arm further includes a spring that applies a biasing force against the second arm so as to close the opening of the first arm. The first electric motor slides and moves the second arm and stops the actuation that contributes to opening of the opening when the rail has entered the space enclosed by the first arm.

With this configuration, the first electric motor needs to be actuated only when the arm is to be coupled to the rail. When the first electric motor is stopped, the second arm automatically closes the opening of the first arm by the biasing force of the spring. Accordingly, any increase in the power used by the flying body can be suppressed.

Variation 1 of Embodiment 4

In the following, a method of controlling a flying body and basic configurations of the flying body and of a flying system according to the present variation are identical to the basic configurations described in Embodiment 1 and so on. Therefore, the descriptions of the method of controlling a flying body and the basic configurations of the flying body and of the flying system according to the present variation will be omitted as appropriate.

Figure 45:
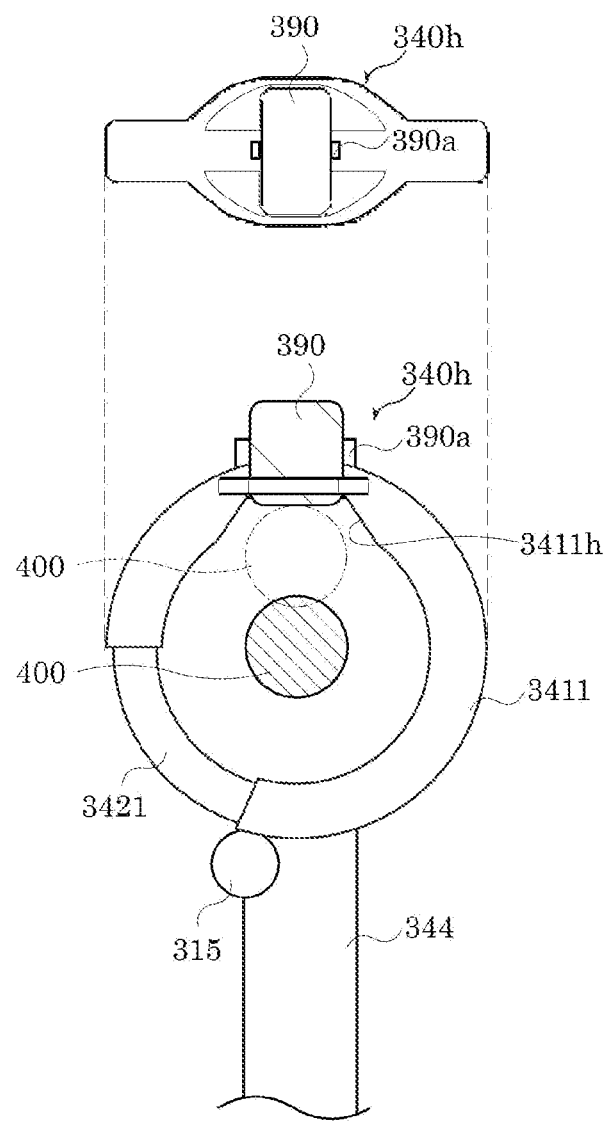
FIG. 45 is a schematic diagram illustrating an example of a child drone of a flying system according to Variation 1 of Embodiment 4.

FIG. 45 is a schematic diagram illustrating an example of a child drone of a flying system according to Variation 1 of Embodiment 4.

As illustrated in FIG. 45, the child drone according to the present variation further includes wheel 390 and axle 390a.

Wheel 390 makes contact with and freely rotates on rail 400. Wheel 390 is rotatably provided at an upper end portion of first arm 3411. Specifically, wheel 390 is supported by axle 390a provided at the upper end portion of first arm 3411 and rotates about axle 390a. When the child drone flies with arm 340h being coupled to rail 400, the axis of axle 390a extends in a direction that is orthogonal to the direction in which rail 400 extends and that is substantially parallel to the horizontal direction. Axle 390a constitutes a part of first arm 3411, and the two ends of rotary shaft 350 are fixed.

In this example, in place of wheel 390, a spherical ball may be provided. A plurality of wheels 390, balls, or the like may be provided on the inner peripheral side of the ring of arm 340h.

Recessed notch 3411h is formed in an inner periphery of the upper end side of first arm 3411 in order to keep first arm 3411 from making contact with rail 400. Wheel 390 is provided at a position closer to the outer peripheral surface than to the inner peripheral surface of first arm 3411. The outer peripheral surface of wheel 390 lies between the inner peripheral surface and the outer peripheral surface of first arm 3411.

Figure 46:
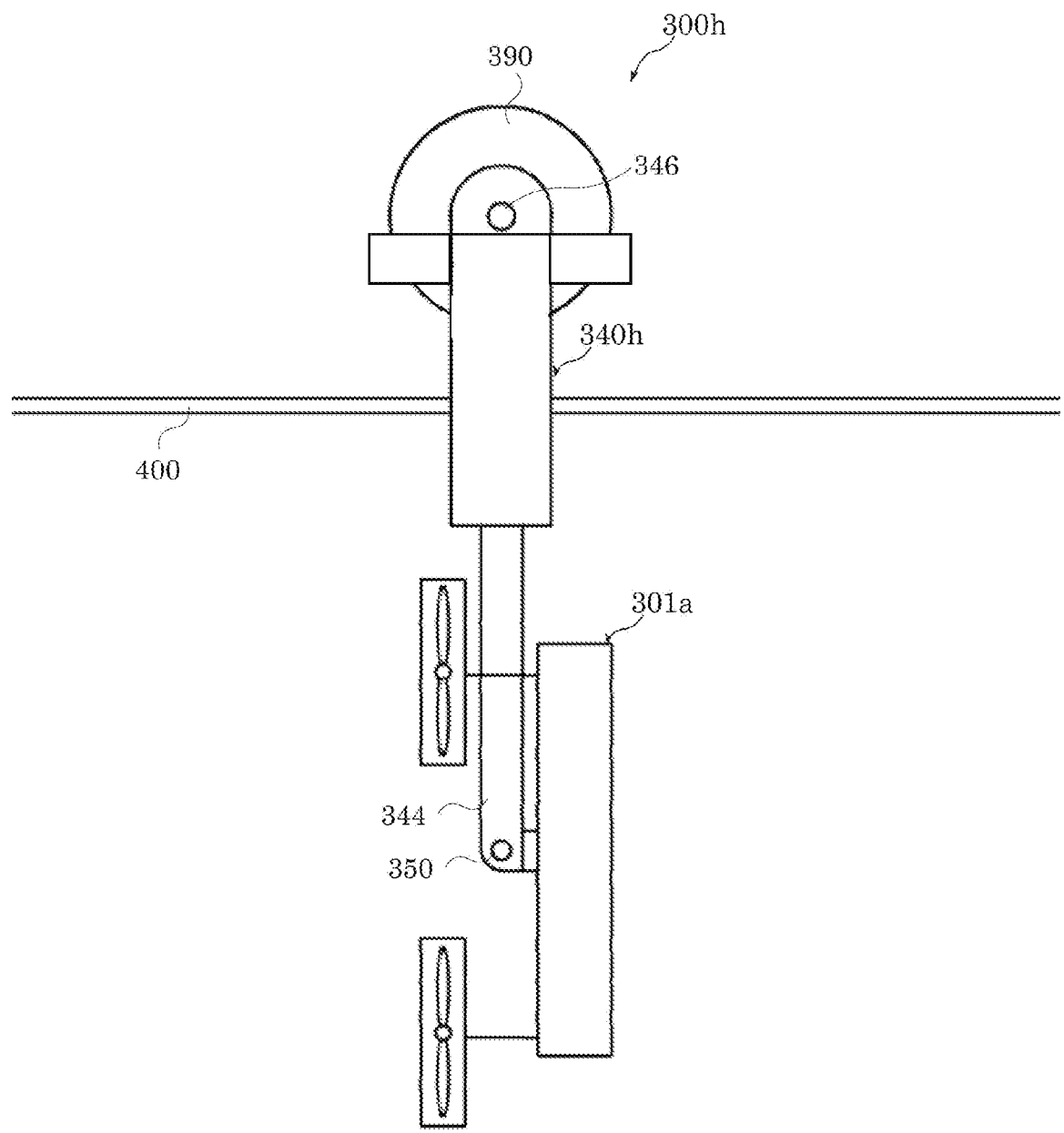
FIG. 46 is another schematic diagram illustrating an example of a child drone of the flying system according to Variation 1 of Embodiment 4.

FIG. 46 is a schematic diagram illustrating an example of a case where child drone main body 301a assumes an upright attitude while child drone 300h of the flying system is traveling along rail 400 according to Variation 1 of Embodiment 4.

As illustrated in FIG. 46, rotary shaft 350 is provided at a connection portion where child drone main body 301a and arm 340*h* are connected to each other. Specifically, when child drone 300*h* flies with arm 340*h* being coupled to rail 400, rotary shaft 350 brings child drone main body 301*a* into an upright attitude while maintaining the attitude of arm 340*h*. Specifically, when child drone 300*h* flies with arm 340*h* being coupled to rail 400, arm 340*h* assumes an attitude in which the lengthwise direction of arm 340*h* is substantially parallel to the vertical direction. Since child drone main body 301*a* has a plate-like shape, when child drone main body 301*a* is in the upright attitude, child drone main body 301*a* is substantially parallel to the vertical direction. In this manner, rotary shaft 350 causes child drone main body 301*a* to pivot mainly between the horizontal attitude and the upright attitude.

Processor 337 of controller 330 controls child drone main body 301*a* so as to bring child drone main body 301*a* into the upright attitude when child drone 300*h* flies with arm 340*h* being coupled to rail 400. Specifically, processor 337 causes child drone main body 301*a* to pivot about the axis of rotary shaft 350 by actuating rotary shaft 350 via actuator 310. In the present variation, actuator 310 is capable of rotating rotary shaft 350 by 180 degrees.

In child drone 300*h* configured as described above, child drone 300*h* can fly with wheel 390 in contact with rail 400 when child drone 300*h* flies with arm 340*h* being coupled to rail 400. Wheel 390 starts rotating upon friction with rail 400. Therefore, child drone 300*h* can travel on rail 400 solely with the propelling force in the traveling direction produced by the rotation of the propellers. This configuration thus renders it unnecessary for child drone 300*h* to use the rotary force of the propellers as the lifting force for lifting up child drone 300*h*.

In this child drone 300*h*, child drone main body 301*a* pivots about the axis of rotary shaft 350 as processor 337 controls actuator 310. Therefore, child drone 300*h* can change the attitude of child drone main body 301*a*.

Rotary shaft 350 brings child drone main body 301*a* into the upright attitude when child drone 300*h* flies with arm 340*h* being coupled to rail 400. Thus, child drone 300*h* can convert the rotary force of the propellers to the propelling force that acts in the traveling direction. Therefore, child drone 300*h* can smoothly travel on rail 400.

Moreover, since rail 400 is located in notch 3411*h*, it is less likely that wheel 390 is separated from rail 400 even if child drone 300*h* wavers while child drone 300*h* is traveling on rail 400. Therefore, child drone 300*h* can stably travel on rail 400.

Variation 2 of Embodiment 4

In the following, a method of controlling a flying body and basic configurations of the flying body and of a flying system according to the present variation are identical to the basic configurations described in Embodiment 1 and so on. Therefore, the descriptions of the method of controlling a flying body and the basic configurations of the flying body and of the flying system according to the present variation will be omitted as appropriate.

Figure 47:
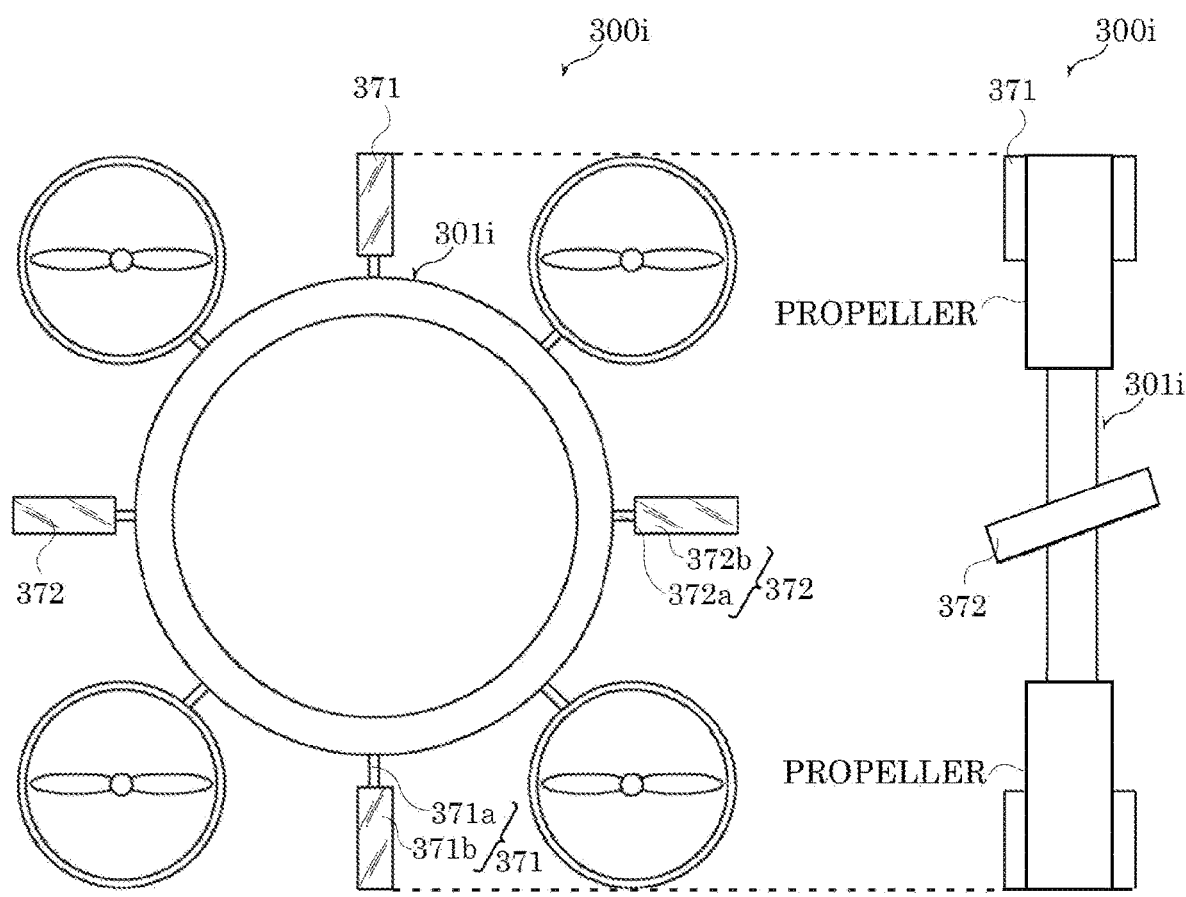
FIG. 47 illustrates a schematic front view and a schematic side view of a child drone of a flying system according to Variation 2 of Embodiment 4.

FIG. 47 illustrates a schematic front view and a schematic side view of child drone 300*i* of a flying system according to Variation 2 of Embodiment 4.

As illustrated in FIG. 47, child drone main body 301*i* according to the present variation has a ring-like shape. Child drone main body 301*i* couples itself to rail 400. Therefore, the main body of child drone 300*i* is shaped to function as an arm as well. Four propellers 801 are provided in respective directions from child drone main body 301*i*.

Child drone main body 301*i* further includes a pair of yaw wings 371, a pair of pitch wings 372, and a rudder controller (not illustrated).

The pair of yaw wings 371 are provided on an outer peripheral portion of child drone main body 301*i*. When child drone main body 301*i* is in the upright attitude, the pair of yaw wings 371 are disposed symmetrically in the vertical direction about the center of gravity of child drone main body 301*i*. Each of the pair of yaw wings 371 includes first shaft portion 371*a* having an axis extending in the vertical direction and first vane portion 371*b* that is pivotably supported by first shaft portion 371*a*. Each first vane portion 371*b* rotates about an axis extending in the vertical direction. The force of the wind in the right and left direction is controlled as first vane portions 371*b* rotate. When viewed in the traveling direction, child drone 300*i* is steered to the left when first vane portions 371*b* are rotated to the left or steered to the right when first vane portions 371*b* are rotated to the right.

The pair of pitch wings 372 are provided on an outer peripheral portion of child drone main body 301*i*. When child drone main body 301*i* is in the upright attitude, the pair of pitch wings 372 are disposed symmetrically in the horizontal direction about the center of gravity of child drone main body 301*i*. Each of the pair of pitch wings 372 includes second shaft portion 372*a* having an axis extending in the horizontal direction and second vane portion 372*b* pivotably supported by second shaft portion 372*a*. Each second vane portion 372*b* rotates about an axis extending in the horizontal direction. The force of the wind in the up and down direction is controlled as second vane portions 372*b* rotate. When viewed in the traveling direction, child drone 300*i* is steered in an upward direction when first vane portions 371*b* are rotated upward or steered in a downward direction when first vane portions 371*b* are rotated downward.

The rudder controller controls the pivoting movement of first vane portion 371*b* of each of the pair of yaw wings 371 and second vane portion 372*b* of each of the pair of pitch wings 372.

Processor 337 of controller 330 controls child drone main body 301*i* so as to bring child drone main body 301*i* into an inclined attitude when child drone 300*i* flies with child drone main body 301*i* being coupled to rail 400. Specifically, processor 337 controls the pivoting movement of second vane portion 372*b* of each of the pair of pitch wings 372 by actuating the rudder controller.

Child drone 300*i* configured as described above can be rotated in the horizontal direction by causing first vane portions 371*b* of yaw wings 371 to pivot and can be rotated in the vertical direction by causing second vane portions 372*b* of pitch wings 372 to pivot. When child drone 300*i* flies while being coupled to rail 400, child drone 300*i* flies in an attitude inclined with respect to the horizontal plane.

Figure 48:
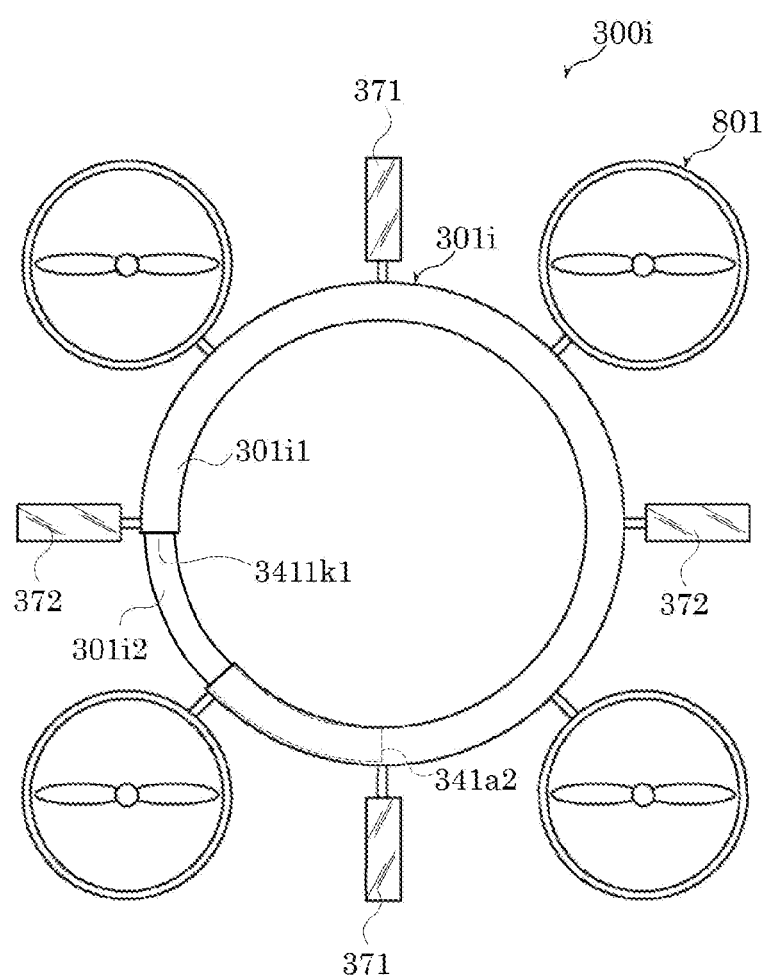
FIG. 48 is a schematic front view of another child drone of the flying system according to Variation 2 of Embodiment 4.

FIG. 48 is a schematic front view of another child drone 300*i* in a flying system according to Variation 2 of Embodiment 4. As illustrated in FIG. 48, in the present variation, child drone main body 301*i* may adopt functions and configurations of first arm 3411 and second arm 3421. Child drone main body 301*i* includes first main body 301*i*1 having a hook-like shape and second main body 301*i*2 having a circular arc shape. Second main body 301*i*2 opens or closes opening 3411*k*1 in the outer periphery of first main body 301*i*1 by sliding and moving out of or into housing 341*a*2 in first main body 301*i*1.

A flying body according to the present variation configured as described above includes a first wing provided on each of an upper portion and a lower portion of the flying body and a second wing provided on each of a left side portion and a right side portion of the flying body with respect to the traveling direction of the flying body.

This configuration makes it possible to move a first flying body more appropriately with the four wings.

The flying body according to the present variation includes a main body (e.g., child drone main body 301i), four propellers, and four wings (e.g., a pair of yaw wings and a pair of pitch wings). The main body includes a ring through which a fixed rail is to pass. The four propellers are provided on the main body so as to be symmetric across the main body. The four wings are provided on the main body so as to be symmetric across the main body. The four propellers and the four wings are disposed in an alternating manner. The two wings (e.g., the pair of pitch wings) of the four wings that are disposed in a first predefined direction steer the main body in the vertical direction, and the two wings (e.g., the pair of yaw wings) of the four wings that are disposed in a second predefined direction different from the first predefined direction steer the main body in the horizontal direction.

With this configuration, steering the four wings makes it possible to steer the traveling direction of the first flying body freely, and thus the first flying body can move stably.

Variation 3 of Embodiment 4

In the following, a method of controlling a flying body and basic configurations of the flying body and of flying system 2c according to the present variation are identical to the basic configurations described in Variation 2 of Embodiment 4 and so on. Therefore, the descriptions of the method of controlling a flying body and the basic configurations of the flying body and of flying system 2c according to the present variation will be omitted as appropriate.

Figure 49:
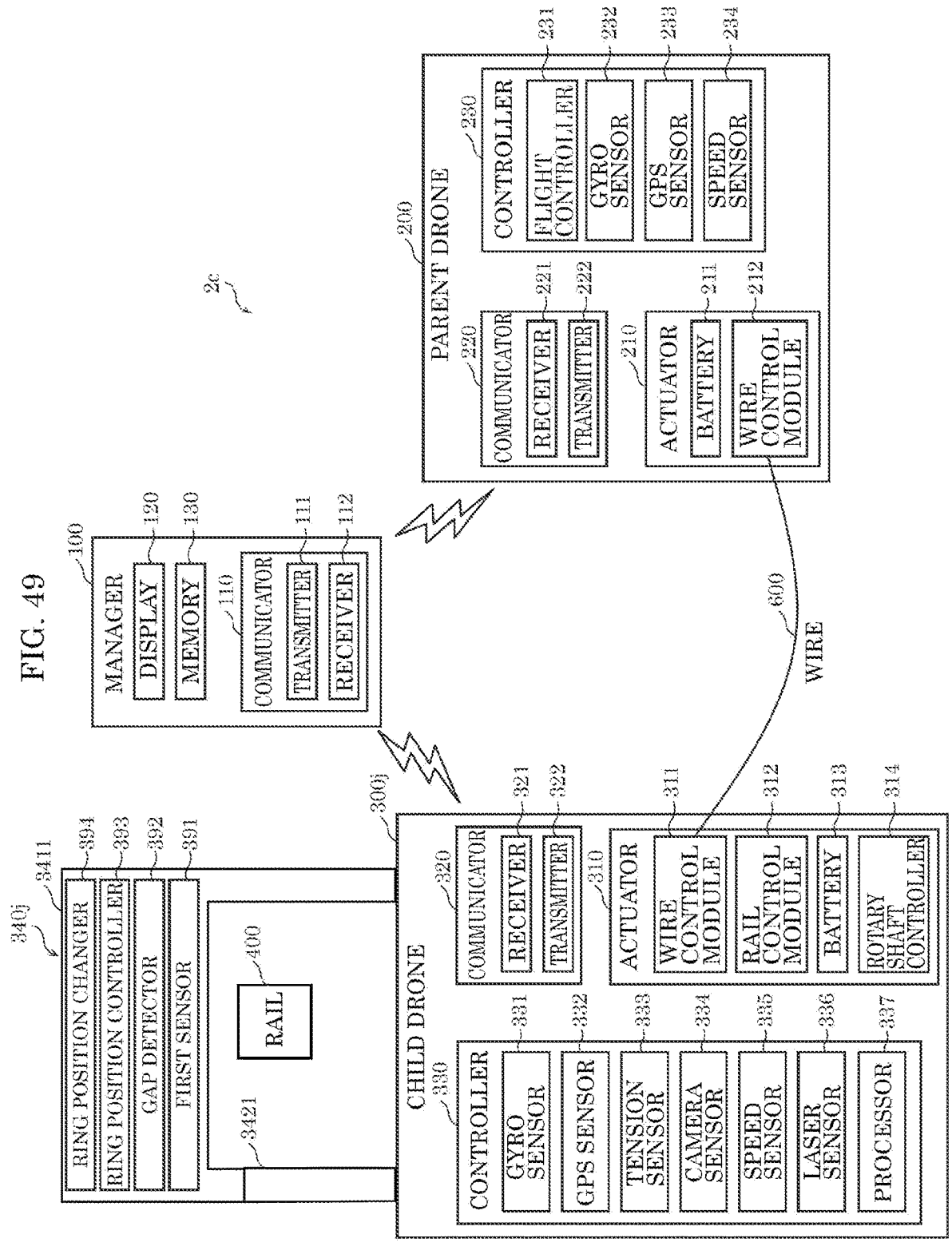
FIG. 49 is a block diagram illustrating a configuration of a flying system according to Variation 3 of Embodiment 4.
Figure 50:
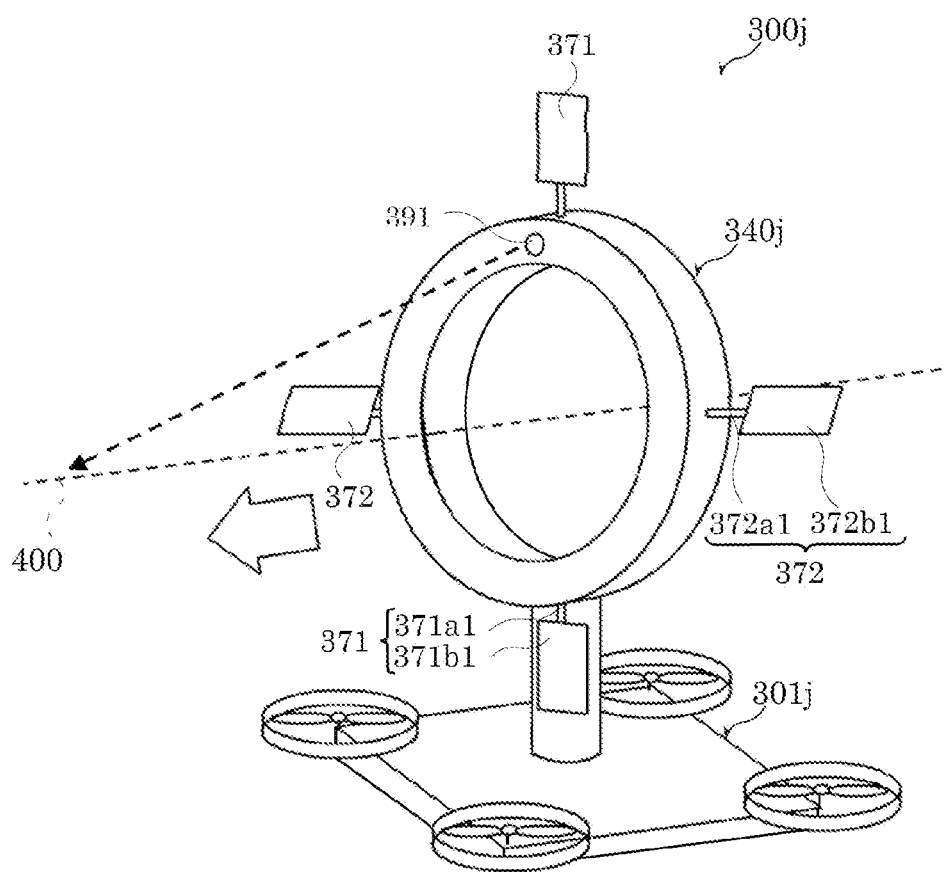
FIG. 50 is a schematic diagram illustrating an example of another child drone of the flying system according to Variation 3 of Embodiment 4.

FIG. 49 is a schematic diagram illustrating an example of another child drone 300j of flying system 2c according to Variation 3 of Embodiment 4. FIG. 50 is a schematic diagram illustrating an example of another child drone 300j of flying system 2c according to Variation 3 of Embodiment 4.

As illustrated in FIGS. 49 and 50, in the present variation, child drone 300j further includes first sensor 391, gap detector 392, ring position controller 393, and ring position changer 394. A pair of yaw wings 371, a pair of pitch wings 372, first sensor 391, gap detector 392, ring position controller 393, and ring position changer 394 are provided on arm 340j of child drone 300j.

The pair of yaw wings 371 are provided on an outer peripheral portion of arm 340j. The pair of yaw wings 371 are disposed on arm 340j so as to be symmetric in the vertical direction. Each of the pair of yaw wings 371 includes first shaft portion 371a1 having an axis extending in the vertical direction and first vane portion 371b1 that is pivotably supported by first shaft portion 371a1. Each first vane portion 371b1 rotates about an axis extending in the vertical direction.

The pair of pitch wings 372 are provided on an outer peripheral portion of arm 340j. The pair of pitch wings 372 are disposed on arm 340j so as to be symmetric in the horizontal direction. Each of the pair of pitch wings 372 includes second shaft portion 372a1 having an axis extending in the horizontal direction and second vane portion 372b1 pivotably supported by second shaft portion 372a1. Each second vane portion 372b1 rotates about an axis extending in the horizontal direction.

First sensor 391 captures an image of rail 400 and the ring when the ring is to be coupled to rail 400, for example. First sensor 391 outputs the captured image information to gap detector 392. In the present variation, first sensor 391 is a camera sensor and does not measure the distance directly. The position of first sensor 391 illustrated in FIG. 50 is merely an example. First sensor 391 may be disposed in a lower side, a left side, a right side, and so on of the ring. The number of first sensor 391 is not limited to one, and a plurality of first sensors 391 may be provided. For example, first sensor 391 may be provided at least four positions including the upper side, the lower side, the left side, and the right side of the ring.

Gap detector 392 calculates a first distance between rail 400 and the ring based on the image information captured by first sensor 391. Gap detector 392 outputs distance information indicating the calculated first distance to ring position controller 393.

Ring position controller 393 controls ring position changer 394 based on the first distance such that the ring can be coupled to rail 400 appropriately. Ring position changer 394 is, for example, an electric motor.

Ring position changer 394 changes the attitude of arm 340j so that the ring can be coupled to rail 400 appropriately. Ring position changer 394 controls pitch wings 372 and so on such that the attitude of child drone main body 301j becomes inclined relative to the horizontal direction when child drone 300j flies with child drone main body 301j being coupled to rail 400. Specifically, ring position controller 393 controls the pivoting movement of second vane portion 372b1 of each of the pair of pitch wings 372 by actuating ring position changer 394. Ring position controller 393 controls yaw wings 371 and so on so that the attitude of child drone main body 301j becomes inclined relative to the vertical direction by actuating ring position changer 394. Specifically, ring position controller 393 controls the pivoting movement of second vane portion 372b1 of each of the pair of pitch wings 372 by actuating ring position changer 394.

In this example, ring position changer 394 may also be capable of extending or retracting arm 340j out of or into child drone main body 301j. In other words, ring position changer 394 may adjust the length of support portion 344.

With this configuration, steering the four wings makes it possible to steer the traveling direction of the flying body freely, and thus the flying body can move stably.

Variation 4 of Embodiment 4

In the following, a method of controlling a flying body and basic configurations of the flying body and of flying system 2d according to the present variation are identical to the basic configurations described in Embodiment 1 and so on. Therefore, the descriptions of the method of controlling a flying body and the basic configurations of the flying body and of flying system 2d according to the present variation will be omitted as appropriate.

Figure 51:
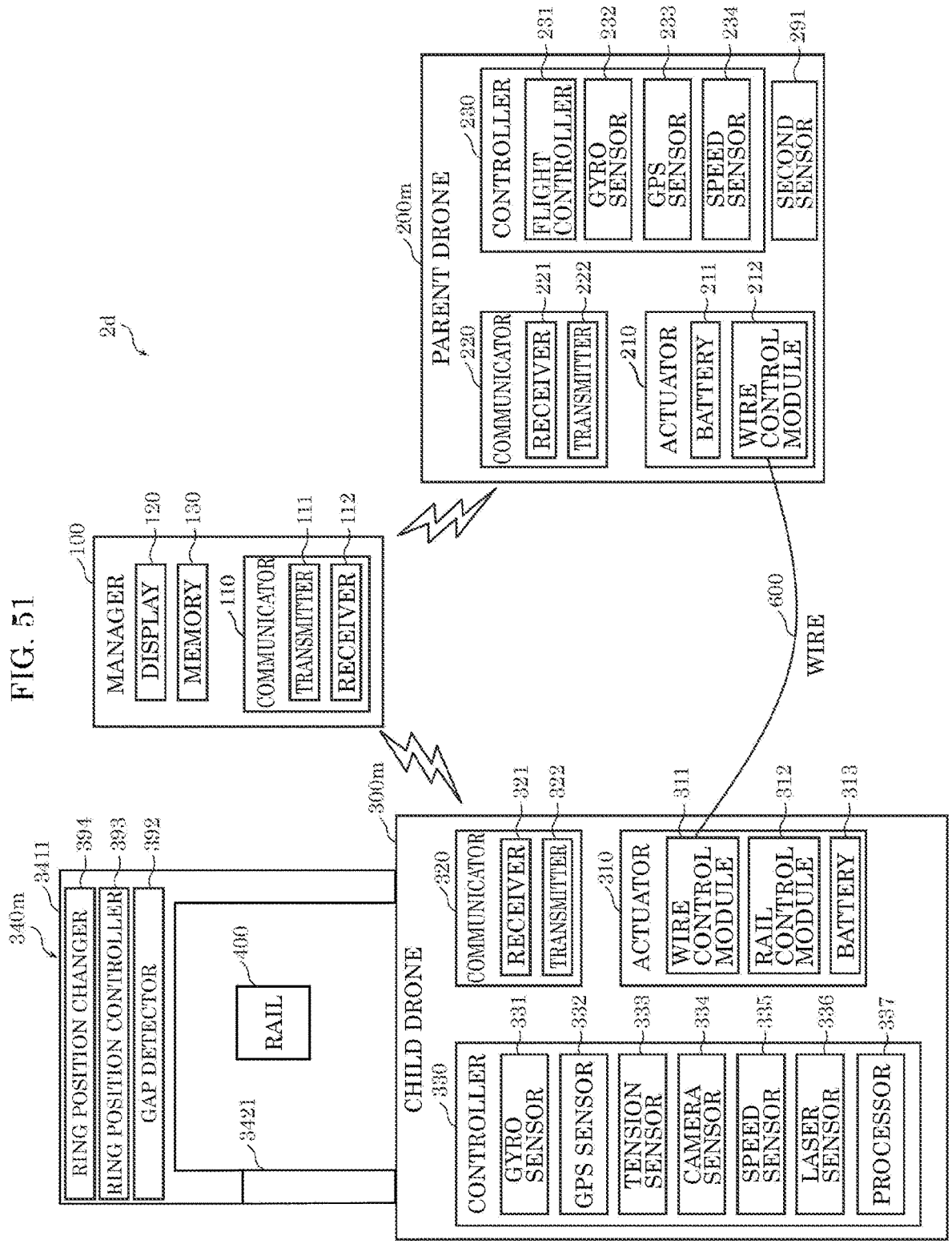
FIG. 51 is a block diagram illustrating a configuration of a flying system according to Variation 4 of Embodiment 4.

FIG. 51 is a block diagram illustrating a configuration of flying system 2d according to Variation 4 of Embodiment 4.

As illustrated in FIG. 51, in the present variation, arm 340m of child drone 300m does not include a first sensor. Instead, parent drone 200m may include second sensor 291. Second sensor 291 may have a configuration similar to that of the first sensor.

Second sensor 291 measures a second distance between rail 400 and the ring of arm 340m. Second sensor 291 may be provided on at least a left side portion or a right side portion of the ring of arm 340m with respect to the traveling direction of child drone 300m. Second sensor 291 transmits second distance information indicating the measured second distance to child drone 300m via communicator 220. Second sensor 291 may be similar to a gap detector.

Ring position controller 393 acquires the received second distance information. Ring position controller 393 controls parent drone 200m so as to move parent drone 200m to the right or the left with respect to the traveling direction of parent drone 200m in accordance with the second distance indicated by the second distance information. At this point, ring position controller 393 determines whether the second distance is greater than a predetermined value.

Specifically, if the second distance is greater than the predetermined value while second sensor 291 is provided in the left side portion of the ring with respect to the traveling direction or if the second distance is smaller than or equal to the predetermined value while second sensor 291 is provided in the right side portion of the ring with respect to the traveling direction, ring position controller 393 controls ring position changer 394 so as to move child drone 300m in the right direction with respect to the traveling direction. Specifically, ring position changer 394 rotates first vane portions 371b1 of yaw wings 371 to the right, and this operation causes arm 340m of child drone 300m to move in the right direction with respect to the traveling direction.

Specifically, if the second distance is smaller than or equal to the predetermined value while second sensor 291 is provided in the left side portion of the ring with respect to the traveling direction or if the second distance is greater than the predetermined value while second sensor 291 is provided in the right side portion of the ring with respect to the traveling direction, ring position controller 393 controls ring position changer 394 so as to move child drone 300m in the left direction with respect to the traveling direction. Specifically, ring position changer 394 rotates second vane portions 372b1 of pitch wings 372 to the left, and this operation causes arm 340m of child drone 300m to move in the left direction with respect to the traveling direction.

Although not illustrated in the drawings, arm 340m of child drone 300m may include the first arm and the second arm described above, and the opening of the first arm may be opened or closed by sliding and moving the second arm.

In the method of controlling a flying body according to the present variation as described above, the other flying body includes a second sensor that measures a second distance between the rail and the ring, and the flying body is moved to the right or the left with respect to the traveling direction in accordance with the second distance.

This configuration allows the flying body to move appropriately along the rail without the arm making contact with the rail when the flying body moves with the arm being coupled to the rail.

The flying body according to the present variation further includes a second sensor that measures a second distance between the rail and the ring. The second sensor is provided in a left side portion or a right side portion of the ring with respect to the traveling direction of the flying body.

In the method of controlling a flying body according to the present variation, the second sensor is provided in a left side portion of the ring with respect to the traveling direction of the flying body. The flying body is moved in the right direction with respect to the traveling direction if the second distance is greater than a predetermined value, or the flying body is moved in the left direction with respect to the traveling direction if the second distance is smaller than or equal to the predetermined value.

This configuration makes it possible to control the traveling of the flying body so as to secure a certain distance between the ring and rail and to keep the ring from making contact with the rail when the right side or the left side of the ring of the arm of the flying body comes too close to the rail. Therefore, the possibility that the ring makes contact with the rail while the flying body is flying is reduced.

In the method of controlling a flying body according to the present variation, the second sensor may be provided in the right side portion of the ring with respect to the traveling direction of the flying body. In this case, in the method of controlling a flying body, the flying body may be moved in the left direction with respect to the traveling direction if the second distance is greater than a predetermined value, or the flying body may be moved in the right direction with respect to the traveling direction if the second distance is smaller than or equal to the predetermined value.

Embodiment 5

In the following, a method of controlling a flying body and basic configurations of the flying body and of a flying system according to the present embodiment are identical to the basic configurations described in Embodiment 1 and so on. Therefore, the descriptions of the method of controlling a flying body and the basic configurations of the flying body and of the flying system according to the present embodiment will be omitted.

In the flying system according to the present embodiment, no parent drone is provided. The following description adopts the reference characters indicated in FIG. 53 described later. Child drone 3000 includes first extension arm 5340a and second extension arm 5340b.

First extension arm 5340a and second extension arm 5340b have similar configurations. First extension arm 5340a and second extension arm 5340b are connected to the child drone main body via wires 611a and 611b, respectively, and are capable of taking up or letting out wires 611a and 611b, respectively. Child drone 3000 includes wires 611a and 611b that connect, respectively, first extension arm 5340a and second extension arm 5340b to the child drone main body. Child drone 3000 further includes wire actuation controllers that control the lengths of respective wires 611a and 611b by taking up or letting out respective wires 611a and 611b.

The wire actuation controllers each have a configuration similar to the configuration of the wire control module. The wire actuation controllers adjust the lengths of wires 611a and 611b in accordance with the distance between child drone 3000 and the rail under the control of the processor.

[Operation]

Now, the method of controlling a flying body and operations of the flying body and of the flying system according to the present embodiment will be described.

Figure 52:
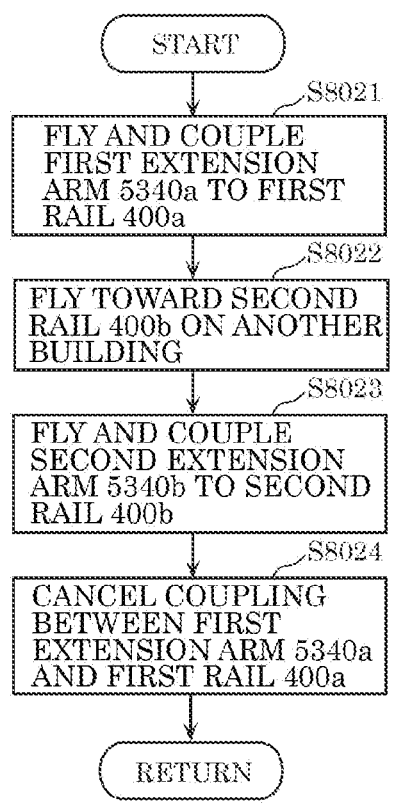
FIG. 52 is a flowchart illustrating an example of how a flying system operates along a route from a sender to a destination point of a receiver according to Embodiment 5.
Figure 53:
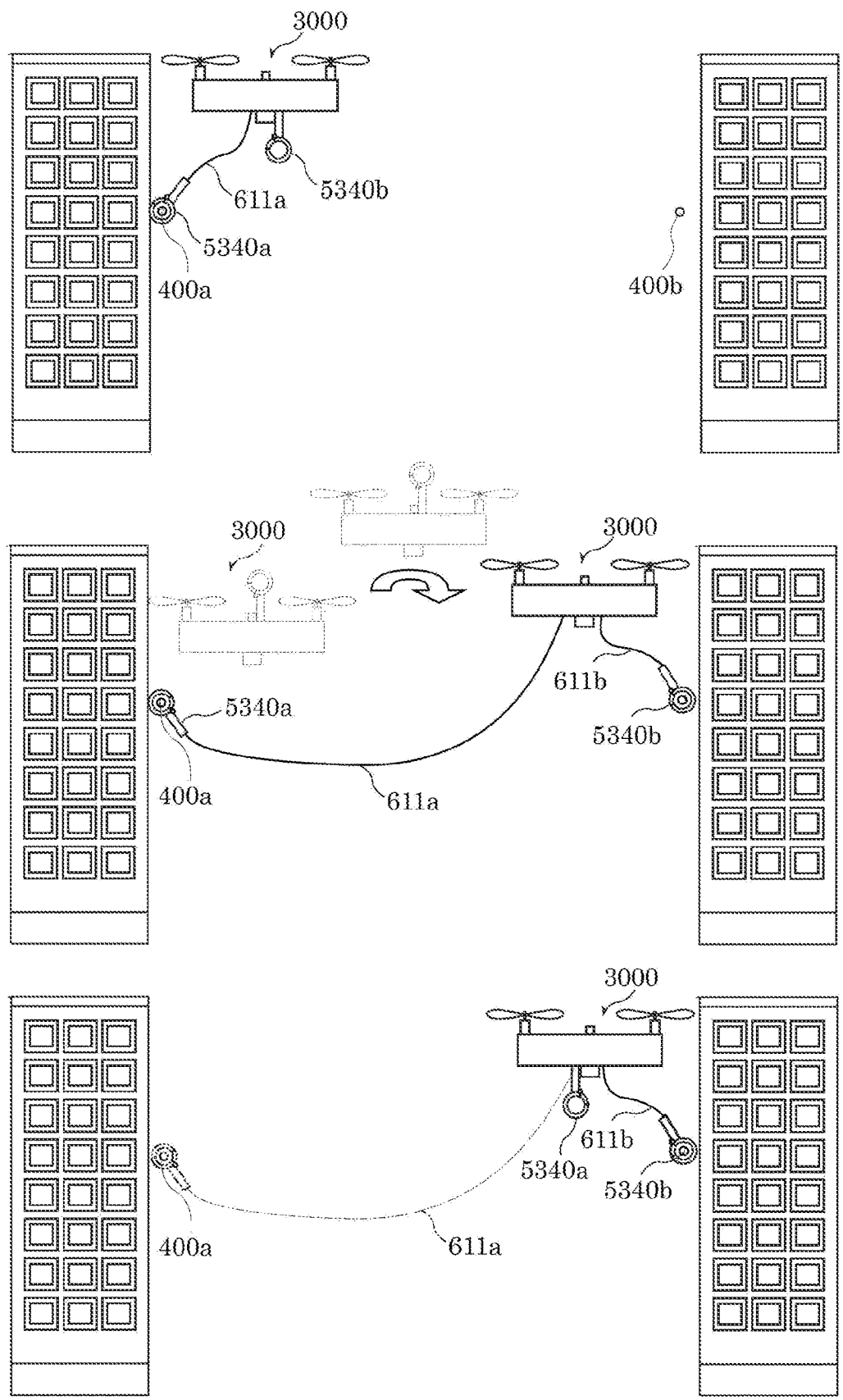
FIG. 53 is a schematic diagram illustrating an example of how the flying system operates along a route from a sender to a destination point of a receiver according to Embodiment 5.

FIG. 52 is a flowchart illustrating an example of how the flying system is operated along a route from a sender to a destination point of a receiver according to Embodiment 5. FIG. 53 is a schematic diagram illustrating an example of how the flying system operates along a route from a sender to a destination point of a receiver according to Embodiment 5.

The present embodiment assumes a case where a load is delivered from a sender to a receiver via first rail 400a installed on a building.

As illustrated in FIG. 52 and in (a) in FIG. 53, first, child drone 3000 flies toward first rail 400a installed on a building. Upon child drone 3000 approaching first rail 400*a*, child drone 3000 couples first extension arm 5340*a* to first rail 400*a* (S8021).

As illustrated in FIG. 52 and in (b) in FIG. 53, next, child drone 3000 flies toward second rail 400*b* on another building located in the vicinity of the building having first rail 400*a* to which first extension arm 5340*a* is coupled (S8022). At this point, child drone 3000 ascends once and flies toward second rail 400*b* on the other building so that wire 611*a* does not sag. Child drone 3000 flies toward second rail 400*b* on the other building with first extension arm 5340*a* being coupled to first rail 400*a*. At this point, the processor of child drone 3000 controls the wire control module so as to let out wire 611*a* connecting first extension arm 5340*a* and the child drone main body and thus adjusts the length of wire 611*a*. Then, upon child drone 3000 approaching second rail 400*b* on the other building, child drone 3000 couples second extension arm 5340*b* to second rail 400*b* (S8023).

Specifically, the processor actuates an electric motor so as to slide and move the second arm of second extension arm 5340*b* and opens the opening in the first arm. In this manner, child drone 3000 couples the arm to second rail 400*b*. Once the arm is coupled to second rail 400*b*, the processor stops the power supplied to the electric motor. This causes the second arm to close the opening in the first arm with the biasing force of the spring.

In this example, before child drone 3000 flies toward the other building, the processor of the controller may recognize, with a camera sensor or the like, the distance from the building to which first extension arm 5340*a* is currently coupled to the other building to which child drone 3000 is to couple second extension arm 5340*b*. Then, the processor of the controller may compare the sum total of the lengths of respective wires 611*b* of first extension arm 5340*a* and second extension arm 5340*b* against the distance to the other building and determine whether child drone 3000 can reach the other building.

As illustrated in FIG. 52 and in (c) in FIG. 53, next, child drone 3000 couples second extension arm 5340*b* to second rail 400*b* (e.g., child drone 3000 detects the coupling with the use of a first sensor or the like). Then, child drone 3000 ascends once so that wire 611*b* does not sag and then cancels the coupling between first extension arm 5340*a* and first rail 400*a*. The processor actuates the electric motor of first extension arm 5340*a* so as to slide and move the second arm to open the opening of the first arm (S8024). This causes first extension arm 5340*a* of child drone 3000 to become disengaged from first rail 400*a*. Once first extension arm 5340*a* becomes disengaged from first rail 400*a*, the processor causes the electric motor to stop the actuation force provided to the second arm of second extension arm 5340*b*. This causes the second arm to close the opening of the first arm with the biasing force of the spring.

In this manner, child drone 3000 moves from a sender to a receiver in accordance with a flying route as if child drone 3000 moves along a horizontal ladder by repeating steps S8021 to S8024.

Advantageous Effects

Now, some advantageous effects of the method of controlling a flying body and of the flying body according to the present embodiment will be described.

As described above, the method of controlling a flying body according to the present embodiment is a method of controlling a first flying body that flies in accordance with a flying route. The first flying body includes a main body that flies, a first extension arm having a ring through which a fixed first rail is to pass, a second extension arm having a ring through which a fixed second rail is to pass, a first wire to be coupled to the main body and to the first extension arm, and a second wire to be coupled to the main body and to the second extension arm. The method includes coupling the first extension arm to the first rail, causing the first flying body to fly toward the second rail while increasing the length of the first wire with the first extension arm being coupled to the first rail and coupling the second extension arm to the second rail, and canceling the coupling between the first extension arm and the first rail after the second extension arm has been coupled to the second rail.

With this configuration, since the first flying body is coupled to the first rail or the second rail, even if the first flying body has a mechanical failure, the possibility that the first flying body falls to the ground is reduced. Therefore, the above method of controlling a flying body provides high safety.

Embodiment 6

In the following, a method of controlling a flying body and basic configurations of the flying body and of a flying system according to the present embodiment are similar to the basic configurations described in Embodiment 1. Therefore, the descriptions of the method of controlling a flying body and the basic configurations of the flying body and of the flying system according to the present embodiment will be omitted as appropriate.

Parent drone 200 according to the present embodiment has a configuration similar to that of child drone 300. In other words, parent drone 200 also includes an arm, a processor that controls the arm, and so on.

[Operation]

Now, the method of controlling a flying body and operations of the flying body and of the flying system according to the present embodiment will be described.

Figure 54:
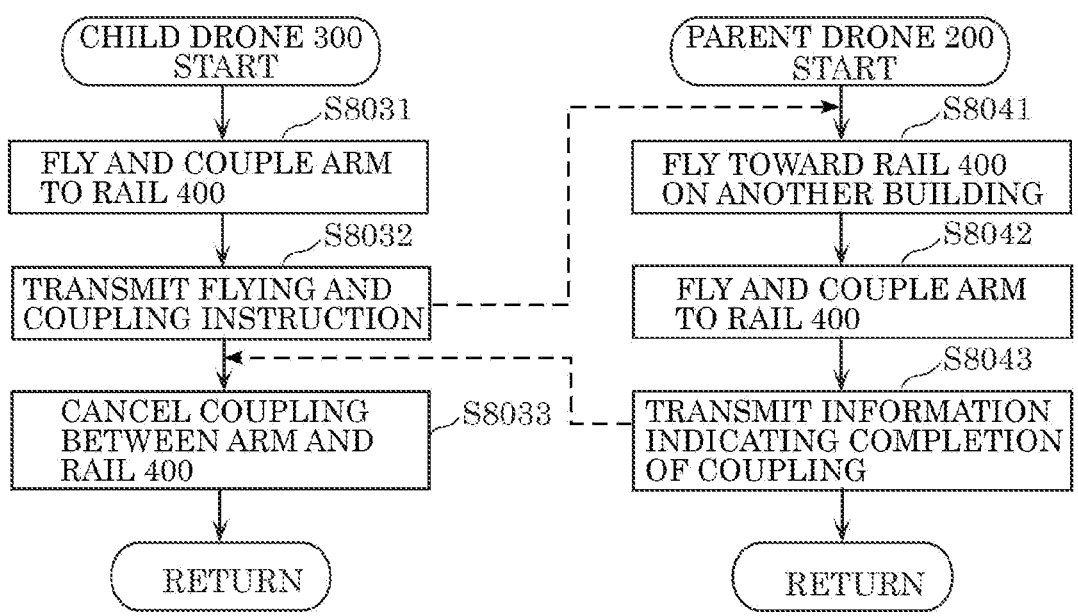
FIG. 54 is a flowchart illustrating an example of how a flying system operates along a route from a sender to a destination point of a receiver according to Embodiment 6.

FIG. 54 is a flowchart illustrating an example of how the flying system operates along a route from a sender to a destination point of a receiver according to Embodiment 6. A schematic diagram corresponding to FIG. 54 is similar to the schematic diagram illustrated in FIG. 53, and therefore the schematic diagram corresponding to FIG. 54 is omitted.

The present embodiment assumes a case where a load is delivered from a sender to a receiver via rail 400 installed on a building.

As illustrated in FIG. 54, first, child drone 300 and parent drone 200 fly toward rail 400 installed on a building. Upon child drone 300 approaching rail 400, child drone 300 couples the arm to rail 400 (S8031). Child drone 300 transmits a flying and coupling instruction to parent drone 200 (S8032).

Next, in response to receiving the flying and coupling instruction, parent drone 200 flies toward rail 400 on another building located in the vicinity of the building having rail 400 to which child drone 300 is connected (S8041). With child drone 300 being coupled to rail 400 on the building, parent drone 200 flies away from child drone 300 and toward the other building. At this point, the processor of child drone 300 controls the wire control module so as to let out a wire. Then, upon approaching rail 400, parent drone 200 couples its arm to rail 400 (S8042).

Specifically, the processor actuates an electric motor so as to slide and move the second arm to open the opening of the first arm. Thus, child drone 300 couples its arm to rail 400. Once the arm is coupled to rail 400, the processor stops the power supplied to the electric motor. This causes second arm to close the opening of the first arm with the biasing force of the spring.

In this example, before parent drone 200 flies toward the other building, the processor of the controller may recognize, with a camera sensor or the like, the distance from the building to which child drone 300 is currently coupled to the other building to which parent drone 200 is going to couple itself. Then, the processor of the controller may compare the length of rail 400 against the distance to the other building and determine whether parent drone 200 can reach the other building.

Next, upon the arm of parent drone 200 being coupled to rail 400, parent drone 200 transmits information indicating completion of coupling to child drone 300 (S8043).

Next, upon child drone 300 receiving the information indicating the completion of coupling, the processor of child drone 300 cancels the coupling between the arm and rail 400 (S8033). The processor actuates the electric motor so as to slide and move the second arm to opens the opening of the first arm. This causes child drone 300 to become disengaged from rail 400. Once the arm becomes disengaged from rail 400, the processor causes the electric motor to stop the actuation force provided to the second arm of the arm. This causes the second arm to closes the opening of the first arm with the biasing force of the spring.

In this manner, parent drone 200 and child drone 300 move from a sender to a receiver by repeating, respectively, steps S8031 to S8033 and steps S8041 to S8043.

Advantageous Effects

Now, some advantageous effects of the method of controlling a flying body and of the flying body according to the present embodiment will be described.

As described above, the method of controlling a flying body according to the present embodiment is a method of controlling a flying body by controlling a first flying body and a second flying body coupled to the first flying body via a coupling line, and the first flying body and the second flying body fly in accordance with a flying route. The first flying body and the second flying body each include an arm having a ring through which a fixed rail is to pass. The method includes coupling the first flying body to the rail, causing the second flying body to fly toward another rail while increasing the length of the coupling line and coupling the arm of the second flying body to the other rail after the first flying body has coupled itself to the rail, and canceling the coupling between the arm of the first flying body and the rail after the second flying body has coupled its arm to the other rail.

With this configuration, since at least one of the first flying body or the second flying body is coupled to a rail, even if the first flying body or the second flying body has a mechanical failure, the possibility that the first flying body or the second flying body falls to the ground is reduced. The first flying body and the second flying body move along the flying route as if they move along a horizontal ladder. Therefore, the above method of controlling a flying body provides high safety.

Embodiment 7

In the following, basic configurations of drone 701 and of delivery system 3a according to the present embodiment are identical to the basic configurations of the drones and of the flying systems according to Embodiment 1 and so on. Therefore, the descriptions of the basic configurations of drone 701 and of delivery system 3a according to the present embodiment are omitted as appropriate, and mainly the differences from Embodiment 1 and so on will be described.

Figure 55:
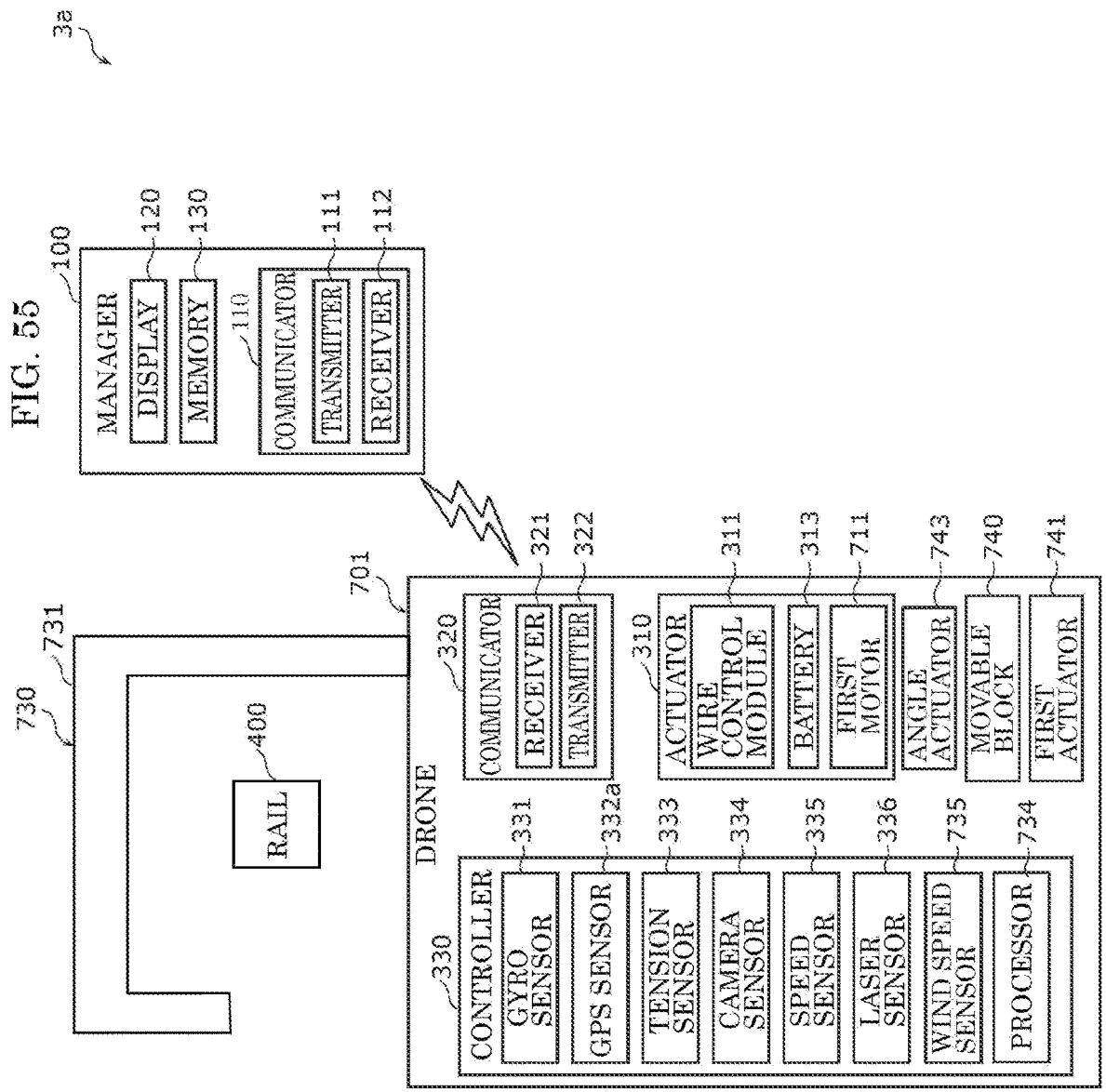
FIG. 55 is a block diagram illustrating a configuration of a delivery system according to Embodiment 7.
Figure 56:
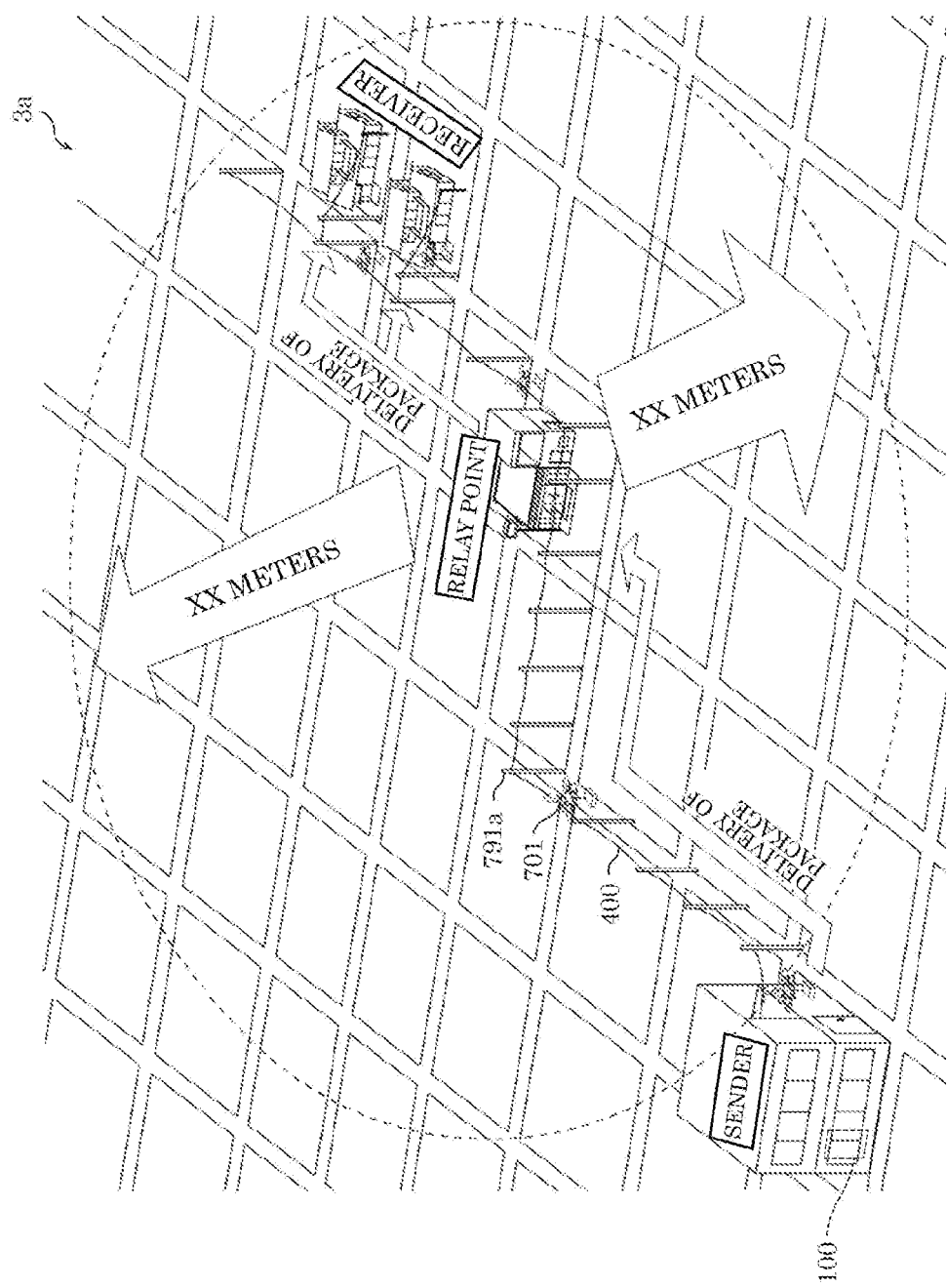
FIG. 56 is an image diagram illustrating an example of how a drone of the delivery system delivers a package from a sender to a receiver according to Embodiment 7.

FIG. 55 is a block diagram illustrating a configuration of delivery system 3a according to Embodiment 7. FIG. 56 is an image diagram illustrating an example of how drone 701 of delivery system 3a delivers a package from a sender to a receiver according to Embodiment 7.

As illustrated in FIGS. 55 and 45, delivery system 3a includes drone 701, manager 100, a plurality of support pillars 791a, and rail 400.

Delivery system 3a is a system capable of delivering a package, serving as a load, from a sender to a receiver with the use of drone 701. Drone 701 is an example of an unmanned aerial vehicle.

In the present embodiment, a sender is a distribution center, which is, for example but not limited to, a facility of a deliver service agent or a convenience store serving as a relay point. A receiver is a party that receives a package, that is, a party to which a package is to be delivered. A receiver is, for example but not limited to, a home or a convenience store serving as a relay point. A relay point is, but is not limited to, a convenience store or a facility attached to a convenience store.

In one example, in a case where a sender is a distribution center, mid-sized drone 701 is used to deliver a large number of packages from the distribution center to a relay point, and small-sized drone 701 is used from the relay point to a home serving as a receiver. In this case, mid-sized drone 701 delivers a large number of packages from the distribution center to the relay point, and small-sized drone 701 is used to deliver the packages from the relay point to individual homes.

Delivery system 3a according to the present embodiment may mainly make short-distance deliveries. For example, a short distance refers to a distance of about several hundred meters from a sender to a receiver. Drone 701 moves within a range in the radius of several hundred meters from a sender. In the present embodiment, the range is within a radius of less than or equal to about 500 or within a radius of less than or equal to about 1,000 meters. In the present embodiment, an assumption is that the range is within a radius of about 400 meters.

[Configuration of Drone 701]

Drone 701 of delivery system 3a acquires, from manager 100 of a sender, route information indicating a flying route from the sender to a receiver indicated in map data. Drone 701 delivers a loaded package from the sender to the receiver in accordance with the route information acquired from manager 100.

Figure 57:
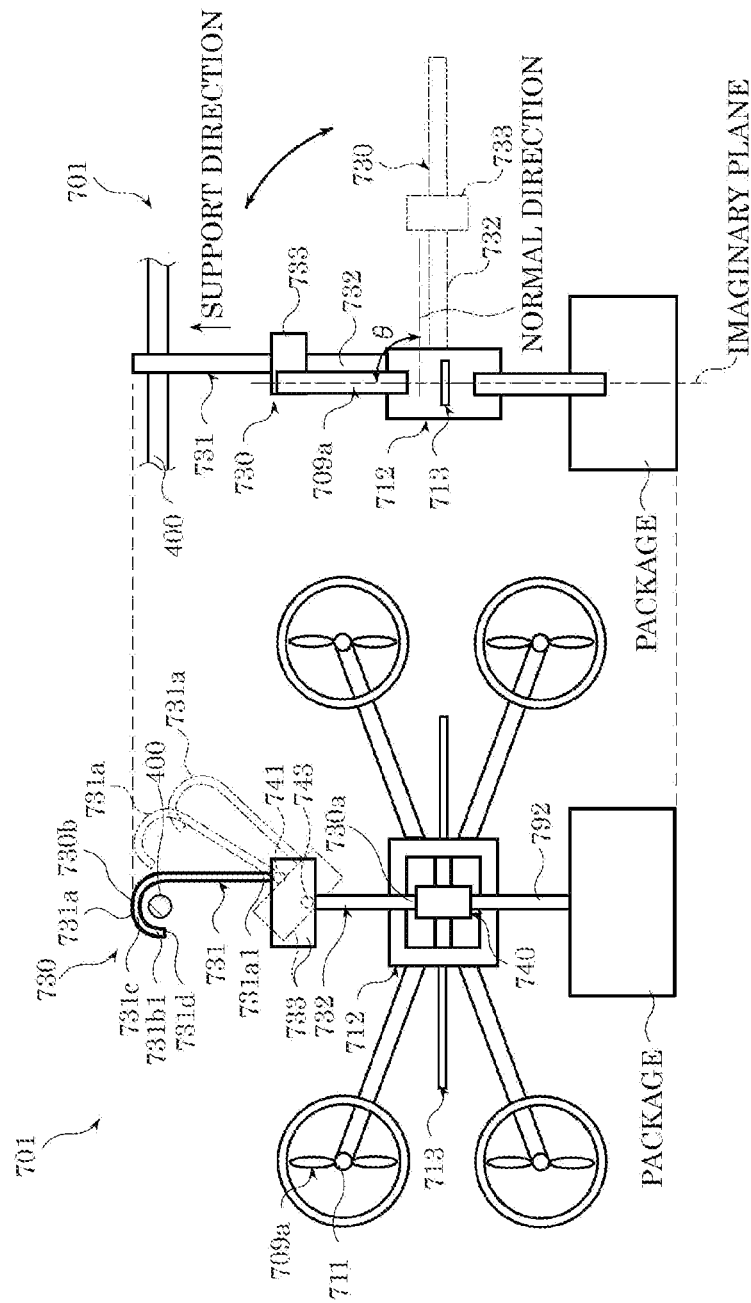
FIG. 57 illustrates a front view and a side view of a drone of the delivery system according to Embodiment 7.

FIG. 57 illustrates a front view and a side view of drone 701 of delivery system 3a according to Embodiment 7. Specifically, FIG. 57 illustrates a front view and a side view of drone 701 having an attitude that puts a direction in which connector 730 extends to be substantially orthogonal to a normal direction of an imaginary plane.

As illustrated in FIGS. 55 and 57, drone 701 includes a plurality of propellers 709a, a plurality of first motors 711, main body 712, a pair of wings 713, connector 730, movable block 740, and controller 330.

The plurality of first motors 711 are provided for respective propellers 709a. The plurality of propellers 709a rotate about the rotary shafts of respective first motors 711 as each first motor 711 is rotationally driven, and this provides a propulsive force to main body 712 of drone 701. Propellers 709a are each an example of a rotary wing. The plurality of propellers 709a are fixed to main body 712. In the present embodiment, main body 712 has a rectangular shape as viewed in a plan view. Therefore, the plurality of propellers 709a are disposed at the respective corner portions of main body 712.

The plurality of first motors 711 are electric motors that rotate respective propellers 709a. Each first motor 711 is actuated and controlled by processor 734 of controller 330.

Main body 712 is the main body of drone 701 that supports the plurality of first motors 711, the plurality of propellers 709a, the pair of wings 713, connector 730, and so on. Main body 712 houses controller 330, communicator 320, actuator 310, and so on.

The pair of wings 713 are provided on an outer peripheral portion of main body 712. The pair of wings 713 function as the pair of yaw wings or the pair of pitch wings described above. In this example, the pair of yaw wings and the pair of pitch wings described above may be provided on an outer peripheral portion of main body 712.

Connector 730 can be connected to rail 400 located at a position spaced apart from the ground surface with main body 712 hanging from connector 730. Connector 730 is an elongated supporting and connecting member that extends in a direction (a vertically upward direction) away from main body 712.

Connector 730 includes first end 730a and second end 730b.

First end 730a is the end of connector 730 that faces main body 712. First end 730a is swingably supported by main body 712 and is connected to main body 712. Second end 730b is the end opposite to first end 730a. Second end 730b can be slidably connected to rail 400.

Connector 730 includes first arm 731, support portion 732, base 733, angle actuator 743, and first actuator 741.

First arm 731 is connected to one end of support portion 732. First arm 731 according to the present embodiment is connected to support portion 732 via base 733. First arm 731 is a hanger for hanging drone 701 from rail 400.

First arm 731 includes first hook 731a.

First hook 731a extends from first connected end 731a1 connected to first actuator 741 to first open end 731b1 on the other end. First hook 731a includes first bent portion 731c that is bent in a first direction and that is located between first connected end 731a1 and first open end 731b1. First hook 731a has, for example but not limited to, a substantially C-like shape, a substantially F-like shape, a substantially J-like shape, or a substantially U-like shape in which a part of the ring-shaped outer shell portion is missing as viewed in the traveling direction of drone 701. The portion cut out from the outer shell portion constitutes opening 731d of first hook 731a through which rail 400 can enter the space enclosed by first hook 731a. Opening 731d lies between first open end 731b1 and first connected end 731a1. First hook 731a corresponds to second end 730b of connector 730. In this example, first hook 731a may be provided with a wheel that allows first hook 731a to make contact with and freely rotate on rail 400 as described above.

One end of support portion 732 is swingably connected to main body 712, and the other end of support portion 732 is connected to first arm 731 via base 733. Thus, support portion 732 supports first arm 731 on main body 712. In the present embodiment, support portion 732 swings ±90 degrees relative to the attitude that is upright with respect to main body 712. Support portion 732 is an elongated support pillar that extends in a direction away from main body 712. The portion where support portion 732 and main body 712 are connected to each other corresponds to first end 730a.

Base 733 is where support portion 732 and first arm 731 are connected to each other. Base 733 is a support member that is disposed between support portion 732 and first arm 731 and that supports first arm 731. Base 733 is connected to first connected end 731a1 of first arm 731 and the other end of support portion 732. Angle actuator 743 is provided in base 733.

Angle actuator 743 can cause base 733 to swing relative to support portion 732 by changing the angle of base 733 relative to the direction in which support portion 732 extends (or relative to main body 712). Angle actuator 743 is an example of a third actuator.

First actuator 741 sets the angle of first hook 731a relative to support portion 732. First actuator 741 is disposed between support portion 732 and first hook 731a and swingably supports first connected end 731a1 of first hook 731a. In the present embodiment, first actuator 741 is disposed in base 733.

In this example, connector 730 may be the arm according to any one of Embodiments 1 to 6 and their variations described above, and it is needless to say that these arms can be applied to drone 701 according to the present embodiment. For example, first arm 731 may include an opening and closing member that opens or closes opening 731d. With this configuration, after first arm 731 has become connected to rail 400, opening 731d may be closed so that first arm 731 does not become disengaged from rail 400.

Movable block 740 sets the inclination of the imaginary plane that contains the plurality of propellers 709a relative to the support direction in which connector 730 is supported on rail 400. Movable block 740 may be an actuator that can actively change the inclination in response to an instruction from processor 734. Alternatively, movable block 740 may be a rotatable member that can passively change the inclination by utilizing the rotary force exerted on main body 712 that is produced due to the difference among the rotation rates of the plurality of first motors 711. Movable block 740 is disposed between main body 712 and connector 730. Alternatively, movable block 740 may be housed in main body 712. The support direction is the direction that extends from first end 730a toward second end 730b of connector 730 and is also the direction in which support portion 732 extends.

Movable block 740 can control the attitude of support portion 732 with respect to main body 712 by causing the one end of support portion 732 supported on main body 712 to swing about an axis of movable block 740. In this example, the imaginary plane is substantially parallel to the horizontal direction when main body 712 has the horizontal attitude and is substantially parallel to the vertical direction when main body 712 has the upright attitude.

Controller 330 includes wind speed sensor 735 in addition to camera sensor 334, processor 734, and so on.

Wind speed sensor 735 is a sensor that detects the wind speed in the surroundings of drone 701. Wind speed sensor 735 mainly detects the wind speed in the surroundings of drone 701 while drone 701 is hovering. To be more specific, wind speed sensor 735 detects the wind speed in the surroundings of drone 701 when wire control module 311 lets out hanging wire 792 for hanging a package under the control of processor 734. Wind speed sensor 735 outputs, to processor 734, wind speed information indicating the wind speed in the surroundings of drone 701. Wire control module 311 is an example of a lift motor.

Controller 330 includes camera sensor 334. Camera sensor 334 is provided on main body 712 and can capture an image of a package and a delivery box from the above.

Camera sensor 334 captures an image of a package and a delivery box and outputs image information including the captured image to processor 734. For example, the image information includes information indicating, for example but not limited to, the relative positions of (i.e., the distance between) the package and the delivery box, the distance from main body 712 to the package, the distance from main body 712 to the delivery box, and the height of an opening in the delivery box from the ground surface. Camera sensor 334 may be, for example but not limited to, a time-of-flight (TOF) camera or a range finding sensor. The delivery box is an example of a storage device.

Controller 330 includes processor 734. Processor 734 is a control device that controls the plurality of first motors 711, movable block 740, first actuator 741, and so on. Processor 734 is provided in controller 330. Alternatively, processor 734 may be a device separate from controller 330, and the present embodiment is not limiting. Processor 734 is an example of a control circuit.

When connector 730 is to be connected to rail 400, processor 734 recognizes rail 400 indicated in the image information acquired from camera sensor 334 or the like and then connects connector 730 to rail 400.

When connector 730 is to be disengaged from rail 400, processor 734 actuates first actuator 741 so as to tilt connector 730 relative to the normal direction of the imaginary plane. Processor 734 controls first actuator 741 so as to increase the angle of the direction in which connector 730 extends relative to the normal direction, and this causes connector 730 to become disengaged from rail 400. Processor 734 can change the angle of base 733 relative to the direction in which support portion 732 extends by controlling angle actuator 743. Thus, processor 734 can raise first hook 731a, cause first hook 731a to swing, and disengage first hook 731a from rail 400. In this example, processor 734 may disengage connector 730 from rail 400 by controlling first actuator 741, movable block 740, and so on. Processor 734 may disengage connector 730 from rail 400 by causing drone 701 to swing or by changing the flying altitude of drone 701.

When first hook 731a of connector 730 is connected to rail 400, processor 734 (i) sets the rotation rate of the plurality of first motors 711 to the rotation rate that is lower than the minimum rotation rate necessary for causing drone 701 to float and that is higher than the minimum rotation rate necessary for propelling drone 701 in the direction in which rail 400 extends and (ii) causes movable block 740 to increase angle θ formed by the normal direction of the imaginary plane relative to the support direction of connector 730.

In (i), processor 734 controls the rotation rate of each first motor 711 while maintaining an appropriate speed that allows drone 701 to move along rail 400. For example, processor 734 controls the movement of drone 701 while keeping connector 730 from making contact with rail 400. Processor 734 adjusts the speed of drone 701 or adjusts the distance between rail 400 and first hook 731a by adjusting this angle θ. In (ii), the attitude of drone 701 approaches the upright attitude as processor 734 increases angle θ, which in turn increases the propulsive power of drone 701. Hence, the speed of drone 701 increases.

For example, in (ii), processor 734 controls the rotation rate of the plurality of first motors 711 so as to set angle θ to greater than 15 degrees, greater than 45 degrees, greater than 65 degrees, or greater than 80 degrees.

The operation in (i) may be executed before or after the operation in (ii). Alternatively, at least a part of each of the operations may be executed in parallel.

Processor 734 disengages connector 730 from rail 400 if the speed of drone 701 provided by the propelling force exceeds a predetermined value after angle θ has been increased by first actuator 741. In other words, if processor 734 is to raise the speed of drone 701 higher than the predetermined value, processor 734 disengages connector 730 from rail 400, increases the rotation rate of the plurality of first motors 711, and raises the speed of drone 701. Processor 734 determines whether the speed is higher than the predetermined value by acquiring the speed information from speed sensor 335.

If connector 730 has been disengaged from rail 400, processor 734 causes movable block 740 to reduce angle θ and controls the rotation rate of the plurality of first motors 711 so as to achieve a rotation rate that is higher than the minimum rotation rate necessary for causing drone 701 to float. For example, processor 734 increases the rotation rate of the plurality of first motors 711 and thus raises the speed or the flying altitude of drone 701.

While processor 734 is letting out hanging wire 792, processor 734 adjusts (corrects) the position of drone 701 in accordance with the position of the package relative to the delivery box. Specifically, upon acquiring the wind speed information from wind speed sensor 735 and the image information, processor 734 recognizes, for example but not limited to, the relative positions of (the distance between) the delivery box and the package indicated in the image information and the orientation of the opening of the delivery box relative to the package. For example, when the position of the package is displaced in a third direction from the position vertically above the delivery box, processor 734 moves drone 701 in a fourth direction opposite the third direction along the direction in which rail 400 extends. In this manner, processor 734 corrects the position of drone 701.

[Operation]

Next, operations of drone 701 and delivery system 3a according to the present embodiment will be described. With regard to these operations, operations performed from when hanging wire 792 is let out upon drone 701 reaching a destination point to when a package serving as a load is cut off will be described.

Figure 58:
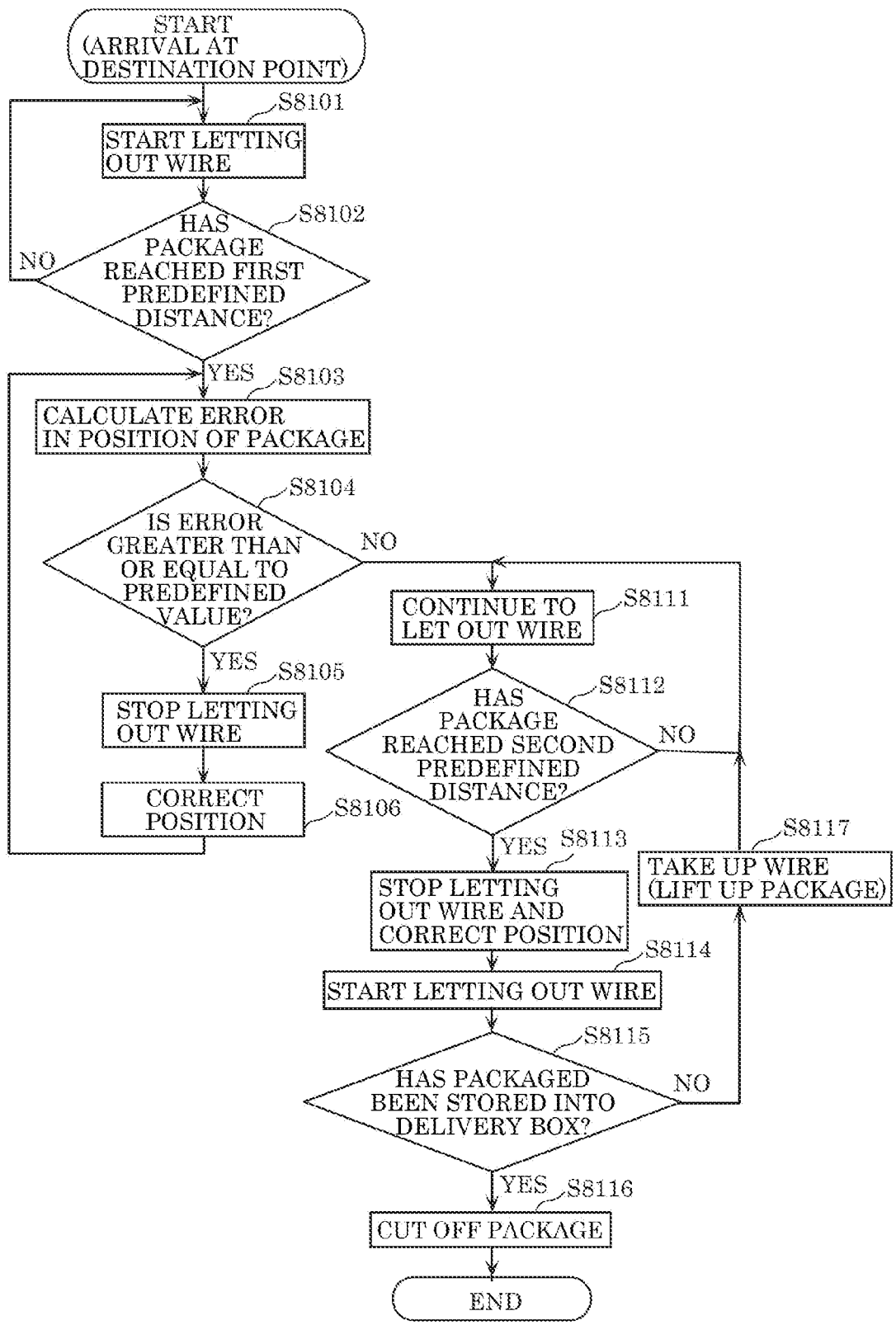
FIG. 58 is a flowchart illustrating an example of an operation of the delivery system according to Embodiment 7.

FIG. 58 is a flowchart illustrating an example of an operation of delivery system 3a according to Embodiment 7.

As illustrated in FIGS. 55 to 58, first, with connector 730 being connected to rail 400, drone 701 arrives at (is positioned at) a position vertically above a delivery box serving as a receiver. Then, processor 734 controls wire control module 311 so as to start letting out hanging wire 792 (S8101). Thus, the package is lowered. At this point, processor 734 acquires image information from camera sensor 334 and calculates the distance between the package and the delivery box.

Next, processor 734 determines whether the distance between the package and the delivery box has reached a first predefined distance (S8102). The first predefined distance is, for example but not limited to, one half or one third of the distance from main body 712 to the delivery box. The first predefined distance may be such a distance that allows processor 734 to calculate an error in the position of the package relative to the delivery box. Therefore, the first predefined distance is not limited to one half one third, or the like of the distance from main body 712 to the delivery box. In this example, processor 734 may control wire control module 311 so as to lower the package at a first speed at which hanging wire 792 is let out at a high speed. Processor 734 may lower the package at the first speed for a period from when hanging wire 792 starts being let out to when the package reaches the first predefined distance.

Whether the distance between the package and the delivery box has reached the first predefined distance can be determined by calculating the first predefined distance based on the image information acquired from camera sensor 334 or based on the length of hanging wire 792 that has been let out, for example.

If processor 734 determines that the distance between the package and the delivery box has not reached the first predefined distance (NO in S8102), the flow returns to the process in step S8101.

If processor 734 determines that the distance between the package and the delivery box has reached the first predefined distance (YES in S8102), processor 734 measures the positions of the package and the delivery box based on the image information acquired from camera sensor 334 and calculates an error in the position (positional mismatch) of the package relative to the delivery box. At this point, processor 734 calculates an error between the opening of the delivery box and the package as the package and the delivery box are viewed from the above. In this example, an error means a positional mismatch of the package along the X-axis, along the Y-axis, and in the roll angle with respect to the XY-plane that is based on the longitudinal direction and the lateral direction of the opening of the delivery box.

If the determination is YES in step S8102, processor 734 may control wire control module 311 so as to lower the package at a second speed at which hanging wire 792 is let out at a low speed. Processor 734 may lower the package at the first speed when hanging wire 792 first starts being let out and may then lower the package at the second speed after the package has reached the first predefined distance. The second speed is lower than the first speed.

Next, processor 734 determines whether the error is greater than or equal to a predefined value. When the error is large, the package may be spaced apart from the delivery box due to their positional mismatch, and the package may not be stored into the delivery box. The predefined value serves as an index for determining whether the package can be stored into the delivery box through its opening.

If processor 734 determines that the error is greater than or equal to the predefined value (YES in S8104), processor 734 controls wire control module 311 so as to stop letting out hanging wire 792 (S8105).

Processor 734 corrects the position of the package (corrects the error) so that the package overlaps the opening of the delivery box, that is, the package is contained within the opening of the delivery box. Specifically, processor 734 controls the plurality of first motors 711 based on the image information and moves drone 701 so as to correct the position of the package relative to the opening of the delivery box (S8106). Then, processor 734 returns to the process in step S8103. In this manner, the position of the package relative to the opening of the delivery box is corrected repeatedly.

Now, an example of how the position of a package relative to the opening of the delivery box is corrected will be described.

Figure 59:
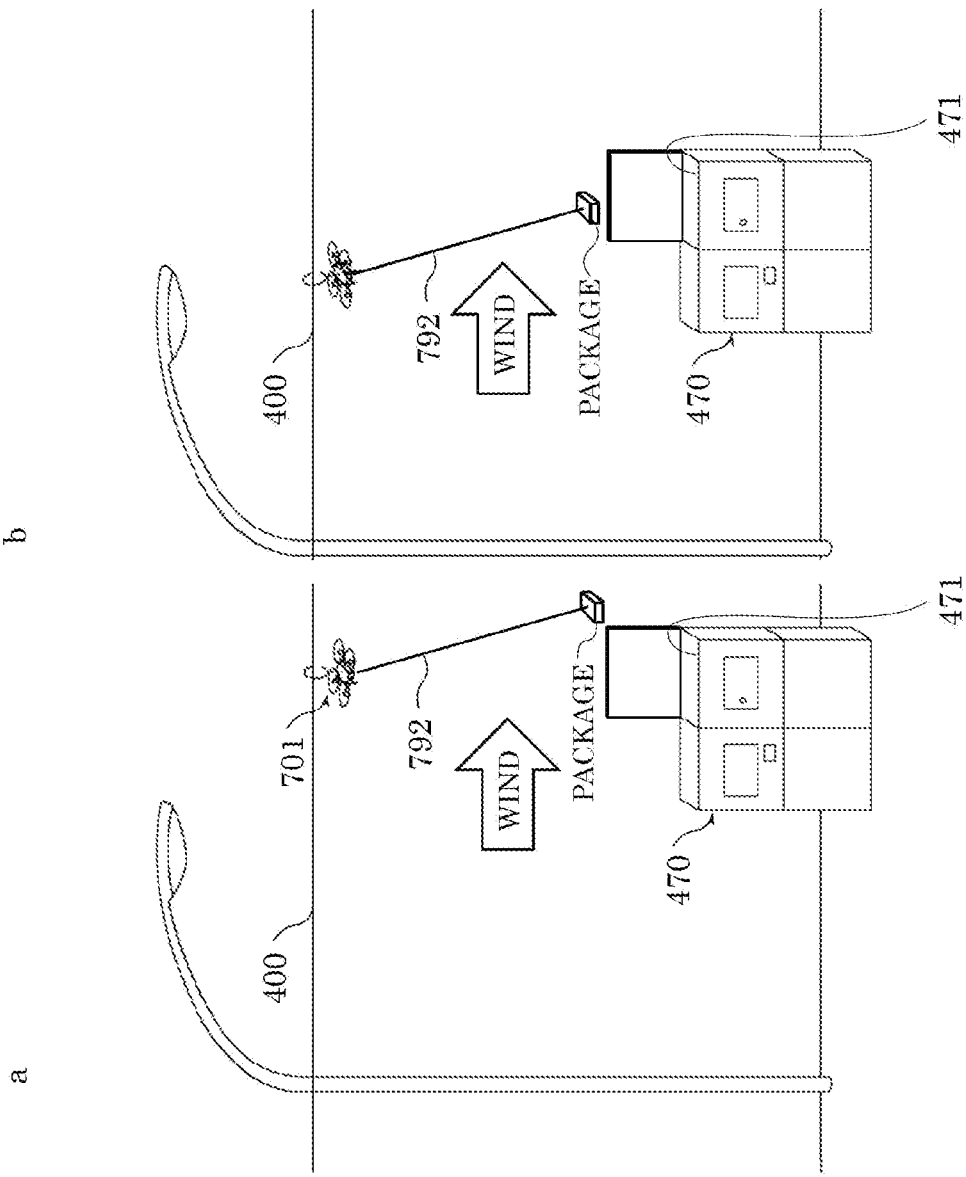
FIG. 59 is a schematic diagram illustrating an example of how the position of a package relative to an opening of a delivery box is corrected when the package is pushed in a third direction by the wind.

FIG. 59 is a schematic diagram illustrating an example of how the position of a package relative to opening 471 of delivery box 470 is corrected when the package has been pushed in a third direction by the wind. In FIG. 59, a illustrates a state in which drone 701 has moved to the position vertically above delivery box 470, lets out hanging wire 792, and lowers the package. In a in FIG. 59, the wind blows in the direction indicated by the arrow (an example of the third direction), and drone 701 is being displaced downwind from the position vertically above delivery box 470. Therefore, in the state illustrated in b in FIG. 59, drone 701 has moved upwind (an example of a fourth direction).

Figure 60:
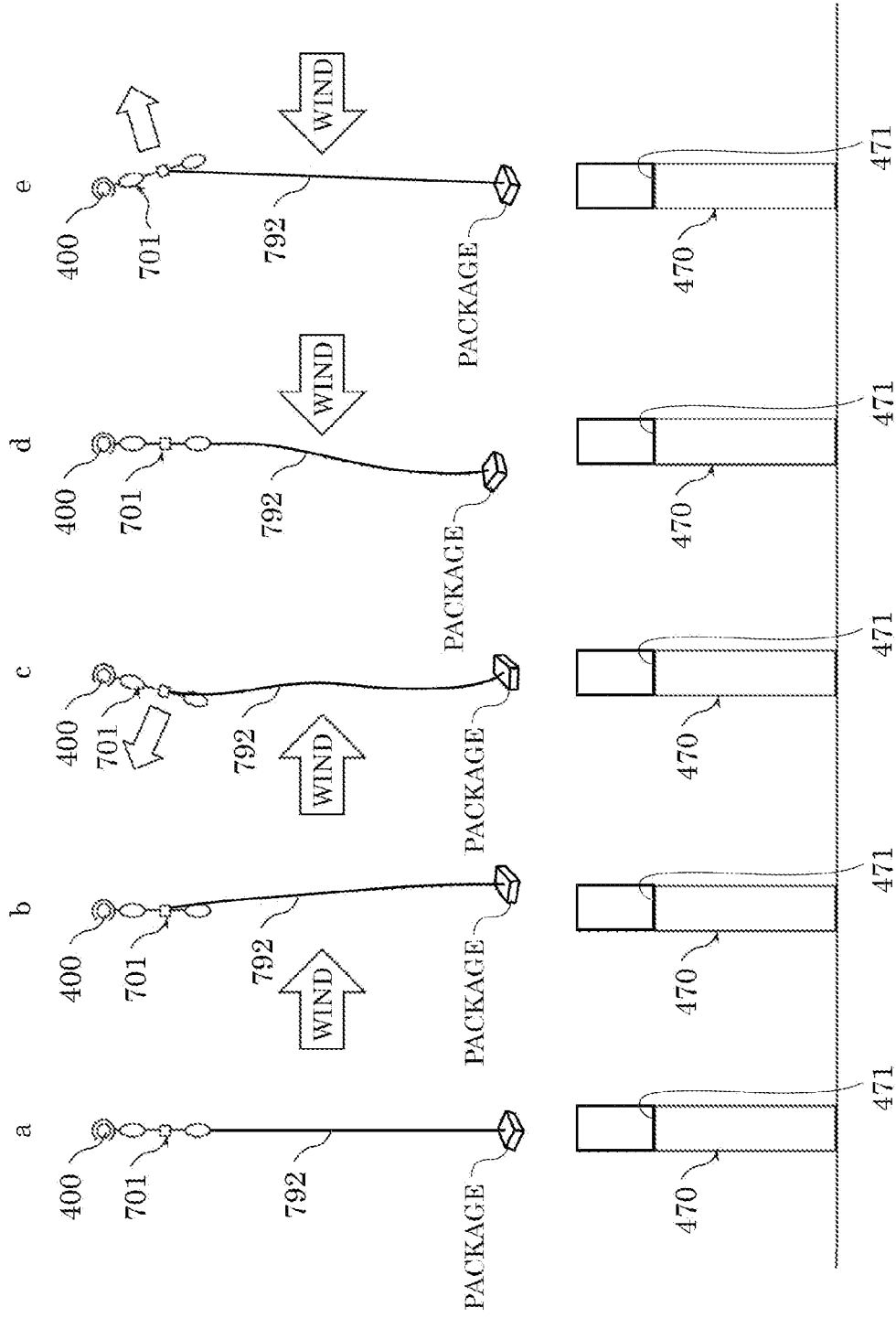
FIG. 60 is a schematic diagram illustrating another example of how the position of a package relative to an opening of a delivery box is corrected when the package is pushed in the third direction by the wind.

FIG. 60 is a schematic diagram illustrating another example of how the position of a package relative to opening 471 of delivery box 470 is corrected when the package has been pushed by the wind in the direction indicated by the arrow (an example of the third direction). In FIG. 60, a illustrates a state in which no wind is blowing. In this case, the package can be stored into delivery box 470 without making any correction. FIG. 60, b and d each illustrate a state in which the wind blows in the direction indicated by the arrow and the position of the package has moved (shifted) downwind (an example of a fifth direction) from the position vertically above opening 471 of delivery box 470. In c and e in FIG. 60, processor 734 tilts the attitude of main body 712, that is, causes main body 712 to swing in the direction of the arrow by controlling the plurality of first motors 711 and movable block 740, and thus processor 734 moves the package coupled to hanging wire 792 upwind (an example of a sixth direction). Specifically, processor 734 controls the plurality of first motors 711 and movable block 740 and tilts the attitude of main body 712 upwind so that the position of the package is moved upwind. When the package is displaced in the fifth direction from the position vertically above delivery box 470, processor 734 causes drone 701 to swing about rail 400 and moves the center of gravity of drone 701 in the sixth direction opposite the fifth direction.

In this manner, processor 734 causes drone 701 to move or swing by controlling the plurality of first motors 711 and movable block 740 based on the image information and thus corrects the position of the package relative to opening 471 of delivery box 470.

In this example, processor 734 may correct the position of the package relative to opening 471 of delivery box 470 while processor 734 continues to let out hanging wire 792. In this case, step S8105 may be omitted. When processor 734 corrects the position of the package relative to opening 471 of delivery box 470, processor 734 may control wire control module 311 so as to set the speed at which hanging wire 792 is let out to a third speed lower than the second speed.

If processor 734 determines that the error is smaller than the predefined value (NO in S8104), processor 734 continues to let out hanging wire 792 (S8111).

Next, processor 734 determines whether the distance between the package and delivery box 470 has reached a second predefined distance shorter than the first predefined distance (S8112). The second predefined distance is, for example but not limited to, one fifth, one tenth, or less than one tenth of the distance from main body 712 to delivery box 470. In this example, processor 734 may control wire control module 311 so as to lower the package at the second speed or the third speed at which hanging wire 792 is let out. Processor 734 may lower the package at the second speed or the third speed from when hanging wire 792 first starts being let out until when the package reaches the second predefined distance from the first predefined distance.

Whether the distance between the package and delivery box 470 has reached the second predefined distance can be determined by calculating the second predefined distance based on the image information acquired from camera sensor 334 or based on the length of hanging wire 792 that has been let out, for example.

If processor 734 determines that the distance between the package and delivery box 470 has not reached the second predefined distance (NO in S8112), processor 734 returns to the process in step S8111.

Next, if processor 734 determines that the distance between the package and delivery box 470 has reached the second predefined distance (YES in S8112), processor 734 controls wire control module 311 so as to stop letting out hanging wire 792. Then, processor 734 measures the positions of the package and delivery box 470 based on the image information acquired from camera sensor 334 and calculates the error in the position of the package relative to delivery box 470. At this point, processor 734 calculates an error (positional mismatch) of the package relative to opening 471 of delivery box 470 as the package and delivery box 470 are viewed from the above.

Processor 734 controls the plurality of first motors 711 and moves drone 701 so as to correct the position of the package relative to opening 471 of delivery box 470 so that the package can be contained within opening 471 of delivery box 470. In this example, as in step S8104, processor 734 may determine whether the error is greater than or equal to a predefined value.

Next, processor 734 controls wire control module 311 so as to start letting out hanging wire 792 (S8114).

Next, processor 734 determines whether the package has passed through opening 471 of delivery box 470 and has been stored in delivery box 470 based on the image information acquired from camera sensor 334 (S8115). For example, processor 734 calculates an overlap between opening 471 of delivery box 470 and the package based on the image information acquired from camera sensor 334 and detects the looseness in the tension of hanging wire 792 with the use of tension sensor 333. Then, processor 734 determines that the package has been placed on the bottom of delivery box 470 based on the tension information acquired from tension sensor 333.

If processor 734 determines that the package have been stored into delivery box 470 (YES in S8115), processor 734 controls a package mounting portion (not illustrated) provided at the leading end of hanging wire 792, and the package mounting portion releases (cuts off) the package. Thus, the package is stored in delivery box 470 (S8116). The package mounting portion can couple a package thereto or hold a package. Processor 734 controls wire control module 311 so as to take up hanging wire 792 and returns to the sender upon having taken up hanging wire 792. Then, processor 734 terminates the flow.

Meanwhile, if processor 734 determines that the package has not been stored into delivery box 470 (NO in S8115), processor 734 is neither able to calculate an overlap between opening 471 of delivery box 470 and the package based on the image information acquired from camera sensor 334 nor able to detect the looseness in the tension of hanging wire 792 based on the tension information acquired from tension sensor 333. Therefore, processor 734 causes wire control module 311 to take up hanging wire 792 by a predefined amount and thus moves the package away from opening 471 of delivery box 470 (S8117). In this example, the predefined amount is, for example, less than or equal to several centimeters or less than or equal to several tens of centimeters. Then, processor 734 returns to step S8111.

[Configuration of Delivery System 3a]

Next, an example of how a package is delivered with the use of drone 701 and delivery system 3a according to the present embodiment will be described.

Figure 61:
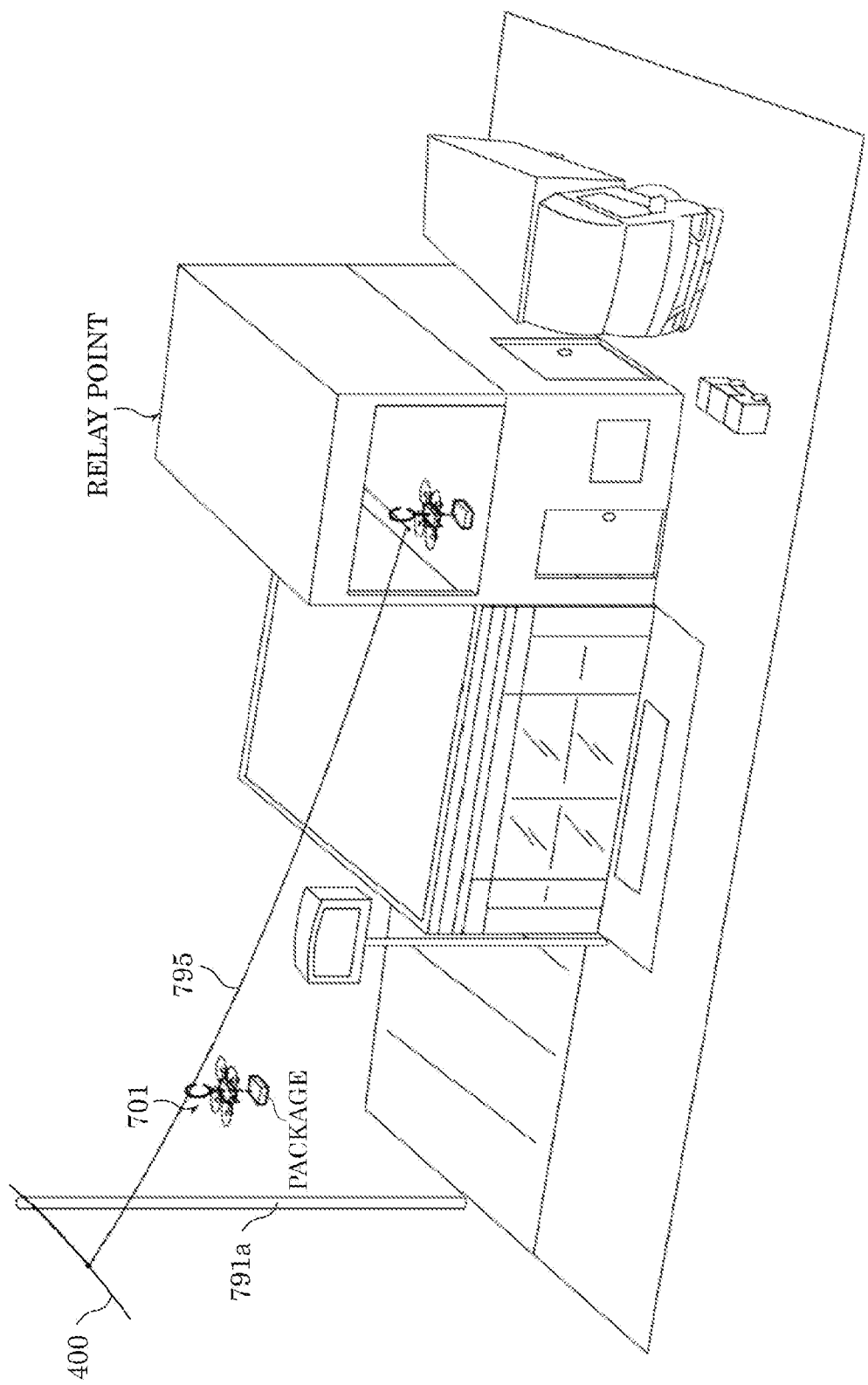
FIG. 61 is an image diagram illustrating an example of how a drone of the delivery system delivers a package from a sender to a relay point of a receiver according to Embodiment 7.

FIG. 61 is an image diagram illustrating an example of how drone 701 of delivery system 3a delivers a package from a sender to a relay point of a receiver according to Embodiment 7.

As illustrated in FIGS. 56 and 61, in a case where a receiver is a relay point, upon a package being delivered to the relay point, that relay point starts serving as a sender and sends out that package to a subsequent receiver via a transportation means. A relay point also serves as a sender that sends out packages to individual receivers such as homes and as a receiver where packages are collected from receivers present within a predetermined distance from the relay point. Collected packages are distributed at a relay point, and the packages are delivered to individual receivers with the use of a distribution means such as drone 701, for example. In this case, manager 100 illustrated in FIG. 55 may be provided at a relay point as well, and drone 701 may acquire route information from this manager 100, or drone 701 may acquire route information from manager 100 of a distribution center. In this example, the transportation means is not limited to drone 701 described above and may also be a delivery robot, a vehicle, a person, or the like.

At a relay point, packages to be delivered to receivers may be classified in accordance with their weights into the packages to be delivered by drone 701 and the packages to be delivered by a delivery robot or the like. A package may be delivered by drone 701 if the weight of that package is less than a predetermined value, or a package may be delivered by a delivery robot if the weight of that package is greater than or equal to the predetermined value. For example, a package may be delivered by drone 701 if the weight of that package is less than 5 Kg, or a package may be delivered by a delivery robot if the weight of that package is greater than or equal to 5 Kg.

Delivery system 3a can manage a plurality of drones 701 simultaneously and deliver packages to a plurality of receivers. In this example, one drone 701 returns to the sender upon delivering a package to a receiver. Alternatively, one drone 701 may deliver packages to two or more receivers.

Figure 62A:
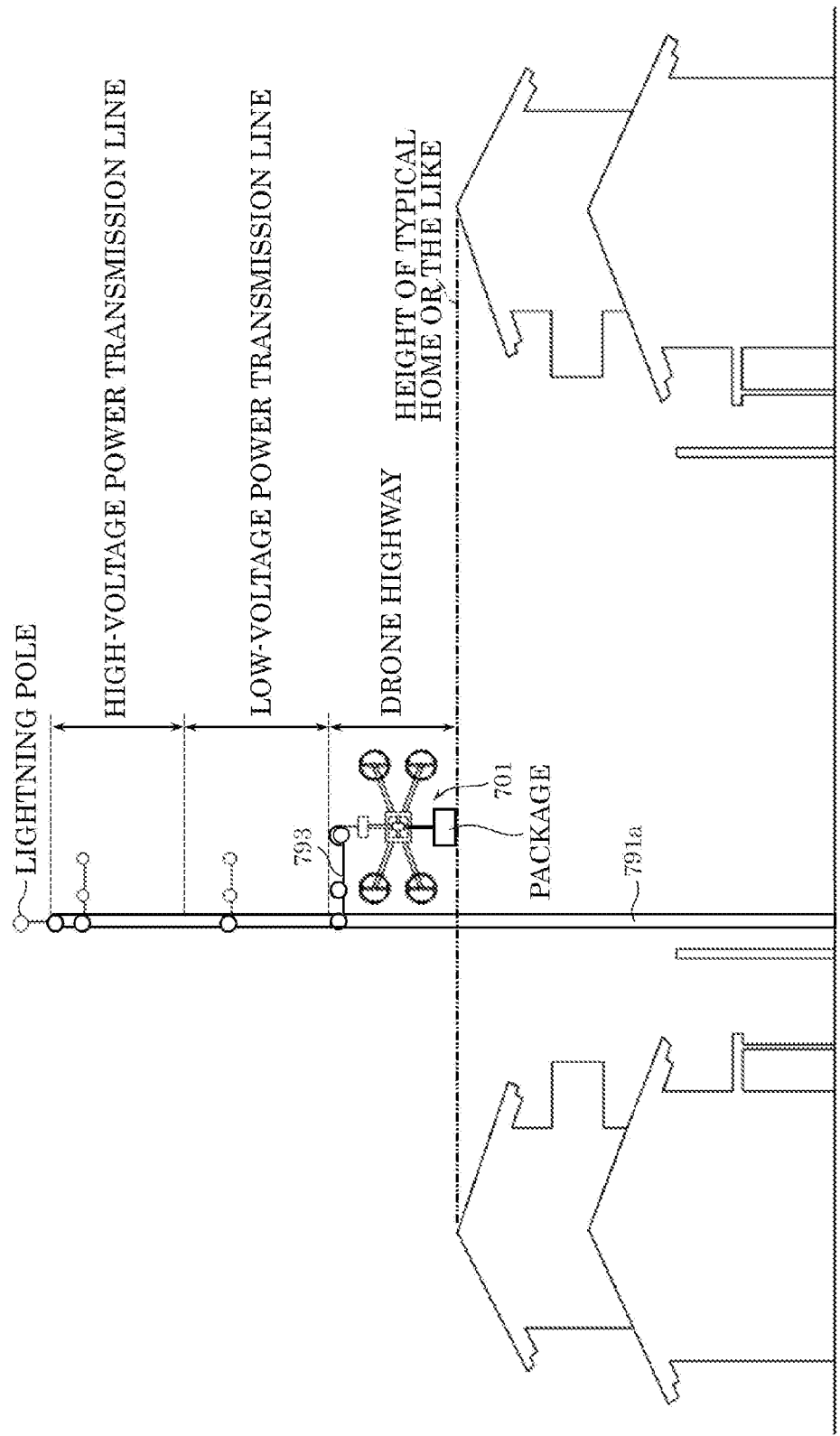
FIG. 62A is a schematic diagram illustrating some heights from the ground surface at which a drone of the delivery system moves according to Embodiment 7.

FIG. 62A is a schematic diagram illustrating some examples of heights from the ground surface at which drone 701 of delivery system 3a moves according to Embodiment 7.

As illustrated in FIGS. 56 and 62A, delivery system 3a further includes rail support portion 793, protective net 794 illustrated in FIG. 63 described later, lead-in support pillar 791b, lead-in wire 795, and delivery box 470 illustrated in FIG. 59.

The plurality of support pillars 791a are each a utility pole or a streetlight. Support pillars 791a are each installed on the ground. Rail 400 used by delivery system 3a is fixed to each support pillar 791a. For example, rail support portion 793 is fixed to each of the plurality of support pillars 791a. Specifically, rail support portion 793 is a support member that supports rail 400 of delivery system 3a. Rail support portion 793 is fixed so as to project from the direction in which support pillar 791a extends and can hold rail 400 with a space provided between rail 400 and support pillar 791a.

Rail 400 of delivery system 3a is stretched over the plurality of support pillars 791a, facilities, and so on and fixed thereon, for example. Rail 400 guides the movement of drone 701 such that drone 701 can move along rail 400 with the connector of drone 701 being connected to rail 400. Rail 400 can support drone 701 and one or more packages loaded in drone 701 even when drone 701 is hanging from rail 400 via the connector. Rail 400 is, for example but not limited to, an elongated stick-like member or a wire.

As illustrated in FIG. 62A, rail 400 is installed at a position spaced apart from the ground surface and between the plurality of support pillars 791a. For example, rail 400 is stretched at a height of greater than or equal to about 10 meters and less than or equal to 13 meters from the ground surface so that drone 701 can move along a drone highway that runs at a height of greater than or equal to about 10 meters and less than or equal to 13 meters from the ground surface. Therefore, rail 400 may be stretched at a height of greater than or equal to about 12 meters and less than or equal to about 13 meters from the ground surface.

In a case where support pillar 791a is a utility pole, a lightning rod, a power transmission line, and so on are provided on the utility pole. Normally, a lightning rod is mounted at the leading end of the utility pole, a high-voltage power transmission line is provided below the lightning rod, and a low-voltage power transmission line is provided below the high-voltage power transmission line and at a height of greater than or equal to about 13 meters. Then, if the height of a typical home or the like is about 10 meters, it is conceivable that there is a space extending from a height of greater than or equal to about 10 meters to a height of less than or equal to about 13 meters. As drone 701 flies along a position higher than the height of homes, drone 701 is less likely to make contact with the homes or the power transmission lines, and the privacy of the user serving as a receiver and the privacy of people in the facilities such as the homes can be protected.

The numerical values for these heights are merely examples and vary depending on the surrounding environment, and thus these numerical values for the heights are not limiting. Therefore, there may be a case where the drone highway is installed along a position lower than a height of about 10 meters from the ground surface.

Figure 62B:
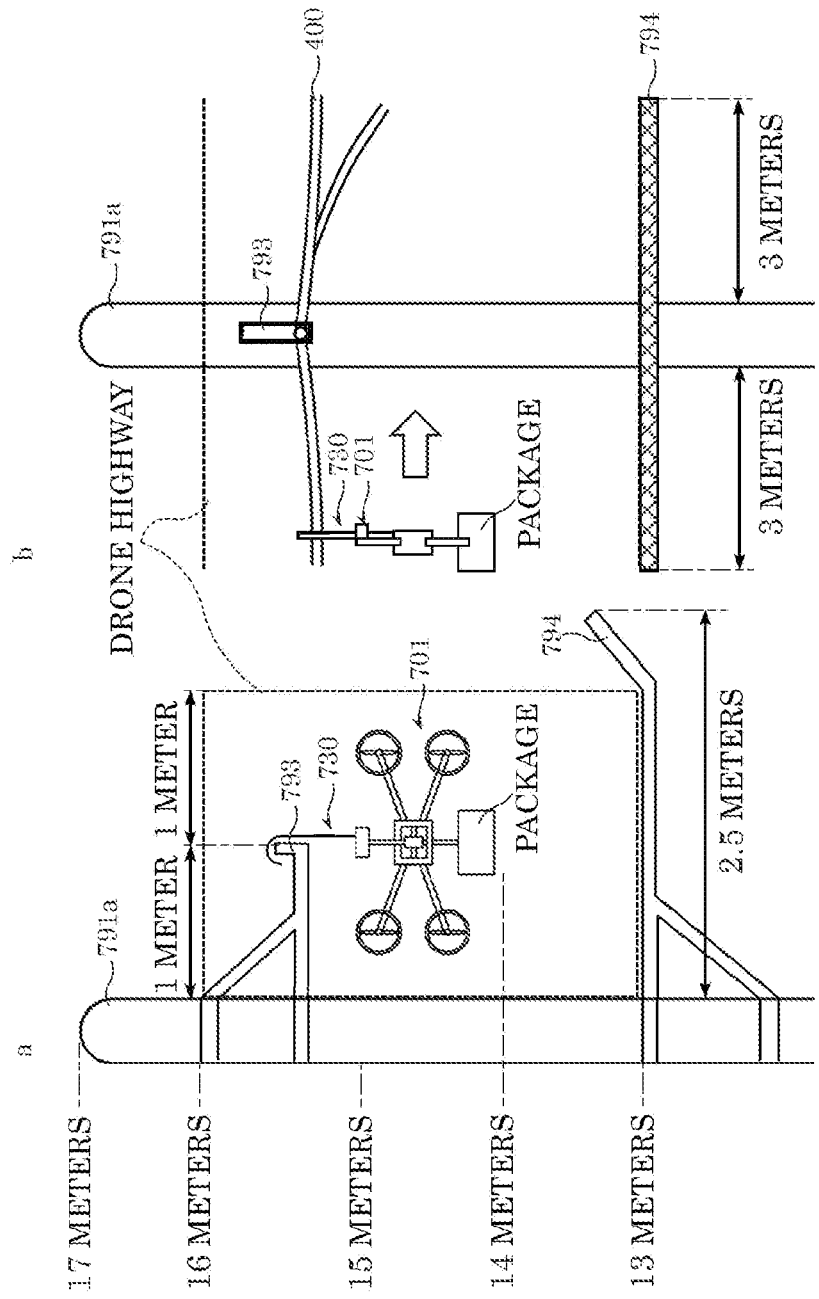
FIG. 62B is a schematic diagram illustrating an example of a position of a drone highway in the delivery system according to Embodiment 7.

FIG. 62B is a schematic diagram illustrating an example of a position of a drone highway in delivery system 3a according to Embodiment 7. In FIG. 62B, a illustrates a state as viewed in the moving direction of drone 701, and b illustrates a state as viewed in a direction orthogonal the moving direction of drone 701.

As illustrated in a and b in FIG. 62B, for example, in a case where support pillar 791a is a utility pole or the like that is 17 meters high from the ground surface, rail 400 is provided along a position at a height of greater than or equal to about 15 meters and less than or equal to about 16 meters. Drone 701 along with a package therein is located within a range from higher than or equal to about 13 meters to lower than or equal to about 16 meters.

The drone highway has a width of about 2 meters. Therefore, if another rail 400 is to be installed across from rail 400, rail 400 is installed with its width taken into account as well.

Protective net 794 is provided on support pillar 791a at a position that is about 13 meters high from the ground surface. Protective net 794 is stretched along a position vertically below rail support portion 793 and is supported by support pillar 791a. Specifically, protective net 794 is supported by support pillar 791a such that protective net 794 is substantially parallel to a plane orthogonal to the lengthwise direction of support pillar 791a. Protective net 794 is provided along a position vertically below the drone highway such that protective net 794 stretches out from support pillar 791a. In FIG. 62B, protective net 794 stretches out about 2.5 meters from support pillar 791a and measures about 6 meters or more in the moving direction of drone 701 (i.e., the direction in which rail 400 extends). When protective net 794 and drone 701 are viewed in a plan view, protective net 794 is larger than drone 701. Protective net 794 is a structure made of a net or fabric having cushioning effect, for example. Protective net 794 keeps drone 701 from colliding with the ground even if connector 730 becomes disengaged from rail 400.

Figure 64:
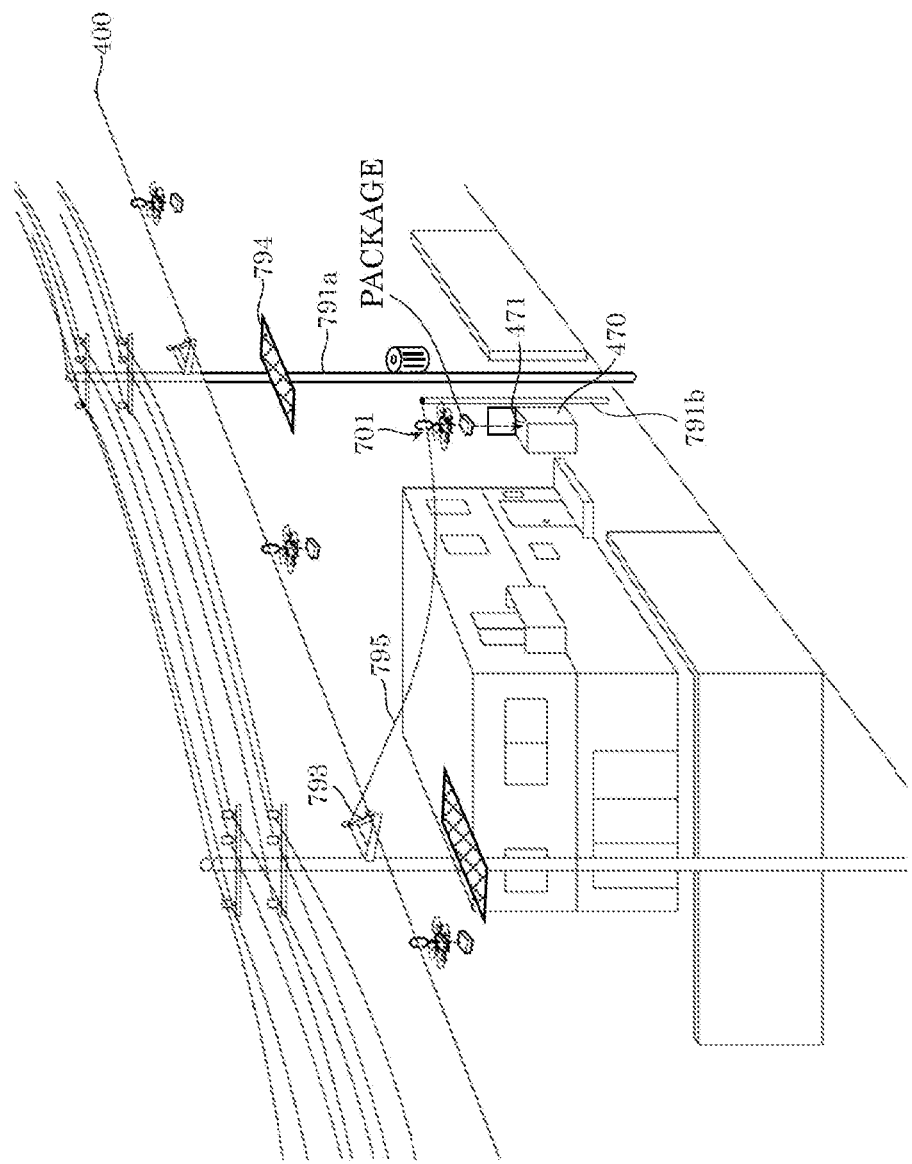
FIG. 64 is a perspective view illustrating an example of how a drone of the delivery system stores a package into a delivery box via a lead-in support pillar and a lead-in wire according to Embodiment 7.

FIG. 63 is a schematic diagram illustrating an example of how drone 701 of delivery system 3a stores a package into delivery box 470 via lead-in support pillar 791b and lead-in wire 795 according to Embodiment 7. FIG. 64 is a perspective view illustrating an example of how drone 701 of delivery system 3a stores a package into delivery box 470 via lead-in support pillar 791b and lead-in wire 795 according to Embodiment 7.

As illustrated in FIGS. 63 and 64, lead-in support pillar 791b is disposed within a predetermined site and installed on the ground or on a facility, for example. FIGS. 63 and 64 illustrate an example in which lead-in support pillar 791b is installed on the ground. Lead-in support pillar 791b is shorter than support pillar 791a, and one end of lead-in wire 795 is fixed to lead-in support pillar 791b. The leading end of lead-in support pillar 791b is located at a position lower than rail 400 and the power transmission lines.

Lead-in wire 795 is stretched to rail 400. Specifically, the one end of lead-in wire 795 is connected and fixed to lead-in support pillar 791b, and the other end of lead-in wire 795 is stretched and fixed to rail 400. Since the connector of drone 701 includes a hook, drone 701 can made a direct connection from rail 400 to lead-in wire 795 at a connection point (branching point) of the other end of lead-in wire 795 and rail 400. This connection point is provided between a first support pillar and an adjacent second support pillar among the plurality of support pillars 791a. Alternatively, the connection point may be provided on the first support pillar or the second support pillar.

Protective net 794 is disposed along a position vertically below the connection point and supported by support pillar 791a. Even if the connector becomes disengaged from the connection point, protective net 794 can keep drone 701 from colliding with the ground surface.

The connector connected to rail 400 makes a switch from rail 400 to lead-in wire 795 at the connection point. Then, lead-in wire 795 becomes connected to the connector and guides the connector to lead-in support pillar 791b. Thus, drone 701 arrives at lead-in support pillar 791b. In this case, lead-in support pillar 791b serves substantially as a receiver.

In the present embodiment, delivery system 3a includes protective net 794, lead-in support pillar 791b, and lead-in wire 795. Alternatively, delivery system 3a does not need to include lead-in support pillar 791b and lead-in wire 795. Drone 701 may lower a package upon arriving at a receiver, and lead-in support pillar 791b and lead-in wire 795 are not essential constituent elements of delivery system 3a.

Delivery box 470 is installed at a receiver, such as a home. In FIGS. 63 and 64, delivery box 470 is installed at a root portion of lead-in support pillar 791b. However, since it suffices that drone 701 can store a package into delivery box 470, there is no particular limitation on the installation location of delivery box 470. Delivery box 470 serves as a destination point for storing a package transported by drone 701.

As illustrated in FIGS. 63 and 64, lead-in support pillar 791b is disposed within a predetermined site and installed on the ground, for example. Lead-in support pillar 791b is shorter than support pillar 791a, and one end of lead-in wire 795 is fixed to lead-in support pillar 791b.

Lead-in wire 795 is stretched to rail 400. Specifically, the one end of lead-in wire 795 is connected and fixed to lead-in wire 795, and the other end of lead-in wire 795 is stretched and fixed to rail 400. Since the connector of drone 701 includes a hook, drone 701 can made a direct connection from rail 400 to lead-in wire 795 at a connection point of the other end of lead-in wire 795 and rail 400. This connection point is provided between a first support pillar and an adjacent second support pillar among the plurality of support pillars 791a. Alternatively, the connection point may be provided on the first support pillar or the second support pillar 791b be more specific, the height from the installation surface to first connection point P1 at which lead-in wire 795 and lead-in support pillar 791b are connected to each other is lower than the height from the installation surface to second connection point P2 at which lead-in wire 795 and lead-in support pillar 791b or rail 400 are connected to each other. The installation surface is the ground surface in the present embodiment. In a case where support pillar 791a or lead-in support pillar 791b is grounded, the portion of the building where support pillar 791a or lead-in support pillar 791b is connected serves as the installation surface.

Figure 65:
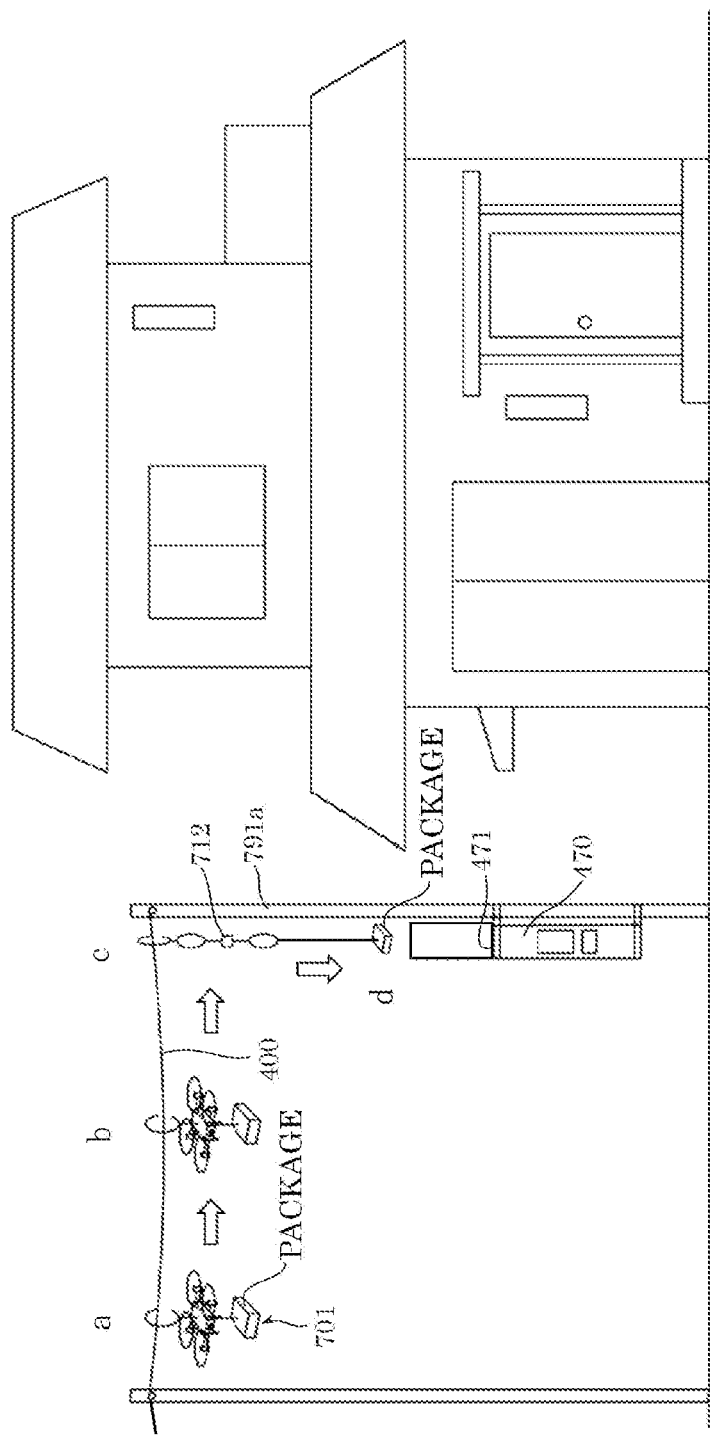
FIG. 65 is a schematic diagram illustrating an example of how a drone of the delivery system stores a package into a delivery box via a lead-in support pillar and a lead-in wire while the attitude of the main body of the drone is substantially parallel to the vertical direction according to Embodiment 7.

FIG. 65 is a side view illustrating an example of how drone 701 of delivery system 3a stores a package into delivery box 470 via support pillar 791a and rail 400 while main body 712 of drone 701 has an attitude substantially parallel to the vertical direction.

In a case where opening 471 of delivery box 470 is small, drone 701 may come into contact with support pillar 791a (or a lead-in support pillar), and this may prevent drone 701 from storing a package into delivery box 470. Therefore, as illustrated in FIGS. 55 and 65, processor 734 of drone 701 changes the attitude of main body 712 to an attitude substantially parallel to the vertical direction by controlling an actuator and brings main body 712 into the upright attitude. Processor 734 brings main body 712 into the upright attitude by controlling the actuator so as to increase angle θ formed by the normal direction of the imaginary plane containing the plurality of propellers 709a as illustrated in FIG. 57 relative to the support direction of the connector (i.e., the vertical direction).

Whether opening 471 of delivery box 470 is small is determined based on image information or the like acquired from camera sensor 334 or the like provided in drone 701.

For example, as illustrated in FIG. 55 and in a and b in FIG. 65, drone 701 moves along rail 400. Processor 734 of drone 701 captures an image of opening 471 of delivery box 470 with camera sensor 334 or the like and determines, based on the captured image information, whether drone 701 can store a package into delivery box 470 with the imaginary plane of main body 712 being oriented substantially parallel to the horizontal direction. If processor 734 determines, based on the above determination result, that drone 701 cannot store the package into delivery box 470 with the imaginary plane of main body 712 being oriented substantially parallel to the horizontal direction, processor 734 changes the attitude of main body 712 to an attitude substantially parallel to the vertical direction by controlling movable block 740. As illustrated in c in FIG. 65, drone 701 arrives at a position vertically above delivery box 470. As illustrated in d in FIG. 65, processor 734 lets out hanging wire 792 and lowers the package by controlling wire control module 311 and stores the package into delivery box 470. Such delivery system 3a reliably stores a package into delivery box 470.

Figure 66:
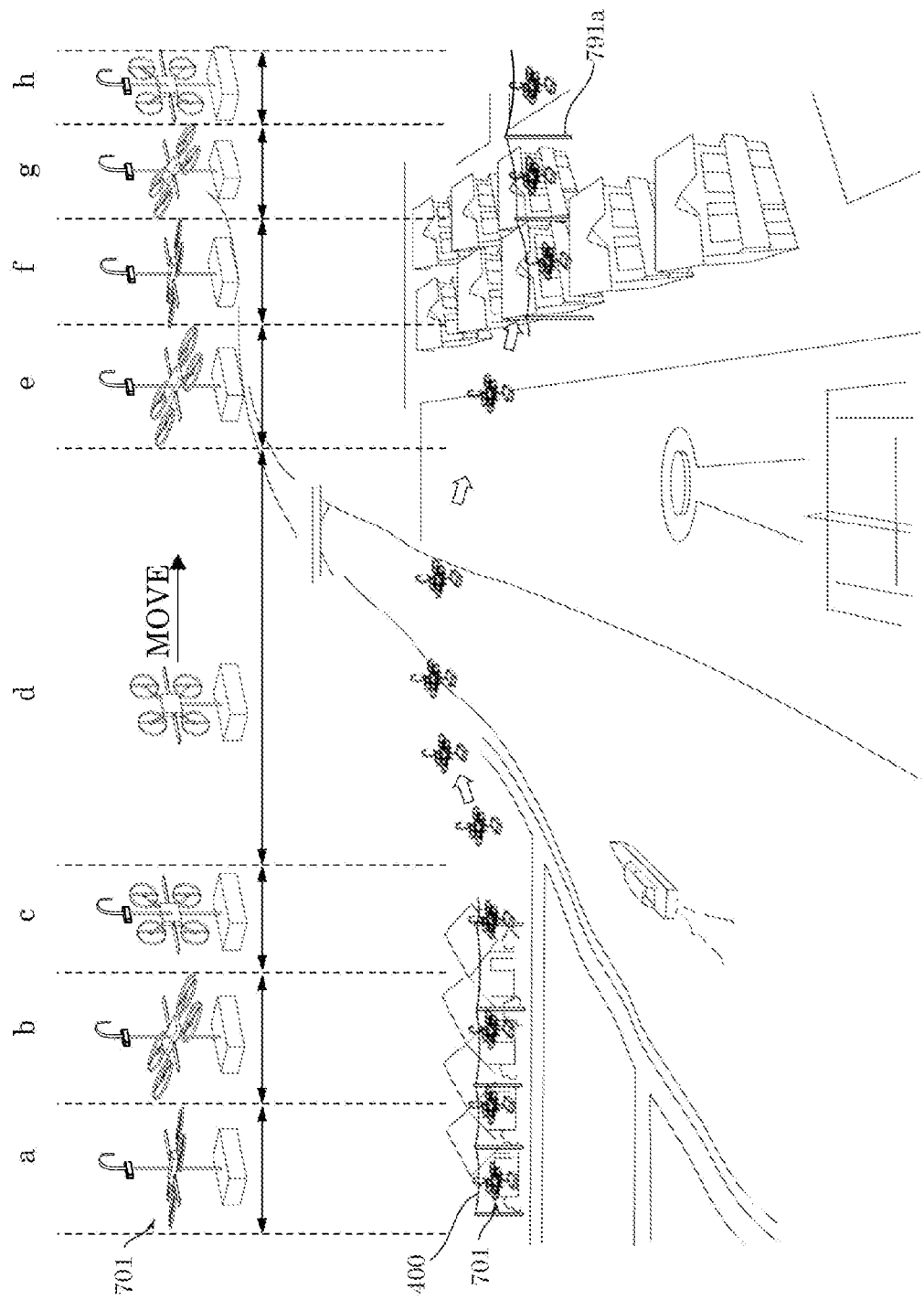
FIG. 66 is a schematic diagram illustrating an example in which a drone of the delivery system flies through a location where no rail is provided according to Embodiment 7.

FIG. 66 is a schematic diagram illustrating an example in which drone 701 of delivery system 3a flies in a location where no rail 400 is provided according to Embodiment 7. There may be a location, such as a river, where no rail 400 can be installed depending on the widthwise dimension of the location. Thus, FIG. 66 illustrates an example in which drone 701 crosses over a river.

As illustrated in FIG. 5 and in a to c in FIG. 66, movable block 740 tilts main body 712 so as to change the attitude of main body 712 from the attitude where the imaginary plane of main body 712 is substantially horizontal to the upright attitude. Drone 701 accelerates in order to cross over the river.

As illustrated in FIG. 55 and in c and d in FIG. 66, connector 730 becomes disengaged from rail 400.

As illustrated in FIG. 55 and in d and e in FIG. 66, drone 701 crosses over the river by utilizing the propelling force caused by the acceleration and with the use of the pair of wings 713. Processor 734 calculates the position of rail 400 based on image information and so on. Upon drone 701 approaching rail 400, processor 734 controls movable block 740 so as to tilt main body 712 such that the attitude of main body 712 is changed from the upright attitude to the attitude where the imaginary plane of main body 712 is substantially horizontal. This causes drone 701 to decelerate.

As illustrated in FIG. 55 and in e and f in FIG. 66, processor 734 calculates the position of rail 400 based on image information and so on, and connector 730 of drone 701 connects itself to rail 400 installed on the other side of the river.

As illustrated in FIG. 5 and in f, g, and h in FIG. 66, after drone 701 has decelerated and connected connector 730 to rail 400, processor 734 controls movable block 740 so as to tilt main body 712 such that the attitude of the main body is changed from the attitude where the imaginary plane of main body 712 is substantially horizontal to the upright attitude. This causes drone 701 to accelerate to the speed that allows drone 701 to safely travel on rail 400. In this manner, drone 701 crosses over a location, such as a river, where rail 400 cannot be installed.

Advantageous Effects

Next, some advantageous effects of drone 701 and delivery system 3a according to the present embodiment will be described.

Drone 701 is an unmanned aerial vehicle that delivers a package, and drone 701 includes a plurality of rotary wings, a plurality of first motors 711 that each rotate a corresponding one of the plurality of rotary wings, main body 712 that supports the plurality of first motors 711, connector 730 that is to be connected to rail 400 located at a position spaced apart from the ground surface with main body 712 hanging from connector 730, movable block 740 that sets an inclination of an imaginary plane containing the plurality of rotary wings relative to a support direction in which connector 730 is supported on rail 400, and processor 734 that controls the plurality of first motors 711 and movable block 740. Connector 730 includes first end 730a connected to main body 712 and second end 730b to be slidably connected to rail 400. The support direction is a direction extending from first end 730a toward second end 730b of connector 730. When second end 730b of connector 730 is connected to rail 400, processor 734 (i) sets the rotation rate of the plurality of first motors 711 to the rotation rate that is lower than the minimum rotation rate necessary for causing drone 701 to float and that is higher than the minimum rotation rate necessary for propelling drone 701 in the direction in which rail 400 extends and (ii) causes movable block 740 to increase angle θ formed by the normal direction of the imaginary plane relative to the support direction of connector 730.

According to this configuration, drone 701 can move along rail 400 while connector 730 is connected to rail 400. In the case of (i), processor 734 controls the rotation rate of the plurality of first motors 711 so as to achieve the rotation rate that is lower than the minimum rotation rate necessary for causing drone 701 to float and that is higher than the minimum rotation rate necessary for propelling drone 701. Thus, drone 701 can move along rail 400 at an appropriate speed. In the case of (ii), processor 734 controls movable block 740 so as to change the inclination of the imaginary plane containing the plurality of rotary wings relative to the support direction of connector 730. This makes it possible to regulate the speed of drone 701.

Delivery system 3*a* includes drone 701, a plurality of support pillars 791*a*, and rail 400 stretched between two adjacent support pillars among the plurality of support pillars 791*a*.

Movable block 740 is disposed between main body 712 and connector 730.

This configuration allows movable block 740 to change angle θ of connector 730 relative to main body 712 with ease.

For example, in a case where connector 730 is disposed at or around the center of gravity of main body 712, movable block 740 is also disposed at or around the center of gravity of main body 712. This configuration makes it possible to balance the center of gravity of drone 701.

Drone 701 further includes a pair of wings 713.

According to this configuration, for example, drone 701 can be rotated in the horizontal direction if the pair of wings 713 are yaw wings, or drone 701 can be rotated in the vertical direction if the pair of wings 713 are pitch wings. Therefore, the traveling direction of drone 701 can be steered freely, and drone 701 can be moved stably.

After processor 734 has increased angle θ with movable block 740, processor 734 disengages connector 730 from rail 400 if the propelling speed of drone 701 has exceeded a predetermined value.

This configuration can keep connector 730 from making contact with rail 400, and thus the safety of drone 701 can be increased.

If connector 730 is being disengaged from rail 400, processor 734 causes movable block 740 to reduce angle θ and controls the rotation rate of the plurality of first motors 711 so as to achieve a rotation rate higher than the minimum rotation rate necessary for causing drone 701 to float.

According to this configuration, when connector 730 is disengaged from rail 400, reducing angle θ allows drone 701 to float to a predetermined height from the ground surface. This can keep drone 701 from making contact with an object, and thus the safety of drone 701 can be increased.

Processor 734 may control the rotation rate of the plurality of first motors 711 so as to increase angle θ to greater than 15 degrees in (ii).

Processor 734 controls the rotation rate of the plurality of first motors 711 so as to increase angle θ to greater than 45 degrees in (ii).

Processor 734 controls the rotation rate of the plurality of first motors 711 so as to increase angle θ to greater than 65 degrees in (ii).

Processor 734 controls the rotation rate of the plurality of first motors 711 so as to increase angle θ to greater than 80 degrees in (ii).

Setting the angle of movable block 740 appropriately makes it possible to adjust the ratio of the propulsive power and the lifting power that act on drone 701. As angle θ increases, the rate of contribution of the power caused by the rotation of the plurality of first motors 711 to the propulsive power of drone 701 acting in substantially the horizontal direction increases. Accordingly, even if the rotation rate of the plurality of first motors 711 is reduced, drone 701 can still obtain a sufficient propulsive power.

Connector 730 includes support portion 732 swingably connected to main body 712 and first arm 731 connected to one end of support portion 732.

This configuration allows first arm 731 to swing along with a swinging movement of support portion 732. Therefore, first arm 731 can connect itself to rail 400 more easily.

First arm 731 is a hanger for hanging drone 701 from rail 400.

According to this configuration, first arm 731 can be hung on rail 400 when drone 701 has stopped. Therefore, a package can be placed at a receiver with drone 701 hanging from rail 400.

Drone 701 further includes hanging wire 792 that is connected to main body 712 and that hangs a package therefrom and a lift motor that can take up hanging wire 792. Processor 734 positions drone 701 at a position vertically above delivery box 470 for storing a package with connector 730 being connected to rail 400. Then, processor 734 lets out hanging wire 792 by driving the lift motor and lowers the package from main body 712 so as to store the package into delivery box 470.

According to this configuration, upon drone 701 arriving at the destination point, processor 734 controls the lift motor so as to let out hanging wire 792. Thus, drone 701 can lower the package and store the package into delivery box 470. Therefore, drone 701 can deliver the package to the receiver.

While processor 734 is letting out hanging wire 792, processor 734 adjusts at least one of the position and the orientation of main body 712 in accordance with the position of the package relative to delivery box 470.

According to this configuration, even if the position of drone 701 fails to match the position directly above delivery box 470, processor 734 can position main body 712 relative to delivery box 470 by adjusting at least one of the position and the orientation of main body 712. Therefore, drone 701 can reliably lower the package and store the package into delivery box 470, which in turn makes it possible to reliably deliver the package to the receiver.

In particular, even if drone 701 moves from a position directly above delivery box 470 due to the wind or the like, drone 701 can position main body 712 relative to delivery box 470.

When the position of the package is displaced in a third direction from the position vertically above delivery box 470, processor 734 moves drone 701 in a fourth direction opposite the third direction along the direction in which rail 400 extends.

According to this configuration, even if the position of the package has changed (moved) in the third direction via hanging wire 792 due to the wind or the like, processor 734 can change the position of drone 701 in the fourth direction opposite the third direction. Therefore, drone 701 can reliably lower the package and store the package into delivery box 470, which in turn makes it possible to deliver the package more reliably to the receiver.

When the position of the package has moved in the fifth direction from the position vertically above delivery box 470, processor 734 causes drone 701 to swing about rail 400 and moves the center of gravity of drone 701 in a sixth direction opposite the fifth direction.

According to this configuration, even if the package has been displaced in the fifth direction via hanging wire 792 due to the wind or the like, processor 734 can move the package in the sixth direction opposite the fifth direction by moving the center of gravity of drone 701. Therefore, drone 701 can reliably lower the package and store the package into delivery box 470, which in turn makes it possible to deliver the package more reliably to the receiver.

In delivery system 3a, each of the plurality of support pillars 791a is a utility pole.

According to this configuration, existing utility poles can be used as support pillars 791a, and no new support pillar 791a needs to be installed in order to stretch rail 400. Therefore, this system can prevent a surge in the cost of installation.

Delivery system 3a further includes lead-in support pillar 791b disposed within a predetermined site and lead-in wire 795 stretched to rail 400. The height from the ground surface to first connection point P1 at which lead-in wire 795 and lead-in support pillar 791b are connected to each other is lower than the height from the ground surface to second connection point P2 at which lead-in wire 795 and rail 400 are connected to each other.

According to this configuration, rail 400 is disposed at a position higher than first connection point P1, and thus drone 701 can move along a high position. Since drone 701 travels along a position where drone 701 is less likely to be recognized by people, the privacy of the user at the receiver and the privacy of people in a facility, such as a home, that is located so as to face rail 400 can be protected.

The utility pole supports a power transmission line, and rail 400 is provided at a position that is lower than the power transmission line and higher than the leading end of lead-in support pillar 791b.

According to this configuration, since rail 400 is disposed under the power transmission line, rail 400 can be disposed at a position where drone 701 will not make contact with the power transmission line, and drone 701 can travel along rail 400. Therefore, the safety of drone 701 delivering packages can be ensured.

Connector 730 may further include a wheel such as the one according to Variation 1 of Embodiment 4 that is connected to first arm 731 and that is to rotatably make contact with rail 400.

According to this configuration, when drone 701 becomes connected to rail 400, drone 701 can move along rail 400 with the wheel making contact with rail 400. The wheel starts rotating upon friction with rail 400. Therefore, drone 701 can travel on rail 400 solely with the propelling force produced by the rotation of the rotary wings in the traveling direction. Thus, this configuration renders it unnecessary for drone 701 to use the rotary force of the rotary wings as a lifting force for lifting itself up. As a result, the energy consumed by drone 701 can be reduced.

Variation 1 of Embodiment 7

In the following, basic configurations of drone 701 and of a delivery system according to the present variation are identical to the basic configurations of the drones and of the delivery systems according to Embodiment 7 and so on. Therefore, the descriptions of the basic configurations of drone 701 and of the delivery system according to the present variation will be omitted as appropriate.

Figure 67:
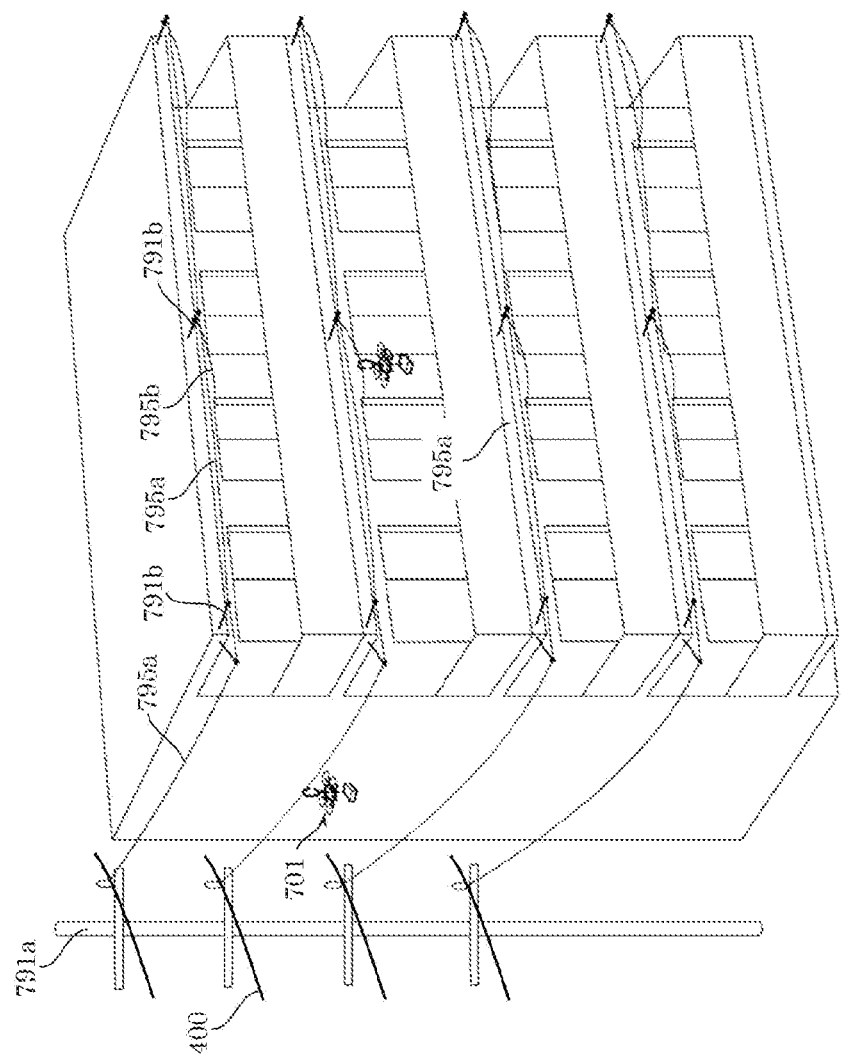
FIG. 67 is a schematic diagram illustrating an example in which a lead-in support pillar, a first lead-in wire, and a second lead-in wire of a delivery system are installed on an apartment building according to Embodiment 7.

FIG. 67 is a schematic diagram illustrating an example in which lead-in support pillar 791b, first lead-in wire 795a, and second lead-in wire 795b of the delivery system are installed on an apartment building according to Variation 1 of Embodiment 7.

FIG. 67 illustrates an example in which lead-in support pillar 791b is installed on a side wall of a ceiling portion of a facility (an apartment building in the present variation). In FIG. 67, first lead-in wire 795a and second lead-in wire 795b are used as lead-in wires.

First lead-in wire 795a is stretched over the side wall of the ceiling portion in each floor via lead-in support pillars 791b installed on the side wall of the ceiling portion. One end of second lead-in wire 795b is connected to lead-in support pillar 791b or first lead-in wire 795a, and the other end of second lead-in wire 795b is connected to the outer wall of the facility. In this example, support pillar 791b may also be provided on the outer wall. Second lead-in wire 795b may or may not be connected to every apartment unit in the facility.

Figure 68:
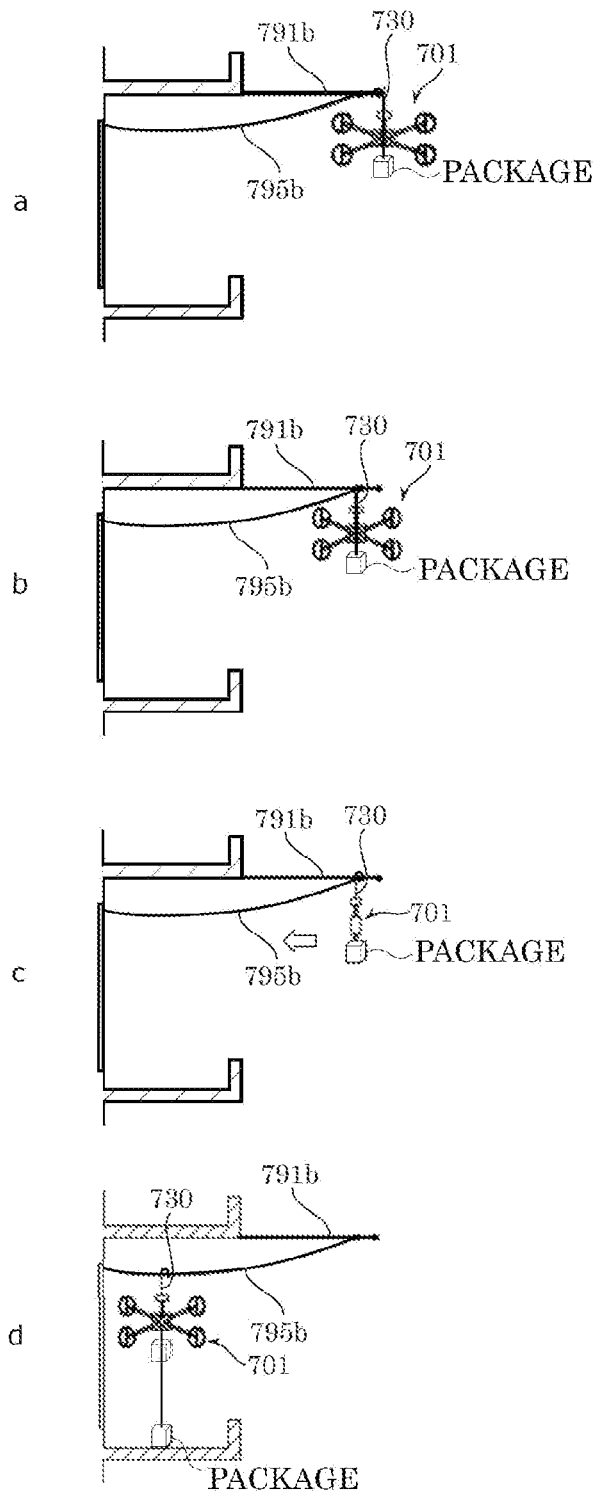
FIG. 68 is a schematic diagram illustrating an example of how a drone delivers a package to an apartment building according to Variation 1 of Embodiment 7.

FIG. 68 is a schematic diagram illustrating an example of how drone 701 delivers a package to the apartment building according to Variation 1 of Embodiment 7.

For example, as illustrated in a and b in FIG. 68, drone 701 moves along first lead-in wire 795a with connector 730 being connected to first lead-in wire 795a. As illustrated in c in FIG. 68, drone 701 changes the connection of connector 730 to second lead-in wire 795b at a connection point of second lead-in wire 795b connected to the receiver and first lead-in wire 795a or lead-in support pillar 791b. As illustrated in d in FIG. 68, drone 701 arrives at the receiver of the destination as being guided by second lead-in wire 795b and unloads the package.

In FIG. 67, first lead-in wire 795a and second lead-in wire 795b are stretched over the apartment building. Alternatively, rail 400 may be stretched over the apartment building.

Variation 2 of Embodiment 7

In the following, basic configurations of drone 701 and of a delivery system according to the present variation are identical to the basic configurations of the drones and of the delivery systems according to Embodiment 7 and so on. Therefore, the descriptions of the basic configurations of drone 701 and of the delivery system according to the present variation will be omitted as appropriate.

Figure 69:
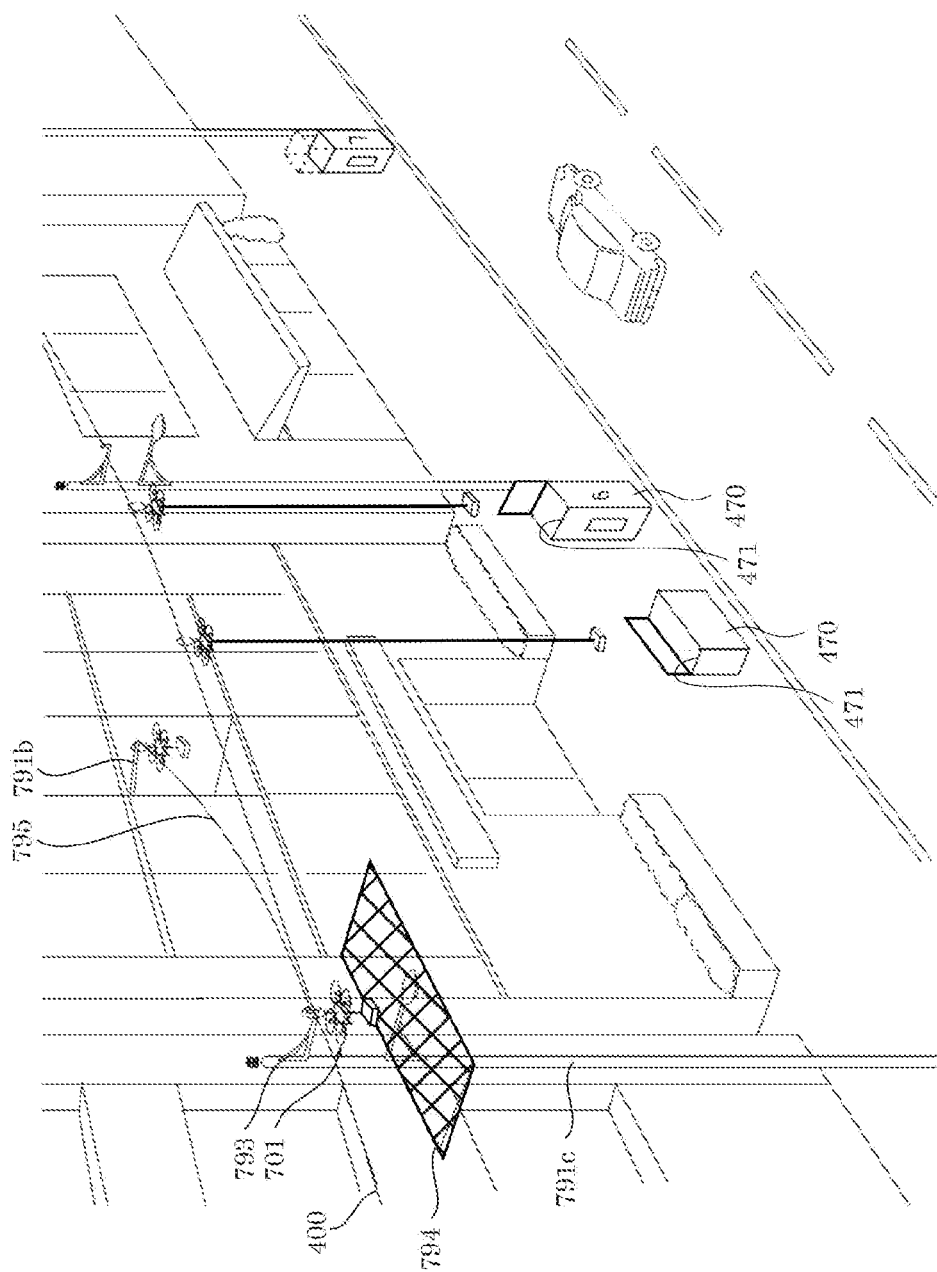
FIG. 69 is a schematic diagram illustrating an example in which a support pillar of a delivery system is a streetlight according to Variation 2 of Embodiment 7.

FIG. 69 is a schematic diagram illustrating an example in which support pillar 791c of the delivery system is a streetlight according to Variation 2 of Embodiment 7.

As illustrated in FIG. 69, delivery box 470 is disposed on a sidewalk and provided for each facility. A package is delivered to each floor of the facility via lead-in support pillar 791b and lead-in wire 795. Lead-in support pillar 791b and lead-in wire 795 may be installed if a receiver can be on the second floor or higher of the facility, for example.

Figure 70:
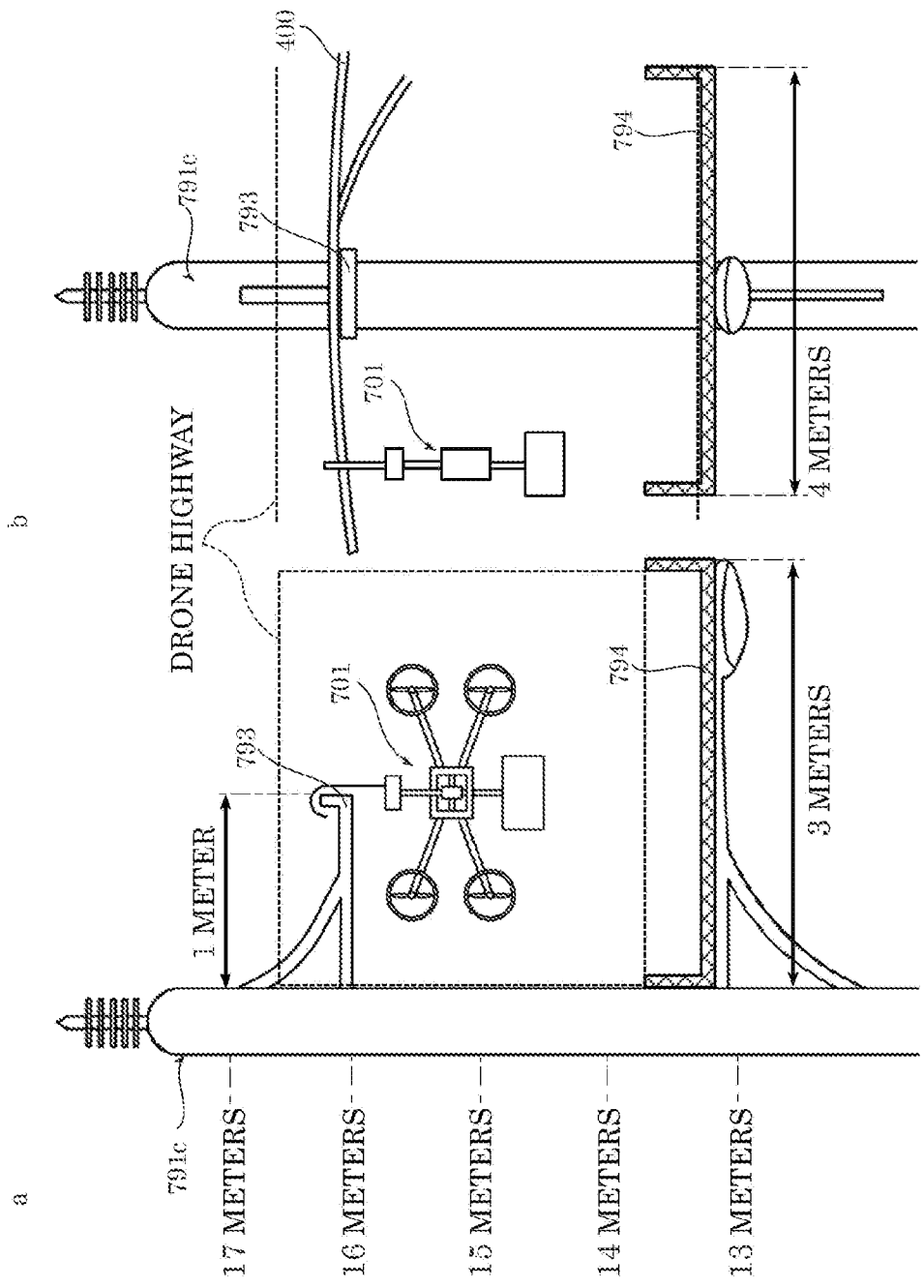
FIG. 70 is a schematic diagram illustrating an example of a position of a drone highway in an example in which a support pillar of the delivery system is a streetlight according to Variation 2 of Embodiment 7.

FIG. 70 is a schematic diagram illustrating an example of where a drone highway is located in a case where support pillar 791c of the delivery system is a streetlight according to Variation 2 of Embodiment 7. In FIG. 70, a illustrates a state as viewed in the moving direction of drone 701, and b illustrates a state as viewed in a direction orthogonal the moving direction of drone 701.

As illustrated in a and b in FIG. 70, protective net 794 is provided along a position vertically above the illumination device of the streetlight according to the present variation.

Protective net 794 is supported by and fixed to a pole that supports the illumination device of support pillar 791c. In FIG. 70, protective net 794 stretches out about three meters from the pole and measures about four meters in the moving direction of drone 701 (i.e., the direction in which rail 400 extends). The size of protective net 794 may vary depending on the environment where the illumination device is installed.

Some advantageous effects of drone 701 and the delivery system configured as described above according to the present variation will be described.

The plurality of support pillars 791c are streetlights.

According to this configuration, existing streetlights can be used as support pillars 791c, and no new support pillar 791c needs to be installed in order to stretch rail 400. Therefore, this system can prevent a surge in the cost of installation.

Variation 3 of Embodiment 7

In the following, basic configurations of drone 701b and of a delivery system according to the present variation are identical to the basic configurations of the drones and of the delivery systems according to Embodiment 7 and so on. Therefore, the descriptions of the basic configurations of drone 701b and of the delivery system according to the present variation will be omitted as appropriate. The present variation differs from Embodiment 7 and so on in the configuration of connector 730c.

Connector 730c of drone 701b according to the present variation includes first arm 731, support portion 732, and first actuator 741. Unlike Embodiment 7, in the present variation, connector 730c does not include base 733 and angle actuator 743.

Figure 71:
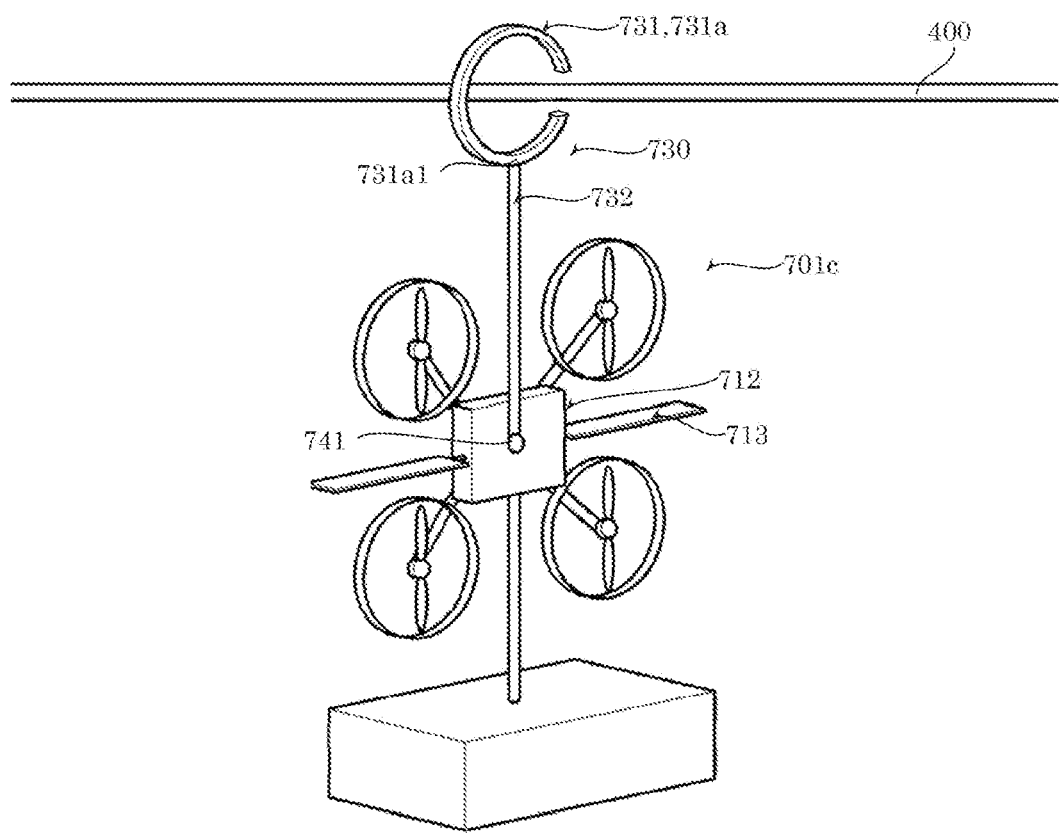
FIG. 71 is a perspective view illustrating a drone of a delivery system according to Variation 3 of Embodiment 7.

FIG. 71 is a perspective view illustrating drone 701b of the delivery system according to Variation 3 of Embodiment 7.

As illustrated in FIG. 71, first hook 731a of first arm 731 according to the present variation has a substantially C-like shape in which a part of the ring-shaped outer shell portion is missing as viewed in the traveling direction of drone 701b. First connected end 731a1 of first hook 731a is connected to the other end of support portion 732.

Figure 72:
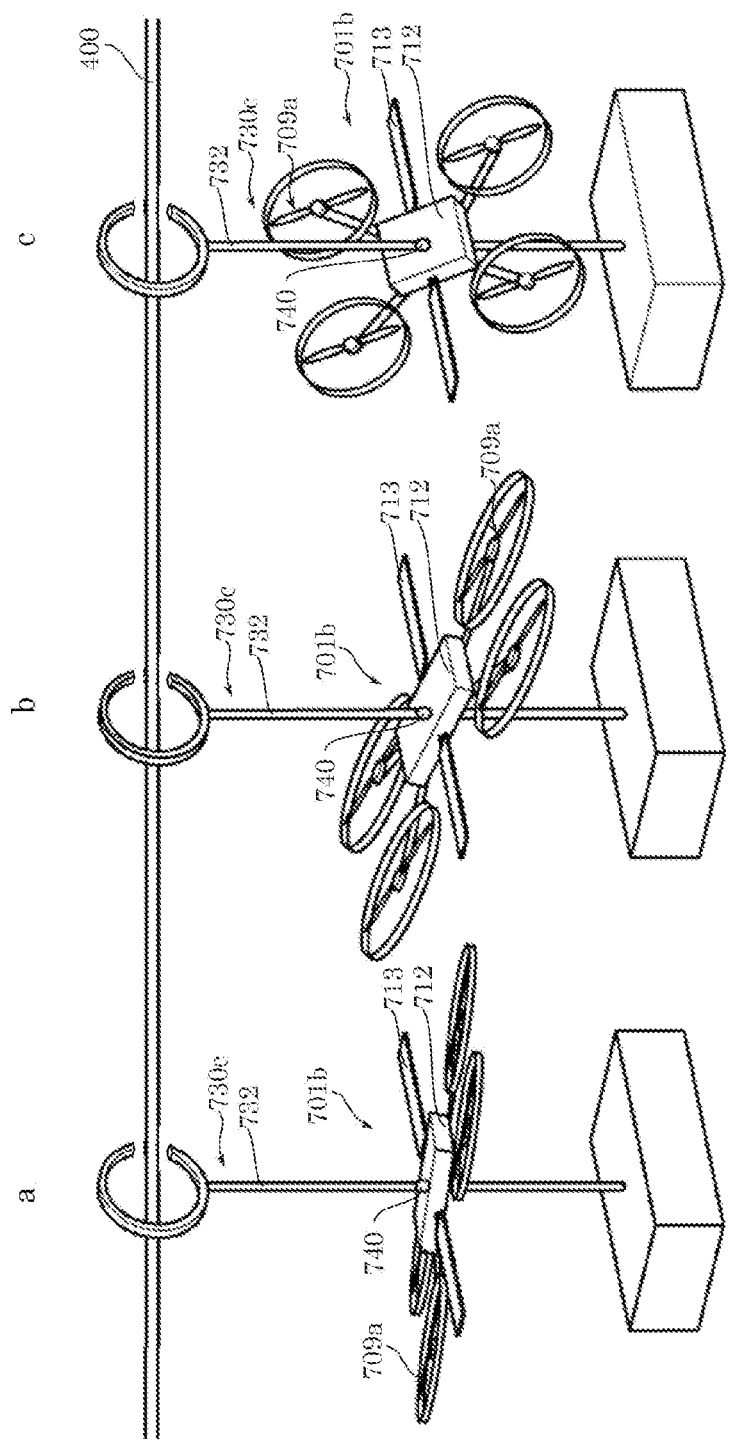
FIG. 72 is a perspective view illustrating how the attitude of the main body of a drone of the delivery system is changed according to Variation 3 of Embodiment 7.

FIG. 72 is a perspective view illustrating how the attitude of main body 712 of drone 701b of the delivery system is changed according to Variation 3 of Embodiment 7.

As illustrated in a, b, and c in FIG. 72, processor 734 illustrated in FIG. 55 changes the attitude of main body 712 while maintaining the attitude of support portion 732 of connector 730c by controlling movable block 740, the plurality of propellers 709a, and the pair of wings 713. Specifically, processor 734 changes the angle of the normal direction of the imaginary plane relative to the direction in which support portion 732 extends.

Embodiment 8

In the following, basic configurations of drone 701c and of delivery system 4 according to the present embodiment are identical to the basic configurations described in Embodiment 7 and so on. Therefore, the descriptions of the basic configurations of drone 701c and of delivery system 4 according to the present embodiment will be omitted as appropriate. The present embodiment differs from Embodiment 7 and so on in that second arm 751 is further provided.

Figure 73:
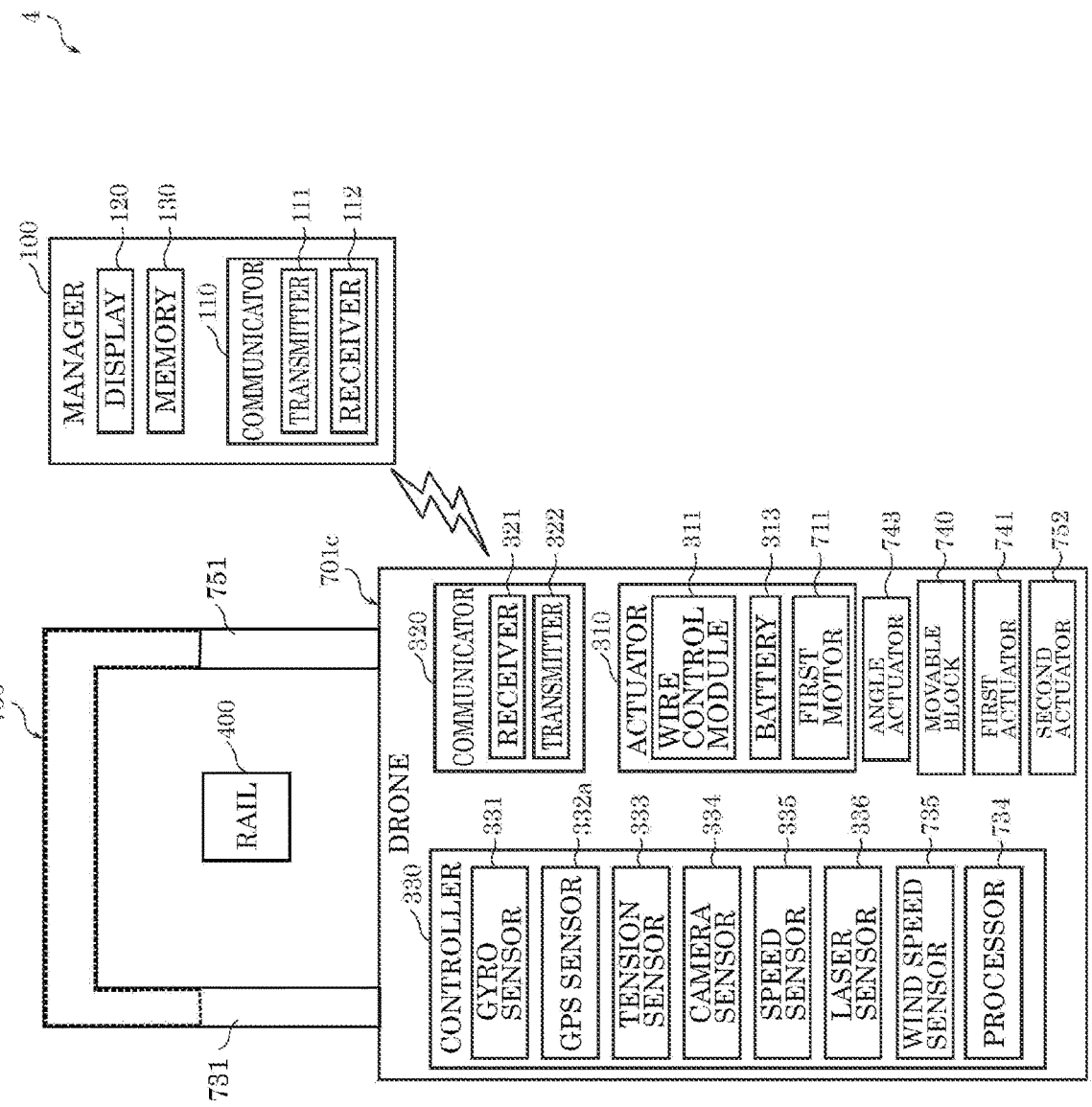
FIG. 73 is a block diagram illustrating a configuration of a delivery system according to Embodiment 8.
Figure 74:
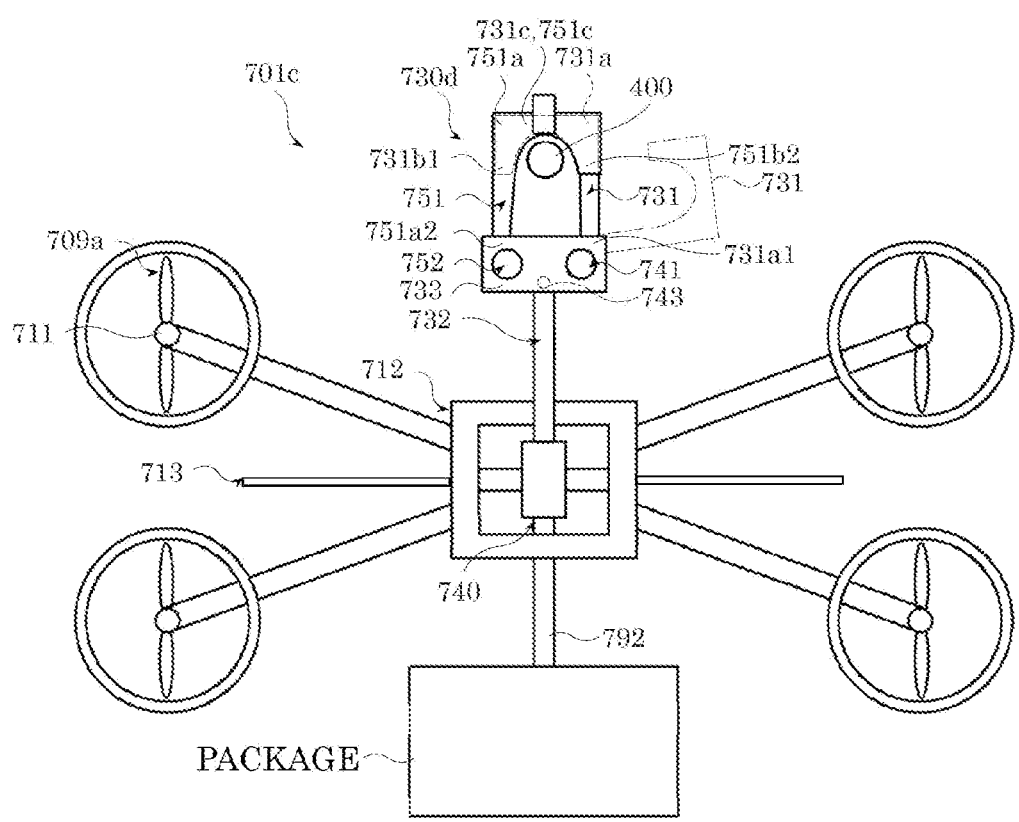
FIG. 74 is a front view illustrating a drone of the delivery system according to Embodiment 8.

FIG. 73 is a block diagram illustrating a configuration of delivery system 4 according to Embodiment 8. FIG. 74 is a front view illustrating drone 701c of delivery system 4 according to Embodiment 8. Specifically, FIG. 74 is a front view illustrating drone 701c of delivery system 4 according to Embodiment 8.

As illustrated in FIGS. 73 and 74, connector 730d according to the present embodiment further includes second arm 751 and second actuator 752.

Second arm 751 is connected to one end of support portion 732. Specifically, second arm 751 is connected to support portion 732 via base 733 so as to oppose first arm 731. First arm 731 and second arm 751 are connected to base 733 and lie in different planes. Second arm 751 is a hanger for hanging drone 701c from rail 400.

Second arm 751 includes second hook 751a.

Second hook 751a extends from second connected end 751a2 connected to second actuator 752 to second open end 751b2 on the other end. Second hook 751a includes second bent portion 751c that is bent in a second direction opposite to the first direction and is located between second connected end 751a2 and second open end 751b2. Second hook 751a has a substantially C-like shape, a substantially F-like shape, a substantially J-like shape, or a substantially U-like shape in which a part of the ring-shaped outer shell portion is missing as viewed in the traveling direction of drone 701c. The portion cut out from the outer shell portion constitutes an opening of second hook 751a through which rail 400 can enter the space enclosed by second arm 751. The opening lies between second open end 751b2 and second connected end 751a2. Second hook 751a is an example of a second end of connector 730d. In this example, second hook 751a may be provided with a wheel that allows second hook 751a to make contact with and freely rotate on rail 400 as described above.

Second hook 751a and first hook 731a oppose each other. When second hook 751a and first hook 731a are viewed in the traveling direction of drone 701c, second open end 751b2 and second connected end 751a2 of second hook 751a oppose, respectively, first open end 731b1 and first connected end 731a1 of first hook 731a with rail 400 interposed therebetween.

Base 733 is a portion where support portion 732 are connected to first arm 731 and second arm 751 and is disposed between support portion 732 and first and second arms 731 and 751. Base 733 is connected to first connected end 731a1 of first arm 731, second connected end 751a2 of second arm 751, and the other end of support portion 732.

Second actuator 752 sets the angle of second hook 751a relative to support portion 732. Second actuator 752 is disposed between support portion 732 and second hook 751a and swingably supports second connected end 751a2 of second hook 751a. In the present embodiment, second actuator 752 is disposed in base 733.

Figure 75:
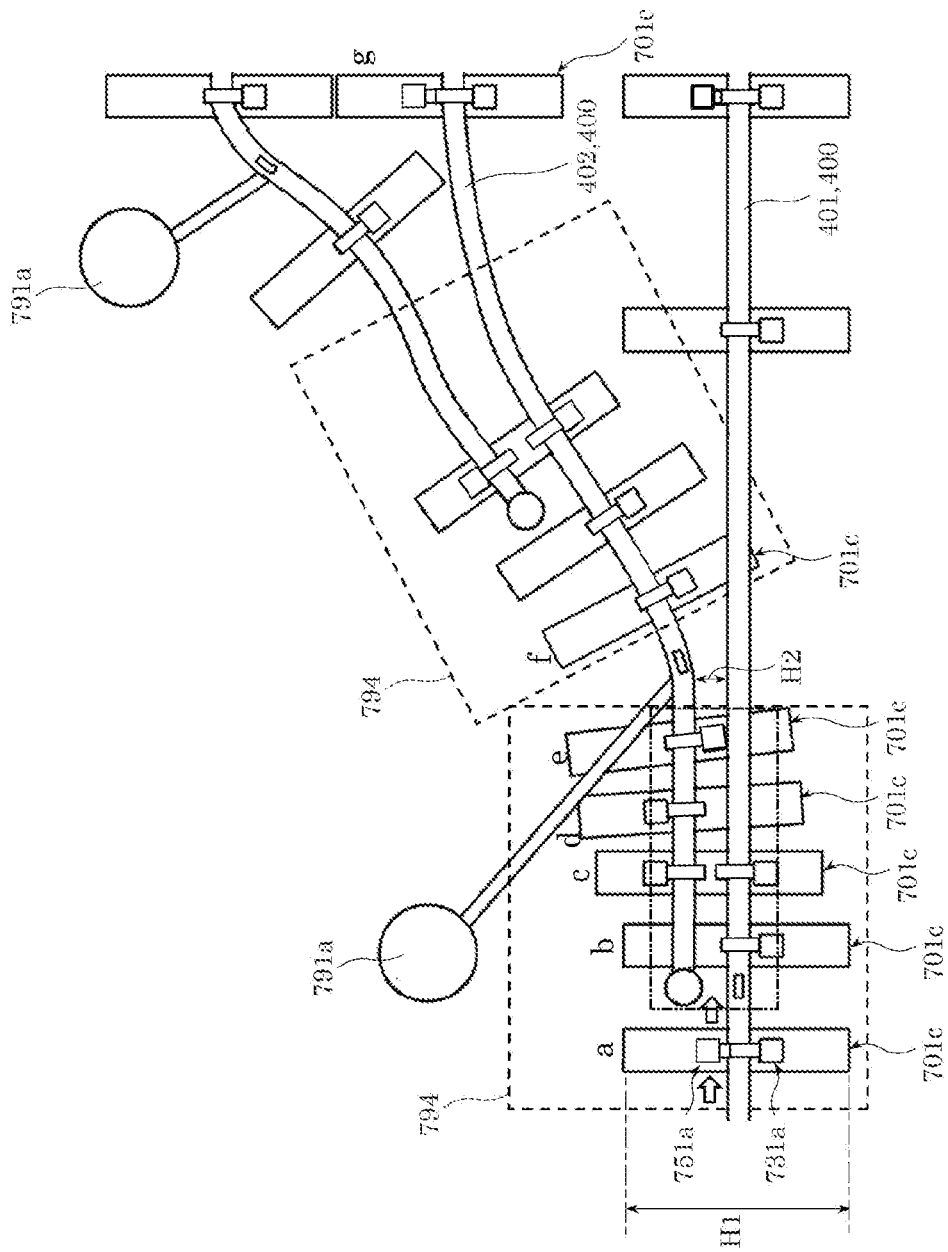
FIG. 75 is a top view of a drone and rails of the delivery system, illustrating an example of how the connection of a connector is switched from a first rail to a second rail, according to Embodiment 8.

FIG. 75 is a top view illustrating an example of how the connection of connector 730d is switched from first rail 401 to second rail 402, as drone 701c and rail 400 of delivery system 4 according to Embodiment 8 are viewed from the above. FIG. 75 illustrates first rail 401, second rail 402, and so on supported by support pillars 791a.

As illustrated in FIGS. 74 and 75, processor 734 according to the present embodiment can switch the connection of connector 730d connected to first rail 401 to second rail 402 by controlling first actuator 741 and second actuator 752. This switching between rails 400 will be described later. Rail 400 is a collective term for first rail 401 and second rail 402. In the present embodiment, when the term rail 400 is used, rail 400 may include first rail 401 and second rail 402.

Delivery system 4 according to the present embodiment includes protective net 794 as well as first rail 401 and second rail 402 stretched between two adjacent support pillars 791*a* among the plurality of support pillars 791*a*.

When first rail 401 is regarded as a stock rail, second rail 402 is a rail that branches off from first rail 401. Second rail 402 is disposed in the vicinity of first rail 401 with a space provided therebetween. In other words, second rail 402 extends alongside first rail 401. A section where first rail 401 and second rail 402 are close to each other is an approaching region and is a turnout serving as a branching point where drone 701*c* can switch between rails 400. Metaphorically speaking, second rail 402 is a tongue rail. The approaching region is a region where the distance (distance H2) between first rail 401 and second rail 402 is smaller than or equal to width H1 of drone 701*c*. For example, the approaching region is a region where first rail 401 and second rail 402 come closest to each other.

Protective net 794 is stretched along a position vertically below the approaching region of first rail 401 and second rail 402 and is supported by support pillar 791*a*

[Operation]

Figure 76:
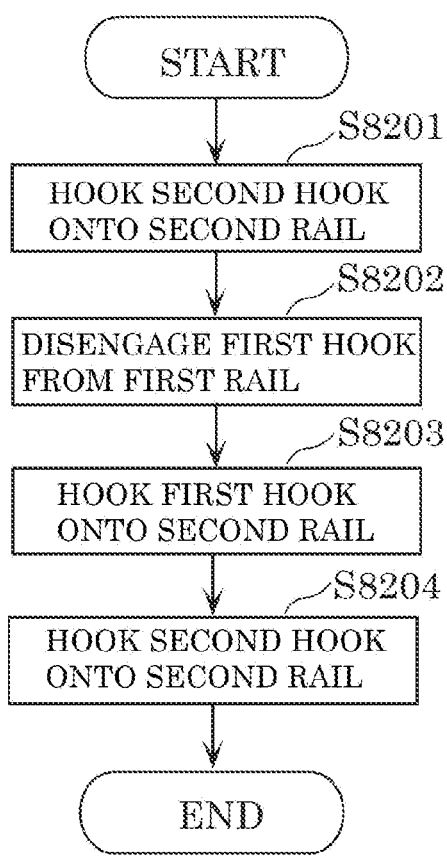
FIG. 76 is a flowchart illustrating an example of an operation in which the connector of a drone of the delivery system is switched from a first rail to a second rail according to Embodiment 8.

Next, operations of drone 701*c* and delivery system 4 according to the present embodiment will be described. Drone 701*c* of this delivery system 4 can switch the connection from first rail 401 to second rail 402 with the use of the two arms including first arm 731 and second arm 751. FIG. 76 is a flowchart illustrating an example of an operation in which the connection of connector 730*d* of drone 701*c* of delivery system 4 is switched from first rail 401 to second rail 402 according to Embodiment 8. In this example described below, drone 701*c* that is moving along first rail 401 switches its path from first rail 401 to second rail 402.

First, as illustrated in FIG. 73, in a in FIG. 75, and in FIG. 76, when first hook 731*a* and second hook 751*a* of connector 730*d* of drone 701*c* are connected to first rail 401, drone 701*c* is slidably hanging from first rail 401 via first hook 731*a* and second hook 751*a*. In this case, as illustrated in b and c in FIG. 75 and in FIG. 76, upon processor 734 determining that drone 701*c* has approached the leading end portion of second rail 402 and has passed this leading end portion based on image information and so on, processor 734 controls second actuator 752 so as to cause second hook 751*a* to swing, become disengaged from first rail 401, and be hooked onto second rail 402 (S8201). Processor 734 recognizes the approaching region where second rail 402 approaches first rail 401 based on the image information and so on. Then, processor 734 controls second actuator 752 in the approaching region so as to cause second hook 751*a* to swing and be hooked onto second rail 402. Thus, second hook 751*a* becomes connected to second rail 402, which results in the state illustrated in c in FIG. 75.

Next, as illustrated in c and d in FIG. 75 and in FIG. 76, processor 734 controls first actuator 741 so as to cause first hook 731*a* to swing and become disengaged from first rail 401 (S8202), which results in the state illustrated in d in FIG. 75.

Next, as illustrated in d and e in FIG. 75 and in FIG. 76, processor 734 controls first actuator 741 so as to cause first hook 731*a* to swing and be hooked onto second rail 402. Thus, first hook 731*a* becomes connected to second rail 402 (88203). Thereafter, processor 734 controls second actuator 752 so as to cause second hook 751*a* to swing and become disengaged from second rail 402, which results in the state illustrated in e in FIG. 75. Then, drone 701*c* moves along second rail 402 or switches the connection of connector 730*d* from second rail 402 to a third rail.

In a case where drone 701*c* moves along second rail 402 thereafter, as illustrated in g in FIG. 75 and in FIG. 76, processor 734 controls second actuator 752 after drone 701*c* has passed rail support portion 793 so as to cause second hook 751*a* to swing and be hooked onto second rail 402. Thus, second hook 751*a* becomes connected to second rail 402 (88204). As first hook 731*a* and second hook 751*a* are connected to second rail 402, drone 701*c* becomes connected to second rail 402 so as not to be disengaged from second rail 402.

Now, how connector 730*d* moves when the connection of connector 730*d* is switched from first rail 401 to second rail 402 will be described in detail.

Figure 77:
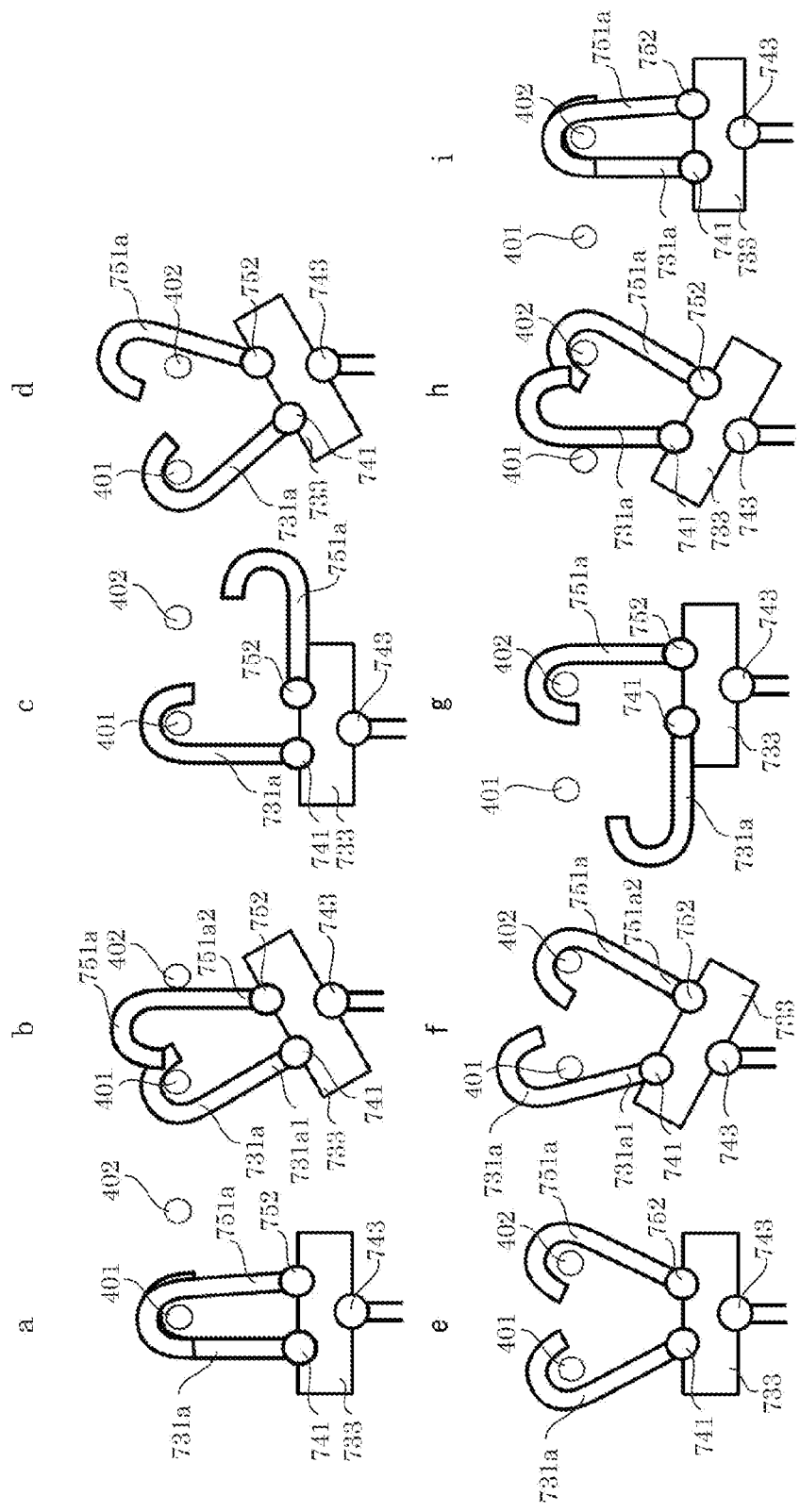
FIG. 77 is a front view of a drone and rails of the delivery system, illustrating an example of how the connection of a connector is switched from a first rail to a second rail, according to Embodiment 8.
Figure 78:
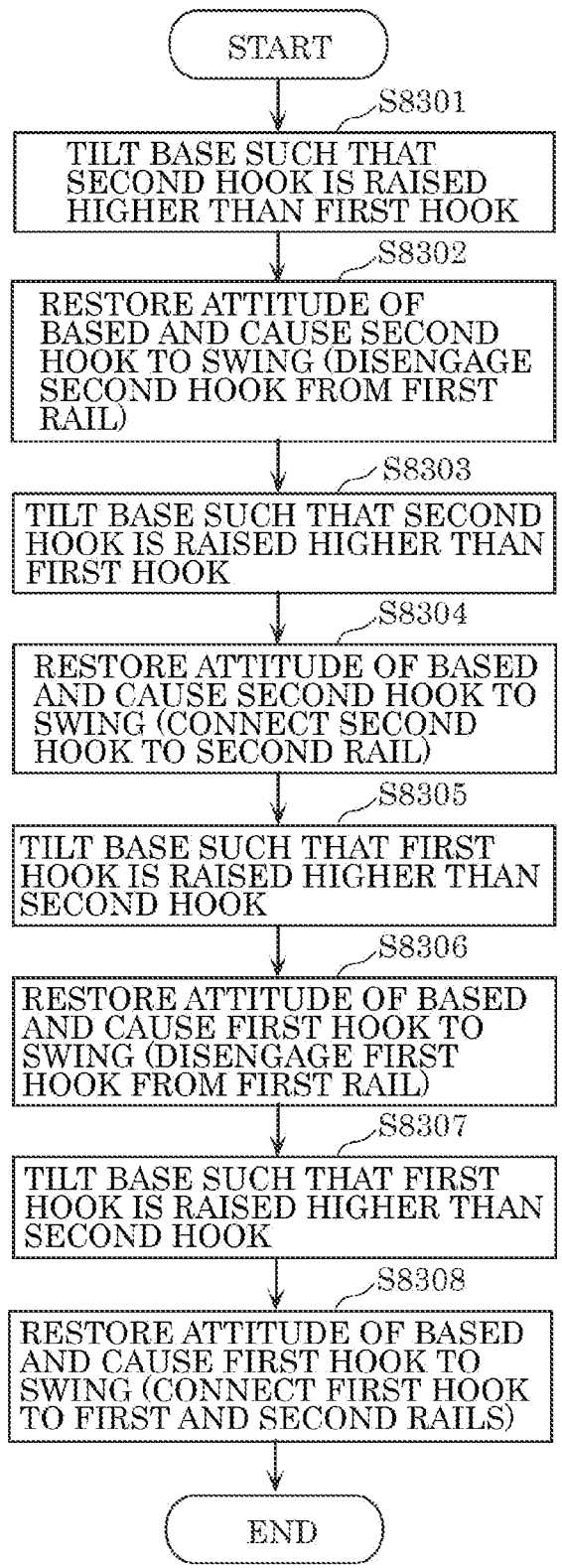
FIG. 78 is a flowchart illustrating, in detail, an example of an operation in which the connection of a connector of a drone of the delivery system is switched from a first rail to a second rail according to Embodiment 8.

FIG. 77 is a rear view illustrating an example of how the connection of connector 730*d* is switched from first rail 401 to second rail 402, as drone 701*c* and rail 400 of delivery system 4 according to Embodiment 8 are viewed from the rear side. FIG. 78 is a flowchart illustrating, in detail, an example of an operation in which the connection of connector 730*d* of drone 701*c* of delivery system 4 is switched from first rail 401 to second rail 402 according to Embodiment 8.

FIG. 77 illustrates first rail 401, second rail 402, and so on supported by support pillar 791*a*. FIG. 77 illustrates an example in which drone 701*c*, first rail 401, and second rail 402 are viewed in the traveling direction (toward the front side) of drone 701*c*.

As illustrated in FIG. 73, in a and b in FIG. 77, and in FIG. 78, when processor 734 hooks second hook 751*a* onto second rail 402, processor 734 controls angle actuator 743 so as to change the angle of base 733 relative to support portion 732 and tilt base 733 such that second hook 751*a* is raised higher than first hook 731*a* (S8301). At this point, second connected end 751*a*2 is located higher than first connected end 731*a*1. In this example, instead of base 733, main body 712 may be tilted.

As illustrated in FIG. 73, in b and c in FIG. 77 and in FIG. 78, second hook 751*a* becomes disengaged from first rail 401. Processor 734 controls angle actuator 743 so as to restore the attitude of base 733 and controls second actuator 752 so as to cause second hook 751*a* to pass between first rail 401 and second rail 402. Then, processor 734 causes second hook 751*a* to swing and disengages second hook 751*a* from first rail 401 (S8302).

As illustrated in FIG. 73, in d in FIG. 77, and in FIG. 78, processor 734 controls second actuator 752 so as to cause second hook 751*a* to swing and to bring second hook 751*a* close to second rail 402 and controls angle actuator 743 so as to change the angle of base 733 relative to support portion 732. Thus, processor 734 tilts base 733 such that second hook 751*a* is raised higher than first hook 731*a* (S8303).

As illustrated in FIG. 73, in e in FIG. 77, and in FIG. 78, processor 734 controls angle actuator 743 so as to restore the attitude of base 733 and controls second actuator 752 so as to cause second hook 751*a* to swing and to hook second hook 751*a* onto second rail 402. Thus, second hook 751*a* becomes connected to second rail 402 (S8304).

As illustrated in FIG. 73, in f in FIG. 77, and in FIG. 78, when first hook 731*a* is to be disengaged from first rail 401, processor 734 controls angle actuator 743 so as to change the angle of base 733 relative to support portion 732 and to tilt base 733 such that first hook 731*a* is raised higher than second hook 751*a* (S8305). At this point, first connected end 731*a*1 is located higher than second connected end 751*a*2. In this example, instead of base 733, main body 712 may be tilted.

As illustrated in FIG. 73, in f and g in FIG. 77, and in FIG. 78, first hook 731a becomes disengaged from first rail 401. Processor 734 controls angle actuator 743 so as to restore the attitude of base 733 and controls first actuator 741 so as to cause first hook 731a to swing and to disengage first hook 731a from first rail 401 (S8306).

As illustrated in FIG. 73, in h in FIG. 77, and in FIG. 78, processor 734 controls second actuator 752 so as to cause second hook 751a to pass between first rail 401 and second rail 402 and approach second rail 402 and controls angle actuator 743 so as to change the angle of base 733 relative to support portion 732. Thus, processor 734 tilts base 733 such that first hook 731a is raised higher than second hook 751a (S8307).

As illustrated in FIG. 73, in i in FIG. 77, and in FIG. 78, processor 734 controls angle actuator 743 so as to restore the attitude of base 733 and controls first actuator 741 so as to cause first hook 731a to swing and to hook first hook 731a onto second rail 402. Thus, first hook 731a becomes connected to second rail 402 (S8308). With the above operation, first hook 731a and second hook 751a become connected to second rail 402.

Advantageous Effects

Next, some advantageous effects of drone 701c and delivery system 4 according to the present embodiment will be described.

Connector 730d further includes second arm 751 connected to one end of support portion 732.

According to this configuration, not only first arm 731 but also second arm 751 can be connected to rail 400. Therefore, the possibility that drone 701c falls off from rail 400 can be reduced, and the safety in the system that includes drone 701c can be further increased.

First arm 731 is a first hanger for hanging drone 701c from rail 400. Second arm 751 is a second hanger for hanging drone 701c from rail 400. Connector 730d further includes first actuator 741 that sets the angle of first arm 731 relative to support portion 732 and second actuator 752 that sets the angle of second arm 751 relative to support portion 732.

This configuration makes it possible to hang drone 701c from rail 400 reliably. Therefore, the possibility that drone 701c falls off from rail 400 can be reduced, and the safety in the system that includes drone 701c can be further increased.

Connector 730d further includes base 733 disposed between support portion 732 and first and second arms 731 and 751 and a third actuator that sets the angle of base 733 relative to support portion 732.

According to this configuration, the height of first arm 731 relative to main body 712 or the height of second arm 751 relative to main body 712 can be changed only by changing the angle of base 733. Therefore, the heights of first arm 731 and second arm 751 can be changed without tilting main body 712, and thus the stability of drone 701c can be maintained.

First arm 731 includes first hook 731a that extends from first connected end 731a1 connected to first actuator 741 to first open end 731b1. Second arm 751 includes second hook 751a that extends from second connected end 751a2 connected to second actuator 752 to second open end 751b2. First hook 731a includes first bent portion 731c that is bent in a first direction and that is located between first connected end 731a1 and first open end 731b1. Second hook 751a includes second bent portion 751c that is bent in a second direction opposite the first direction and that is located between second connected end 751a2 and second open end 751b2.

According to this configuration, the horizontal attitude of main body 712 can be maintained when first hook 731a is hung on rail 400, and the horizontal attitude of main body 712 can be maintained also when second hook 751a is hung on rail 400. Therefore, first hook 731a and second hook 751a can maintain an appropriate attitude of drone 701c.

First hook 731a and second hook 751a make it easier to hook drone 701c from rail 400.

When drone 701c is slidably hung from first rail 401 via first hook 731a, processor 734 controls second actuator 752 so as to hook second hook 751a onto second rail 402 that extends along and adjacent to first rail 401 and controls first actuator 741 so as to disengage first hook 731a from first rail 401.

According to this configuration, for example, when first hook 731a of drone 701c is connected to first rail 401 and if first hook 731a is disengaged from first rail 401 after second hook 751a has become connected to second rail 402, drone 701c can switch the connection from first rail 401 to second rail 402 serving as another rail 400 and move along second rail 402. Therefore, drone 701c can reliably switch from one rail 400 to another rail 400 at the branching point of these rails 400. Thus, the possibility that drone 701c falls off can be reduced, and the safety in the system that includes drone 701c can be further increased.

Delivery system 4 includes drone 701c, a plurality of support pillars 791a, and first rail 401 and second rail 402 that are stretched between two adjacent support pillars 791a among the plurality of support pillars 791a.

When drone 701c is slidably hung from first rail 401 via first hook 731a and second hook 751a, processor 734 controls second actuator 752 so as to disengage second hook 751a from first rail 401 and to hook second hook 751a onto second rail 402 extending along and adjacent to first rail 401 and controls first actuator 741 so as to disengage first hook 731a from first rail 401 and to hook first hook 731a onto second rail 402.

According to this configuration, for example, when first hook 731a and second hook 751a of drone 701c are connected to first rail 401 and if first hook 731a is disengaged from first rail 401 and connected to second rail 402 after second hook 751a has been disengaged from first rail 401 and connected to second rail 402, drone 701c can switch the connection from first rail 401 to second rail 402 serving as another rail 400 and then move along second rail 402. Therefore, drone 701c can reliably switch from one rail 400 to another rail 400 at the branching point of these rails 400. Thus, the possibility that drone 701c falls off can be reduced, and the safety in the system that includes drone 701c can be further increased.

When second hook 751a is to be hooked onto second rail 402, processor 734 tilts main body 712 or support portion 732 in a second direction so as to position second connected end 751a2 higher than first connected end 731a1. When first hook 731a is to be disengaged from first rail 401, processor 734 tilts main body 712 or support portion 732 in a first direction so as to position first connected end 731a1 higher than second connected end 751a2.

According to this configuration, by tilting main body 712 or support portion 732, first hook 731a and second hook 751a can be hooked onto rail 400 with ease, or first hook 731a and second hook 751a can be disengaged from rail 400 with ease.

Delivery system 4 further includes protective net 794 stretched along a position vertically below the approaching region of first rail 401 and second rail 402. The approaching region is a region where the distance between first rail 401 and second rail 402 is smaller than or equal to the size of drone 701c.

According to this configuration, since distance H2 between first rail 401 and second rail 402 is smaller than width H1 (the size) of main body 712, drone 701c can make a switch from first rail 401 to second rail 402 with ease and then move along second rail 402.

As protective net 794 is provided along a position vertically below the approaching region of first rail 401 and second rail 402, even if drone 701c becomes disengaged from first rail 401 and second rail 402, the possibility that drone 701c falls to the ground can be reduced. Therefore, the safety in the system that includes drone 701c can be further increased.

Variation of Embodiment 8

In the following, basic configurations of drone 701c and of a delivery system according to the present variation are identical to the basic configurations of the drones and of the delivery systems according to Embodiment 7 and so on. Therefore, the descriptions of the basic configurations of drone 701c and of the delivery system according to the present variation will be omitted as appropriate.

Figure 79:
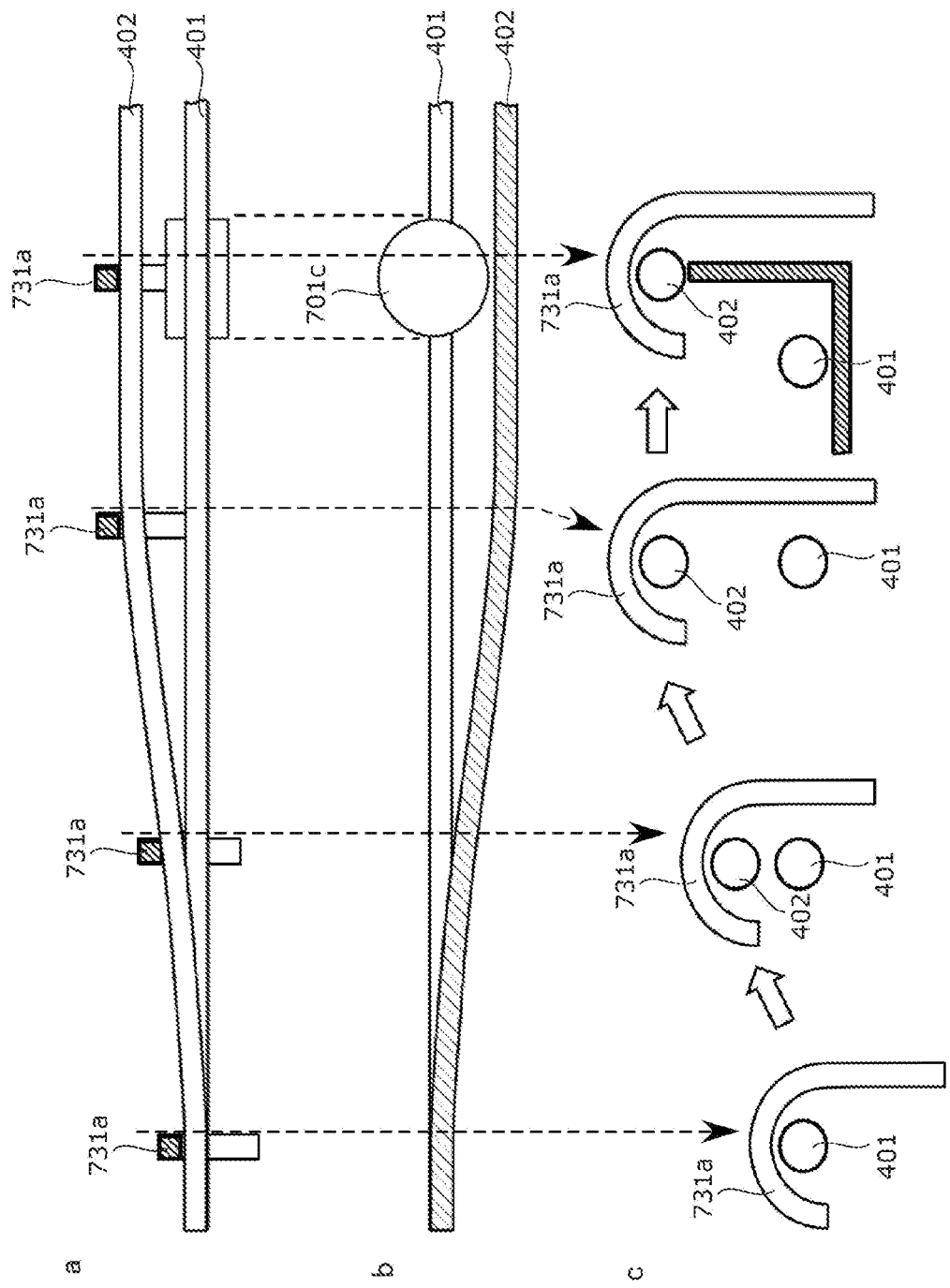
FIG. 79 illustrates a side view, a top view, and a front view of a first hook of a drone and rails of the delivery system according to Embodiment 8.

FIG. 79 illustrates a top view, a side view, and a front view of rails and first hook 731a of drone 701c of the delivery system according to a variation of Embodiment 8. In FIG. 79, a is a side view of first hook 731a of drone 701c of the delivery system, first rail 401, and second rail 402. In FIG. 79, b is a top view of first hook 731a of drone 701c of the delivery system, first rail 401, and second rail 402. In FIG. 79, c is a front view of first hook 731a of drone 701c of the delivery system, first rail 401, and second rail 402, as viewed from the traveling direction of drone 701c of the delivery system.

As illustrated in FIG. 79, in the present variation, the height of at least a portion of second rail 402 is higher than the height of adjacent first rail 401. Second rail 402 is a rail that branches off from first rail 401, and the leading end portion of second rail 402 is disposed along the direction in which first rail 401 extends. A portion of second rail 402 is disposed higher than first rail 401 and serves as a passing siding that extends so as to detour first rail 401. Second rail 402 is a rail for separating one of two drones 701c when these two drones 701c travel toward each other from opposite directions on first rail 401. In this example, first rail 401 and second rail 402 may each be a power transmission line.

In the delivery system according to the present variation, when a first drone of two drones 701c travels in a first moving direction along first rail 401 and a second drone of two drones 701c travels in a second moving direction opposite the first moving direction along first rail 401, the first drone switches the connection of connector 730d from first rail 401 to second rail 402 upon detecting the approaching second drone with the use of camera sensor 334 or the like. Since second rail 402 is higher than first rail 401, the second drone traveling on first rail 401 and the first drone traveling on second rail 402 can pass each other. Setting the heights of first rail 401 and second rail 402 differently can reduce the possibility that main body 712 of the first drone or a package therein makes contact with main body 712 of the second drone or a package therein.

In this example, since it suffices that the first drone and the second drone can pass each other, the distance between the first drone and the second drone may be secured by providing a space between first rail 401 and second rail 402.

Some advantageous effects of drone 701c and the delivery system configured as described above according to the present variation will be described.

The height of at least a portion of second rail 402 is higher than the height of adjacent first rail 401.

According to this configuration, when two drones 701c are traveling along first rail 401 in opposite directions, one drone 701c of two drones 701c can take refuge on second rail 402. Second rail 402 can be used as a refuge track. This configuration can keep drones 701c from colliding with each other or suppress the congestion of drones 701c.

Embodiment 9

In the following, basic configurations of drone 701 and of delivery system according to the present embodiment are identical to the basic configurations of the drones and of the delivery systems described in Embodiment 7 and so on. Therefore, the descriptions of the basic configurations of drone 701 and of delivery system 5 according to the present embodiment will be omitted as appropriate. The present embodiment differs from Embodiment 7 and so on in that thruster device 910 is further provided on a package.

Figure 80:
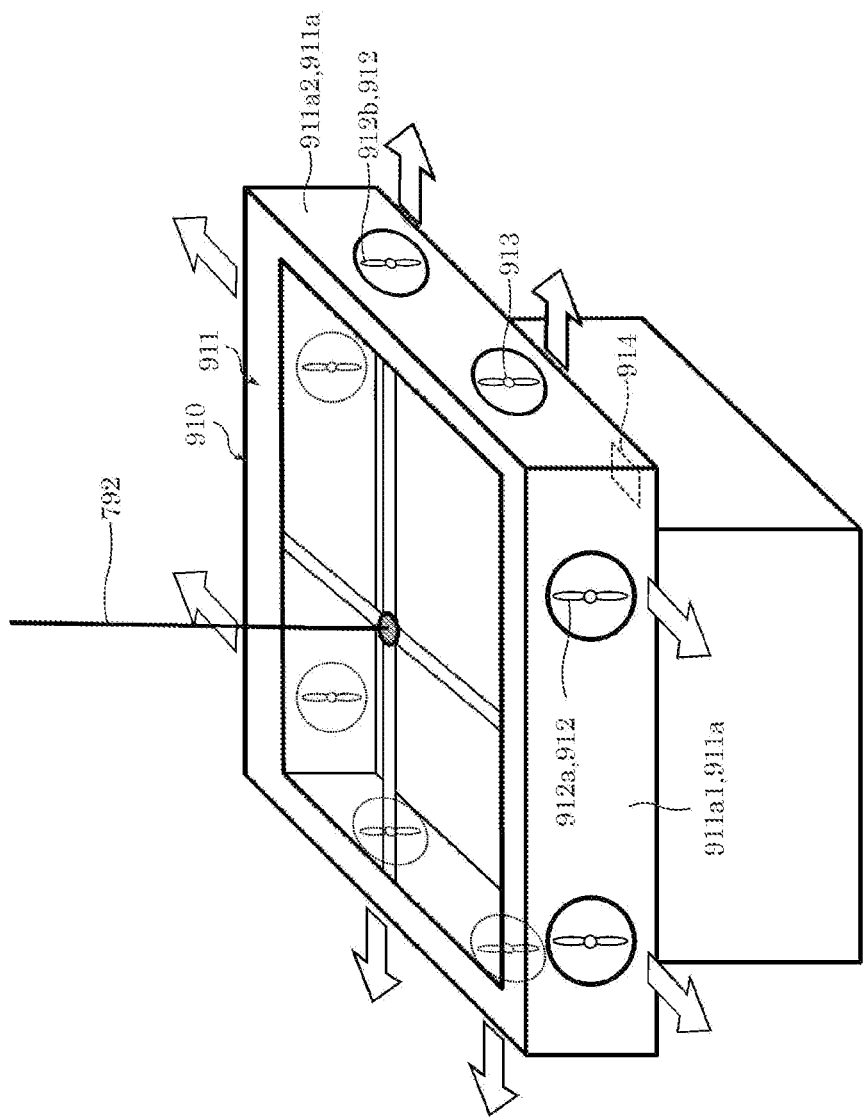
FIG. 80 is a perspective view illustrating a thruster device of a delivery system and a package mounted to the thruster device according to Embodiment 9.
Figure 81:
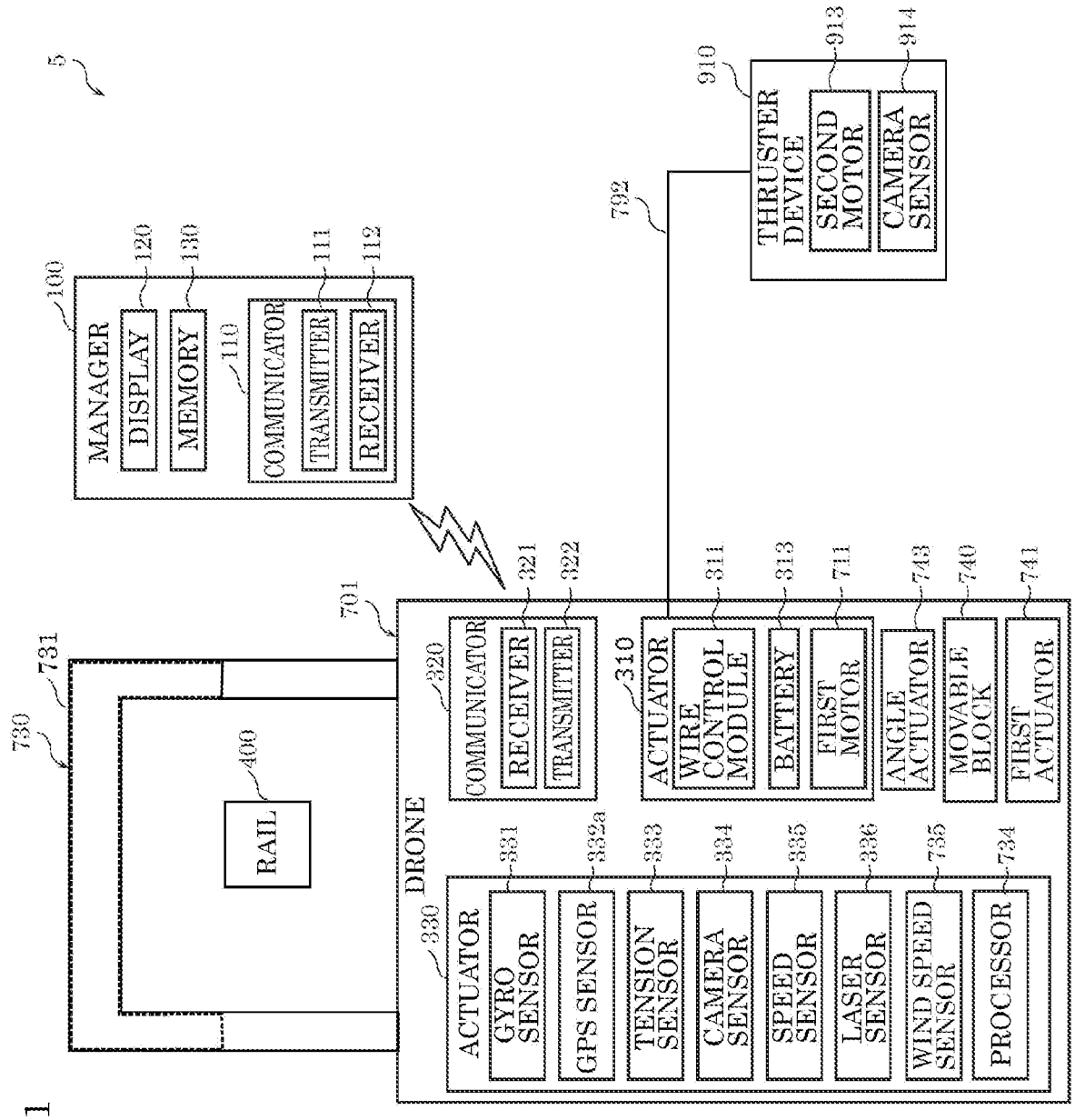
FIG. 81 is a block diagram illustrating a configuration of the delivery system according to Embodiment 9.

FIG. 80 is a perspective view illustrating thruster device 910 of delivery system 5 and a package provided with thruster device 910 according to Embodiment 9. FIG. 81 is a block diagram illustrating a configuration of delivery system 5 according to Embodiment 9.

As illustrated in FIGS. 80 and 81, delivery system 5 further includes thruster device 910.

Thruster device 910 is a device that is removably attached to a package and that can correct the position of the package. Thruster device 910 can communicate with main body 712 of drone 701 via hanging wire 792 or may wirelessly communicate with main body 712 via a communication module or the like. In this example, thruster device 910 may also be drone 701.

Thruster device 910 includes support member 911, a plurality of propellers 912, a plurality of second motors 913, and camera sensor 914.

Support member 911 engages with an upper portion of a package and can thus retain the package in a predetermined attitude. A lower end of hanging wire 792 is coupled to a center portion of support member 911. In the present embodiment, support member 911 is a frame-like member that encloses an upper periphery of a package. Support member 911 encloses the upper periphery of the package and grabs the package therein or connects itself to the package. Thus, support member 911 can retain the package in a predetermined attitude. In the present embodiment, support member 911 is a rectangular frame-like member.

Support member 911 supports the plurality of second motors 913 and the plurality of propellers 912. The plurality of second motors 913 and the plurality of propellers 912 are provided on an outer peripheral side portion 911a of support member 911. In the present embodiment, two propellers 912 and two second motors 913 are provided on each side of support member 911.

The plurality of propellers 912 are each disposed on outer peripheral side portion 911a of support member 911 and provided on support member 911 so as to produce the propulsive force in the horizontal direction. The plurality of propellers 912 are each provided on support member 911 in such an attitude where the plane of rotation of propeller 912 is substantially parallel to the vertical direction, and each propeller 912 sends out the air toward the outside of support member 911. The plane of rotation is a plane in which the blades of each propeller 912 rotate, and the plane of rotation is orthogonal to the axis of rotation of each propeller 912 (the axis of rotation of each second motor 913).

The plurality of propellers 912 include first propellers 912a and second propellers 912b. First propellers 912a are disposed on first side portion 911a1 that is included in outer peripheral side portion 911a of support member 911. Second propellers 912b are disposed on second side portion 911a2 that is included in outer peripheral side portion 911a of support member 911 and that is different from first side portion 911a1. In the present embodiment, first propellers 912a are provided on each of first side portion 911a1 on the front side and first side portion 911a1 on the rear side of outer peripheral side portion 911a, and second propellers 912b are provided on each of second side portion 911a2 on the right side and second side portion 911a2 on the left side of outer peripheral side portion 911a. The front side corresponds to the front side of thruster device 910 in the drawing, the rear side corresponds to the rear side of thruster device 910 in the drawing, the right side corresponds to the right side of thruster device 910 in the drawing, and the left side corresponds to the left side of thruster device 910 in the drawing.

The plurality of second motors 913 are electric motors that rotate respective propellers 912. For example, the power is supplied to second motors 913 from battery 313 of the main body of drone 701 via hanging wire 792. In this example, a battery may be provided in support member 911, and the power may be supplied to each of the plurality of second motors 913 from that battery.

Camera sensor 914 is provided on the side of support member 911 where support member 911 faces a package, that is, provided on a lower side of support member 911 in the vertical direction. Camera sensor 914 captures an image of delivery box 470 and outputs the acquired image information to processor 734. A plurality of camera sensors 914 may be provided.

Processor 734 of controller 330 provided in drone 701 performs control of actuating at least one of the plurality of second motors 913 of thruster device 910 in at least a portion of the period in which hanging wire 792 is being let out. Specifically, processor 734 calculates the position of delivery box 470 and the position of the package based on the image information acquired from camera sensor 914 of thruster device 910 and the image information acquired from camera sensor 334 of the main body of drone 701. Processor 734 controls the plurality of second motors 913 of thruster device 910 such that the package is located at a position vertically above the opening of the delivery box and moves thruster device 910 and the package such that the package is contained within the opening of the delivery box as viewed from the above. Specifically, processor 734 calculates the error (positional mismatch) between the opening of the delivery box and the package and corrects the position of the package relative to the opening of the delivery box so as to correct the calculated error.

Now, the procedures for storing a package into delivery box 470 with the use of thruster device 910 will be described. In the following, any description that overlaps the description given with reference to FIG. 58 will be omitted as appropriate.

Figure 82:
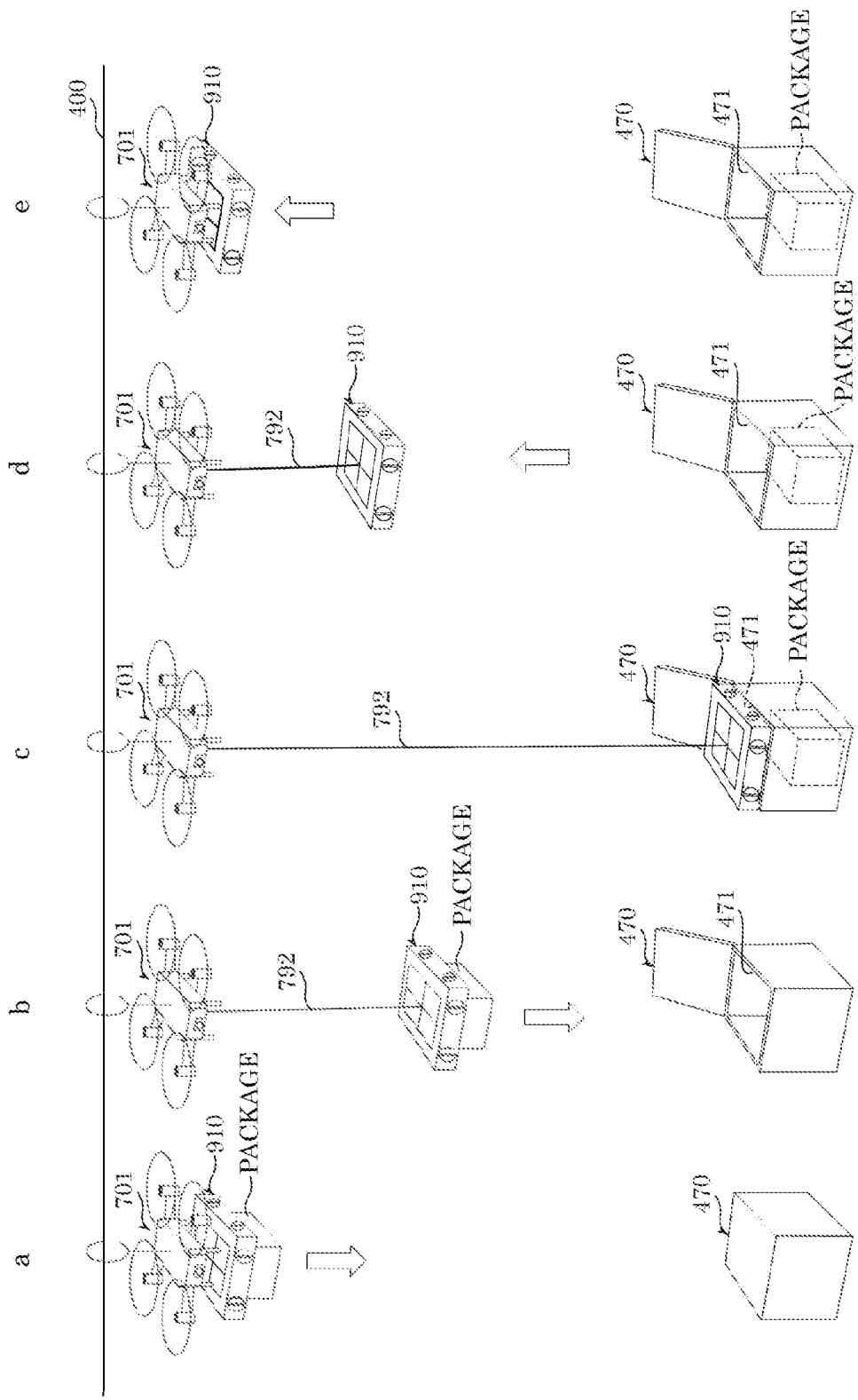
FIG. 82 is a schematic diagram illustrating an example of how a thruster device of the delivery system stores a package into a delivery box according to Embodiment 9.

FIG. 82 is a schematic diagram illustrating an example of how thruster device 910 of delivery system 5 stores a package into delivery box 470 according to Embodiment 9.

As illustrated in FIG. 81 and in a and b in FIG. 82, first, upon drone 701 arriving at a position vertically above delivery box 470 serving as a receiver, processor 734 starts letting out hanging wire 792 by controlling wire control module 311. As wire control module 311 lets out hanging wire 792 and when the distance between the package and delivery box 470 has reached a predefined distance, delivery box 470 opens its lid to release the opening.

Next, when processor 734 lets out hanging wire 792 by controlling wire control module 311, processor 734 measures the position of the package and the position of delivery box 470 and calculates an error in the position of the package relative to delivery box 470. If the error is greater than or equal to a predefined value, processor 734 corrects the position of the package relative to opening 471 of delivery box 470 by controlling each of the plurality of second motors 913 of thruster device 910. Processor 734 may move drone 701 so as to correct the position of the package relative to opening 471 of delivery box 470 by controlling the plurality of first motors 711. How the position of the package is corrected with the use of thruster device 910 will be described later in detail.

As illustrated in FIG. 81 and in c in FIG. 82, processor 734 positions thruster device 910 relative to opening 471 of delivery box 470 by repeatedly correcting the error in the position of thruster device 910 relative to the position of opening 471 of delivery box 470 and brings the position of thruster device 910 to match the position of opening 471 of delivery box 470. Processor 734 stores the package into delivery box 470 with the use of thruster device 910. Specifically, thruster device 910 descends over opening 471 of delivery box 470 and stores the package into delivery box 470.

As illustrated in FIG. 81 and in d and e in FIG. 82, after thruster device 910 has stored the package in delivery box 470, thruster device 910 cuts off the package, ascends, and becomes mounted onto the main body of drone 701. Then, drone 701 returns to the sender.

Now, an example in which the position of a package is corrected with the use of thruster device 910 will be described.

Figure 83:
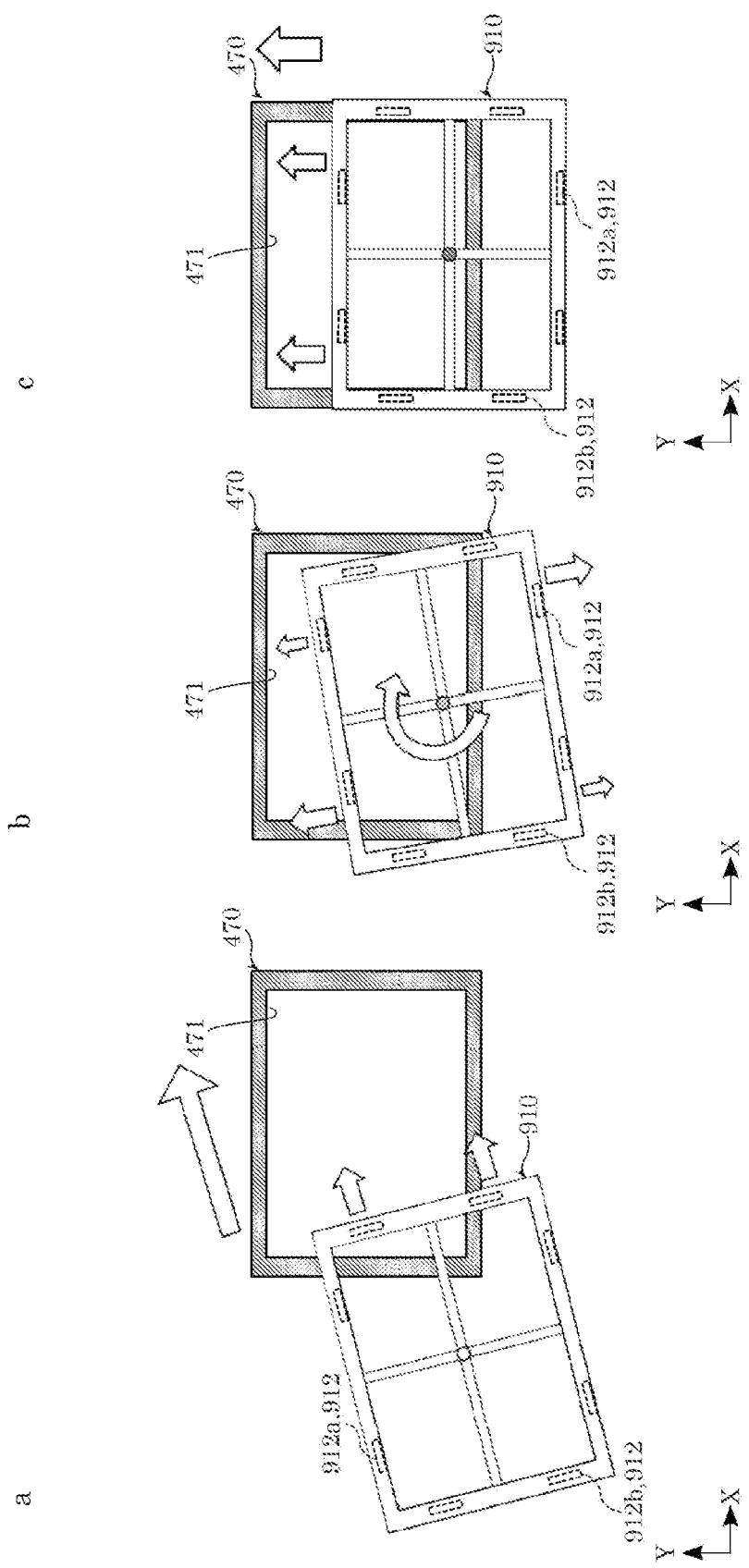
FIG. 83 is a top view of a thruster device of the delivery system and a delivery box according to Embodiment 9.

FIG. 83 is a top view of thruster device 910 of delivery system 5 and delivery box 470 according to Embodiment 9. FIG. 83 illustrates thruster device 910 and delivery box 470 as viewed from the above.

In FIG. 81 and in a in FIG. 83, although opening 471 of delivery box 470 and thruster device 910 partially overlap each other, thruster device 910 cannot store the package into delivery box 470 in this state. Therefore, processor 734 moves thruster device 910 in an XY-direction that is a composite of the X-axis direction and the Y-axis direction by controlling each of the plurality of second motors 913. For example, processor 734 moves drone 701 in the XY-direction by controlling each of two second motors 913 on second side portion 911a2 on the left side, and this results in the state illustrated in b in FIG. 83.

In FIG. 81 and in b in FIG. 83, opening 471 of delivery box 470 and thruster device 910 partially overlap each other, but the position of opening 471 of delivery box 470 and the position of the package fail to match. Processor 734 rotates thruster device 910 by a predetermined roll angle in the XY-plane by controlling each of the plurality of second motors 913. For example, processor 734 controls second motor 913 on the right side on first side portion 911a1 on the rear side and controls second motor 913 on the left side on first side portion 911a1 on the front side. Thus, processor 734 rotates thruster device 910 in the XY-plane, and this results in the state illustrated in c in FIG. 83.

In FIG. 81 and in c in FIG. 83, opening 471 of delivery box 470 and thruster device 910 partially overlap each other, but the position of opening 471 of delivery box 470 and the position of the package still fail to match. Processor 734 moves thruster device 910 in the Y-axis direction by controlling each of the plurality of second motors 913. For example, processor 734 moves drone 701 in the Y-axis direction by controlling each of two second motors 913 on first side portion 911a1 on the front side and brings the position of thruster device 910 to match the position of opening 471 of delivery box 470 so that the package is contained within opening 471 of delivery box 470. Thus, thruster device 910 can store the package into delivery box 470.

FIG. 84 is a schematic diagram illustrating an example of how drone 701 delivers a package to an apartment building with the use of thruster device 910 of delivery system 5 according to Embodiment 9.

As illustrated in FIGS. 81 and 84, in a case where delivery box 470 is present vertically below rail 400, processor 734 recognizes delivery box 470 based on the image information acquired from camera sensor 914 and stores a package into delivery box 470 by controlling the plurality of second motors 913 of thruster device 910.

Specifically, in FIG. 81 and in a in FIG. 84, processor 734 starts letting out hanging wire 792 by controlling wire control module 311, calculates the position of delivery box 470 based on the image information, and controls the plurality of second motors 913. This causes thruster device 910 to move toward delivery box 470. Then, thruster device 910 moves to a position vertically above opening 471 of delivery box 470.

In FIG. 81 and in b in FIG. 84, processor 734 causes thruster device 910 to store the package into delivery box 470. Specifically, thruster device 910 descends toward opening 471 of delivery box 470 and stores the package into delivery box 470.

As illustrated in FIG. 81 and in c in FIG. 84, after thruster device 910 has stored the package in delivery box 470, thruster device 910 cuts off the package, ascends, and becomes mounted onto main body 712. Then, drone 701 returns to the sender.

Advantageous Effects

Next, some advantageous effects of drone 701 and delivery system 5 according to the present embodiment will be described.

Drone 701 further includes thruster device 910 removably attached to a package. Thruster device 910 includes a plurality of propellers 912, a plurality of second motors 913 that rotate respective propellers 912, and support member 911 that supports the plurality of second motors 913.

According to this configuration, even if the position of drone 701 fails to match the position directly above delivery box 470, thruster device 910 can guide the package to delivery box 470. Therefore, drone 701 can reliably lower the package and store the package into delivery box 470, which in turn makes it possible to deliver the package more reliably to the receiver. Even in a case where opening 471 of delivery box 470 is small and it is hard to insert a package into delivery box 470, drone 701 can reliably insert the package into delivery box 470. Thus, drone 701 does not require a large space for landing.

In particular, with this drone 701, even in a case where drone 701 moves from the position directly above delivery box 470 due to the wind or the like, thruster device 910 can store a package into delivery box 470.

The plurality of propellers 912 include first propellers 912a disposed on first side portion 911a1 of support member 911 and second propellers 912b disposed on second side portion 911a2 of support member 911 that is different from first side portion 911a1.

According to this configuration, the position and the orientation of thruster device 910 relative to delivery box 470 can be adjusted. Therefore, with this drone 701, thruster device 910 can more reliably store a package into delivery box 470.

Processor 734 performs control of causing thruster device 910 to actuate at least one of the plurality of second motors 913 in at least a portion of the period in which hanging wire 792 is being let out.

According to this configuration, when a package is lowered from drone 701, the position and the orientation of thruster device 910 relative to delivery box 470 can be adjusted. Therefore, with this drone 701, a package can be stored smoothly into delivery box 470.

Other Variations

For example, in the foregoing embodiments and the variations of the foregoing embodiments, a child drone may include a wheel that allows the child drone to travel like a vehicle on a rail. The child drone may be self-propelled with the wheel only while the child drone travels on a rail on a building. In this case, a rail may be a plate-like member on which the child drone can travel. A guide rail may be provided on a rail along its edge opposite the building so that the child drone does not fall off from the rail. This can ensure the safety.

In the foregoing embodiments, the constituent elements may each be implemented by dedicated hardware or may each be implemented through execution of a software program suitable for a corresponding constituent element. Each of the constituent elements may be implemented as a program executing unit, such as a CPU or a processor, reads out a software program recorded on a recording medium, such as a hard disk or a semiconductor memory, and executes the software program. Herein, software that implements the unmanned aerial vehicle and so on of the foregoing embodiments described above is a program such as the one described below.

Specifically, this program causes a computer to execute a method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

The techniques described above may be applied to an autonomous aerial vehicle instead of an unmanned aerial vehicle, for example. In this case, the term "unmanned aerial vehicle" or "drone" used in the foregoing descriptions is replaced with "autonomous aerial vehicle" as appropriate. Alternatively, the techniques described above may be applied to any aerial vehicle regardless of whether the aerial vehicle is manned or unmanned or regardless of whether the aerial vehicle is autonomously driven or manually driven.

[Supplementation]

A control method according to a first aspect is a control method of controlling a first unmanned aerial vehicle and a second unmanned aerial vehicle in a system that includes the first unmanned aerial vehicle and the second unmanned aerial vehicle coupled to the first unmanned aerial vehicle via a coupling line. The control method includes (A) causing the first unmanned aerial vehicle and the second unmanned aerial vehicle to move forward and (B) stopping the first unmanned aerial vehicle from moving forward when an anomaly has occurred in flying of the second unmanned aerial vehicle.

A control method according to a second aspect is a control method according to the first aspect. In the above (B), an operation of the first unmanned aerial vehicle is changed from the forward movement to hovering.

A control method according to a third aspect is a control method according to the first or second aspect. In the above (A), the first unmanned aerial vehicle monitors the tension in the coupling line. In the above (B), the first unmanned aerial vehicle detects an anomaly in flying of the second unmanned aerial vehicle based on a change in the tension.

A control method according to a fourth aspect is a control method according to the third aspect. In the above (B), the first unmanned aerial vehicle determines that an anomaly has occurred in flying of the second unmanned aerial vehicle when the tension has reached or exceeded a predetermined value.

A control method according to a fifth aspect is a control method according to the first or second aspect. In the above (B), the second unmanned aerial vehicle is caused to output an anomaly signal when an anomaly has occurred in flying of the second unmanned aerial vehicle, and the first unmanned aerial vehicle determines that an anomaly has occurred in flying of the second unmanned aerial vehicle in response to receiving the anomaly signal.

A control method according to a sixth aspect is a control method according to the fifth aspect. The coupling line includes a communication cable, and the anomaly signal is transmitted from the second unmanned aerial vehicle to the first unmanned aerial vehicle via the communication cable.

A control method according to a seventh aspect is a control method according to the first or second aspect. The first unmanned aerial vehicle includes a camera. In the above (B), the first unmanned aerial vehicle determines that an anomaly has occurred in the second unmanned aerial vehicle based on a video from the camera.

A control method according to an eighth aspect is a control method according to any one of the first to seventh aspects. In the above (B), the length of the coupling line is reduced when an anomaly has occurred in the second unmanned aerial vehicle.

A control method according to a ninth aspect is a control method according to the eighth aspect. In the above (B), the length of the extended coupling line is reduced by causing the first unmanned aerial vehicle to take up a portion of the coupling line.

A control method according to a tenth aspect is a control method according to any one of the first to ninth aspects. The system further includes a first rail fixed at a position spaced apart from a ground surface. In the above (A), the first unmanned aerial vehicle is caused to move forward at a position where the first unmanned aerial vehicle is closer to the first rail than the second unmanned aerial vehicle is.

A control method according to an eleventh aspect is a control method according to the tenth aspect. In the above (A), the first unmanned aerial vehicle is caused to move forward at a position lower than the first rail.

A control method according to a twelfth aspect is a control method according to the tenth or eleventh aspect. In the above (A), the first unmanned aerial vehicle is caused to move forward along the first rail with the first unmanned aerial vehicle being movably coupled to the first rail.

A control method according to a thirteenth aspect is a control method according to the tenth or eleventh aspect. In the above (B), the first unmanned aerial vehicle is coupled to the first rail when an anomaly has occurred in flying of the second unmanned aerial vehicle.

A control method according to a fourteenth aspect is a control method according to the thirteenth aspect. The first unmanned aerial vehicle includes an arm that can be opened and closed. In the above (A), the first unmanned aerial vehicle is caused to move forward with the arm open. In the above (B), the first unmanned aerial vehicle is coupled to the first rail by closing the arm so as to enclose the first rail.

A control method according to a fifteenth aspect is a control method according to the fourteenth aspect. The arm includes a first arm and a second arm. When the arm is open, the distance between one end of the first arm and one end of the second arm is greater than the width of the first rail. When the arm is closed, the distance between the one end of the first arm and the one end of the second arm is smaller than the width of the first rail.

A control method according to a sixteenth aspect is a control method according to any one of the first to fifteenth aspects. The first unmanned aerial vehicle is smaller than the second unmanned aerial vehicle.

A control method according to a seventeenth aspect is a control method according to any one of the first to sixteenth aspects. One end of the coupling line is coupled to a lower surface of the first unmanned aerial vehicle while the first unmanned aerial vehicle is in a flying state.

A control method according to an eighteenth aspect is a control method according to the seventeenth aspect. The second unmanned aerial vehicle includes a ring that encloses the main body of the second unmanned aerial vehicle and that is rotatable relative to the main body. An outer peripheral surface of the ring extends along a lower surface, a first side surface, an upper surface, and a second side surface of the main body of the second unmanned aerial vehicle while the second unmanned aerial vehicle is in a flying state. The other end of the coupling line is coupled to the outer peripheral surface of the ring of the second unmanned aerial vehicle while the second unmanned aerial vehicle is in a flying state.

A control method according to a nineteenth aspect is a control method according to any one of the tenth to fifteenth aspects. The system includes a management server. The first rail includes a first recording surface on which first identification information for identifying the first rail is recorded. The first unmanned aerial vehicle includes at least one reading sensor for reading the first identification information from the first recording surface. In the above (A), the first unmanned aerial vehicle causes the at least one reading sensor to read the first identification information continuously or intermittently. The first unmanned aerial vehicle causes itself to identify its own position based on the first identification information. The first unmanned aerial vehicle is caused to wirelessly transmit first position information indicating the position of the first unmanned aerial vehicle to the management server continuously or intermittently.

A control method according to a twentieth aspect is a control method according to the nineteenth aspect. In the above (A), the first unmanned aerial vehicle is caused to wirelessly transmit second position information indicating the relative positions of the first unmanned aerial vehicle and the second unmanned aerial vehicle to the management server continuously or intermittently. The management server is caused to identify the position of the second unmanned aerial vehicle based on the first position information and the second position information.

A control method according to a twenty-first aspect is a control method according to the nineteenth or twentieth aspect. Prior to the above (A), the first unmanned aerial vehicle is caused to download, from the management server, route information indicating a plurality of rails disposed along a planned flying route of the first unmanned aerial vehicle and the second unmanned aerial vehicle. In the above (A), the first unmanned aerial vehicle is caused to compare the first identification information against the rail information so as to identify the position of the first unmanned aerial vehicle.

A control method according to a twenty-second aspect is a control method according to the twenty-first aspect. The rail information includes identification information of each of the plurality of rails and coordinate information indicating the geographical coordinates of each of the plurality of rails.

A control method according to a twenty-third aspect is a control method according to any one of the nineteenth to twenty-second aspects. The at least one reading sensor is at least one optical sensor.

A control method according to a twenty-fourth aspect is a control method according to any one of the nineteenth to twenty-third aspects. The recording surface is disposed on the outer peripheral surface of the first rail. The at least one optical sensor includes a plurality of optical sensors. In the above (A), the plurality of optical sensors scan the recording surface in mutually different directions.

A control method according to a twenty-fifth aspect is a control method according to any one of the nineteenth to twenty-fourth aspects. The first recording surface has further recorded thereon altitude information indicating the altitude of the first rail.

A control method according to a twenty-sixth aspect is a control method according to any one of the first to twenty-fifth aspects. The control method further includes (C) changing the flying course of the second unmanned aerial vehicle when a following aerial vehicle that flies behind the second unmanned aerial vehicle passes the second unmanned aerial vehicle.

A control method according to a twenty-seventh aspect is a control method according to the twenty-sixth aspect. In the above (C), the flying course of the second unmanned aerial vehicle is changed to a direction away from the first unmanned aerial vehicle.

A control method according to a twenty-eighth aspect is a control method according to the twenty-sixth or twenty-seventh aspect. In the above (C), the second unmanned aerial vehicle is returned to its original flying course after the following aerial vehicle has passed the second unmanned aerial vehicle.

A control method according to a twenty-ninth aspect is a control method according to any one of the twenty-sixth to twenty-eighth aspects. In the above (C), the length of the coupling line extending from the first unmanned aerial vehicle to the second unmanned aerial vehicle is increased before the following aerial vehicle passes the second unmanned aerial vehicle.

A control method according to a thirtieth aspect is a control method according to the tenth aspect. The system further includes a third unmanned aerial vehicle that shares the first rail with the first unmanned aerial vehicle and a fourth unmanned aerial vehicle that is coupled to the third unmanned aerial vehicle via a coupling line. The control method further (D) changes the flying course of the first unmanned aerial vehicle when the third unmanned aerial vehicle flying behind the first unmanned aerial vehicle passes the first unmanned aerial vehicle.

A control method according to a thirty-first aspect is a control method according to the thirtieth aspect. In the above (D), the flying course of the first unmanned aerial vehicle is changed to a direction away from the first rail.

A control method according to a thirty-second aspect is a control method according to the thirty-first aspect. The system further includes a second rail that is fixed at a position spaced apart from the ground surface and that extends parallel to the first rail. In the above (D), the flying course of the first unmanned aerial vehicle is changed to a direction approaching the second rail.

A control method according to a thirty-third aspect is a control method according to the thirty-second aspect. In the above (A), the first unmanned aerial vehicle is caused to move forward along the first rail with the first unmanned aerial vehicle being movably coupled to the first rail. In the above (D), the first unmanned aerial vehicle is caused to disengage itself from the first rail and couple itself to the second rail before the third unmanned aerial vehicle passes the first unmanned aerial vehicle, and the first unmanned aerial vehicle is caused to disengage itself from the second rail and couple itself to the first unmanned aerial vehicle after the third unmanned aerial vehicle has passed the first unmanned aerial vehicle.

A control method according to a thirty-fourth aspect is a control method according to the thirty-second or thirty-third aspect. When viewed in a direction perpendicular to the ground surface, the distance between the first rail and the second rail is greater than the size of the first unmanned aerial vehicle.

A control method according to a thirty-fifth aspect is a control method according to any one of the thirty-second to thirty-fourth aspects. The first rail and the second rail are disposed at the same height from the ground surface.

A control method according to a thirty-sixth aspect is a control method according to the tenth aspect. The system further includes a third unmanned aerial vehicle that is coupled to the second unmanned aerial vehicle via a coupling line and that shares the first rail with the first unmanned aerial vehicle, a fourth unmanned aerial vehicle that shares the first rail with the first unmanned aerial vehicle and the third unmanned aerial vehicle, and a fifth unmanned aerial vehicle that is coupled to the fourth unmanned aerial vehicle via a coupling line. In the above (A), the first unmanned aerial vehicle and the third unmanned aerial vehicle are each caused to move forward along the first rail with the first unmanned aerial vehicle and the third unmanned aerial vehicle being movably coupled to the first rail. In the control method, furthermore, (F) in a case where the first unmanned aerial vehicle and the third unmanned aerial vehicle are flying behind the fourth unmanned aerial vehicle and where the second unmanned aerial vehicle is flying behind the fifth unmanned aerial vehicle, when the second unmanned aerial vehicle is to pass the fifth unmanned aerial vehicle, the first unmanned aerial vehicle is disengaged from the first rail, the first unmanned aerial vehicle is moved to the front of the fourth unmanned aerial vehicle, the first unmanned aerial vehicle is recoupled to the first rail, the second unmanned aerial vehicle is moved to the front of the fifth unmanned aerial vehicle after the first unmanned aerial vehicle has been recoupled to the first rail, the third unmanned aerial vehicle is disengaged from the first rail after the first unmanned aerial vehicle has been recoupled to the first rail, the third unmanned aerial vehicle is moved to the front of the fourth unmanned aerial vehicle, and the third unmanned aerial vehicle is recoupled to the first rail.

A control method according to a thirty-seventh aspect is a control method according to any one of the tenth to fifteenth aspects. The system further includes a second rail that is fixed at a position spaced apart from the ground surface and that is disposed adjacent to the first rail with a space provided therebetween. In the control method, furthermore, (F) the first unmanned aerial vehicle is moved from the vicinity of the first rail to the vicinity of the second rail when the first unmanned aerial vehicle is moving forward along the first rail and the second rail is located in the direction in which the first unmanned aerial vehicle moves forward.

A control method according to a thirty-eighth aspect is a control method according to the thirty-seventh aspect. In the above (F), the altitude of the first unmanned aerial vehicle is temporarily raised when the first unmanned aerial vehicle is disengaged from the first rail.

A control method according to a thirty-ninth aspect is a control method according to the thirty-eighth aspect. In the above (F), the altitude of the first unmanned aerial vehicle is raised higher than the height of the first rail and the height of the second rail.

A control method according to a fortieth aspect is a control method according to any one of the first to thirty-ninth aspects. In the control method, furthermore, (G) the first unmanned aerial vehicle is stopped from flying while the second unmanned aerial vehicle is flying, the second unmanned aerial vehicle is caused to take up the coupling line, and the first unmanned aerial vehicle is anchored to the second unmanned aerial vehicle.

A control method according to a forty-first aspect is a control method according to the fortieth aspect. In the above (G), the second unmanned aerial vehicle is housed inside the first unmanned aerial vehicle.

A control method according to a forty-second aspect is a control method according to the fortieth or forty-first aspect. The second unmanned aerial vehicle includes a housing opening for housing a package, and the housing opening is located in a panel regarded as a side panel when the second unmanned aerial vehicle is flying.

A program or a non-transitory recording medium according to a forty-third aspect causes a computer to execute any one of the control methods according to the first to forty-second aspects.

An unmanned aerial vehicle according to a forty-fourth aspect is an unmanned aerial vehicle in a system that includes the unmanned aerial vehicle and another unmanned aerial vehicle coupled to the unmanned aerial vehicle via a coupling line. The unmanned aerial vehicle includes a first controller. The first controller causes the unmanned aerial vehicle to move forward or to stop moving forward when an anomaly has occurred in the other unmanned aerial vehicle.

A flying system according to a forty-fifth aspect is a system that includes a first unmanned aerial vehicle and a second unmanned aerial vehicle coupled to the first unmanned aerial vehicle via a coupling line. The first unmanned aerial vehicle includes a first controller, and the second unmanned aerial vehicle includes a second controller. The first controller causes the first unmanned aerial vehicle to move forward or to stop moving forward when an anomaly has occurred in flying of the second unmanned aerial vehicle.

An unmanned aerial vehicle according to a forty-sixth aspect is an unmanned aerial vehicle that delivers a package, and the unmanned aerial vehicle includes a plurality of rotary wings, a plurality of first motors that respectively rotate the plurality of rotary wings, a main body that supports the plurality of first motors, a connector that is to be connected to a rail provided at a position spaced apart from a ground surface with the main body hanging from the connector, a movable block that sets an inclination of an imaginary plane containing the plurality of rotary wings relative to a support direction in which the connector is supported on the rail, and a control circuit that controls the plurality of first motors and the movable block. The connector includes a first end connected to the main body and a second end to be slidably connected to the rail. The support direction extends from the first end toward the second end of the connector. When the second end of the connector is connected to the rail, the control circuit (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends, and (ii) causes the movable block to increase an angle formed by a normal direction of the imaginary plane relative to the support direction of the connector.

An unmanned aerial vehicle according to a forty-seventh aspect is an unmanned aerial vehicle according to the forty-sixth aspect. The movable block is disposed between the main body and the connector.

An unmanned aerial vehicle according to a forty-eighth aspect is an unmanned aerial vehicle according to the forty-sixth or forty-seventh aspect. The unmanned aerial vehicle further includes a pair of wings.

An unmanned aerial vehicle according to a forty-ninth aspect is an unmanned aerial vehicle according to the forty-eighth aspect. After the movable block has increased the angle, the control circuit disengages the connector from the rail when a propulsion speed of the unmanned aerial vehicle exceeds a predetermined value.

An unmanned aerial vehicle according to a fiftieth aspect is an unmanned aerial vehicle according to the forty-ninth aspect. When the connector is disengaged from the rail, the control circuit causes the movable block to reduce the angle and controls the rotation rate of the plurality of first motors to a rotation rate higher than the minimum rotation rate necessary for causing the unmanned aerial vehicle to float.

An unmanned aerial vehicle according to a fifty-first aspect is an unmanned aerial vehicle according to any one of the forty-sixth to fiftieth aspects. In the above (ii), the control circuit controls the rotation rate of the plurality of first motors so as to increase the angle to greater than 15 degrees.

An unmanned aerial vehicle according to a fifty-second aspect is an unmanned aerial vehicle according to the fifty-first aspect. In the above (ii), the control circuit controls the rotation rate of the plurality of first motors so as to increase the angle to greater than 45 degrees.

An unmanned aerial vehicle according to a fifty-third aspect is an unmanned aerial vehicle according to the fifty-second aspect. In the above (ii), the control circuit controls the rotation rate of the plurality of first motors so as to increase the angle to greater than 65 degrees.

An unmanned aerial vehicle according to a fifty-fourth aspect is an unmanned aerial vehicle according to the fifty-third aspect. In the above (ii), the control circuit controls the rotation rate of the plurality of first motors so as to increase the angle to greater than 80 degrees.

An unmanned aerial vehicle according to a fifty-fifth aspect is an unmanned aerial vehicle according to any one of the forty-fifth to fifty-fourth aspects. The connector includes a support portion swingably connected to the main body and a first arm connected to one end of the support portion.

An unmanned aerial vehicle according to a fifty-sixth aspect is an unmanned aerial vehicle according to the fifty-fifth aspect. The first arm is a hanger for hanging the unmanned aerial vehicle from the rail.

An unmanned aerial vehicle according to a fifty-seventh aspect is an unmanned aerial vehicle according to the fifty-fifth or fifty-sixth aspect. The connector further includes a wheel that is connected to the first arm and that allows the connector to rotatably make contact with the rail.

An unmanned aerial vehicle according to a fifty-eighth aspect is an unmanned aerial vehicle according to the fifty-fifth aspect. The connector further includes a second arm connected to the one end of the support portion.

An unmanned aerial vehicle according to a fifty-ninth aspect is an unmanned aerial vehicle according to the fifty-eighth aspect. The first arm is a first hanger for hanging the unmanned aerial vehicle from the rail. The second arm is a second hanger for hanging the unmanned aerial vehicle from the rail. The connector further includes a first actuator that sets an angle of the first arm relative to the support portion and a second actuator that sets an angle of the second arm relative to the support portion.

An unmanned aerial vehicle according to a sixtieth aspect is an unmanned aerial vehicle according to the fifty-ninth aspect. The connector further includes a base disposed between the support portion and the first and second arms and a third actuator that sets an angle of the base relative to the support portion.

An unmanned aerial vehicle according to a sixty-first aspect is an unmanned aerial vehicle according to the fifty-ninth or sixtieth aspect. The first arm includes a first hook that extends from a first connected end connected to the first actuator to a first open end. The second arm includes a second hook that extends from a second connected end connected to the second actuator to a second open end. The first hook includes a first bent portion that is bent in a first direction and located between the first connected end and the first open end. The second hook includes a second bent portion that is bent in a second direction opposite the first direction and located between the second connected end and the second open end.

An unmanned aerial vehicle according to a sixty-second aspect is an unmanned aerial vehicle according to the sixty-first aspect. When the unmanned aerial vehicle is slidably hung from a first rail via the first hook, the control circuit hooks the second hook onto a second rail extending along and adjacent to the first rail by controlling the second actuator and disengages the first hook from the first rail by controlling the first actuator.

An unmanned aerial vehicle according to a sixty-third aspect is an unmanned aerial vehicle according to the sixty-first aspect. When the unmanned aerial vehicle is slidably hung from the first rail via the first hook and the second hook, the control circuit disengages the second hook from the first rail and hooks the second hook onto the second rail extending along and adjacent to the first rail by controlling the second actuator and disengages the first hook from the first rail and hooks the first hook onto the second rail by controlling the first actuator.

An unmanned aerial vehicle according to a sixty-fourth aspect is an unmanned aerial vehicle according to the sixty-second or sixty-third aspect. When the second hook is to be hooked onto the second rail, the control circuit tilts the main body or the support portion in the second direction so as to position the second connected end higher than the first connected end. When the first hook is to be disengaged from the first rail, the control circuit tilts the main body or the support portion in the first direction so as to position the first connected end higher than the second connected end.

An unmanned aerial vehicle according to a sixty-fifth aspect is an unmanned aerial vehicle according to any one of the forty-sixth to sixty-fourth aspects. The unmanned aerial vehicle further includes a hanging wire connected to the main body and provided to hang the package and a lift motor that is capable of taking up the hanging wire. The control circuit positions the unmanned aerial vehicle vertically above a storage device for storing the package with the connector being connected to the rail. In addition, the control circuit lets out the hanging wire by actuating the lift motor, lowers the package from the main body, and stores the package into the storage device.

An unmanned aerial vehicle according to a sixty-sixth aspect is an unmanned aerial vehicle according to the sixty-fifth aspect. While the control circuit lets out the hanging wire, the control circuit adjusts at least one of the position and the orientation of the main body in accordance with the position of the package relative to the storage device.

An unmanned aerial vehicle according to a sixty-seventh aspect is an unmanned aerial vehicle according to the sixty-sixth aspect. When the position of the package is displaced in a third direction from the position vertically above the storage device, the control circuit moves the unmanned aerial vehicle in a fourth direction opposite the third direction along the direction in which the rail extends.

An unmanned aerial vehicle according to a sixty-eighth aspect is an unmanned aerial vehicle according to the sixty-seventh aspect. When the position of the package is displaced in a fifth direction from the position vertically above the storage device, the control circuit causes the unmanned aerial vehicle to swing about the rail and moves the center of gravity of the unmanned aerial vehicle in a sixth direction opposite the fifth direction.

An unmanned aerial vehicle according to a sixty-ninth aspect is an unmanned aerial vehicle according to the sixty-fifth aspect. The unmanned aerial vehicle further includes a thruster device removably attached to the package. The thruster device includes a plurality of propellers, a plurality of second motors that respectively rotate the plurality of propellers, and a support member that supports the plurality of second motors.

An unmanned aerial vehicle according to a seventieth aspect is an unmanned aerial vehicle according to the sixty-ninth aspect. The plurality of propellers include a first propeller disposed on a first side portion of the support member and a second propeller disposed on a second side portion of the support member, and the second side portion is different from the first side portion.

An unmanned aerial vehicle according to a seventy-first aspect is an unmanned aerial vehicle according to the seventieth aspect. The control circuit causes the thruster device to actuate at least one of the plurality of second motors in at least a portion of a period in which the hanging wire is let out.

A delivery system according to a seventy-second aspect includes an unmanned aerial vehicle according to any one of the forty-sixth to seventy-first aspects, a plurality of support pillars, and the rail stretched between two adjacent support pillars of the plurality of support pillars.

A delivery system according to a seventy-third aspect is a delivery system according to the seventy-second aspect. The plurality of support pillars are each a utility pole.

A delivery system according to a seventy-fourth aspect is a delivery system according to the seventy-third aspect. The delivery system further includes a lead-in support pillar disposed within a predetermined site and a lead-in wire stretched to the rail. The height from the ground surface to a first connection point at which the lead-in wire and the lead-in support pillar are connected to each other is lower than the height from the ground surface to a second connection point at which the lead-in wire and the rail are connected to each other.

A delivery system according to a seventy-fifth aspect is a delivery system according to the seventy-fourth aspect. The utility pole supports a power transmission line, and the rail is provided at a position lower than the power transmission line and higher than the leading end of the lead-in support pillar.

A delivery system according to a seventy-sixth aspect is a delivery system according to the seventy-second aspect. The plurality of support pillars are each a streetlight.

A delivery system according to a seventy-seventh aspect includes an unmanned aerial vehicle according to any one of the sixty-second to sixty-fourth aspects, a plurality of support pillars, and the first rail and the second rail stretched between two adjacent support pillars of the plurality of support pillars.

A delivery system according to a seventy-eighth aspect is a delivery system according to the seventy-seventh aspect. The delivery system further includes a protective net stretched along a position vertically below an approaching region of the first rail and the second rail. The approaching region is a region where the distance between the first rail and the second rail is smaller than or equal to the size of the unmanned aerial vehicle.

A delivery system according to a seventy-ninth aspect is a delivery system according to the seventy-seventh or seventy-eighth aspect. The height of at least a portion of the second rail is higher than the height of the adjacent first rail.

Thus far, a method of controlling an unmanned aerial vehicle has been described based on some embodiments. The present disclosure, however, is not limited to these embodiments. Unless departing from the spirit of the present disclosure, an embodiment obtained by making various modifications conceivable by a person skilled in the art to the present embodiments or an embodiment obtained by combining the constituent elements in different embodiments may also be included within the scope of one or more aspects.

Among the configurations described in Embodiments 1 to 6, the configuration of the child drone where the presence of a parent drone is not assumed or the configuration of the parent drone where the presence of a child drone is not assumed may be applied as a configuration of a standalone drone as illustrated in Embodiments 7 to 9, aside from the parent-child drone system. In this case, an embodiment in which one of the parent drone and the child drone described in Embodiments 1 to 6 is replaced with another object (e.g., a package or a moving means other than an unmanned aerial vehicle) may also be encompassed by the present disclosure. For example, the parent drone illustrated in FIG. 31 may be replaced with a package.

INDUSTRIAL APPLICABILITY

The present disclosure can be used in, for example but not limited to, a system of delivering packages with a drone in a city area.

The invention claimed is:

1. An unmanned aerial vehicle that delivers a package, the unmanned aerial vehicle comprising:
   a plurality of rotary wings;
   a plurality of first motors that rotate the plurality of rotary wings, respectively;
   a main body that supports the plurality of first motors;
   a connector that is to be connected to a rail, with the main body hanging from the connector, the rail being provided at a position spaced apart from a ground surface;
   a movable block that sets an inclination of an imaginary plane containing the plurality of rotary wings relative to a support direction in which the connector is supported on the rail; and
   a control circuit that controls the plurality of first motors and the movable block, wherein
   the connector includes:
      a first end connected to the main body; and
      a second end to be slidably connected to the rail,
   the support direction extends from the first end toward the second end of the connector, and
   when the second end of the connector is connected to the rail, the control circuit:
      (i) sets a rotation rate of the plurality of first motors to a rotation rate that is lower than a minimum rotation rate necessary for causing the unmanned aerial vehicle to float and that is higher than a minimum rotation rate necessary for propelling the unmanned aerial vehicle in a direction in which the rail extends; and
      (ii) causes the movable block to increase an angle formed by a normal direction of the imaginary plane relative to the support direction of the connector.

2. The unmanned aerial vehicle according to claim 1, further comprising:
   a pair of wings.

3. The unmanned aerial vehicle according to claim 1, wherein
   the control circuit disengages the connector from the rail when a propulsion speed of the unmanned aerial vehicle exceeds a predetermined value after the movable block has increased the angle.

4. The unmanned aerial vehicle according to claim 3, wherein
   when the connector is disengaged from the rail, the control circuit:
      causes the movable block to reduce the angle; and
      controls the rotation rate of the plurality of first motors to a rotation rate higher than the minimum rotation rate necessary for causing the unmanned aerial vehicle to float.

5. The unmanned aerial vehicle according to claim 1, wherein
   the connector includes:
      a support portion swingably connected to the main body; and
      a first arm connected to one end of the support portion.

6. The unmanned aerial vehicle according to claim 5, wherein
the connector further includes a second arm connected to the one end of the support portion.

7. The unmanned aerial vehicle according to claim 6, wherein
the first arm is a first hanger for hanging the unmanned aerial vehicle from the rail,
the second arm is a second hanger for hanging the unmanned aerial vehicle from the rail, and
the connector further includes:
a first actuator that sets an angle of the first arm relative to the support portion; and
a second actuator that sets an angle of the second arm relative to the support portion.

8. The unmanned aerial vehicle according to claim 7, wherein
the first arm includes a first hook that extends from a first connected end connected to the first actuator to a first open end,
the second arm includes a second hook that extends from a second connected end connected to the second actuator to a second open end,
the first hook includes a first bent portion that is bent in a first direction and located between the first connected end and the first open end, and
the second hook includes a second bent portion that is bent in a second direction opposite the first direction and located between the second connected end and the second open end.

9. The unmanned aerial vehicle according to claim 8, wherein
when the unmanned aerial vehicle is slidably hung from a first rail via the first hook and the second hook, the control circuit:
disengages the second hook from the first rail and hooks the second hook onto a second rail by controlling the second actuator, the second rail extending along and adjacent to the first rail; and
disengages the first hook from the first rail and hooks the first hook onto the second mil by controlling the first actuator.

10. The unmanned aerial vehicle according to claim 1, further comprising:
a hanging wire connected to the main body and provided to hang the package; and
a lift motor that is capable of taking up the hanging wire, wherein
the control circuit:
positions the unmanned aerial vehicle vertically above a storage device for storing the package, with the connector being connected to the rail; and
lets out the hanging wire by actuating the lift motor, lowers the package from the main body, and stores the package into the storage device.

11. The unmanned aerial vehicle according to claim 10, further comprising:
a thruster device removably attached to the package, wherein
the thruster device includes:
a plurality of propellers;
a plurality of second motors that rotate the plurality of propellers, respectively; and
a support member that supports the plurality of second motors.

12. The unmanned aerial vehicle according to claim 11, wherein
the plurality of propellers include:
a first propeller disposed on a first side portion of the support member; and
a second propeller disposed on a second side portion of the support member, the second side portion being different from the first side portion.

13. The unmanned aerial vehicle according to claim 12, wherein
the control circuit causes the thruster device to actuate at least one of the plurality of second motors in at least a portion of a period in which the hanging wire is let out.

14. A delivery system, comprising:
the unmanned aerial vehicle according to claim 1;
a plurality of support pillars; and
the rail stretched between two adjacent support pillars of the plurality of support pillars.

15. The delivery system according to claim 14, wherein
the plurality of support pillars are each a utility pole or a streetlight.

* * * * *